United States Patent
Yang et al.

(10) Patent No.: US 11,064,240 B2
(45) Date of Patent: Jul. 13, 2021

(54) BROADCASTING SIGNAL TRANSMISSION APPARATUS, BROADCASTING SIGNAL RECEPTION APPARATUS, BROADCASTING SIGNAL TRANSMISSION METHOD, AND BROADCASTING SIGNAL RECEPTION METHOD

(71) Applicant: LG Electronics Inc., Seoul (KR)

(72) Inventors: Seungryul Yang, Seoul (KR); Jinwon Lee, Seoul (KR); Kyoungsoo Moon, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/397,463

(22) Filed: Apr. 29, 2019

(65) Prior Publication Data

US 2019/0253746 A1  Aug. 15, 2019

Related U.S. Application Data

(62) Division of application No. 15/549,349, filed as application No. PCT/KR2016/001993 on Feb. 29, 2016.

(Continued)

(51) Int. Cl.
*H04N 21/41* (2011.01)
*H04N 21/478* (2011.01)
(Continued)

(52) U.S. Cl.
CPC ..... *H04N 21/4104* (2013.01); *H04N 21/4345* (2013.01); *H04N 21/478* (2013.01);
(Continued)

(58) Field of Classification Search
CPC ........... H04N 21/4104; H04N 21/4345; H04N 21/4821; H04N 21/8586; H04N 21/478; H04N 21/6125
See application file for complete search history.

(56) References Cited

U.S. PATENT DOCUMENTS 10,567,098 B2 * 2/2020 Kitazato ............... H04H 60/25
2004/0123317 A1   6/2004 Ozawa
(Continued)

FOREIGN PATENT DOCUMENTS

EP          2838274 A1 *  2/2015 ............. H04N 21/81
KR   10-2010-0081714 A   7/2010
(Continued)

OTHER PUBLICATIONS

ATSC Candidate Standard: Interactive Services Standard (A/105:2014), Apr. 24, 2014 (S13-2-389r7) (Year: 2014).*

(Continued)

*Primary Examiner* — Benjamin R Bruckart
*Assistant Examiner* — Tien M Nguyen
(74) *Attorney, Agent, or Firm* — Dentons US LLP

(57) ABSTRACT

The present invention proposes a method for transmitting a broadcasting signal. The method for transmitting a broadcasting signal according to the present invention proposes a system which can support a next generation broadcasting service in an environment that supports next generation hybrid broadcasting using a terrestrial broadcasting network and an Internet network. Further, in the environment that supports the next generation hybrid broadcasting, the present invention proposes an efficient signaling scheme which can cover both the terrestrial broadcasting network and the Internet network.

12 Claims, 147 Drawing Sheets

Related U.S. Application Data

(60) Provisional application No. 62/126,693, filed on Mar. 1, 2015, provisional application No. 62/150,821, filed on Apr. 21, 2015.

(51) Int. Cl.
*H04N 21/434* (2011.01)
*H04N 21/61* (2011.01)
*H04N 21/482* (2011.01)
*H04N 21/858* (2011.01)

(52) U.S. Cl.
CPC ..... *H04N 21/4821* (2013.01); *H04N 21/8586* (2013.01); *H04N 21/6125* (2013.01)

(56) References Cited

U.S. PATENT DOCUMENTS

| | | |
|---|---|---|
| 2006/0291412 A1 | 12/2006 | Naqvi et al. |
| 2009/0100472 A1 | 4/2009 | Jeon et al. |
| 2009/0180398 A1 | 7/2009 | Lejeune |
| 2009/0217320 A1* | 8/2009 | Aldrey ............... H04N 21/4622 725/37 |
| 2010/0205638 A1 | 8/2010 | Ke |
| 2011/0158354 A1* | 6/2011 | Yokokawa ............ H04L 1/0071 375/340 |
| 2011/0177775 A1* | 7/2011 | Gupta .................. H04N 21/858 455/3.06 |
| 2011/0280327 A1* | 11/2011 | Ko ........................ H04L 1/0071 375/260 |
| 2013/0311920 A1* | 11/2013 | Koo ..................... G06F 3/04817 715/765 |
| 2014/0207957 A1 | 7/2014 | Zhang et al. |
| 2017/0085921 A1 | 3/2017 | Deshpande |
| 2017/0085955 A1 | 3/2017 | Deshpande |
| 2017/0244992 A1* | 8/2017 | Deshpande ............. G06F 21/10 |
| 2017/0264966 A1 | 9/2017 | Kitahara et al. |
| 2019/0319725 A1* | 10/2019 | Lee ........................ H04H 60/07 |

FOREIGN PATENT DOCUMENTS

| | | |
|---|---|---|
| KR | 10-2013-0020879 A | 3/2013 |
| WO | 2014/119961 A1 | 8/2014 |
| WO | 2015/008986 A1 | 1/2015 |

OTHER PUBLICATIONS

HbbTV-working-draft_ts_102796 v010301p_draft_23-non-etsi-branding.pdf (Year: 2014).*
ETSI TS 102 796 v.1.2.1 (Year: 2012).*
ATSC Candidate Standard: Interactive Services Standard (A/105:2014), Apr. 24, 2014 (S13-2-389r7) (Year: 2014) (Year: 2014).*
HbbTV-working-draft_ts_102796 v010301p_draft_23-non-etsi-branding.pdf (Year: 2014) (Year: 2014).*
OIPF Release 2 Specification, vol. 5—Declarative Application Environment, V2.3 [Jan. 4, 2014] (Year: 2014).*
ETSI TS 102 796 v.1.2.1 (Year: 2012) (Year: 2012).*
U.S. Appl. No. 15/549,349.

* cited by examiner

FIG. 2

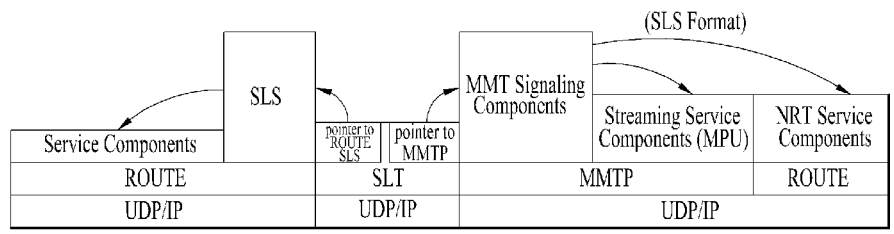

FIG. 3

| Element or Attribute Name | Use |
|---|---|
| SLT | |
| @bsid | 1 |
| @sltSectionVersion | 1 |
| @sltSectionNumber | 0..1 |
| @totalSltSectionNumbers | 0..1 |
| @language | 0..1 |
| @capabilities | 0..1 |
| InetSigLoc | 0..1 |
| Service | 1..N |
| @serviceId | 1 |
| @SLT serviceSeqNumber | 1 |
| @protected | 0..1 |
| @majorChannelNo | 1 |
| @minorChannelNo | 1 |
| @serviceCategory | 1 |
| @shortServiceName | 1 |
| @hidden | 0..1 |
| @sls ProtocolType | 1 |
| BroadcastSignaling | 0..1 |
| @slsPlpId | 0..1 |
| @slsDestinationIpAddress | 0..1 |
| @slsDestinationUdpPort | 0..1 |
| @slsSourceIpAddress | 0..1 |
| @slsMajorProtocolVersion | 0..1 |
| @SlsMinorProtocolVersion | 0..1 |
| @serviceLanguage | 0..1 |
| @broadbandAccessRequired | 0..1 |
| @capabilities | 0..1 |
| InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0...N |
| | | atsc: capabilityCode | | 0...1 |
| | | deliveryMethod | | 1..N |
| | | | r12: broadcastAppService | 1..N |
| | | | basePattern | 1..N |
| | | | r12: unicastAppService | 0..N |
| | | | basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | Use |
|---|---|---|---|---|---|
| bundleDescription | | | | | |
| | userServiceDescription | | | | |
| | | @serviceId | | | M |
| | | @atsc: serviceId | | | M |
| | | Name | | | 0..N |
| | | | Lang | | CM |
| | | serviceLanguage | | | 0..N |
| | | atsc: capabilityCode | | | 0..1 |
| | | atsc: Channel | | | 1 |
| | | | @atsc: majorChannelNo | | M |
| | | | @atsc: minorChannelNo | | M |
| | | | @atsc: serviceLang | | O |
| | | | @atsc: serviceGenre | | O |
| | | | @atsc: serviceIcon | | M |
| | | | atsc: ServiceDescription | | 0..N |
| | | | | @atsc: serviceDescrText | M |
| | | | | @atsc: serviceDescrLang | O |
| | | atsc:mpuComponent | | | 0..1 |
| | | | @atsc: mmtPackageId | | M |
| | | | @atsc: next MmtPackageId | | O |
| | | atsc: routeComponent | | | 0..1 |
| | | | @atsc: sTSIDUri | | M |
| | | | @slsPlpId | | OD |
| | | | @slsDestinationIpAddress | | OD |
| | | | @slsDestinationUdpPort | | M |
| | | | @slsSourceIpAddress | | M |
| | | | @slsMajorProtocolVersion | | OD |
| | | | @SlsMinorProtocolVersion | | OD |
| | | atsc: broadbandComponent | | | 0..1 |
| | | | @atsc: fullfMPDUri | | M |
| | | atsc: ComponentInfo | | | 1..N |
| | | | @atsc: component Type | | M |
| | | | @atsc: component Role | | M |
| | | | @atsc: component ProtectedFlag | | OD |
| | | | @atsc: component Id | | M |
| | | | @atsc: component Name | | O |

FIG. 13
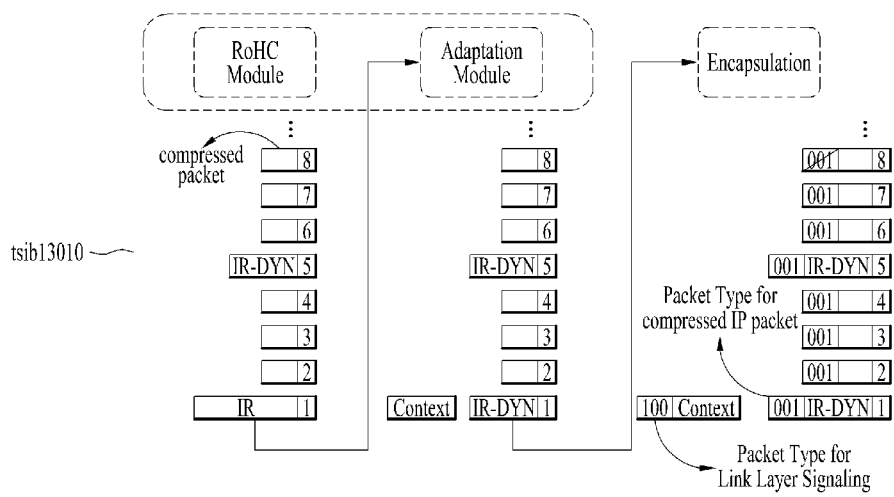
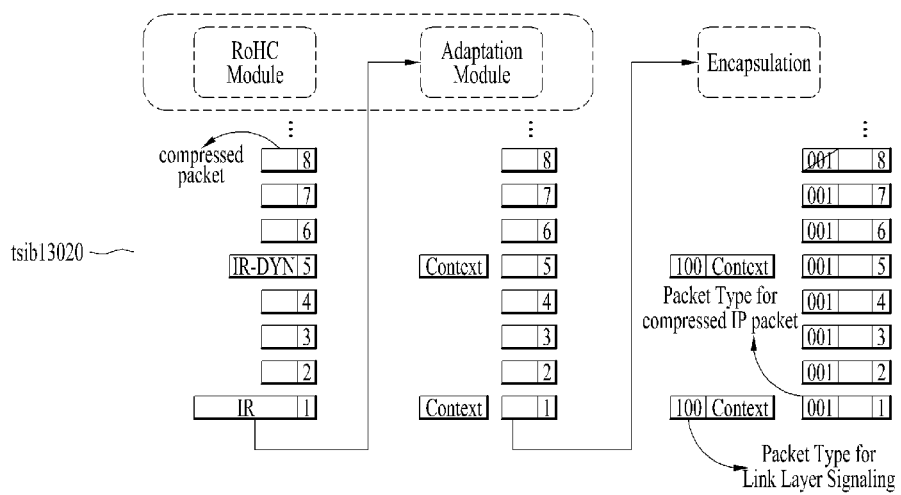

FIG. 14

Link Mapping Table — tsib14010

| Syntax | Number of bits | Mnemonic |
|---|---|---|
| Link_Mapping_Table() { | | |
|   signaling_type | 8 | "0x01" |
|   PLP_ID | 6 | uimsbf |
|   Reserved | 2 | |
|   num_session | 8 | uimsbf |
|   for(j = 0; i < num_session; i++) { | | |
|     src_IP_add | 32 | uimsbf |
|     dst_IP_add | 32 | uimsbf |
|     src_UDP_port | 16 | uimsbf |
|     dst_UDP_port | 16 | uimsbf |
|     SID_flag | 1 | bslbf |
|     compressed_flag | 1 | bslbf |
|     reserved | 6 | '000000' |
|     if(SID_flag == "1") { | | |
|       SID | 8 | uimsbf |
|     } | | |
|     if(compressed_flag == "1") { | | |
|       context_id | 8 | uimsbf |
|     } | | |
|   } | | |
| } | | |

ROHC-U description table — tsib14020

| Syntax | Number of bits | Mnemonic |
|---|---|---|
| ROHC-U_description_table { | | |
|   signaling_type | 8 | "0x02" |
|   PLP_ID | 6 | uimsbf |
|   adaptation_mode | 2 | uimsbf |
|   context_config | 2 | bslbf |
|   reserved | 6 | bslbf |
|   context_id | 8 | uimsbf |
|   context_profile | 8 | uimsbf |
|   if(context_config = 0x01) { | | |
|     context_length | 8 | uimsbf |
|     static_chain_byte () | var | uimsbf |
|   } | | |
|   else if (context_config = 0X02) { | | |
|     context_length | 8 | uimsbf |
|     dynamic_chain_byte () | var | uimsbf |
|   } | | |
|   else if (context_config = 0x03) { | | |
|     context_length | 8 | uimsbf |
|     static_chain_byte () | var | uimsbf |
|     dynamic_chain_byte () | var | uimsbf |
|   } | | |
| } | | |

(a) $S_{demux\_in}(i) = \{b_i(0), b_i(1), b_i(2),...,b_i(\eta_{MOD}-1)\}$,
$S_{demux\_out}(i) = \{c_i(0), c_i(1), c_i(2),...,c_i(\eta_{MOD}-1)\}$,
$c_i(1) = b_i(i\%\eta_{MOD}), c_i(2) = b_i((i+1)\%\eta_{MOD}),...,c_i(\eta_{MOD}-1) = b_i((i+1)\%\eta_{MOD})$ a) Bit-Interleaving Output (b) b) Bit-Demultiplexer Output

FIG. 24

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 25

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

FIG. 33

The main-PRBS generator is defined based on the $(N_a-1)$-bit binary word sequence $R_n$ with $N_a = \log_2 N_{max}$ $0 \leq n < 2$
$\quad R_n[N_a-2, N_a-3, \ldots, 1, 0] = 0, 0, \ldots, 0, 0$
$n = 2$
$\quad R_n[N_a-2, N_a-3, \ldots, 1, 0] = 0, 0, \ldots, 0, 1$
$2 < n < N_{max}$
$\quad R_n[N_a-3, N_a-4, \ldots, 1, 0] = R_n[N_a-2, N_a-3, \ldots, 2, 1]$
where
$R_n[N_a-2]$ is defined as:

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b = \log_2(0.5 N_{max})$ $0 \le k < 4$
$\quad G_k[N_b-2, N_b-3,\ldots,1,0] = 0,0,\ldots,0,0$
$k = 4$
$\quad G_k[N_b-2, N_b-3,\ldots,1,0] = 1,1,\ldots,1,1$
$4 < k < N_{max}$
$\quad G_k[N_b-3, N_b-4,\ldots,1,0] = G_k[N_b-2, N_b-3,\ldots,2,1]$ where
$\quad G_k[N_b-2]$ is defined as:

in 8K FFT mode: $G_k[10] = G_{k-1}[0] \oplus G_{k-1}[2]$
in 16K FFT mode: $G_k[11] = G_{k-1}[0] \oplus G_{k-1}[1] \oplus G_{k-1}[4] \oplus G_{k-1}[6]$
in 32K FFT mode: $G_k[12] = G_{k-1}[0] \oplus G_{k-1}[1] \oplus G_{k-1}[4] \oplus G_{k-1}[5] \oplus G_{k-1}[9] \oplus G_{k-1}[11]$ (a)

$p = 0;$
*for* $(n=0; n<N_{max}; n=n+1)$
$\quad \{T(n) = (n \bmod 2) \cdot 2^{N_a-1} + \sum_{i=0}^{N_a-2}(2^i \; ?R_n[i]);$
$\quad S_l(n) = (T(n) + A_{\lfloor l/2 \rfloor}) \bmod N_{max};$
$\quad if \; S_l(n) < N_{data}$
$\quad\quad \{H_l(p) = S_l(n);$
$\quad\quad p = p+1; \}$
$\}$ $(n \bmod 2) \cdot 2^{N_a-1}$ denotes 1-bit toggling, i.e., $R_n[N_a-1] = 0,1,0,1,\ldots$ and
the cyclic-shifting value $A_{\lfloor l/2 \rfloor}$ is calculated for every OFDM symbol pair (b)

FIG. 36
| PLP_NUM | 1 | >1 |
|---|---|---|
| Interleaving type | CI | CI-BI |
FIG. 37
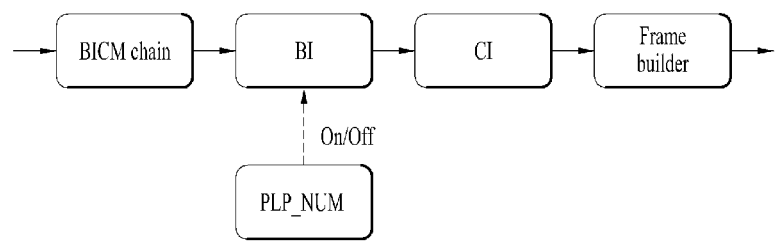
<Hybrid TI structure: example-1>
FIG. 38
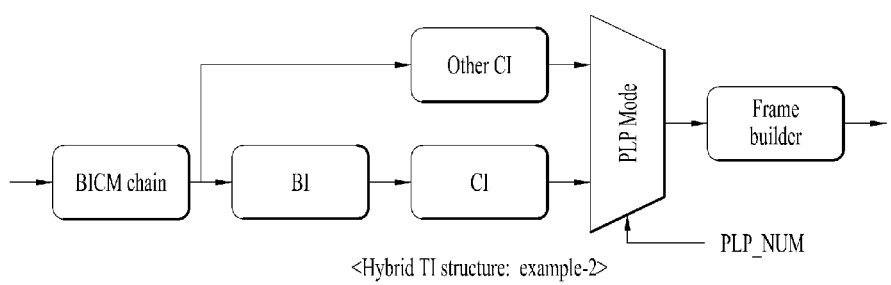
<Hybrid TI structure: example-2>

<Hybrid TI structure: example-1>

<Hybrid TI structure: example-2>

FIG. 57

| Service | Service Type | Service ID |
|---|---|---|
| ESG | atsc3.0ESG:1 | urn:atsc.org:serviceId:atsc3.0ESG |

FIG. 58

```
<?xml version="1.0" encoding="UTF-8"?>
<ESGData
xmlns="urn: atsc. serviceId: atsc3 . OESG"
xsi: schemaLocacion="urn. atsc.org : serviceId: atsc3 . OESG"
```
t54010
```
    <Service id = "atsc.org/ esg/ service/1" version-"1">
        <Name>Home Shopping</Name>
        <Description> Home Shopping Linear Service</Descripcion>
        <ServiceType>14</ServiceType>
        <ServiceType>15</ServiceType>
        ...
    </Service>
```
t54020
```
    <Schedule id="atsc.org/ esg/scheduie/1" version="1">
        <ServiceReference idRef ="atsc.org/ esg/ service/1">
        </ServiceReference>
        ...
    </Schedule>
    <Content id="atsc.org/content/1" version="1">
        ...
```
t54030
```
        <ComponentReference idRef = "atsc.org/ esg/component/1">
        </ComponentReference>
        ...
    </Content>
```
t54040
```
    <Component id="atsc.org/esg/component/1" version="1">
        <ComponentType>1</ComponentType>
        <ComponentType>6</ComponentType>
        ...
        <ComponentData ConrentType="Video">
              ...
    </Component>
    ...
    <InteractivityData>
    ...
    </InteractivityData>
</ESGData>
```

FIG. 59

```
<ESGData
xmlns="urn: atsc. serviceId: atsc3 . OESG"
xsi: schemaLocacion="urn. atsc.org : serviceId: atsc3 . OESG">
    <Service id = "atsc.org/ esg/ service/1" version-"1">
        <Name>Home Shopping</Name>
        <Description> Home Shopping Linear Service</Descripcion>
        <ServiceType>14</ServiceType>
        <ServiceType>15</ServiceType>
        ...
    </Service>
    <Schedule id="atsc.org/ esg/service/2" version="1">
        ...
    </Schedule>
    <Content id="atsc.org/content/1" version="1">
        <ServiceReference idRef = "atsc.org/ esg/ service/1">
        </ServiceReference>
        ...
    </Schedule>
    <Content id = "atsc.org/ esg/ service/1" version="1">
        ...
        <ServiceReference idRef = <"atsc.org/ esg/ service/1">
        </ServiceReference>
        <PrivateExt>
        <Component>                                              ← t55010
            <ComponentType>1</ComponentType>
            <ComponentType>1</ComponentType>
            <StarTime/>
            <EndTime/>
            <Language/>
            <Length/>
            <ParentalRating/>
            <DeviceCapability>4</DeviceCapability>
            <DeviceCapability>8</DeviceCapability>
            <TargetDevice>1</TargetDevice>
        </Component>
        <Component>
            <ComponentType>2</ComponentType>
            <ComponentRole>6</ComponentRole>
            <StartTime/>
            <EndTime/>
            <Language>KOR</Language>
            <Length/>
            <ParentalRating/>
            <DeviceCapability>11</DeviceCapability>
            <TargetDevice>1</TargetDevice>
        </Component>
        </PrivateExt>
        ...
    </Content>
</ESGData>
```

FIG. 61

```
<?xml version="1.0" encoding="UTF-8"?>
<LastChangedESGData
xmlns="urn: atsc . org:serviceId: atsc3 . OESG"
xsi: schemaLocacion="urn. atsc.org : serviceId: atsc3 . OESG"
``` t57010 —
```
    <Addtion>
        <Service id="atsc.org/esg/service/3" version="1">
        ...
        </Service>
        <Service id="atsc.org/esg/service/4" version="1">
        <Name>ABC</Name>
            ...
        </Service>
    </Addtion>
``` t57020 —
```
    <Modification>
        <Schedule id="atsc.org/esg/service/3" version="1">
            ...
        </Schedule>
    </Modification>
``` t57030 —
```
    <Deletion>
        <Content id="atsc.org/content/1" version="1">
        ...
        </Content>
        <Content id="atsc.org/content/2" version="1">
        ...
        </Content>
    </Deletion>
</LastChangedESGData>
```

FIG. 83

```
NOTIFY * HTTP/1.1
HOST: 239.255.255.250:1900
CACHE-CONTROL: max-age = seconds until advertisement expires
LOCATION: URL for UPnP description for root device
NT: search target (for example, urn:atsc:device:atsccompanion:3)
NTS: ssdp:alive
SERVER: OS/version UPnP/1.0 product/version
USN: advertisement UUID
```
~ t413010

```
M-SEARCH * HTTP/1.1
HOST: 239.255.255.250:1900
MAN: "ssdp:discover"
MX: seconds to delay response
ST: search target (for example, urn:atsc:device:atsccompanion:3)
```
~ t413020

```
HTTP/1.1 200 OK
CACHE-CONTROL: max-age = seconds until advertisement expires
DATE: when response was generated
EXT:
LOCATION: URL for UPnP description for root device
SERVER: OS/version UPnP/1.0 product/version
ST: search target (for example, urn:atsc:device:atsccompanion:3)
USN: advertisement UUID
```
~ t413030

FIG. 85

```
GET path to description HTTP/1.1
HOST: host for IP address:port for description
ACCEPT-LANGUAGE: language preferred by control point
```
~ t418010

```
<?xml version="1.0"?>
<root xmlns="urn:schemas-upnp-org:device-1-0">
  <specVersion>
    <major>1</major>
    <minor>0</minor>
  </specVersion>
  <URLBase>base URL for all relative URLs</URLBase>
  <device>
    <deviceType>urn: atsc: device: atsccompanion: 3</deviceType>
    <friendlyName>short user-friendly title</friendlyName>
    <manufacturer>manufacturer name</manufacturer>
    .....
    <serviceList>
      <service>
        <serviceType>urn: atsc: service: atsccompanion: 3</serviceType>
        <serviceId> urn: atsc: serviceId: atsccompanion</serviceId>
        <SCPDURL>URL to service description</SCPDURL>
        <controlURL>URL for control</controlURL>
        <eventSubURL>URL for eventing</eventSubURL>
        .....
      </service>
    </serviceList>
  </device>
</root>
```
~ t418020

FIG. 86 t419010

```
<?xml version="1.0"?>
<root xmlns="urn:schemas-upnp-org:device-1-0">
  .....
  <device>
    <deviceType>urn:atsc:device:atsccompanion:3</deviceType>
    <X_ATSC_ServiceIdentification>Address of Service and Content Identification
    Endpoint</X_ATSC_ServiceIdentification>
    <X_ATSC_ESG>Address of ESG Information Endpoint</X_ATSC_ESG>
    <X_ATSC_Data>Address of Service, Show and Segment Data Endpoint</X_ATSC_Data>
    <X_ATSC_MediaTimeline>Address of Media Timeline Endpoint</X_ATSC_MediaTimeline>
    <X_ATSC_MediaPlaybackState>Address of Media Playback State
    Endpoint</X_ATSC_MediaPlaybackState>
    <X_ATSC_EAS>Address of Emergency Alert Messages Endpoint</X_ATSC_EAS>
    <X_ATSC_ApptoApp>Address of App-to-App Endpoint</X_ATSC_ApptoApp>
    .....
  </device>
</root>
``` t419020

```
<?xml version="1.0"?>
<root xmlns="urn:schemas-upnp-org:device-1-0">
  .....
  <service>
    <serviceType>urn:atsc:service:atsccompanion:3</serviceType>
    <X_ATSC_ServiceIdentification>Address of Service and Content Identification
    Endpoint</X_ATSC_ServiceIdentification>
    <X_ATSC_ESG>Address of ESG Information Endpoint</X_ATSC_ESG>
    <X_ATSC_Data>Address of Service, Show and Segment Data Endpoint</X_ATSC_Data>
    <X_ATSC_MediaTimeline>Address of Media Timeline Endpoint</X_ATSC_MediaTimeline>
    <X_ATSC_MediaPlaybackState>Address of Media Playback State
    Endpoint</X_ATSC_MediaPlaybackState>
    <X_ATSC_EAS>Address of Emergency Alert Messages Endpoint</X_ATSC_EAS>
    <X_ATSC_ApptoApp>Address of App-to-App Endpoint</X_ATSC_ApptoApp>
    .....
  </service>
  .....
</root>
```

FIG. 87

```
<?xml version="1.0"?>
<root xmlns="urn:schemas-upnp-org:device-1-0">
    .....
    <device>
        <deviceType>urn:atsc:device:atsccompanion:3</deviceType>
        <X_ATSC_Companion>Address of a WebSocket Endpoint for all
        Companion functions</X_ATSC_Companion>
        .....
    </device>
</root>
```
~ t420010

```
<root xmlns="urn:schemas-upnp-org:device-1-0">
    .....
    <service>
        <serviceType>urn:atsc:device:atsccompanion:3</deviceType>
        <X_ATSC_Companion>Address of a WebSocket Endpoint for all
        Companion functions</X_ATSC_Companion>
        .....
    </service>
    ...
</root>
```
~ t420020

```
<?xml version="1.0"?>
<root xmlns="urn:schemas-upnp-org:device-1-0">
    .....
    <device>
        <deviceType>urn:atsc:device:atsccompanion:3</deviceType>
        <X_ATSC_ApptoApp>Address of App-to-App
        Endpoint</X_ATSC_ApptoApp>
        <X_ATSC_Companion>Address of a WebSocket Endpoint for all other
        Companion functions</X_ATSC_Companion>
        .....
    </device>
</root>
```
~ t420030

```
<?xml version="1.0"?>
<root xmlns="urn:schemas-upnp-org:device-1-0">
    .....
    <service>
        <serviceType>urn:atsc:device:atsccompanion:3</deviceType>
        <X_ATSC_ApptoApp>Address of App-to-App
        Endpoint</X_ATSC_ApptoApp>
        <X_ATSC_Companion>Address of a WebSocket Endpoint for all other
        Companion functions</X_ATSC_Companion>
        .....
    </service>
    .....
</root>
```
~ t420040

FIG. 89

```
GET path to description HTTP/1.1
HOST: host for description:port for description                                    — t422010
ACCEPT-LANGUAGE: language preferred by control point
```

```
HTTP/1.1 200 OK
CONTENT-LANGUAGE: language used in description
CONTENT-LENGTH: Bytes in body
CONTENT-TYPE: text/xml
ServiceIdentification-WSEndpoint-URL: Address of Service and Content Identification Endpoint
ESG-WSEndpoint-URL: Address of ESG Information Endpoint
Data-WSEndpoint-URL: Address of Service, Show and Segment Data Endpoint            — t422020
MediaTimeline-WSEndpoint-URL: Address of Media Timeline Endpoint
MediaPlaybackState-WSEndpoint-URL: Address of Media Playback State Endpoint
EAS-WSEndpoint-URL: Address of Emergency Alert Messages Endpoint
ApptoApp-WSEndpoint-URL: Address of App-to-App Endpoint
DATE: when responded
```

```
HTTP/1.1 200 OK
CONTENT-LANGUAGE: language used in description
CONTENT-LENGTH: Bytes in body                                                      — t422030
CONTENT-TYPE: text/xml
Companion-WSEndpoint-URL: Address of a WebSocket Endpoint for all Companion functions
DATE: when responded
```

```
HTTP/1.1 200 OK
CONTENT-LANGUAGE: language used in description
CONTENT-LENGTH: Bytes in body
CONTENT-TYPE: text/xml                                                             — t422040
ApptoApp-WSEndpoint-URL: Address of App-to-App Endpoint
Companion-WSEndpoint-URL: Address of a WebSocket Endpoint for all other Companion functions
DATE: when responded
```

FIG. 91

```
GET path to description HTTP/1.1
HOST: host for description:port for description          ~ t424010
ACCEPT-LANGUAGE: language preferred by control point
```

```
HTTP/1.1 200 OK
CONTENT-LANGUAGE: language used in description
CONTENT-LENGTH: Bytes in body
CONTENT-TYPE: text/xml                                   ~ t424020
WSEndpoint-URL: URL for WebSocket Endpoints
DATE: when responded
```

```
GET path to WebSocket Endpoints HTTP/1.1
HOST: host for IP address:port for WebSocket Endpoints   ~ t424030
ACCEPT-LANGUAGE: language preferred by control point
```

```
GET /WSEndpoints HTTP/1.1
HOST: 192.168.1.10:8080                                  ~ t424040
ACCEPT-LANGUAGE: language preferred by control point
```

FIG. 92

```
<?xml version="1.0"?>
 .....
 <additionalData>
   <X_ATSC_ServiceIdentification>Address of Service and Content Identification
   Endpoint</X_ATSC_ServiceIdentification>
   <X_ATSC_ESG>Address of ESG Information Endpoint</X_ATSC_ESG>
   <X_ATSC_Data>Address of Service, Show and Segment Data Endpoint</X_ATSC_Data>
   <X_ATSC_MediaTimeline>Address of Media Timeline Endpoint</X_ATSC_MediaTimeline>
   <X_ATSC_MediaPlaybackState>Address of Media Playback State
   Endpoint</X_ATSC_MediaPlaybackState>
   <X_ATSC_EAS>Address of Emergency Alert Messages Endpoint</X_ATSC_EAS>
   <X_ATSC_ApptoApp>Address of App-to-App Endpoint</X_ATSC_ApptoApp>
   .....
 </additionalData>
</root>
```
— t425010

```
<?xml version="1.0"?>
 .....
 <additionalData>
   <X_ATSC_Companion>Address of a WebSocket Endpoint for all
   Companion functions</X_ATSC_Companion>      .....
 </additionalData>
</root>
```
— t425020

```
<?xml version="1.0"?>
 .....
 <additionalData>
   <X_ATSC_ApptoApp>Address of App-to-App
   Endpoint</X_ATSC_ApptoApp>
   <X_ATSC_Companion>Address of a WebSocket Endpoint for all other
   Companion functions</X_ATSC_Companion>
   .....
   </additionalData>
</root>
```
— t425030

FIG. 101

```
<ESGData
xmlns="urn : atsc.org : serviceId : atsc3.0ESG"
xsi : schemaLocation="urn.atsc.org : serviceId : atsc3.0ESG"
    <Service id="atsc.org/esg/service/1" version="1">
        <Name> Home Shopping < /Name>
        <Description> Home shopping Linear Service < /Description>
        <ServiceType>14< /ServiceType>
        <ServiceType>15< /ServiceType>
        ...
    < /Service>
    <Service id="atsc.org/esg/service/2" version="1">
        ...
    < /Service>
    <Schedule id="atsc.org/esg/schedule/1" version="1">
        <ServiceReference idRef="atsc.org/esg/service/1">
        < /ServiceReference>
        ...
    < /Schedule>
    <Content id="atsc.org/content/1" version="1">
        ...
        <ServiceReference idRef= "atsc.org/esg/service/1">
        < /ServiceReference>
        <PrivateExt>
        <Component>
            <ComponentType>1< /ComponentType>
            <ComponentType>1< /ComponentRole>
            <StartTime/ >
            <EndTime/ >
            <Language/ >
            <Length/ >
            <ParentalRating/ >
            <DeviceCapability>4< /DeviceCapability>
            <DeviceCapability>8< /DeviceCapability>
            <TargetDevice>1< /TargetDevice>
        < /Component>
        <Component>
            <ComponentType>2</ComponentType>
            <ComponentRole>6< /ComponentRole>
            <StartTime/ >
            <EndTime/ >
            <Language>KOR</Language>
            <Length/ >
            <ParentalRating/ >
            <DeviceCapability>11< /DeviceCapability>
            <TargetDevice>1< /TargetDevice>
        < /Component>
    < /PrivateExt>
    ...
    < /Content>
    ...
< /ESGData>
```

(a)

```
{
"VariableName":"ESGData",
"Service":{
    "id":"atsc.org/esg/service/1", "version":"1", "Name":"Home Shopping",
    "Description":"Home Shopping Linear Service",
    "ServiceType":"14", "ServiceType":"15"
    ...
}
"Service":{
    "id":"atsc.org/esg/service/2", "version":"1", "Name":"Home Shopping",
    ...
}
"Schedule":{
    "id":"atsc.org/esg/schedule/1", "version":"1",
    "ServiceReference":{
            "idRef":"atsc.org/esg/service/1"
    }
    ...
}
"Content":{
    "id":" atsc.org/esg/content/1", "version":"1",
    ...
    "ServiceReference":{
            "idRef":"atsc.org/esg/service/1"
    }
    "PrivateExt":{
            "Component":{
                "ComponentType":"1", "ComponentRole":"1", "StartTime":"xxx",
                "EndTime":"yyy", "Language":"zzz", "ParentalRating":"ppp",
                "DeviceCapability":"4", "DeviceCapability":"8", "TargetDevice":"1"
            }
            ...
    }
}
}
```

(b)

FIG. 108
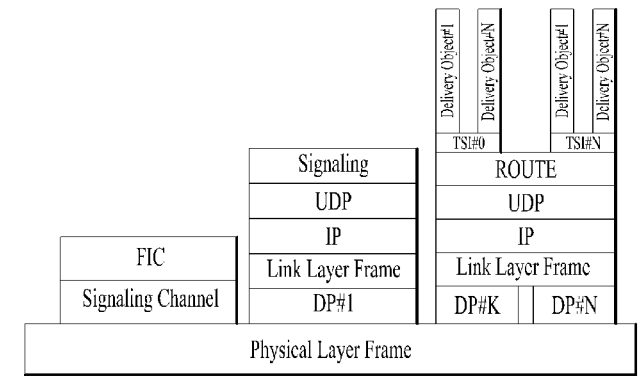
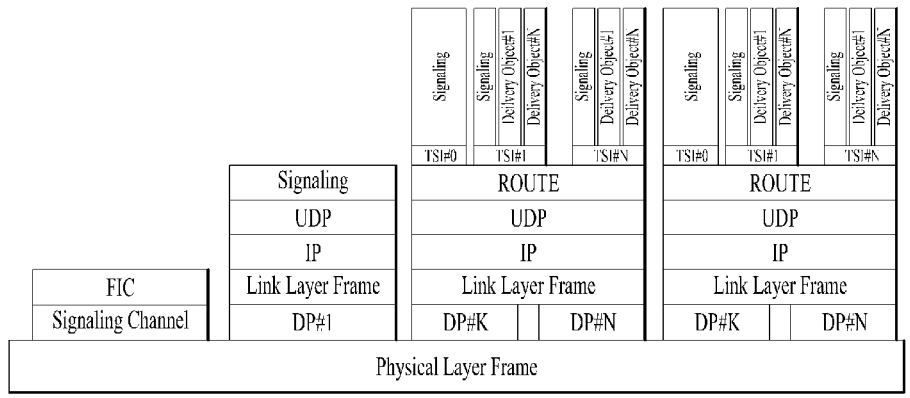
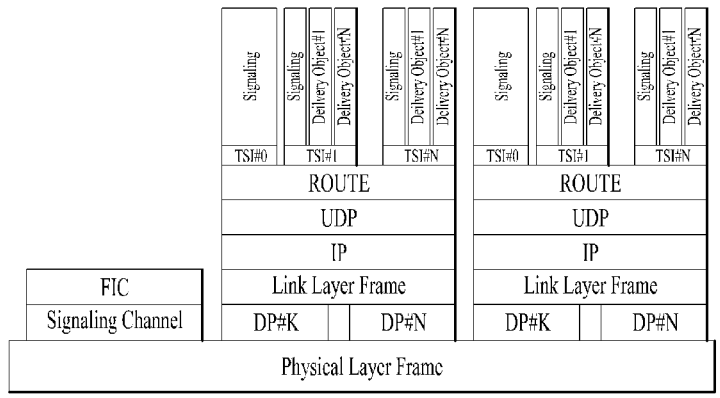

FIG. 109

| Syntax | No. Bits | Format |
|---|---|---|
| FIC(){ | | |
|     FIC_protocol_version | 8 | uimsbf |
|     TSID | 16 | uimsbf |
|     FIC_data_version | 8 | uimsbf |
|     num_partitions | 8 | uimsbf |
|     for (i-0; i<num_partitions ; i++) { | | |
|         partition_protocol_version | 8 | uimsbf |
|         base_DP_ID | 8 | uimsbf |
|         base_DP_version | 8 | uimsbf |
|         num_services | 8 | uimsbf |
|         For (j=0; j< num_services ; j++) { | | |
|             service_id | 16 | uimsbf |
|             channel_number | 16 | uimsbf |
|             service_category | 5 | uimsbf |
|             short_service_name _length /*m*/ | 3 | uimsbf |
|             short_service_name | 16*m | var |
|             service_status | 2 | uimsbf |
|             service_distribution | 2 | uimsbf |
|             sp_indicator | 1 | uimsbf |
|             reserved | 3 | '111' |
|             } | | |
|         } | | |
|     } | | |

FIG. 110

| Syntax | No. Bits | Format |
|---|---|---|
| FIC(){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i-0 ; i<num_partitions ; i++) { | | |
|         partition_id | 8 | uimsbf |
|         partition_protocol_version | 8 | uimsbf |
|         num_services | 8 | uimsbf |
|         For (j=0 ; j<num_services ; j++) { | | |
|             service_id | 16 | uimsbf |
|             service_data_version | 8 | uimsbf |
|             channel_number | 16 | uimsbf |
|             service_category | 5 | uimsbf |
|             short_service_name_length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for ( int k=0; k< num_transport_sessions;k ++){ | | |
|                 if( source_IP_address_flag ) | | |
|                     source_IP_addr | 32 or 128 | uimsbf |
|                 dest_IP_addr | 32 or 128 | uimsbf |
|                 dest_UDP_port | 16 | uimsbf |
|                 LSID_DP | 8 | uimsbf |
|                 service_signaling_flag | 8 | uimsbf |
|             [transport_session_descriptors] | | |
|             } | | |
|         [service_descriptors] | | |
|         } | | |
|     [partition_descriptors] | | |
|     } | | |
|     [FIC_descriptors] | | |
| } | | |

FIG. 112

| Syntax | No. Bits | Format |
|---|---|---|
| FIC( ){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i=0 ; i<num_partitions ; i++) { | | |
|         partition_id | 8 | uimsbf |
|         partition_protocol_version | 8 | uimsbf |
|         num_services | 8 | uimsbf |
|         For (j=0 ; j< num_services ; j++) { | | |
|             service_id | 16 | uimsbf |
|             service_data_version | 8 | uimsbf |
|             channel_number | 16 | uimsbf |
|             service_category | 5 | uimsbf |
|             short_service_name _ length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for ( int k=0; k< num_transport_sessions;k ++){ | | |
|                 if( source_IP_address_flag ) | | |
|                     source_IP_addr | | |
|                 dest_IP_addr | | |
|                 dest_UDP_port | 32 or 128 | uimsbf |
|                 LSID_DP | 32 or 128 | uimsbf |
|                 service_signaling_flag | 16 | uimsbf |
|                 if( service_signaling_flag == TRUE){ | 8 | uimsbf |
|                     signaling_data_version | 8 | uimsbf |
|                     signaling_DP | | |
|                 } | 8 | uimsbf |
|                 [transport_session_descriptors] | 8 | uimsbf |
|             } | | |
|             [service_descriptors] | | |
|         } | | |
|         [partition_descriptors] | | |
|     } | | |
|     [FIC_descriptors] | | |
| } | | |

FIG. 114

| Signaling message header | Signaling message data (binary or XML formatted) |
|---|---|

| Syntax | No. Bits | Format |
|---|---|---|
| signaling_message_header ( ){ | | |
|    signaling_id | 8 | uimsbf |
|    signaling_length | 16 | uimsbf |
|    signaling_id_extension | 16 | uimsbf |
|    version_number | 4 | uimsbf |
|    current_next_indicator | 1 | uimsbf |
|    indicator_flags{ | | |
|      fragmentation_indicator | 1 | bslbf |
|      payload_format_indicator | 1 | bslbf |
|      expiration _indicator | 1 | bslbf |
|    } | | |
|    if( fragmentation_availability == '1'){ | | |
|      fragment_number | 4 | uimsbf |
|      last_fragment_number | 4 | uimsbf |
|    } | | |
|    if( payloadformat_availability == '1'){ | | |
|      payload_format | 8 | uimsbf |
|    } | | |
|    if(expiration _availability == '1'){ | | |
|      expiration | 32 | uimsbf |
|    } | | |
|  } | | |
| } | | |

FIG. 115

| Service Mapping Table |
|---|
| Signaling_id(SMT) |
| ..
protocol_version
broadcast_id
signaling_version |
| ..
num_services
for i=0..num_services-1{
   service_id
   service_category
   service_status
   sp_indicator
   num_ROUTE_session
   ..
} |

| MPD Delivery Table |
|---|
| Signaling_id(MPDT) |
| ..
protocol_version
sequence_number
signaling_version |
| ..
MPD_id
version
delivery_mode
If(delivery_mode==embedded)
   MPD_data( )
else if(delivery_mode==referenced)
   MPD_URL
.. |

| Component Mapping Table |
|---|
| Signaling_id(CMT) |
| ..
protocol_version
..
signaling_version |
| ..
service_id
num_component
for i=0..num_component-1{
   mpd_id
   period_id
   representation_id
   IP
   port
   tsi
   DP_id
   ..
} |

| LSID Table |
|---|
| signaling_id(LSIDT) |
| ..
protocol_version
..
signaling_version
.. |
| .... |

| Application Parameter Table |
|---|
| Signaling_id(APT) |
| ..
protocol_version
..
signaling_version
.. |
| service_id
tpt_id
num_app
for i=0..num_app-1{
   app_name
   ..
} |

| Initialization Segment Delivery Table |
|---|
| Signaling_id(ISDT) |
| protocol_version
sequence_number
signaling_version
.. |
| mpd_id
period_id
representation_id
Initialization_segment_data( )
... |

FIG. 116

| Signaling message header | Service signaling message or a part thereof |

| | Element or Attribute Name | Use | Description |
|---|---|---|---|
| | Service | 1..N | specifies the service |
| | @id | M | Service identifier |
| | @serviceType | M | service type |
| | @serviceName | O | service name |
| | @channelNumber | M | channel number associated with this service |
| | ... | | |
| | ROUTE Session | 0..N | ROUTE session information |
| | @sourceIP | O | the source address of the IP datagrams carrying ROUTE packets |
| | @destinationIP | O | the destination address of the IP datagrams carrying ROUTE packets |
| | @destinationPort | O | the destination port number of the IP datagrams carrying ROUTE packets |
| | LSID | 0..1 | LCT session instance description used in this ROUTE session |
| | LSIDLocation | 0..1 | The location where LSID can be acquired |
| | @deliveryMode | M | The delivery mode of this LSID location signalling |
| | BootstrapInfo | 1 | Bootstrap information of LSID according to the delivery mode |
| | MPD | 0...1 | DASH media presentation description (MPD) |
| | @version | 0..1 | Version of the MPD |
| | MPDSignalingLocation | 0...1 | The location where MPD or MPD URL can be acquired |
| | @deliveryMode | O | The delivery mode of this MPD location signalling |
| | BootstrapInfo | 1 | Bootstrap information of MPD or MPD URL according to the delivery mode |
| | ComponentSignalingLocation | 1...N | Component location signalling |
| | @deliveryMode | O | The delivery mode of this component location signalling |
| | BootstrapInfo | 1 | Bootstrap information of this component location signalling according to the delivery mode |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href. If linking is used, then all attributes are "optional" and < minOccurs =0>
Elements are bold ; attributes are non -bold and preceded with an @.

| | Element or Attribute Name | Use | Description |
|---|---|---|---|
| | BootstrapInfo | | |
| | @sourceIP | O | the source address of the IP datagrams carrying associated data |
| | @destinationIP | O | the destination address of the IP datagrams carrying associated data |
| | @destinationPort | O | the destination port number of the IP datagrams carrying associated data |
| | @tsi | O | Application layer transport session identifier of session-based transport packets carrying associated data |
| | @URL | O | URL where associated data can be acquired |
| | @packetid | O | The identifier of transport packets carrying the associated data |

FIG. 117

| Syntax | No. of Bits | Format |
|---|---|---|
| Service_signaling_table { | | |
|     SST_protocol_version | 8 | uimsbf |
|     partition_id | 8 | uimsbf |
|     SST_data_version | 8 | uimsbf |
|     num_services | 8 | uimsbf |
|     for (i-0; i<num_services ; i++) { | | |
|         service_id    {same   as  service_channel?} | 16 | uimsbf |
|         service_name    {string} | var | |
|         Component_signaling_locations { | | |
|             availability_flags { | | |
|                 MPD_availability | 4 | uimsbf |
|                 CMT_availability | 4 | uimsbf |
|                 AST_availability | 4 | uimsbf |
|                 reserved | 4 | uimsbf |
|             } | | |
|             DP_ID | 8 | uimsbf |
|             LCT_IP_address | 32 | uimsbf |
|             LCT_UDP_port | 16 | uimsbf |
|             LCT_TSI | 16 | uimsbf |
|             MPD_TOI | 16 | uimsbf |
|             CMT_TOI | 16 | uimsbf |
|             AST_TOI | 16 | uimsbf |
|             MPD_URL    {string} | var | |
|             CMT_URL    {string} | var | |
|             AST_URL    {string} | var | |
|         } | | |
|     } | | |

FIG. 119

Component Mapping Table Description Semantics

| Element/Attribute | | | Cardinality | Description |
|---|---|---|---|---|
| Component Mapping TableDescription | | | | |
| | @ service_id | | 1 | Identifier associated with the component |
| | Broadcast Comp | | 0..N | Components transmitted through the same broadcast stream |
| | | @ mpdID | 0 | Associated DASH MPD identifier |
| | | @perID | 0 | Associated period identifier in corresponding MPD |
| | | @ reptnID | 0 | DASH Representation identifier associated with the corresponding component |
| | | @ baseURL | 0 | This may indicate Base URL of DASH segment associated with corresponding component |
| | | @ datapipe_ID | 1 | Identifier of data pipe through which corresponding component data is transmitted in a broadcast stream |
| | BBComp | | 0..N | Component transmitted through the broadband network |
| | | @ mpdID | 0 | Associated DASH MPD identifier |
| | | @ perID | 0 | Associated period identifier in corresponding MPD |
| | | @ reptnID | 0 | DASH Representation identifier associated with the corresponding component |
| | | @ baseURL | 0 | This may indicate Base URL of DASH segment associated with corresponding component |
| | ForeignComp | | 0..N | Components transmitted through another broadcast stream |
| | | @mpdID | 0 | Associated DASH MPD identifier |
| | | @ perID | 0 | Associated period identifier in corresponding MPD |
| | | @ reptnID | 0 | DASH Representation identifier associated with the corresponding component |
| | | @ baseURL | 0 | This may indicate Base URL of DASH segment associated with corresponding component |
| | | @ transportStreamID | 1 | Identifier of the broadcast stream containing the component data |
| | | @ sourceIPAddr | 1 | Source IP address of the IP datagram containing the component data |
| | | @ destIPAddr | 1 | Destination IP address of the IP datagram containing the component data |
| | | @ destUDPPort | 1 | Destination UDP port number of the IP datagram containing the component data |
| | | @ datapipe_ID | 1 | Identifier of a data pipe through which the corresponding component data is transmitted in a broadcast stream |

Legend:
 For attributes: M=Mandatory, O=Optional, OD=Optional with Default Value, CM=Conditionally Mandatory.
 For elements: < minOccurs >...< maxOccurs > (N=unbounded)
 Note that the conditions only holds without using xlink:href . If linking is used, then all attributes are
 "optional" and < minOccurs = 0 >
 Elements are bold ; attributes are non -bold and preceded with an @.

| Signaling message header | Component mapping description or a part thereof |
|---|---|

FIG. 120

| Syntax | No. of Bits | Format |
|---|---|---|
| Component_mapping_table { | | |
|     CMT_protocol_version | 8 | uimsbf |
|     service_id | 16 | uimsbf |
|     CMT_data_version | 8 | uimsbf |
|     num_broadcast_streams | 8 | uimsbf |
|     for (i-0; i<num_broadcast_streams; i++) { | | |
|         TSID | 16 | uimsbf |
|         num_partitions | 8 | uimsbf |
|         for (j-0; j<num_partitions; j++) { | | |
|             partition_id | 8 | uimsbf |
|             num_data_pipes | 8 | uimsbf |
|             for (k-0; k<num_data_pipes; k++) { | | |
|                 DP_ID | 8 | uimsbf |
|                 num_transort_sessions | 8 | |
|                 for (l-0; l<num_transport_sessions; l++) { | | |
|                     IP_address | 32 | uimsbf |
|                     UDP_port | 16 | uimsbf |
|                     num_LCT_channels | 8 | uimsbf |
|                     for (l-0; l<num_LCT_channels; l++) { | 8 | uimsbf |
|                         LCT_TSI | 16 | uimsbf |
|                         Representation_ID | | |
|                         Internet_availability | 1 | bslbf |
|                         reserved | 7 | '1111111' |
|                     } | | |
|                 } | | |
|             } | | |
|         } | | |
|     } | | |
|     num_internet_only_reptns | 8 | uimsbf |
|     for (l-0; l<num_internet_only_reptns; l++) { | | |
|         Representation_ID | 8 | uimsbf |
|     } | | |
| } | | |

FIG. 121

The semantics of URL Signaling Table Description

| Element/Attribute | Cardinality | Description |
|---|---|---|
| URL Signaling Table Description | | |
| @ service_id | 1 | Associated Service identifier |
| @ mpdURL | 0..1 | URL of broadband MPD |
| @ cstURL | 0..1 | URL of broadband CMT (component mapping table) |
| @ astURL | 0..1 | URL of broadband AST (application signaling table) |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold ; attributes are non -bold and preceded with an @.

| Signaling message header | URL Signaling Table Description or a part thereof |

FIG. 122

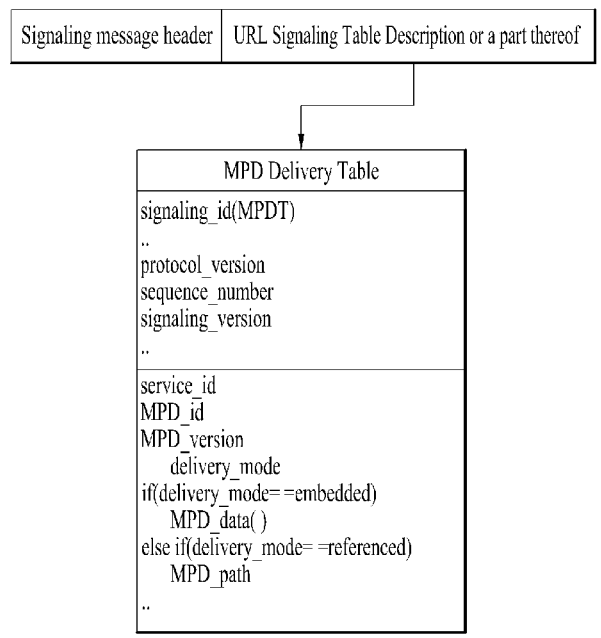

MDP Delivery Table Description Semantics

| Element/Attribute | Cardinality | Description |
|---|---|---|
| MPD Table Description | | |
| @ service_id | 1 | Identifier of associated broadcast service |
| @ MPD_id | 1 | MPD identifier |
| @ MPD_version | 1 | Version information indicating change in information of about MPD |
| @MPD_URL | 0 | URL information for acquiring MPD |
| MPD | 0 | MPD element |

Legend:
For attributes: M=Mandatory, O=Optional, OD=Optional with Default Value, CM=Conditionally Mandatory.
For elements: <minOccurs >...< maxOccurs > (N=unbounded)
Note that the conditions only holds without using xlink:href . If linking is used, then all attributes are "optional" and < minOccurs = 0 >
Elements are bold ; attributes are non -bold and preceded with an @.

FIG. 123

```
┌─────────────────────────┬──────────────────────────────────┐
│ Signaling message header│ MPD delivery table or a part thereof │
└─────────────────────────┴──────────────────────────────────┘
```

| Syntax | No. Bits | Format |
|---|---|---|
| service_id | 16 | uimsbf |
| MPD_id_length /* M */ | 16 | uimsbf |
| MPD_id_bytes ( ) | 8*M | var |
| MPD_version | 8 | uimsbf |
| availability_flag { | | |
|   MPD_URL_availabilty | 1 | bslbf |
|   MPD_data_availability | 1 | bslbf |
| } | | |
| if( MPD_URL_availabilty ) { | | |
|   MPD_URL_length /* L */ | 14 | uimsbf |
|   MPD_URL_bytes ( ) | 8*L | var |
| } | | |
| if( MPD_data_availability ) { | | |
|   MPD_coding | 2 | uimsbf |
|   MPD_byte_length /* N */ | 14 | uimsbf |
|   MPD_bytes ( ) | 8*N | var |
| } | | |
| } | | |

| Value | Designation |
|---|---|
| 0×00 | Plain text |
| 0×01 | Compressed by gzip |
| 0×02-0×03 | Reserved for future use |

FIG. 124

LCT Session Instance Dscription Semantics

| Element or Attribute Name | | | Use | Description |
|---|---|---|---|---|
| LSID | | | | LCT Session Instance Description |
| @version | | | O | Version of this LCT Session Instance Description. The version is increased by one when the descriptor is updated. The received LSID with highest version number is the currently valid version. |
| | @validFrom | | O | The date and time from which the LSID is valid. The validFrom attribute may or may not be present. If not present, the receiver can assume the LSID version is valid immediately. |
| | @expiration | | O | The date and time when the LSID expires. The expiration attribute may or may not be present. If not present the receiver can assume the LSID is valid for all time, or until it receives a newer LSID with an associated expiration value. |
| | TransportSession | | 1...N | Provides information about LCT transport sessions |
| | | @ tsi | M | Specifies the transport session identifier. The session identifiers must not be 0. |
| | | SourceFlow | 0 ... 1 | Provides information of a source flow carried on this tsi |
| | | RepairFlow | 0 ... 1 | Provides information of a repair flow carried on the tsi. |
| Legend: | | | | |
| For attributes: M=Mandatory, O=Optional, OD=Optional with Default Value, CM=Conditionally Mandatory. | | | | |
| For elements: < minOccurs >...< maxOccurs > (N=unbounded) | | | | |
| Note that the conditions only holds without using xlink:href . If linking is used, then all attributes are "optional" and < minOccurs = 0 > | | | | |
| Elements are bold; attributes are non bold and preceded with an @. | | | | |

FIG. 125

| Element or Attribute Name | | | Use | Description |
|---|---|---|---|---|
| SourceFlow | | | | defines a source flow in session |
| | EFDT | | 0 ... 1 | If provided, it specifies the details of the file delivery data. This is the extended File Delivery Table(FDT) instance. The EFDT may either be embedded or may be provided as a reference. If provided as a reference the EFDT may be updated independently of the LSID. |
| | | @idRef | 0? | Identification of the EFDT, it can be represented as a URI by the corresponding Transport Session. |
| | | @realtime | OD default: false | If not present it is false. If present and set to true, LCT packets contain extension headers including timestamps that express the presentation time of the included delivery object. |
| | | @minBufferSize | O | Defines the maximum amount of data that needs to be stored in the receiver. This value may be present if @realtime is set to true. |
| | ApplicationIdentifier | | 0 ... 1 | May provide additional information that can be mapped to the application that is carried in this transport session, e.g. Representation ID of a DASH content or the Adaptation Set parameters of a DASH Representation in order to select the LCT transport session for rendering. |
| | PayloadFormat | | 1 ... N | Defines payload formats of ROUTE packets carrying the objects of the source flow |
| | | @codePoint | OD default=0 | Defines what CodePoint value is used for this payload. This is the value of the CP field in the LCT header. When signalling this value, the delivery of the object can follow the rules below. |
| | | @deliveryObjectFormat | M | Specifies the payload format of the delivery object |
| | | @fragmentation | OD default=0 | Specifies the type of fragmentation 0 : arbitrary 1: application specific (sample based) 2 : application specific (e.g., a collection of boxes) |
| | | @deliveryOrder | OD default=0 | Specifies the ordering of delivery of objects 0 : arbitrary 1: in -order delivery 2: in -order delivery of media samples and prior to movie fragment box |
| | | @sourceFecPayloadID | OD default=1 | Defines the format of the Source FEC Payload ID. The following values can be defined : - 0: the source FEC payload ID is absent and the entire delivery object is contained in this packet. - 1: the source FEC payload ID is 32 bit and expresses the start offset in the object. - 2: FECParameters defines the Format of the Source FEC Payload ID. |
| | FECParameters | | 0 ... 1 | Defines the FEC parameters . This includes the FEC-encoding -id, the instance -id, etc. It is specifically used to signal the applied Source FEC Payload ID. |

Legend:
For attributes: M=Mandatory, O=Optional, OD=Optional with Default Value. CM=Conditionally Mandatory.
For elements: <minOccurs >...< maxOccurs > (N=unbounded)
Note that the conditions only holds without using xlink:href . If linking is used, then all attributes are "optional"
and < minOccurs = 0 >
Elements are bold; attributes are non bold and preceded with an @.

FIG. 126

| Element or Attribute Name | Use | Description |
|---|---|---|
| EFDT | | extended FDT instance descriptor |
| @ idRef | 0...1 | Identification of the EFDT, |
| @version | O | Version of this extended FDT instance descriptor. The version if increased by one when the descriptor is updated. The received EFDT with highest version number is the currently valid version. |
| @ maxExpiresDelta | O | The maximum expiry time for an object in the Transport Session after sending the first packet associated to this object. |
| @ maxTransportSize | O | The maximum transport size of any object described by this EFDT. |
| FileTemplate | 0...1 | Specifies the file URL or file template in the body |
| Legend: | | |
| For attributes: M=Mandatory, O=Optional, OD=Optional with Default Value, CM=Conditionally Mandatory. | | |
| For elements: <minOccurs>...< maxOccurs> (N=unbounded) | | |
| Note that the conditions only holds without using xlink:href . If linking is used, then all attributes are "optional" and < minOccurs = 0 > | | |
| Elements are bold ; attributes are non-bold and preceded with an @ . | | |

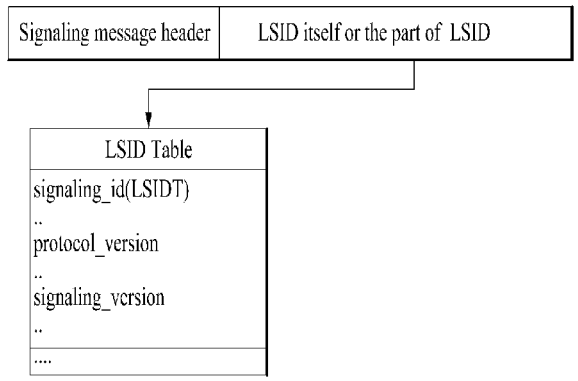

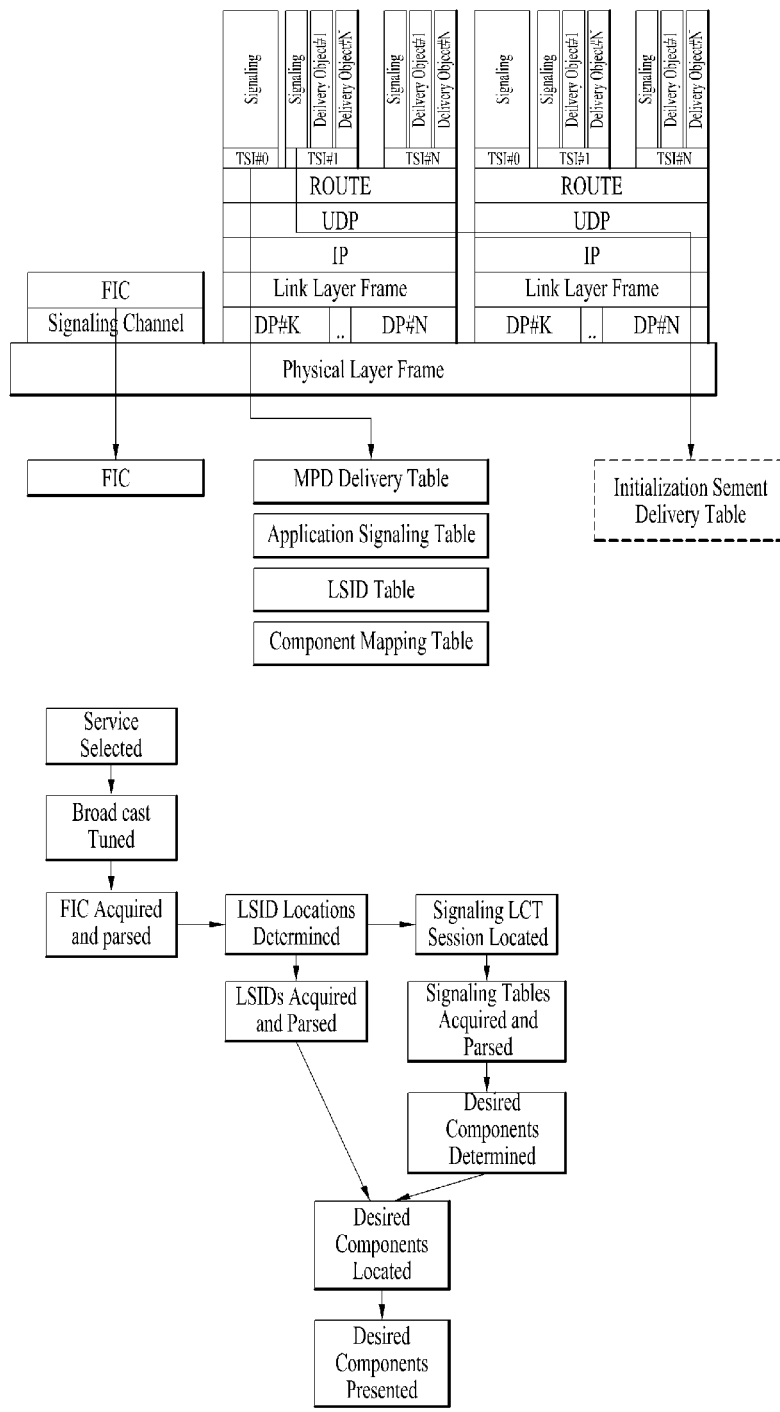

FIG. 129

| Example Trigger | Function |
|---|---|
| xbc.tv/e12 | Pre-load TPT from identified location (online at http://xbc.tv/e12 or within associated FLUTE session). |
| xbc.tv/e12?s=10 | Pre-load TPT from identified location (online at http://xbc.tv/e12 or within associated FLUTE session), with smoothing parameter value 10 seconds. |
| xbc.tv/e12?v=2 | Pre-load TPT from the identified location and indicate the version number of this TPT. If a TPT had previously been acquired from this location and it was associated with a different version number, the receiver should reload this new version. |
| xbc.tv/e12?m=5a33 | Identify the location of TPT and establish the current Media Time of the associated content. |
| xbc.tv/e12?e=7.5 | Identify the location of TPT and signal the immediate execution of the TPT interactive event with eventID value 5 associated with the TDO that has appID value 7. |
| xbc.tv/e12?e=8.3&t=77ee | Identify the location of TPT and signal the execution at Media Time 77ee of the TPT interactive event with eventID value 3 associated with the TDO that has appID value 8. |
| xbc.tv/e12?m=5a33&s=12 | Identify the location of TPT and establish the current Media Time of the associated content, with smoothing parameter value 12 seconds. |
| xbc.tv/e12?m=44b1&c=xbc55 | Identify the location of the Direct Execution DO to be launched, establish the current Media Time of the associated content, and identify the content. |
| xbc.tv/e12?e=8.3&st=77ee&et=80ee | Identify the location of TPT and signal the execution at Media Time 77ee of the TPT interactive event with eventID value 3 associated with the TDO that has appID vaue 8 and has a end time 80ee. |

FIG. 130

| Element/Attribute | Cardinality | Data Type | Description and Value |
|---|---|---|---|
| TPT | | | |
| @majorProtocolVersion | 0..1 | integer 0..15 | Major Protocol Version, default="1" |
| @minorProtocolVersion | 0..1 | integer 0..15 | Minor Protocol version, default="0" |
| @id | 1 | anyURI | segment_id = domain_name/program_id |
| @tptVersion | 1 | unsignedByte | Data version of this TPT |
| @expireDate | 0..1 | dateTime | Date after which this TPT will not be used |
| @updatingTime | 0..1 | unsignedShort | Time interval to check for TPT updates |
| @serviceID | 0..1 | unsignedShort | NRT service_id |
| @baseURL | 0..1 | anyURI | Base URL for all relative URLs in TPT |
| Capabilities | 0..1 | nrt:CapabilitiesType | Essential capabilities for the segment associated with this TPT |
| LiveTrigger | 0..1 | | Info on Internet live trigger delivery |
| @URL | 1 | anyURI | URL of server for live triggers |
| @pollPeriod | 0..1 | unsignedByte | Short polling period in seconds |
| TDO | 1..N | | TDO (app) for the segment associated with this TPT |
| @appID | 1 | unsignedShort | Application ID of this app, unique within the scope of this TPT |
| @appType | 0..1 | integer 0..15 | Application type (default: 1="TDO") |
| @appName | 0..1 | String | Display name (for viewer launch consent) |
| @globalID | 0..1 | anyURI | Globally unique app ID |
| @appVersion | 0..1 | unsignedByte | Version of this app |
| @cookieSpace | 0..1 | unsignedByte | Persistent storage needed; default=0 |
| @frequencyOfUse | 0..1 | integer 0..15 | Code values per Table 6.3 |
| @expireDate | 0..1 | dateTime | Expire date for caching this app |
| @testTDO | 0..1 | Boolean | Flag for test app; default="false" |
| @availInternet | 0..1 | Boolean | Default="true" |
| @availBroadcast | 0..1 | Boolean | Default="true" |
| URL | 1..N | anyURI | App URL(s) |
| @entry | 0..1 | Boolean | Indicator of entry point; default = "false" |
| Capabilities | 0..1 | nrt:CapabilitiesType | Essential capabilities to present this app |
| ApplicationBoundary | 0..1 | | Extensions to app boundary |
| OriginURL | 1..N | anyURI | Origin to be added to app boundary |
| ContentItem | 0..N | | Content item used by this app |
| URL | 1..N | anyURI | URL(s) of content item |
| @entry | 0..1 | Boolean | Indicator of entry point; default = "false" |
| @updatesAvail | 0..1 | Boolean | Default="false" |
| @pollPeriod | 0..1 | unsignedByte | Short polling period in seconds |
| @size | 0..1 | 24-bit integer | Size of content item, in kilobytes |
| @availInternet | 0..1 | Boolean | Default="true" |
| @availBroadcast | 0..1 | Boolean | Default="true" |
| Event | 1..N | | Event targeted to this TDO |
| @eventID | 1 | unsignedShort | Unique identifier of this Event element within the scope of the TDO element. |
| @action | 1 | String | Allowed values are "prep", "exec", "susp", and "kill" |
| @destination | 0..1 | unsignedByte | Device to which the event is directed (primary screen, second screen, or both) |
| @diffusion | 0..1 | unsignedByte | Period for applying diffusion, in seconds |
| Data | 0..N | base64Binary | Data to be used for this event |
| @dataID | 1 | unsignedShort | Unique identifier of this Data element within the scope of the Event element. |

FIG. 131

| Element or Attribute Name | Use | Description |
|---|---|---|
| EventStream | | specifies event Stream |
| @xlink:href | O | specifies a reference to an external EventStream element |
| @xlink:actuate | OD<br>default: onRequest | specifies the processing instructions, which can be either "onLoad" or "onRequest".<br><br>This attribute shall not be present if the @xlink:href attribute is not present. |
| @schemeIdUri | M | identifies the message scheme. The string may use URN or URL syntax. When a URL is used, it is recommended to also contain a month-date in the form mmyyyy; the assignment of the URL must have been authorized by the owner of the domain name in that URL on or very close to that date. A URL may resolve to an Internet location, and a location that does resolve may store a specification of the message scheme. |
| @value | O | specifies the value for the event stream element. The value space and semantics must be defined by the owners of the scheme identified in the @schemeIdUri attribute. |
| @timescale | O | specifies the timescale in units per seconds to be used for the derivation of different real-time duration values in the Event elements.<br><br>If not present on any level, it shall be set to 1. |
| Event | 0 ... N | specifies one event. For details see Table 25.<br><br>Events in Event Streams shall be ordered such that their presentation time is non-decreasing. |
| Legend:<br>    For attributes: M=Mandatory, O=Optional, OD=Optional with Default Value,<br>    CM=Conditionally Mandatory.<br>    For elements: <minOccurs>...<maxOccurs> (N=unbounded)<br>Elements are bold; attributes are non-bold and preceded with an @. | | |

FIG. 132

| Element or Attribute Name | Use | Description |
|---|---|---|
| Event | | specifies an event and contains the message of the event, formatted as a string. The content of this element depends on the event scheme. |
| @presentationTime | OD default: 0 | specifies the presentation time of the event relative to the start of the Period.<br><br>The value of the presentation time in seconds is the division of the value of this attribute and the value of the @timescale attribute.<br><br>If not present, the value of the presentation t is 0. |
| @duration | O | specifies the presentation duration of the event.<br><br>The value of the duration in seconds is the division of the value of this attribute and the value of the @timescale attribute.<br><br>If not present, the value of the duration is unknown. |
| @id | O | specifies an identifier for this instance of the event. Events with equivalent content and attribute values in the Event element shall have the same value for this attribute. |
| Legend:<br>    For attributes: M=Mandatory, O=Optional, OD=Optional with Default Value, CM= Conditionally Mandatory.<br>    For elements: <minOccurs>...<maxOccurs> (N=unbounded)<br>Elements are bold; attributes are non-bold and preceded with an @. | | |

FIG. 133

```
aligned(8) class DASHEventMessageBox extends FullBox('emsg', version = 0, flags = 0){
    string                    scheme_id_uri;
    string        value;
    unsigned int(32) timescale;
    unsigned int(32) presentation_time_delta;
    unsigned int(32) event_duration;
    unsigned int(32) id;
    unsigned int(8)  message_data[];
    }
}
```

FIG. 134

| Application Trigger Property | MPD Events | Inband Events (emsg) |
|---|---|---|
| Application Trigger Type | @schemeIdUri + "U-0020" (SPACE character) + @value | scheme_id_uri + "U+0020" (SPACE character) + value |

FIG. 135

| @value | Description |
|---|---|
| tpt | Signals the location of TPT |
| status | Signals the lifecycle of applications (e.g., preparing, launching, terminating, suspending, etc.) |
| action | Signals the actions taken by applications |
| mediatime | Signals media time |

FIG. 136

| Element/Attribute | Cardinality | Data Type | Description and Value |
|---|---|---|---|
| TPT | | | |
| @majorProtocolVersion | 0..1 | integer 0..15 | Major Protocol Version, default="1" |
| @minorProtocolVersion | 0..1 | integer 0..15 | Minor Protocol version, default="0" |
| @id | 1 | anyURI | segment_id = domain_name/program_id |
| @tptVersion | 1 | unsignedByte | Data version of this TPT |
| @expireDate | 0..1 | dateTime | Date after which this TPT will not be used |
| @updatingTime | 0..1 | unsignedShort | Time interval to check for TPT updates |
| @serviceID | 0..1 | unsignedShort | NRT service_id |
| @baseURL | 0..1 | anyURI | Base URL for all relative URLs in TPT |
| Capabilities | 0..1 | nrt:CapabilitiesType | Essential capabilities for the segment associated with this TPT |
| LiveTrigger | 0..1 | | Info on Internet live trigger delivery |
|   @URL | 1 | anyURI | URL of server for live triggers |
|   @pollPeriod | 0..1 | unsignedByte | Short polling period in seconds |
| TDO | 1..N | | TDO (app) for the segment associated with this TPT |
|   @appID | 1 | unsignedShort | Application ID of this app, unique within the scope of this TPT |
|   @appType | 0..1 | integer 0..15 | Application type (default: 1="TDO") |
|   @appName | 0..1 | String | Display name (for viewer launch consent) |
|   @globalID | 0..1 | anyURI | Globally unique app ID |
|   @appVersion | 0..1 | unsignedByte | Version of this app |
|   @cookieSpace | 0..1 | unsignedByte | Persistent storage needed; default=0 |
|   @frequencyOfUse | 0..1 | integer 0..15 | Code values per Table 6.3 |
|   @expireDate | 0..1 | dateTime | Expire date for caching this app |
|   @testTDO | 0..1 | Boolean | Flag for test app; default="false" |
|   @availInternet | 0..1 | Boolean | Default="true" |
|   @availBroadcast | 0..1 | Boolean | Default="true" |
|   URL | 1..N | anyURI | App URL(s) |
|     @entry | 0..1 | Boolean | Indicator of entry point; default = "false" |
|   Capabilities | 0..1 | nrt:CapabilitiesType | Essential capabilities to present this app |
|   ApplicationBoundary | 0..1 | | Extensions to app boundary |
|     OriginURL | 1..N | anyURI | Origin to be added to app boundary |
|   ContentItem | 0..N | | Content item used by this app |
|     URL | 1..N | anyURI | URL(s) of content item |
|       @entry | 0..1 | Boolean | Indicator of entry point; default = "false" |
|     @updatesAvail | 0..1 | Boolean | Default="false" |
|     @pollPeriod | 0..1 | unsignedByte | Short polling period in seconds |
|     @size | 0..1 | 24-bit integer | Size of content item, in kilobytes |
|     @availInternet | 0..1 | Boolean | Default="true" |
|     @availBroadcast | 0..1 | Boolean | Default="true" |
|   Event | 1..N | | Event targeted to this TDO |
|     @eventID | 1 | unsignedShort | Unique identifier of this Event element within the scope of the TDO element. |
|     @action | 1 | String | Allowed values are "prep", "exec", "susp", and "kill" |
|     @destination | 0..1 | unsignedByte | Device to which the event is directed (primary screen, second screen, or both) |
|     @diffusion | 0..1 | unsignedByte | Period for applying diffusion, in seconds |
|     Data | 0..N | base64Binary | Data to be used for this event |
|       @dataID | 1 | unsignedShort | Unique identifier of this Data element within the scope of the Event element. |

FIG. 137

| Application Trigger Property | MPD Events | Inband Events (emsg) |
|---|---|---|
| tptID | @id | id |
| TPT location | Message | message_data |

FIG. 138

| Application Trigger Property | MPD Events | Inband Events (emsg) |
|---|---|---|
| startTime | @presentationTime | event_presentation_time_data |
| tptID | @id | id |
| status (preparing, launching, terminating, suspending, etc.) | Message | message_data |

FIG. 139

| Application Trigger Property | MPD Events | Inband Events (emsg) |
|---|---|---|
| startTime | @presentationTime | event_presentation_time_data |
| endTime | startTime + @duration | startTime + event_duration |
| segmentID (tptID) | @id | id |
| Trigger message | Message | message_data |

FIG. 140

| Application Trigger Property | MPD Events | Inband Events (emsg) |
|---|---|---|
| mediaTime | @presentationTime | event_presentation_time_data |
| segmentID (tptID) | @id | id |

FIG. 141

| @value | Description |
|---|---|
| tpt | Signals the location of TPT |
| status | Signals the lifecycle of applications (e.g., preparing, launching, terminating, suspending, etc.) |
| action | Signals the actions taken by applications |
| mediatime | Signals media time |
| trigger | Signals all trigger information |

FIG. 142

| Application Trigger Property | MPD Events | Inband Events (emsg) |
|---|---|---|
| tptID | @id | id |
| Trigger message | Message | message_data |

| 0 1 2 3 4 5 6 7 8 9 0 1 2 3 4 5 | 6 7 8 9 0 | 1 2 | 3 | 4 5 | 6 7 8 9 0 1 |
|---|---|---|---|---|---|
| length | FT | T | f_i | A | frag_counter |
| MPU_sequence_number ||||||
| DU_length | DU_Header .... |||||
| DU payload .... ||||||

Application Signaling Track

FIG. 147

| Syntax | Value | No. of bits | Mnemonic |
|---|---|---|---|
| signalling_message () { | | | |
|     message_id | | 16 | uimsbf |
|     version | | 16 | uimsbf |
|     if(message_id != PA_message && message_id !=MPI_message) { | | | |
|         langth | | 16 | uimsbf |
|     } else { | | | |
|         langth | | | |
|     } | | 32 | uimsbf |
|     extension | | | |
|     message_payload{ | | | |
|     } | | | |

FIG. 148

| Value | Description |
|---|---|
| 0x0000 | PA messages |
| 0x0001 ~ 0x000F | MPI messages.<br><br>For a Package, 16 contiguous values are allocated to MPI messages.<br><br>If the value % 16 equals 15, the MPI message carries complete PI.<br><br>If the value %16 equals N where N = 0 ~ 14, the MPI message carries Subset-N PI. |
| 0x0010 ~ 0x001F | MPT messages.<br><br>For a package, 16 contiguous values are allocated to MPT messages.<br><br>If the value % 16 equals 15, the MPT message carries complete MPT.<br><br>If the value %16 equals N where N = 0 ~ 14, the MPT message carries Subset-N MPT. |
| 0x0200 | CRI messages |
| 0x0201 | DCI messages |
| 0x0202 | AL_FEC messgages |
| 0x0203 | HRBM messages |
| 0x0204 ~ 0x7FFF | reserved for ISO use |
| 0x8000 | Application Signaling messages |
| 0x8001 ~ 0xFFFF | reserved for private use |

FIG. 149

| Syntax | Value | No. of bits | Mnemonic |
|---|---|---|---|
| application_signaling_message() { | | | |
|   message_id | 0x8000 | 16 | uimsbf |
|   version | | 8 | uimsbf |
|   length | | 32 | uimsbf |
|   extension { | | | |
|     number_of_tables | N1 | 8 | uimsbf |
|     for(i=0;i<N1;i++) { | | | |
|       table_id | | 8 | uimsbf |
|       table_version | | 8 | uimsbf |
|       table_length | | 16 | uimsbf |
|     } | | | |
|   } | | | |
|   message_payload { | | | |
|     for(i=0;i<N1;i++) { | | | |
|       application_signaling_table() | | | |
|     } | | | |
|   } | | | |
| } | | | |

FIG. 150

| Syntax | No. of Bits | Format |
|---|---|---|
| application_signaling_table() { | | |
|     table_id | 8 | uimsbf |
|     version | 8 | uimsbf |
|     length | 16 | uimsbf |
|     trigger_type | 8 | uimsbf |
|     for (i=0;i<length-1; i+-){ | | |
|         URI_character | 8 | uimsbf |
|     } | | |
|     reserved | var | |
| } | | |

FIG. 151

| Value | Description |
|---|---|
| 00000001 | Signals the location of TPT-tpt |
| 00000010 | Signals the lifecycle of applications (e.g., preparing, launching, terminating, suspending, etc.) - Status |
| 00000100 | Signals the actions taken by applications - action |
| 00001000 | Signals media time - mediatime |
| 00010000 | Signals all trigger information - trigger |
| 00100000 ~ 10000000 | Reserved |

FIG. 152

| Value | Description |
|---|---|
| 0x0000 | PA messages |
| 0x0001 ~ 0x000F | MPI messages.<br><br>For a Package, 16 contiguous values are allocated to MPI messages.<br><br>If the value % 16 equals 15, the MPI message carries complete PI.<br><br>If the value %16 equals N where N = 0 ~ 14, the MPI message carries Subset-N PI. |
| 0x0010 ~ 0x001F | MPT messages.<br><br>For a package, 16 contiguous values are allocated to MPT messages.<br><br>If the value % 16 equals 15, the MPT message carries complete MPT.<br><br>If the value %16 equals N where N = 0 ~ 14, the MPT message carries Subset-N MPT. |
| 0x0200 | CRI messages |
| 0x0201 | DCI messages |
| 0x0202 | AL_FEC messgages |
| 0x0203 | HRBM messages |
| 0x0204 ~ 0x7FFF | reserved for ISO use |
| 0x8000 ~ 0x8004 | Application Signaling Message<br><br>0x8000: Signals the location of TPT – tpt<br><br>0x8001: Signals the lifecycle of applications (e.g., preparing, launching, terminating, suspending, etc.) – Status<br><br>0x8002: Signals the actions taken by applications – action<br><br>0x8003: Signals media time – mediatime<br><br>0x8004: Signals all trigger information – trigger |
| 0x8005 ~ 0x801F | Reserved |

FIG. 153

| Syntax | No. of Bits | Format |
|---|---|---|
| application_signaling_table() { | | |
|     table_id | 8 | uimsbf |
|     version | 8 | uimsbf |
|     length | 16 | uimsbf |
|     for (i=0; i<length-1; i++) { | 8 | uimsbf |
|         URI_character | | |
|     } | var | |
|     reserved | | |
| } | | |

FIG. 154

| 0 1 2 3 4 5 6 7 8 9 0 1 2 3 4 5 6 7 8 9 0 1 2 3 4 5 6 7 8 9 0 1 |
|---|
| V=0 | C | FEC | r | X | R | RES | type | packet_id |
| timestamp |
| packet_sequence_number |
| packet_counter |
| header_extension .... |
| payload data .... |
| source_FEC_payload_ID |

FIG. 155

| 0 1 2 3 4 5 6 7 8 9 | 0 1 2 3 4 5 | 6 7 8 9 0 1 2 3 4 5 6 7 8 9 0 1 |
|---|---|---|
| V=0 \| C \| FEC \| r \| X \| R \| RES | type | packet_id |
| timestamp ||| 
| packet_sequence_number ||| 
| packet_counter ||| 
| header_extension  .... ||| 
| payload data  .... ||| 
| source_FEC_payload_ID |||

(a)

| 0 1 2 3 4 5 6 7 8 9 0 1 2 3 4 5 | 6 7 8 9 0 1 2 3 4 5 6 7 8 9 0 1 |
|---|---|
| type | length |
| header_extension_value  .... ||

| Integer addLink(String uri, String linkMetadata) | | |
|---|---|---|
| Description | When successful, this method shall cause the receiver to add a Link to its list of Links The integer return value of this method shall indicate whether or not the call was successful, and it shall provide the reason for failure if it failed, according to Table below. | |
| Arguments | uri | The input URI value shall be the URL that is to be saved as a Link. |
| | linkMetadata | The input linkMetadata value shall represent the metadata to be associated with the Link, in the form of a UTF-8 representation of an XML document with root element LinkMetadata conforming to the schema described by Table below. |

(a)

| Code Value | Meaning |
|---|---|
| 0 | Call succeeded; Link added |
| 1 | Call failed; syntax of uri argument invalid |
| 2 | Call failed; format of linkMetadata argument invalid |
| 3 | Call failed; upper limit on number of stored links exceeded |

(b)

| Element/Attribute | Cardinality | XML data type | Description |
|---|---|---|---|
| LinkMetadata | 1 | | |
| @url | 1 | anyURI | URL to be saved as Link |
| @title | 0..1 | string | Title of Link |
| @majChanNum | 0..1 | unsignedShort | Major channel # where Link offered |
| @minChanNum | 0..1 | unsignedShort | Minor channel # where Link offered |
| @channelName | 0..1 | string | Name of channel where Link offered |
| @programName | 0..1 | string | Name of program when Link offered |
| @expiration | 0..1 | dateTime | Expiration date/time of Link |
| @packagedApp | 0..1 | boolean | Flag for indicating a packaged app; default="false" |
| @description | 0..1 | string | Description of the application |
| Param | 0..1 | string | Query string |
| @title | 0..1 | string | Title of parameter |
| @description | 0..1 | string | Description of parameter |
| Icon | 0..N | | |
| @source | 1 | anyURI | Pointer to icon file |
| @width | 0..1 | unsignedShort | Icon width, in pixels |
| @height | 0..1 | unsignedShort | Icon height, in pixels |

(c)

Application content items:
  http(s)://app.example.com/index.html
  http(s)://app.example.com/assets/v1/base.css
  http(s)://app.example.com/assets/v1/app.js
  http(s)://app.example.com/services/inventory/data.json
  http(s)://app.example.com/assets/v1/logo.png Application content items:
 http(s)://app.example.com/index.html
 http(s)://app.example.com/assets/v1/base.css
 http(s)://app.example.com/assets/v1/app.js
 http(s)://app.example.com/services/inventory/data.json
 http(s)://app.example.com/assets/v1/logo.png

FIG. 165

| Method | Purpose |
|---|---|
| ApplicationManager.installWidget | Install Packaged App (asynchronous call) |
| ApplicationManager.onWidgetInstallation | Callback routine to report on installation progress |
| ApplicationManager.startWidget | Launch an installed Packaged App |
| ApplicationManager.widgets | Return the list of installed Packaged Apps |

FIG. 166

| void installWidget(String uri, String widgetMetadata) | | |
|---|---|---|
| Description | When successful, this method shall cause the receiver to install and add a Widget to its list of Widgets. The integer return value of this method shall indicate whether or not the call was successful, and it shall provide the reason for failure if it failed, according to Table below. | |
| Arguments | uri | The resource locator in form of a URI, which points to a Widget package to be installed. |
| | widgetMetadata | The input widgetMetadata value shall represent the metadata to be associated with the Widget, in the form of a UTF-8 representation of an XML document the same as to the linkMetadata except the root element. The root element of widgetMetadata is WidgetMetadata. |

FIG. 167

| Void addWidget(String uri, String widgetMetadata) | | |
|---|---|---|
| Description | When successful, this method shall cause the receiver to add a Widget to its list of Widgets. The integer return value of this method shall indicate whether or not the call was successful, and it shall provide the reason for failure if it failed, according to Table below. | |
| Arguments | uri | The resource locator in form of a URI, which points to a Widget package to be installed. |
| | widgetMetadata | The input widgetMetadata value shall represent the metadata to be associated with the Widget, in the form of a UTF-8 representation of an XML document the same as to the linkMetadata except the root element. The root element of widgetMetadata is WidgetMetadata.. |

FIG. 168

| String getLinks( ) | |
|---|---|
| Description | When successful, this method shall return the list of linkMetadata of Links in the receiver. |

FIG. 169

| Integer checkApplication(String metadata) | | |
|---|---|---|
| Description | This method shall check if there are the same application (either packaged application or Link) exists in the TV. The integer return value of this method shall indicate whether or not there are the same application exists. | |
| Arguments | metadata | The input metadata value shall represent the metadata to be associated with either the Packaged application or the Link, in the form of a UTF-8 representation of an XML document with root element metadata conforming the same as to the schema described by Table of linkMetadata. |

(a)

| Code Value | Meaning |
|---|---|
| 0 | No same application is installed; application can be installed or added. |
| 1 | The same widget exists; widget cannot be installed or added. |

| Integer installWidget(String uri, String widgetMetadata) | | |
|---|---|---|
| Description | When successful, this method shall cause the receiver to add a Widget to its list of Widgets. The integer return value of this method shall indicate whether or not the call was successful, and it shall provide the reason for failure if it failed, according to Table below. | |
| Arguments | uri | The resource locator in form of a URI, which points to a Widget package to be installed. |
| | widgetMetadata | The input widgetMetadata value shall represent the metadata to be associated with the Widget, in the form of a UTF-8 representation of an XML document the same as to the linkMetadata except the root element. The root element of widgetMetadata is WidgetMetadata. |

(a)

| Code Value | Meaning |
|---|---|
| 0 | Call succeeded; Widget added |
| 1 | Call failed; syntax of uri argument invalid |
| 2 | Call failed; format of widgetMetadata argument invalid |
| 3 | Call failed; upper limit on number of stored Widget exceeded |
| 4 | Call failed; Widget already exists |

| Integer addLink(String uri, String linkMetadata) | | |
|---|---|---|
| Description | When successful, this method shall cause the receiver to add a Link to its list of Links The integer return value of this method shall indicate whether or not the call was successful, and it shall provide the reason for failure if it failed, according to Table below. | |
| Arguments | uri | The input URI value shall be the URL that is to be saved as a Link. |
| | linkMetadata | The input linkMetadata value shall represent the metadata to be associated with the Link, in the form of a UTF-8 representation of an XML document with root element LinkMetadata conforming to the schema described by Table below. |

( a )

| Code Value | Meaning |
|---|---|
| 0 | Call succeeded; Link added |
| 1 | Call failed; syntax of uri argument invalid |
| 2 | Call failed; format of linkMetadata argument invalid |
| 3 | Call failed; upper limit on number of stored links exceeded |
| 4 | Call failed; link already exists |

( b )

BROADCASTING SIGNAL TRANSMISSION APPARATUS, BROADCASTING SIGNAL RECEPTION APPARATUS, BROADCASTING SIGNAL TRANSMISSION METHOD, AND BROADCASTING SIGNAL RECEPTION METHOD

This application is a Divisional of U.S. patent application Ser. No. 15/549,349, filed Aug. 7, 2017, which is a National Stage Application of International Application No. PCT/KR2016/001993 filed on Feb. 29, 2016, and claims priority to U.S. Provisional Application No. 62/126,693 filed on Mar. 1, 2015 and U.S. Provisional Application No. 62/150,821 filed on Apr. 21, 2015, all of which are hereby incorporated by reference in their entireties as if fully set forth herein.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting future broadcast services in an environment supporting future hybrid broadcasting using terrestrial broadcast networks and the Internet and related signaling methods.

Advantageous Effects

The present invention proposes a method for efficiently providing hybrid broadcast using both broadcast networks and the Internet.

The present invention proposes app-based enhancement on the basis of applications for basic broadcast services.

The present invention proposes a method for providing app-based enhancement in synchronization with a broadcast service.

The present invention proposes architectures according to various protocols between a PD and a CD and a method for communication between the PD and the CD and between applications according to architectures.

The present invention proposes architectures and signaling methods for effectively delivering information such as an ESG and an EAS from a PD to a CD.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 24 is a table illustrating PLS1 data according to an embodiment of the present invention;

FIG. 25 is a table illustrating PLS2 data according to an embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 57 is a diagram illustrating a service for exchanging electronic service guide (ESG) between a broadcast receiver and companion devices according to an embodiment of the present invention;

FIG. 58 is a diagram illustrating an ESGData state variable according to an embodiment of the present invention;

FIG. 59 is a diagram illustrating an ESGData state variable according to another embodiment of the present invention;

FIG. 61 is a diagram illustrating LastChangedESGData state variable according to an embodiment of the present invention;

FIG. 83 illustrates formats of messages used for discovery of a PD (Primary Device) according to an embodiment of the present invention;

FIG. 85 illustrates a DDD request message and a DDD format in a process for discovering a Websocket endpoint or an HTTP service URL using a DDD according to an embodiment of the present invention;

FIG. 86 illustrates DDD formats in a process for discovering a Websocket endpoint or an HTTP service URL using a DDD according to an embodiment of the present invention;

FIG. 87 illustrates DDD formats in a process for discovering a Websocket endpoint or an HTTP service URL using a DDD according to another embodiment of the present invention;

FIG. 89 illustrates response header formats in a process for discovering a Websocket endpoint or an HTTP service URL using a response header to a DDD request according to an embodiment of the present invention;

FIG. 91 illustrates a GET request and formats of response messages thereto in a process for discovering a Websocket endpoint or an HTTP service URL using a URL of a response header to a DDD request according to an embodiment of the present invention;

FIG. 92 illustrates a format of a response message delivering address information in a process for discovering a Websocket endpoint or an HTTP service URL using a URL of a response header to a DDD request according to another embodiment of the present invention;

FIG. 101 illustrates conversion of an ESGDdata state variable in XML format into an ESGData state variable in JSON format according to another embodiment of the present invention.

FIG. 108 illustrates a method of transmitting signaling data in a next generation broadcast system according to an embodiment of the present invention.

FIG. 109 shows signaling data transmitted by a next generation broadcast system according to an embodiment of the present invention for rapid broadcast service scan of a receiver.

FIG. 110 shows signaling data transmitted by a next generation broadcast system according to an embodiment of the present invention for rapid broadcast service scan of a receiver.

FIG. 112 shows signaling data transmitted by a next generation broadcast system according to an embodiment of the present invention for rapid broadcast service scan of a receiver.

FIG. 114 is a diagram illustrating a service signaling message format of a next generation broadcast system according to an embodiment of the present invention.

FIG. 115 shows a service signaling table used in a next generation broadcast system according to an embodiment of the present invention.

FIG. 116 is a diagram illustrating a service mapping table used in a next generation broadcast system according to an embodiment of the present invention.

FIG. 117 shows a service signaling table of a next generation broadcast system according to an embodiment of the present invention.

FIG. 119 illustrates a component mapping table description according to an embodiment of the present invention.

FIG. 120 shows syntax of a component mapping table of a next generation broadcast system according to an embodiment of the present invention.

FIG. 121 illustrates a method for delivering signaling associated with each service over a broadband network in a next generation broadcast system according to an embodiment of the present invention.

FIG. 122 illustrates a method for signaling MPD in a next generation broadcast system according to an embodiment of the present invention.

FIG. 123 shows syntax of an MPD delivery table of a next generation broadcast system according to an embodiment of the present invention.

FIG. 124 shows a description of a transmission session instance of a next generation broadcast system according to an embodiment of the present invention.

FIG. 125 shows a SourceFlow element of a next generation broadcast system according to an embodiment of the present invention.

FIG. 126 shows an EFDT of a next generation broadcast system according to an embodiment of the present invention.

FIG. 127 shows a method for transmitting an ISDT used by a next generation broadcast system according to an embodiment of the present invention.

FIG. 128 shows a delivery structure of a signaling message of a next generation broadcast system according to an embodiment of the present invention.

FIG. 129 illustrates a trigger according to the aforementioned trigger syntax.

FIG. 130 illustrates the syntax of triggering application information according to an embodiment of the present invention.

FIG. 131 illustrates the syntax of an event stream element including MPD according to an embodiment of the present invention.

FIG. 132 illustrates the syntax of an event element of an event stream element included in the MPD according to an embodiment of the present invention.

FIG. 133 illustrates the syntax of an event message box for inband event signaling according to an embodiment of the present invention.

FIG. 134 illustrating a matching relationship of trigger attribute, the MPD element, and the event message box, for signaling trigger type information, according to an embodiment of the present invention.

FIG. 135 illustrates trigger type information according to an embodiment of the present invention.

FIG. 136 illustrates the syntax of triggering application information according to an embodiment of the present invention.

FIG. 137 illustrates a matching relationship of trigger attribute, the MPD element, and the event message box, for signaling a position of information on a triggered application, according to an embodiment of the present invention.

FIG. 138 illustrates a matching relationship of trigger attribute, the MPD element, and the event message box, for signaling a status of an application, according to an embodiment of the present invention.

FIG. 139 is a matching relationship of trigger attribute, an MPD element, and an event message box, for signaling an action of an application, according to an embodiment of the present invention.

FIG. 140 is a matching relationship of trigger attribute, an MPD element, and an event message box, for signaling media time, according to an embodiment of the present invention.

FIG. 141 illustrates definition of value attribute for signaling all trigger attributes as one event according to an embodiment of the present invention.

FIG. 142 illustrates a matching relationship of identifier attribute and message attribute of an event element, an identifier field of an event message box, and a message data field, for signaling all trigger attributes as one event, according to an embodiment of the present invention.

Figure 143:
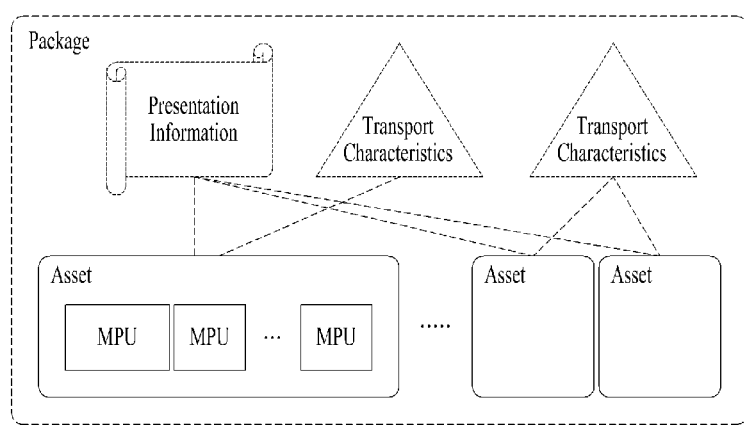

FIG. 143 shows a structure of a package of an MMT protocol according to an embodiment of the present invention.

Figure 144:
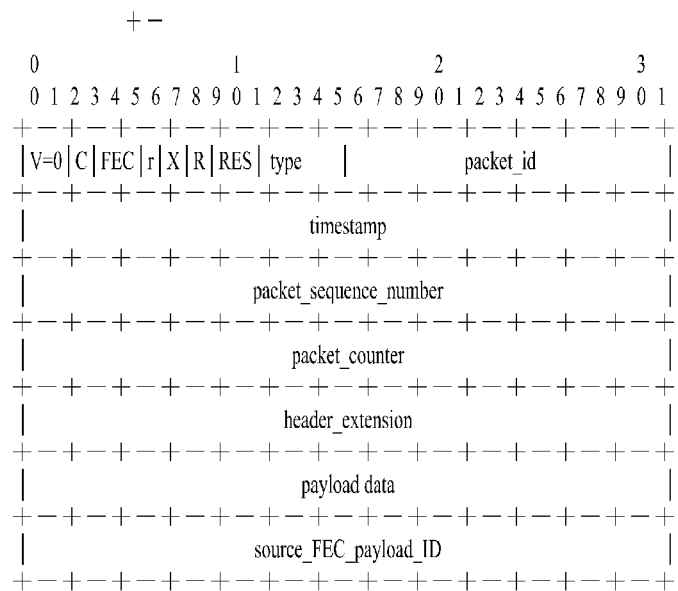

FIG. 144 shows a structure of an MMTP packet and data types included in the MMTP packet according to an embodiment of the present invention.

Figures 145, 146:

FIG. 145 shows a syntax of an MMTP payload header when the MMTP packet includes a fragment of an MPU according to an embodiment of the present invention.

FIG. 146 shows synchronization of content with a trigger transmitted through an MPU according to an embodiment of the present invention.

FIG. 147 shows a syntax of an MMT signaling message according to another embodiment of the present invention.

FIG. 148 shows a relationship between a value of an identifier identifying an MMT signaling message and data signaled by the MMT signaling message according to another embodiment of the present invention.

FIG. 149 shows a syntax of a signaling message including application signaling information according to another embodiment of the present invention.

FIG. 150 shows a syntax of an application signaling table including application signaling information according to another embodiment of the present invention.

FIG. 151 shows a relationship between trigger type information included in an application signaling table and trigger properties included in triggers according to another embodiment of the present invention.

FIG. 152 shows a relationship between a value of an identifier identifying an MMT signaling message and data signaled by the MMT signaling message according to another embodiment of the present invention.

FIG. 153 shows a syntax of an application signaling table that does not include trigger type information according to another embodiment of the present invention.

FIG. 154 shows a structure of an MMTP packet according to another embodiment of the present invention.

FIG. 155 shows a structure of an MMTP packet and a syntax of a header extension field for application signaling information transmission according to another embodiment of the present invention.

Figure 156:
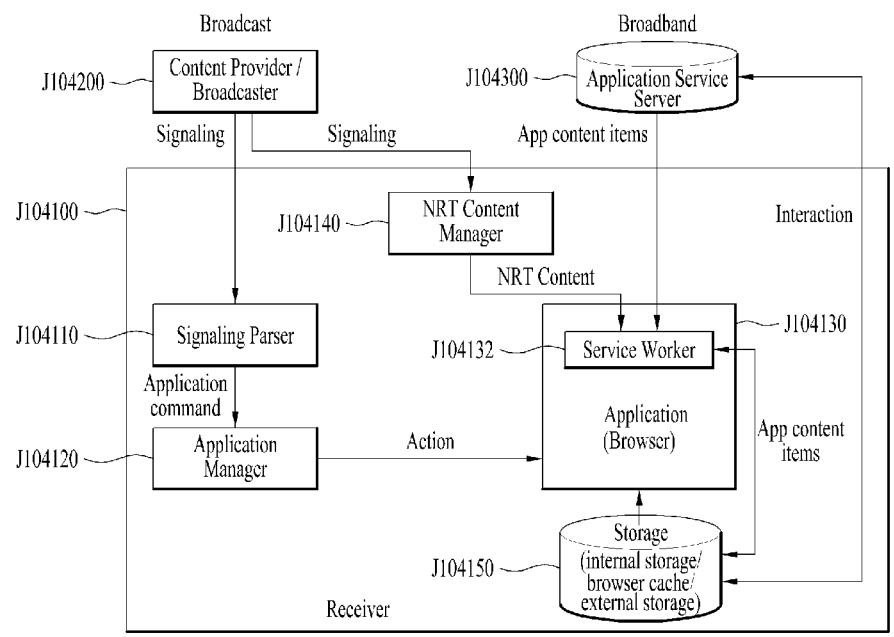

FIG. 156 shows part of a broadcast system according to an embodiment of the present invention.

Figure 157:
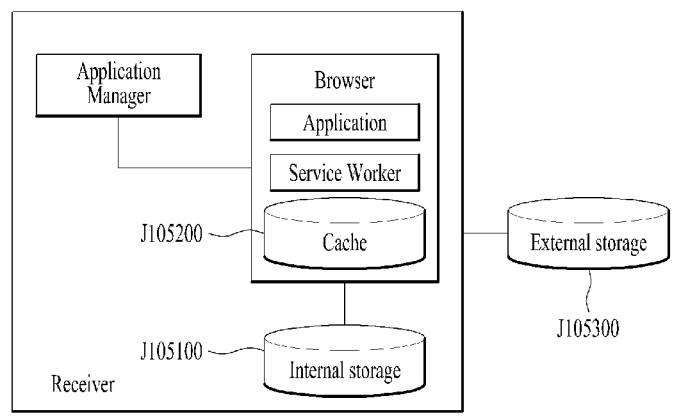

FIG. 157 shows an example in which a storage is included in a broadcast system according to an embodiment of the present invention.

Figure 158:
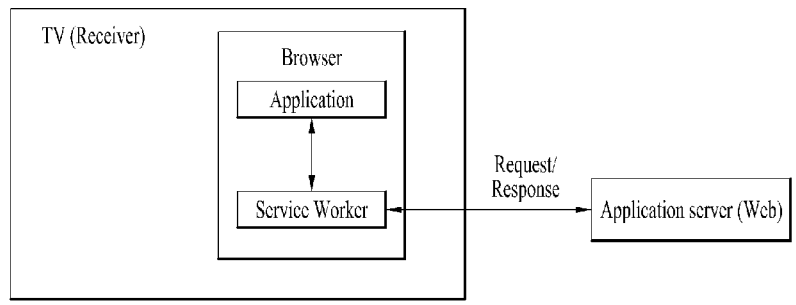

FIG. 158 shows operation of a service worker according to an embodiment of the present invention.

Figure 159:
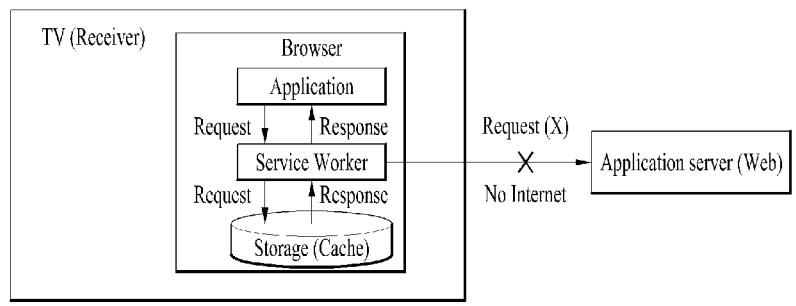

FIG. 159 shows operation of a service worker in an offline state according to an embodiment of the present invention.

FIG. 160 shows an application program interface (API) and metadata used for a receiver to execute an application according to an embodiment of the present invention.

Figure 161:
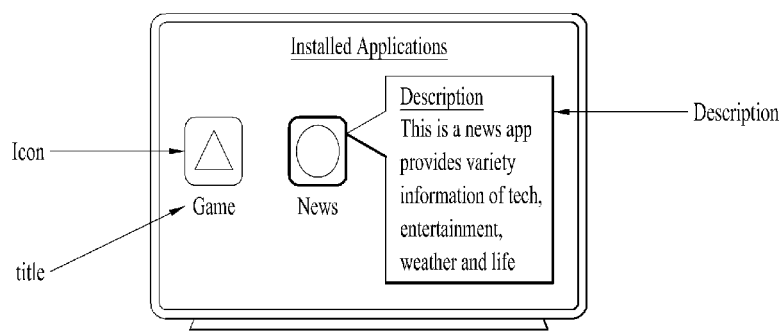

FIG. 161 shows a user interface (UI) with respect to an application or a link for an application according to an embodiment of the present invention.

Figure 162:
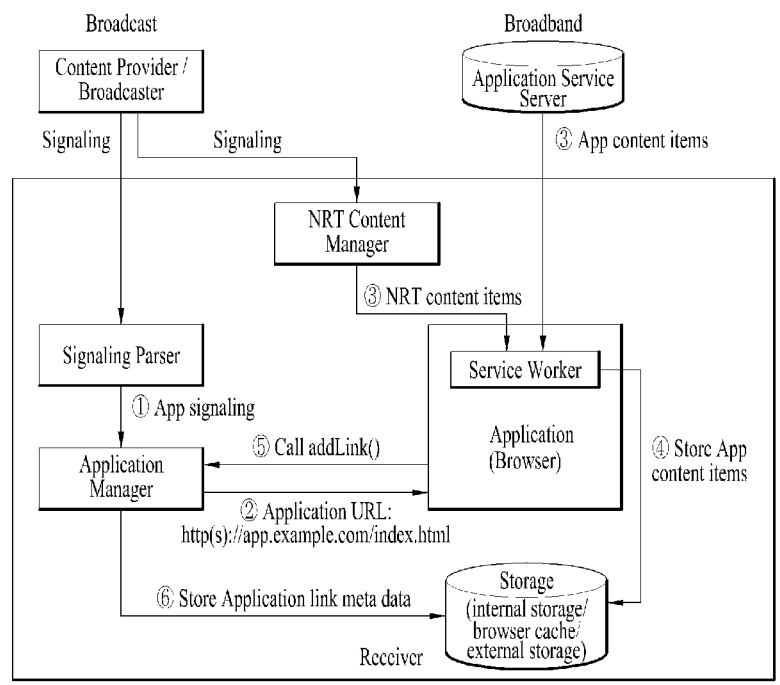

FIG. 162 shows a process through which a receiver installs and executes an application in the form of a widget according to an embodiment of the present invention.

Figure 163:
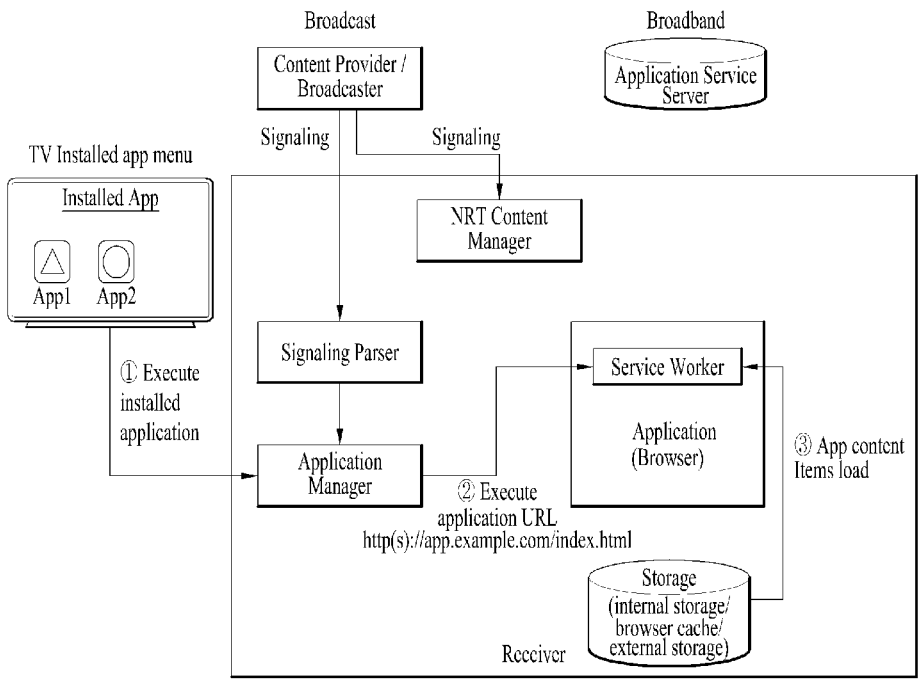

FIG. 163 shows a process through which a user executes an application upon installation of the application according to an embodiment of the present invention.

Figure 164:
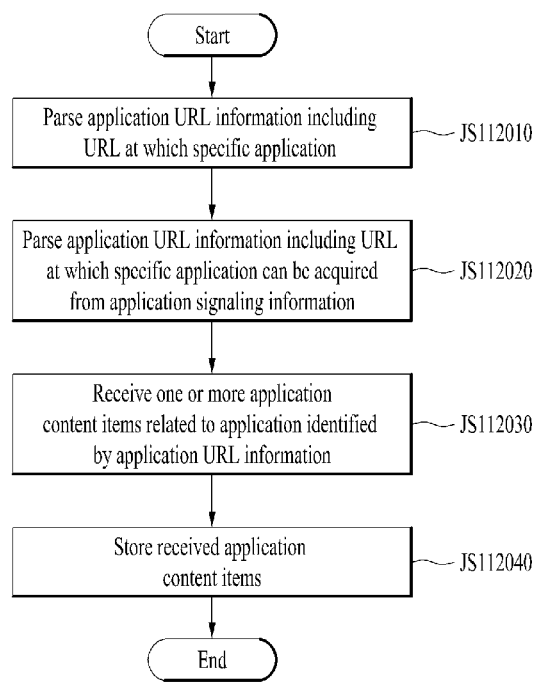

FIG. 164 is a flowchart illustrating a method of executing an application by a broadcast receiver according to an embodiment of the present invention.

FIG. 165 is a diagram showing an API according to an embodiment of the present invention.

FIG. 166 is a diagram showing an installWidget( ) API according to an embodiment of the present invention.

FIG. 167 is a diagram showing an addWidget( ) API according to an embodiment of the present invention.

FIG. 168 is a diagram showing a getLinks( ) API according to an embodiment of the present invention.

FIG. 169 is a diagram showing a checkApplication( ) API according to an embodiment of the present invention.

FIG. 170 is a diagram showing an installWidget( ) API according to an embodiment of the present invention.

FIG. 171 is a diagram showing an addLink( ) API according to an embodiment of the present invention.

Figure 172:
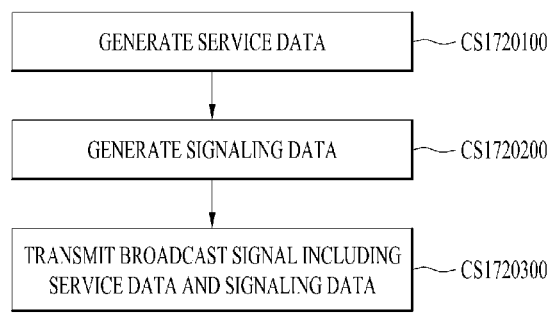

FIG. 172 is a diagram showing a broadcast transmission method according to an embodiment of the present invention.

Figure 173:
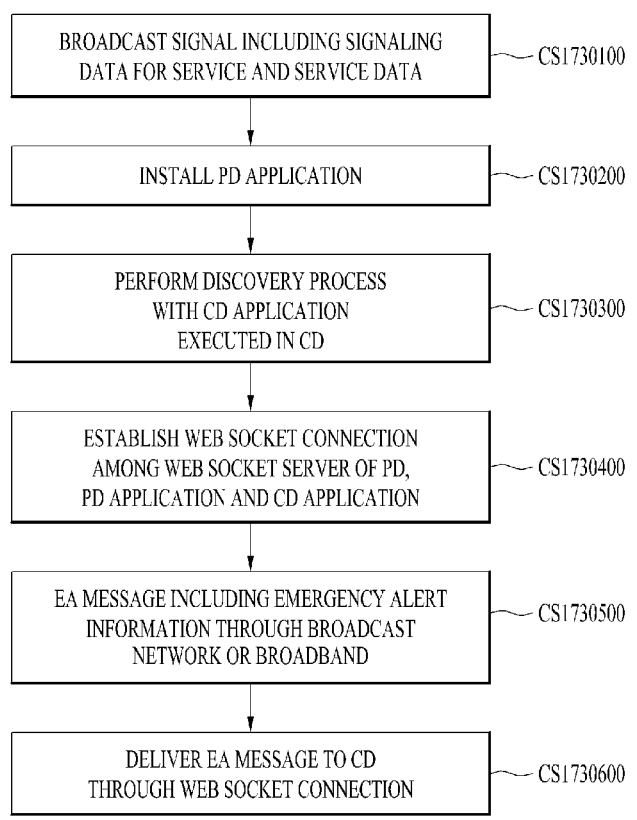

FIG. 173 is a diagram showing a broadcast reception method according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
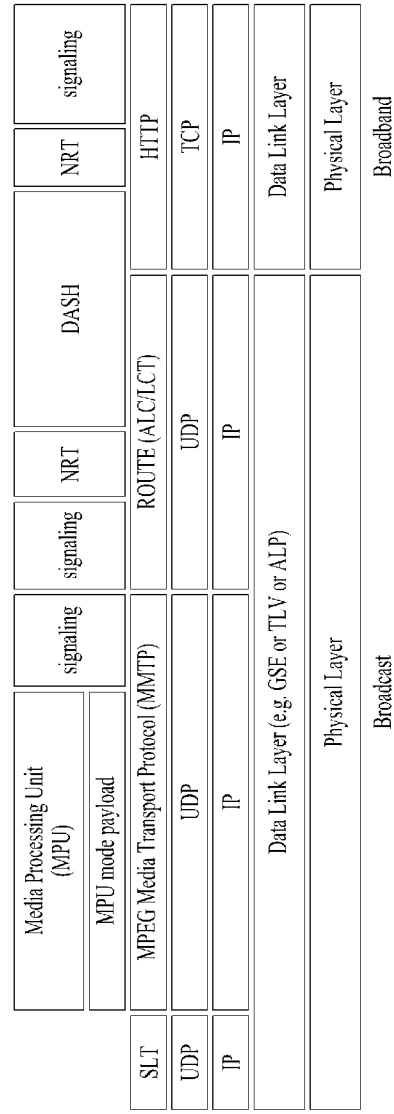
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
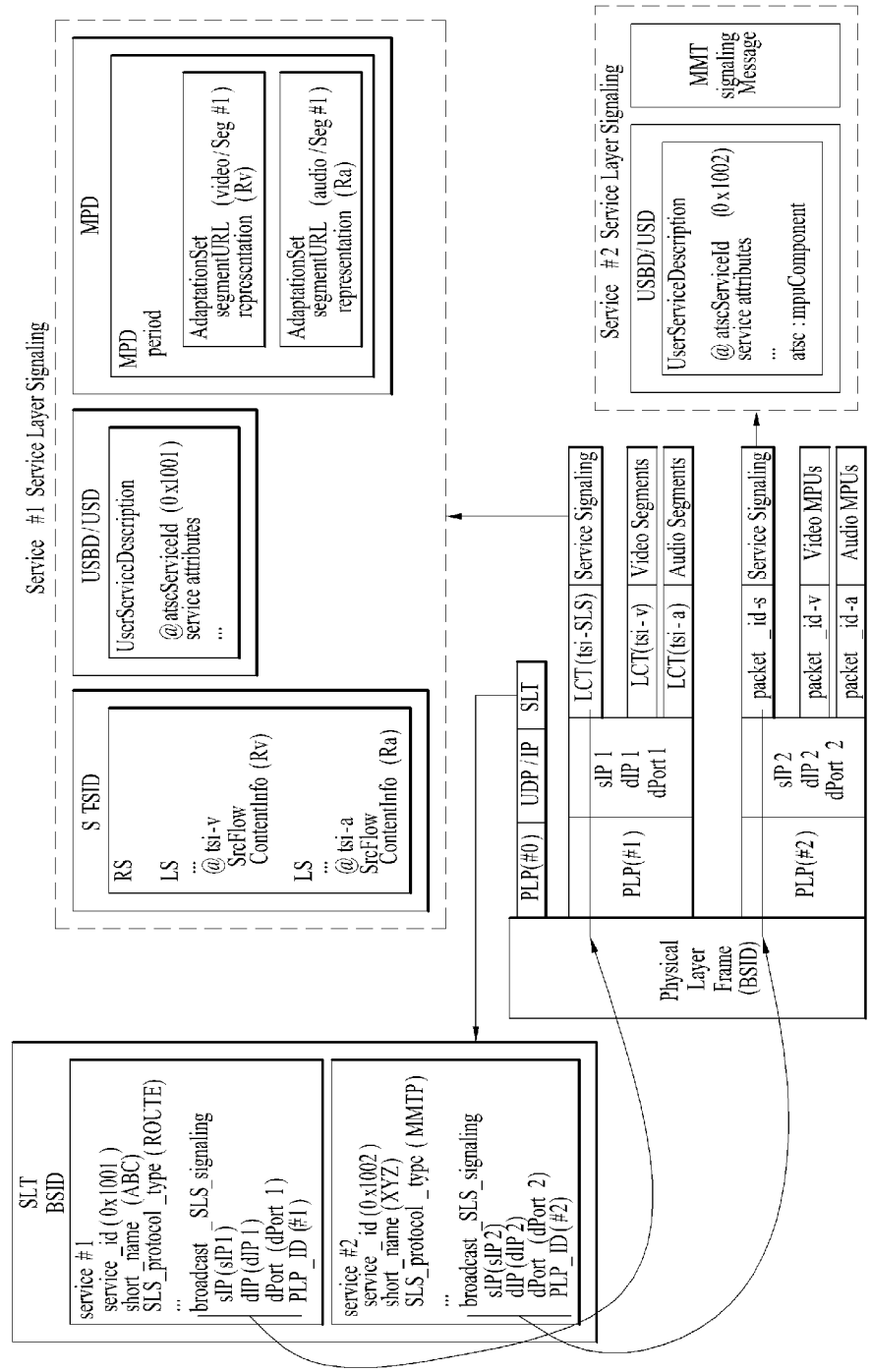
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@global ServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atscfullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
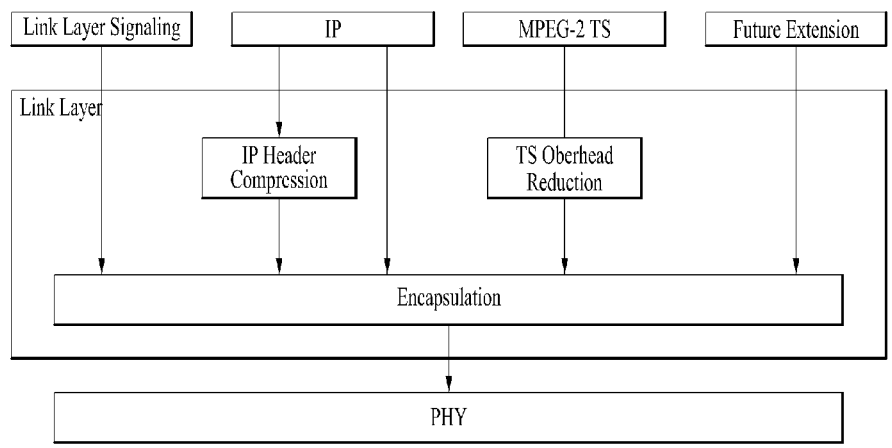
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
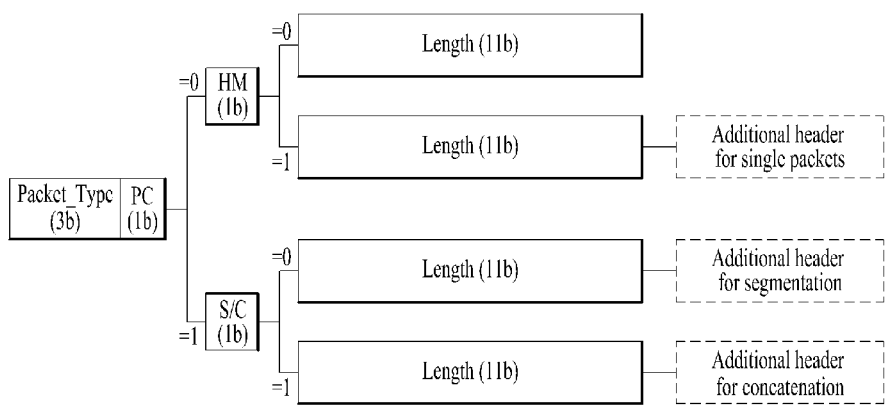
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be an 11-bit field that indicates the 11 least significant bits (LSBs) of the length in bytes of payload carried by the link layer packet. When there is a Length-_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
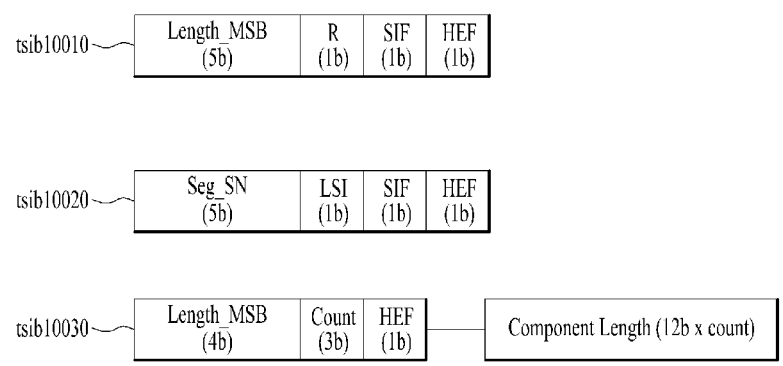
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be an 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be an 8-bit field that can indicate the length of the Header Extension ( ) in bytes counting from the next byte to the last byte of the Header_Extension ( ).

Extension_Byte can be a byte representing the value of the Header Extension ( ).

Figure 11:
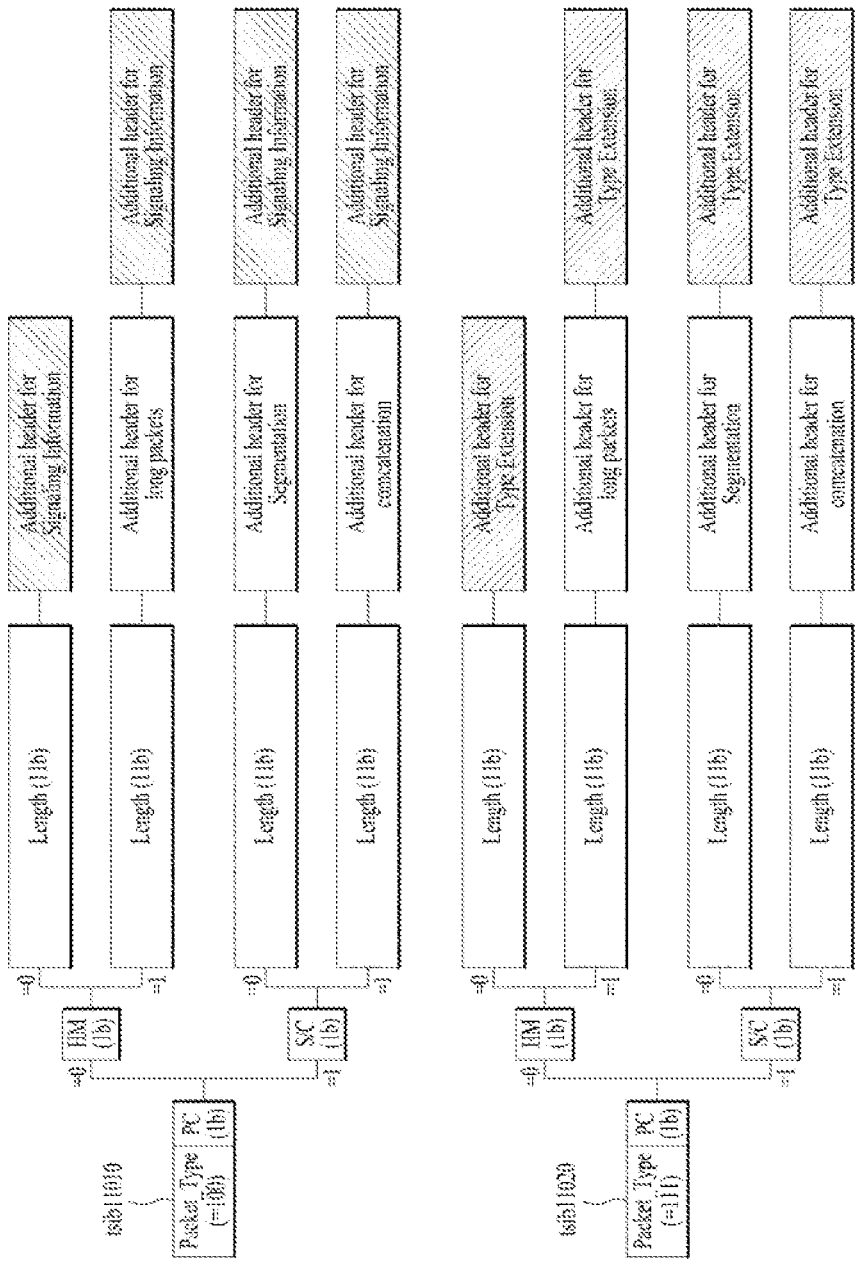
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
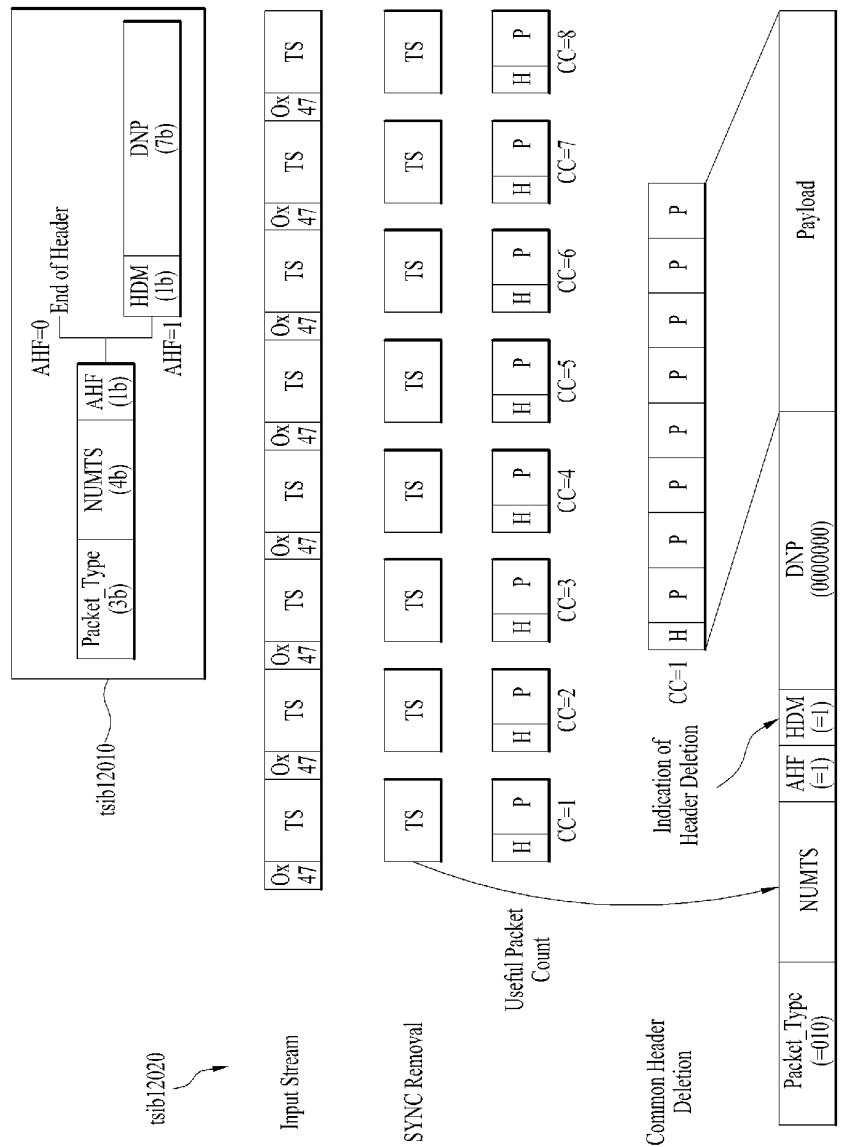
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirctional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID flag is equal to 1.

context id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context_length can be an 8-bit field that indicates the length of the static_chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
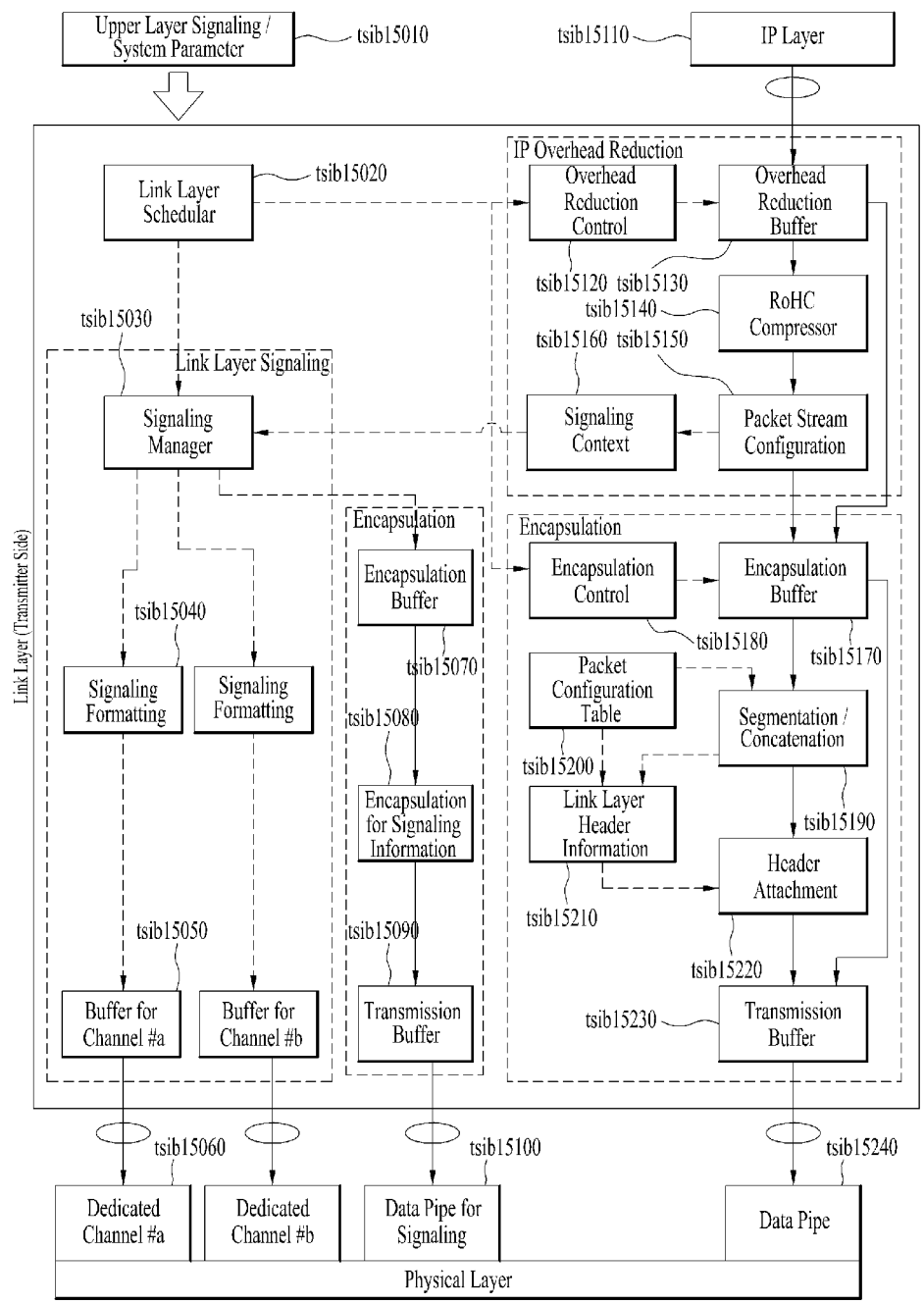
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be falterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
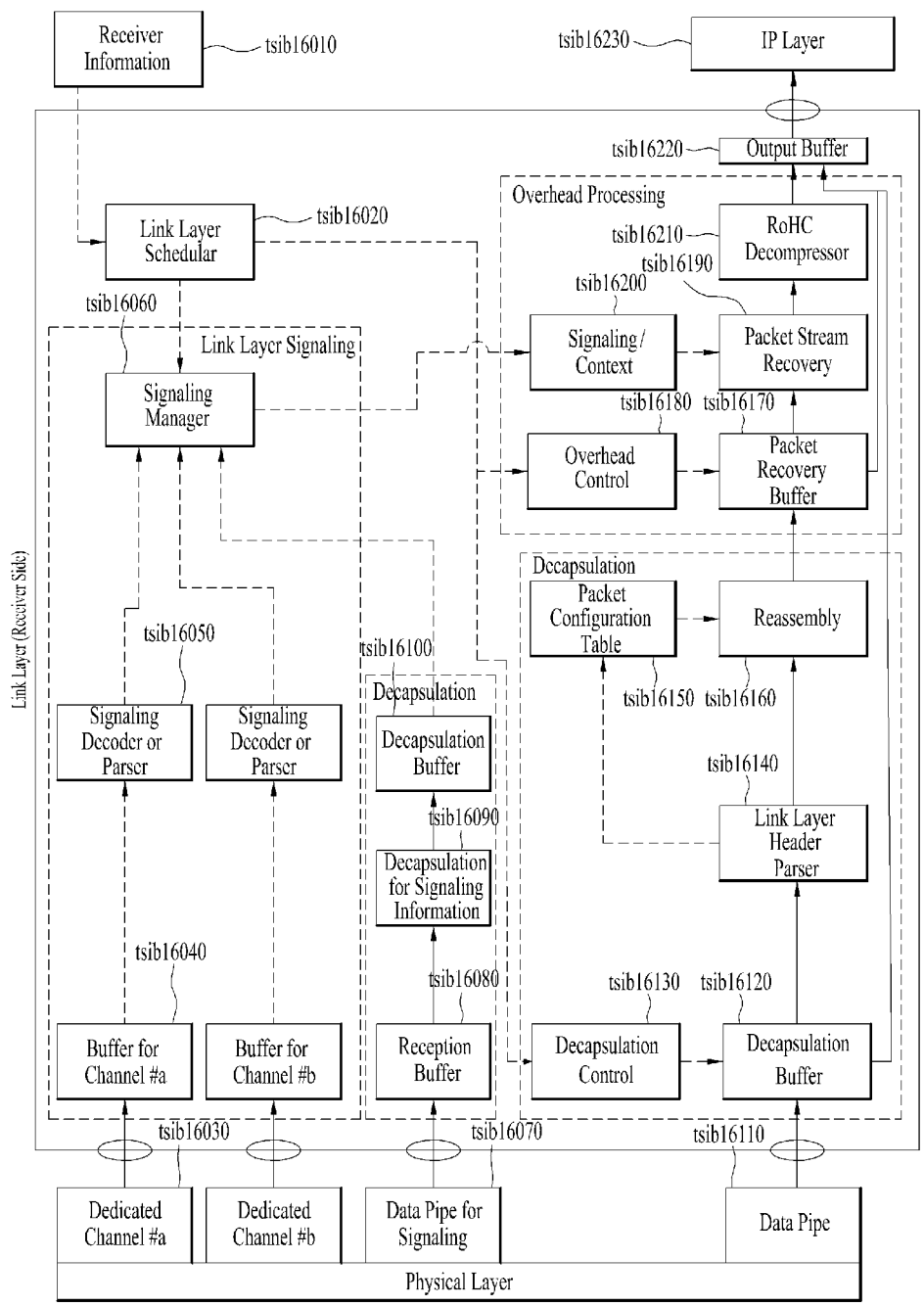
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
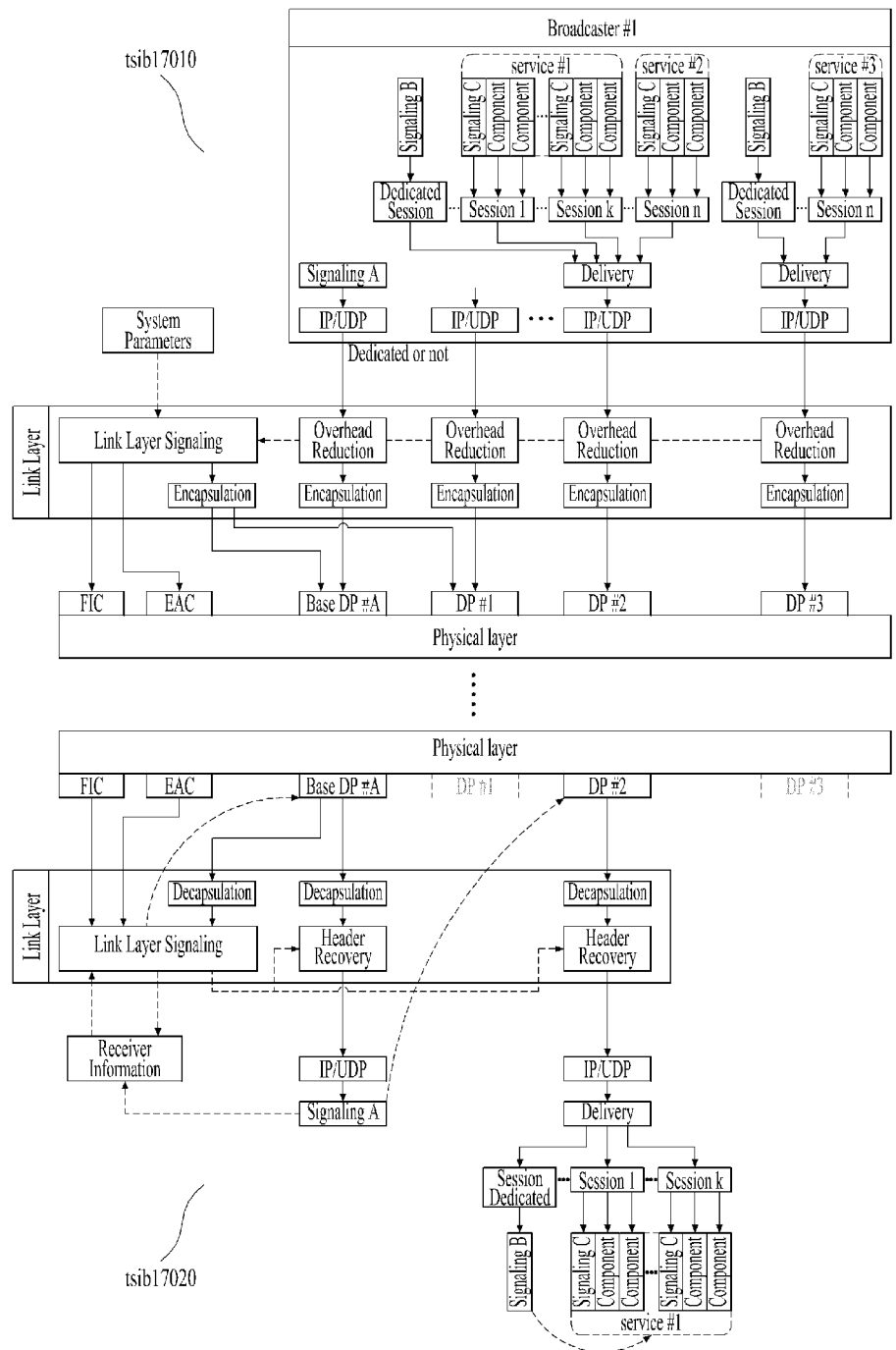
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transport session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transport session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Figure 18:
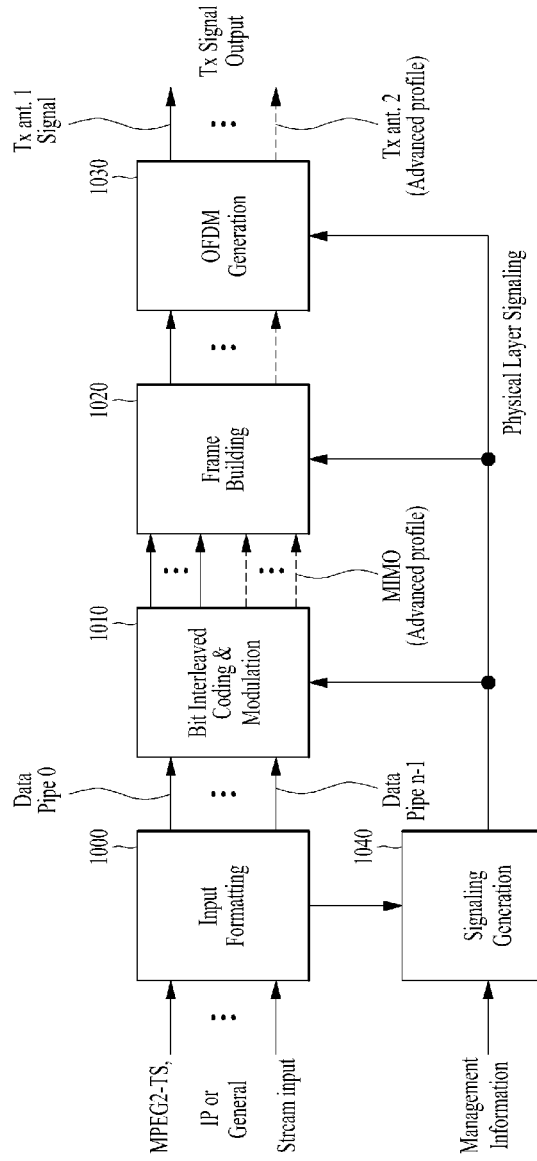
FIG. 18 is a block diagram illustrating a configuration of a broadcast signal transmission apparatus for future broadcast services according to an embodiment of the present invention.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of $N_{cells}$ cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
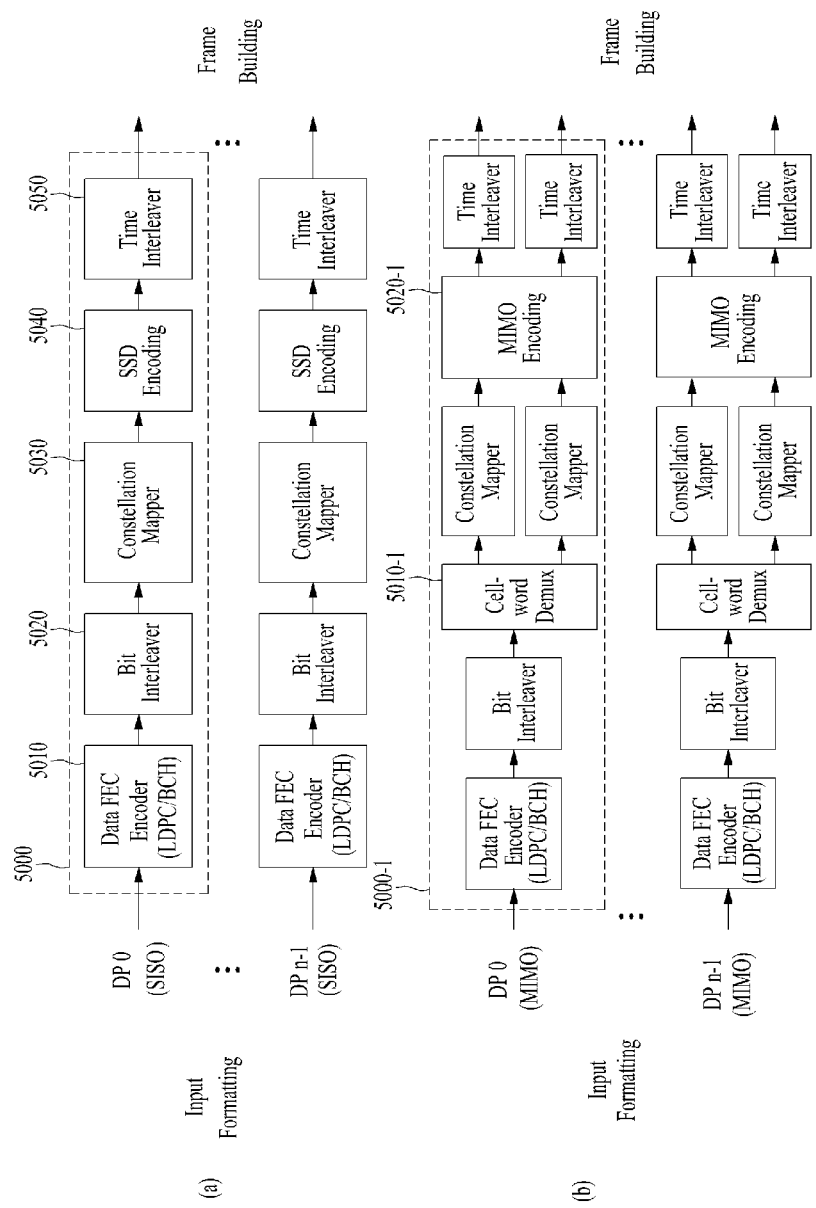
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, $e_l$. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ ($e_{1,i}$ and $e_{2,i}$) corresponding to a pair of constellation mapper outputs is fed to an input of a MIMO encoder. Paired MIMO encoder output (g1,i and g2,i) is transmitted by the same carrier k and OFDM symbol l of respective TX antennas thereof.

The above-described blocks may be omitted or replaced by blocks having similar or identical functions.

Figure 20:
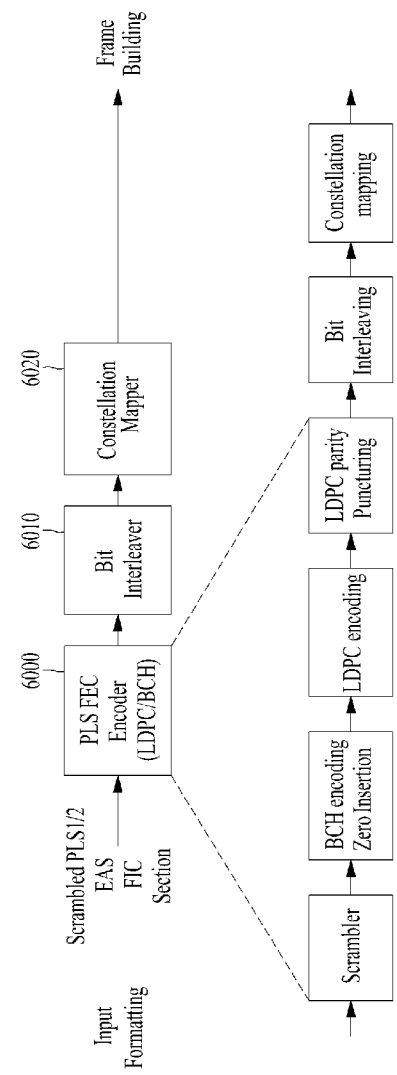
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS 1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS 1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, $C_{ldpc}$ and parity bits $P_{ldpc}$ are encoded systematically from each zero-inserted PLS information block $I_{ldpc}$ and appended thereto.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}] \quad \text{[Equation 1]}$$

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-ineterleaved PLS1 data and PLS2 data to constellations.

The above-described blocks may be omitted or replaced by blocks having similar or identical functions.

Figure 21:
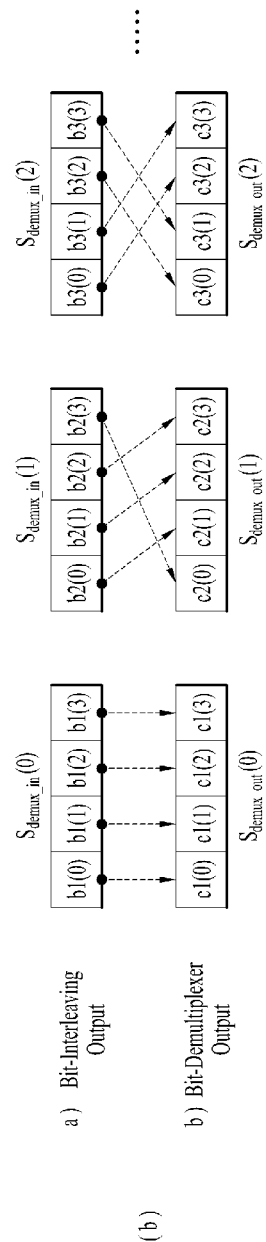
FIG. 21 illustrates a bit interleaving process of physical layer signaling (PLS) according to an embodiment of the present invention.

FIG. 21 illustrates a bit interleaving process of PLS according to an embodiment of the present invention.

Figure 22:
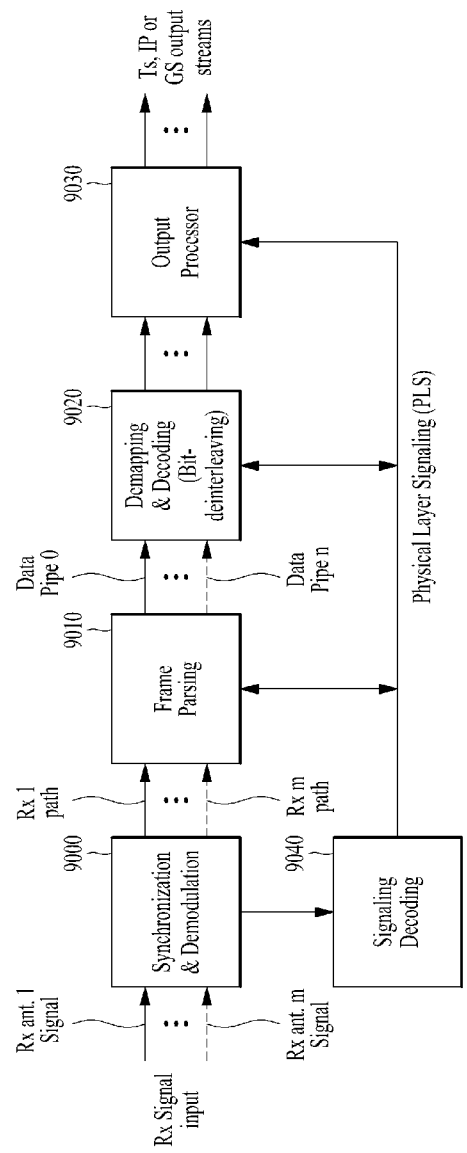
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo $N_{FEC}$ addition with cyclic shifting value floor($N_{FEC}/2$), where $N_{FEC}$ is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

In the cases of QAM-16 and NUQ-64 mapped to a QAM symbol, the rule of operation is described in FIG. 23(a). As shown in FIG. 23(a), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast future-cast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

Figure 23:
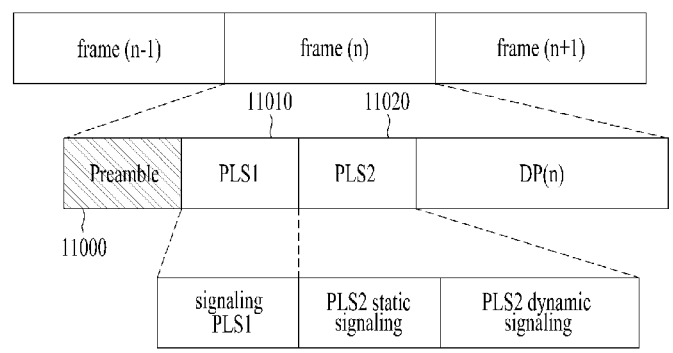
FIG. 23 illustrates a signaling hierarchy structure of a frame according to an embodiment of the present invention.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|---|---|
| 00 | 8K FFT |
| 01 | 16K FFT |
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
|---|---|
| 000 | 1/5 |
| 001 | 1/10 |

TABLE 2-continued

| Value | GI_FRACTION |
|---|---|
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
|---|---|
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicates major version information. A change in the major version field indicates a non-backward-compatible change. A default value is '0000'. For a version described in this standard, a value is set to '0000'.

Minor version: The LSB corresponding to four bits of SYSTEM_VERSION field indicates minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an $(i+1)^{th}$ (i is a loop index) frame of an associated FRU. This field uses the same signaling format as shown in Table 8.

FRU_FRAME_LENGTH: This 2-bit field indicates a length of an $(i+1)^{th}$ frame of an associated FRU. Using FRU_FRAME_LENGTH together with FRU_GI_FRACTION, an exact value of a frame duration may be obtained.

FRU GI_FRACTION: This 3-bit field indicates a guard interval fraction value of an $(i+1)^{th}$ frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
| --- | --- |
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
| --- | --- |
| 000 | BPSK |
| 001 | QPSK |
| 010 | QAM-16 |
| 011 | NUQ-64 |
| 100 to 111 | Reserved |

PLS2_SIZE_CELL: This 15-bit field indicates $C_{total\_partial\_block}$, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates $C_{total\_partial\_block}$, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates $C_{total\_full\_block}$, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
| --- | --- |
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
|---|---|
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
|---|---|
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
|---|---|
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates $P_I$, the number of frames to which each TI group is mapped, and one TI block is present per TI group ($N_{TI}$=1). Allowed values of $P_I$ with the 2-bit field are defined in Table 12 below.

If DP_TI_TYPE is set to a value of '0', this field indicates the number of TI blocks $N_{TI}$ per TI group, and one TI group is present per frame ($P_I$=1). Allowed values of $P_I$ with the 2-bit field are defined in the following Table 12.

TABLE 12

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_IN_INTERVAL: This 2-bit held indicates a frame interval ($I_{JUMP}$) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
FIG. 26 is a table illustrating PLS2 data according to another embodiment of the present invention.
FIG. 27 illustrates a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| | DP_START field size | |
|---|---|---|
| PHY profile | 64K | 16K |
| Base | 13 bits | 15 bits |
| Handheld | — | 13 bits |
| Advanced | 13 bits | 15 its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE. If the EAC_FLAG field is equal to '0', the following 12 bits are allocated to EAC COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
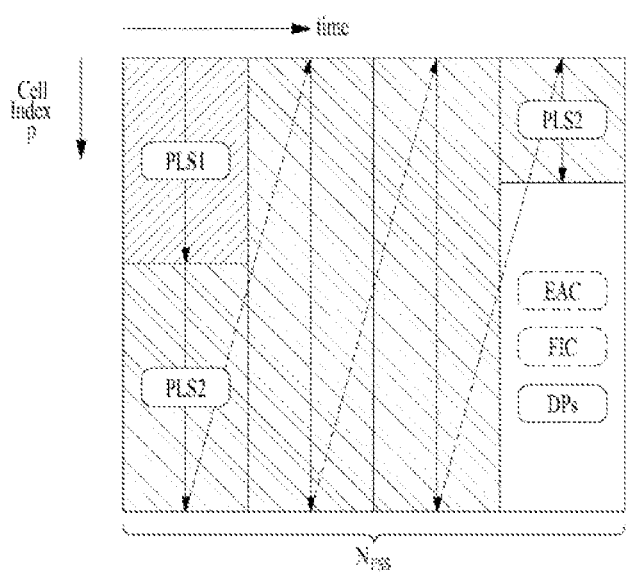
FIG. 28 illustrates PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF ($K_{bch}$ bits), and then LDPC encoding is applied to BCH-encoded BBF ($K_{ldpc}$ bits=$N_{bch}$ bits).

A value of $N_{ldpc}$ is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed $B_{ldpc}$, (FECBLOCK), $P_{ldpc}$ (parity bits) is encoded systematically from each $I_{ldpc}$ (BCH—encoded BBF), and appended to $I_{ldpc}$. The completed $B_{ldpc}$ (FECBLOCK) is expressed by the following Equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Equation 2]

Parameters for the long FECBLOCK and the short FECBLOCK are given in the above Tables 22 and 23, respectively.

A detailed procedure to calculate $N_{ldpc}-K_{ldpc}$ parity bits for the long FECBLOCK, is as follows.

1) Initialize the parity bits $$p_0=p_1=p_2=\ldots=p_{N_{ldpc}-K_{ldpc}-1}=0$$ [Equation 3]

2) Accumulate a first information bit—$i_0$, at a parity bit address specified in a first row of addresses of a parity check matrix. Details of the addresses of the parity check matrix will be described later. For example, for the rate of 13/15, $$p_{983}=p_{983}\oplus i_0 \quad p_{2815}=p_{2815}\oplus i_0$$

$$p_{4837}=p_{4837}\oplus i_0 \quad p_{4989}=p_{4989}\oplus i_0$$

$$p_{6138}=p_{6138}\oplus i_0 \quad p_{6458}=p_{6458}\oplus i_0$$

$$p_{6921}=p_{6921}\oplus i_0 \quad p_{6974}=p_{6974}\oplus i_0$$

$$p_{7572}=p_{7572}\oplus i_0 \quad p_{8260}=p_{8260}\oplus i_0$$

$$p_{8496}=p_{8496}\oplus i_0$$ [Equation 4]

3) For the next 359 information bits, $i_s$, s=1, 2, ..., 359, accumulate $i_s$ at parity bit addresses using following Equation.

$$\{x+(s \bmod 360)\times Q_{ldpc}\} \bmod (N_{ldpc}-K_{ldpc})$$ [Equation 5]

Here, x denotes an address of a parity bit accumulator corresponding to a first bit $i_0$, and $Q_{ldpc}$ is a code rate dependent constant specified in the addresses of the parity check matrix. Continuing with the example, $Q_{ldpc}$=24 for the rate of 13/15, so for an information bit $i_1$, the following operations are performed.

$$p_{1007}=p_{1007}\oplus i_1 \quad p_{2839}=p_{2839}\oplus i_1$$

$$p_{4861}=p_{4861}\oplus i_1 \quad p_{5013}=p_{5013}\oplus i_1$$

$$p_{6162}=p_{6162}\oplus i_1 \quad p_{6482}=p_{6482}\oplus i_1$$

$$p_{6945}=p_{6945}\oplus i_1 \quad p_{6998}=p_{6998}\oplus i_1$$

$$p_{7596}=p_{7596}\oplus i_1 \quad p_{8284}=p_{8284}\oplus i_1$$

$$p_{8520}=p_{8520}\oplus i_1$$ [Equation 6]

4) For a 361th information bit $i_{360}$, an address of the parity bit accumulator is given in a second row of the addresses of the parity check matrix. In a similar manner, addresses of the parity bit accumulator for the following 359 information bits $i_s$, s=361, 362, ..., 719 are obtained using Equation 6, where x denotes an address of the parity bit accumulator corresponding to the information bit $i_{360}$, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_i=p_i\oplus p_{i-1}, i=1,2,\ldots N_{ldpc}-K_{ldpc}-$$ [Equation 7]

Here, final content of $p_i$ (i=0, 1, ..., $N_{ldpc}-K_{ldpc}-1$) is equal to a parity bit $p_i$.

TABLE 24

| Code rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for the short FEC-BLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 29:
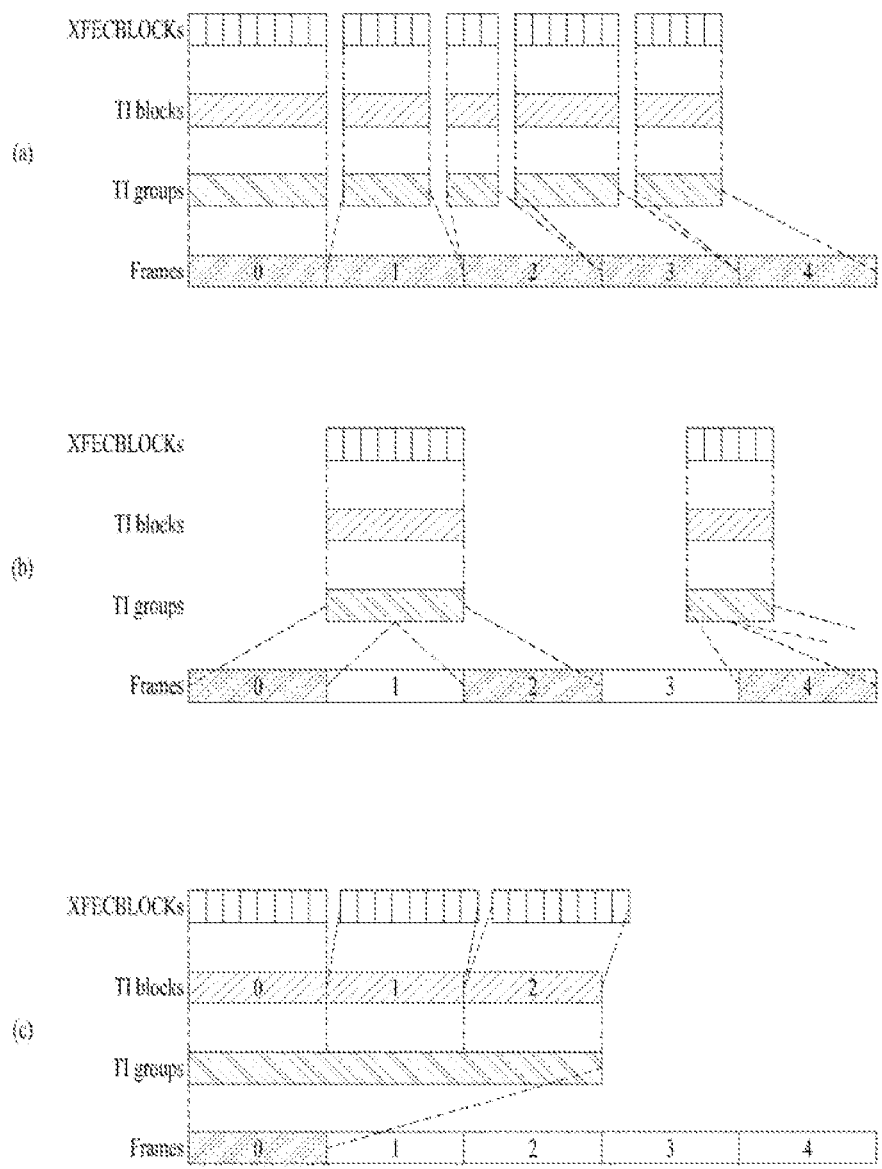
FIG. 29 illustrates time interleaving according to an embodiment of the present invention.

FIG. 29 illustrates time interleaving according to an embodiment of the present invention.

(a) to (c) show examples of a TI mode.

A time interleaver operates at the DP level. Parameters of time interleaving (TI) may be set differently for each DP.

The following parameters, which appear in part of the PLS2-STAT data, configure the TI.

DP_TI_TYPE (allowed values: 0 or 1): This parameter represents the TI mode. The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): This parameter represents the maximum number of XFEC-BLOCKs per TI group.

DP FRAME INTERVAL (allowed values: 1, 2, 4, and 8): This parameter represents the number of the frames hump between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFEC-BLOCKs and contains a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from a minimum value of 0 to a maximum value of $N_{xBLOCK\_Group\_MAX}$ (corresponding to DP_NUM_BLOCK_MAX), the largest value of which is 1023.

Each TI group is either mapped directly to one frame or spread over $P_I$ frames. Each TI group is also divided into more than one TI block ($N_{TI}$), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
|---|---|
| Option 1 | Each TI group contains one TI block and is mapped directly to one frame as shown in (a). This option is signaled in PLS2-STAT by DP_TI_TYPE = '0' and DP_TI_LENGTH = '1' ($N_{TI}$ = 1). |
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP_TI_TYPE = '0' and DP_TI_LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an 5th TI block of an $n^{th}$ TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 30:
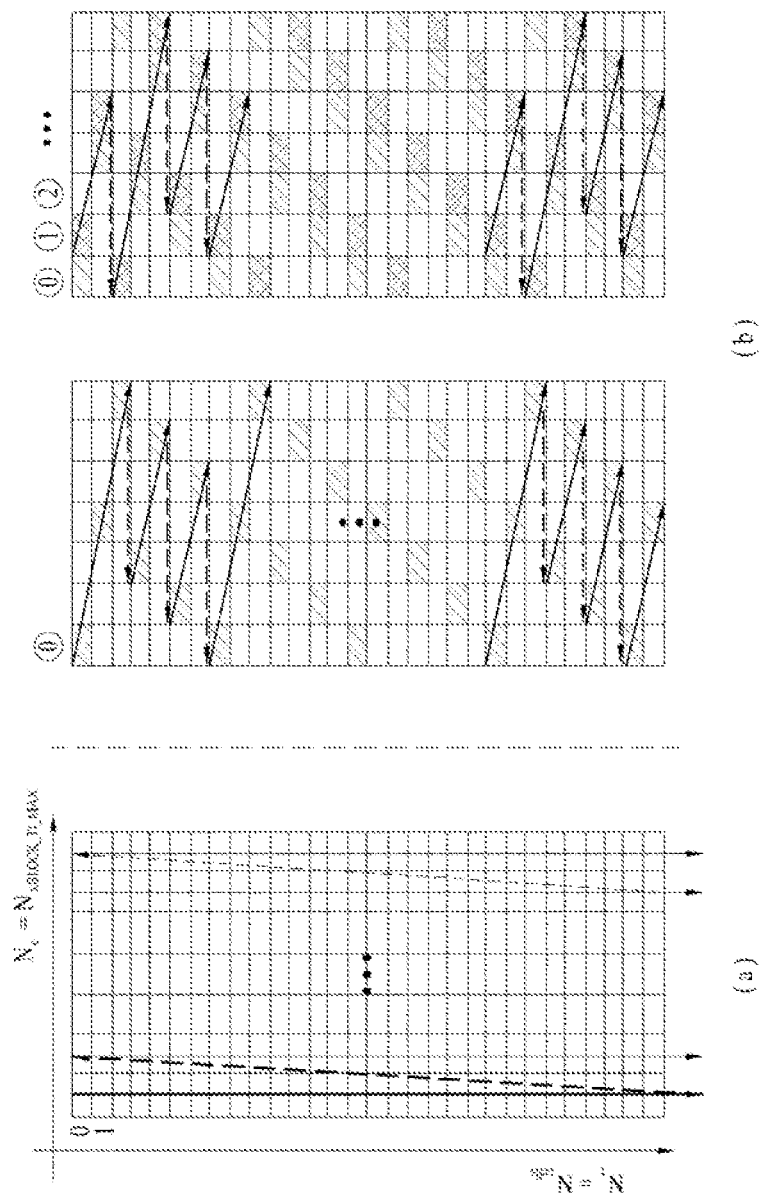
FIG. 30 illustrates a basic operation of a twisted row-column block interleaver according to an embodiment of the present invention.

FIG. 30 illustrates a basic operation of a twisted row-column block interleaver according to an embodiment of the present invention.

FIG. 30(a) shows a write operation in the time interleaver and FIG. 30(b) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, $N_r$ cells are read out as shown in (b). In detail, assuming $z_{n,s,t}$ (i=0, . . . , $N_rN_c$) as a TI memory cell position to be read sequentially, a reading process in such an interleaving array is performed by calculating a row index $R_{n,s,i}$, a column index $C_{n,s,i}$ and an associated twisting parameter $T_{n,s,i}$ as in the following Equation.

$$\text{GENERATE}(R_{n,s,i}, C_{n,s,i}) = \quad \text{[Equation 8]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

[Equation 9]

for
$$\begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases},$$

$$S_{shift} = \frac{N'_{xBLOCK\_TI\_MAX} - 1}{2}$$

As a result, cell positions to be read are calculated by coordinates $z_{n,s,i} = N_r C_{n,s,i} + R_{n,s,i}$.

Figure 31:
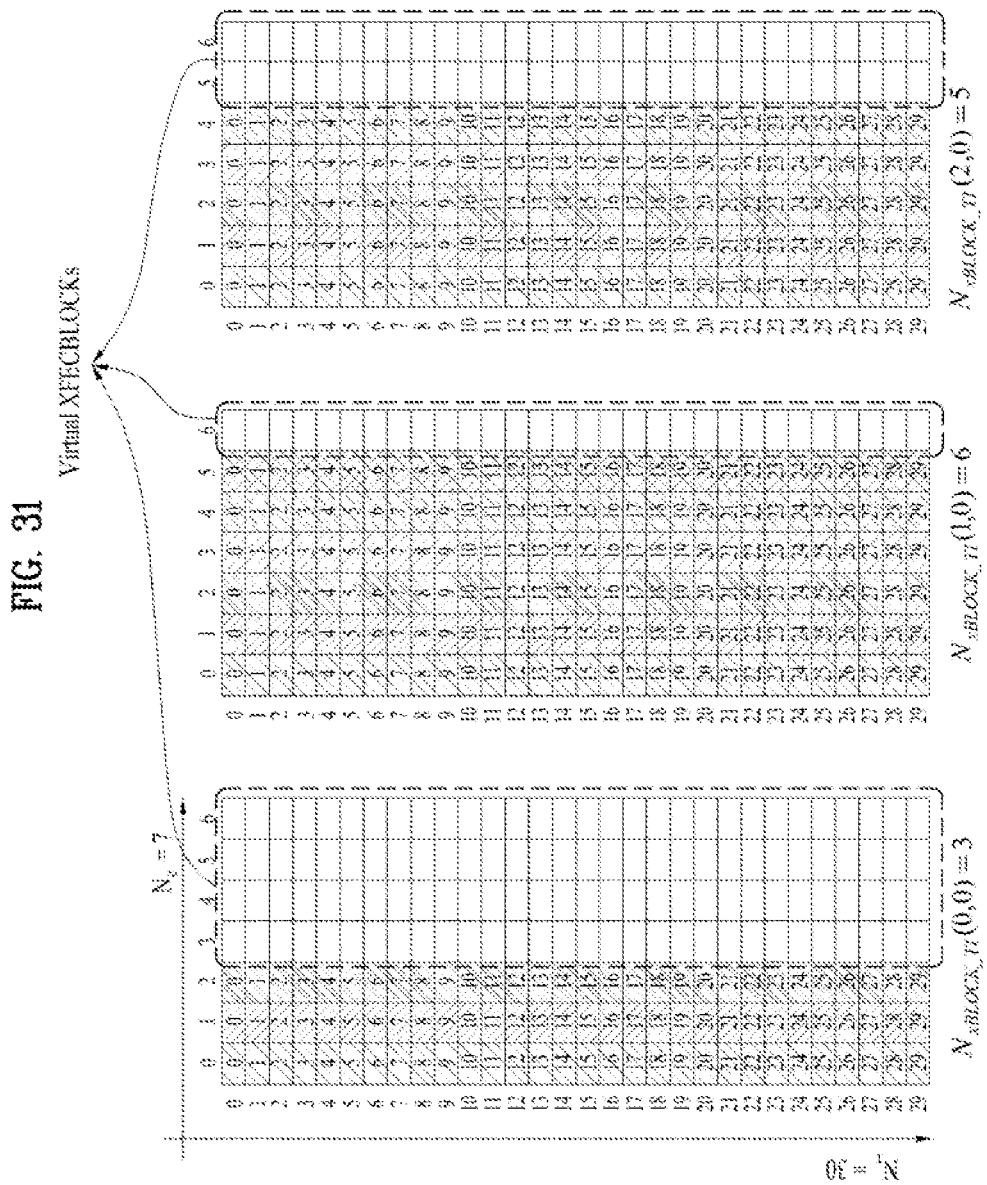
FIG. 31 illustrates an operation of a twisted row-column block interleaver according to another embodiment of the present invention.

FIG. 31 illustrates an operation of a twisted row-column block interleaver according to another embodiment of the present invention.

More specifically, FIG. 31 illustrates an interleaving array in a TI memory for each TI group, including virtual XFEC-BLOCKs when $N_{xBLOCK\_TI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$ may be less than or equal to $N'_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r \times N_c = N_{cells} \times N'_{xBLOCK\_TI\_MAX}$ by inserting the virtual XFECBLOCKs into the TI memory and a reading process is accomplished as in the following Equation.

[Equation 10]

```
p = 0;
for i = 0; i < N_cells N'_xBLOCK_TI_MAX; i = i + 1
{GENERATE (R_{n,s,i}, C_{n,s,i});
V_i = N_r C_{n,s,j} + R_{n,s,j}
    if V_i < N_cells N_xBLOCK_TI (n,s)
    {
        Z_{n,s,p} = V_i; p = p + 1;
    }
}
```

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
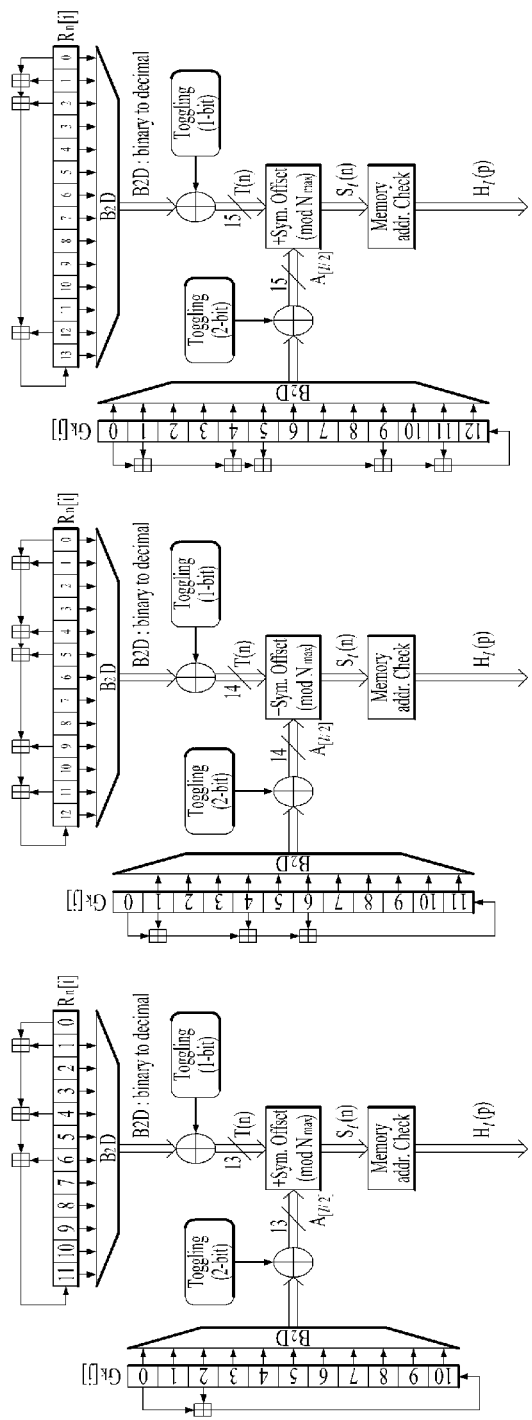
FIG. 32 is a block diagram illustrating an interleaving address generator including a main pseudo-random binary sequence (PRBS) generator and a sub-PRBS generator according to each FFT mode according to an embodiment of the present invention.

FIG. 32 illustrates an interleaving address generator including a main pseudo-random binary sequence (PRBS) generator and a sub-PRBS generator according to each FFT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots x_{m,l,p}, \ldots, x_{m,l,N_{data}-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,M_{data}-1}]$ for $l=0, \ldots, N_{sym}-1$. For the OFDM symbol pair, the interleaved OFDM symbol pair is given by $v_{m,l,Hi(p)}=x_{m,l,p}$, $p=0, \ldots N_{data}-1$, for the first OFDM symbol of each pair $x_{m,l,p}=v_{m,l,Hi(p)}$, $p=0, \ldots N_{data}-1$, for the second OFDM symbol of each pair, where $H_l(p)$ is the interleaving address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

Figure 35:
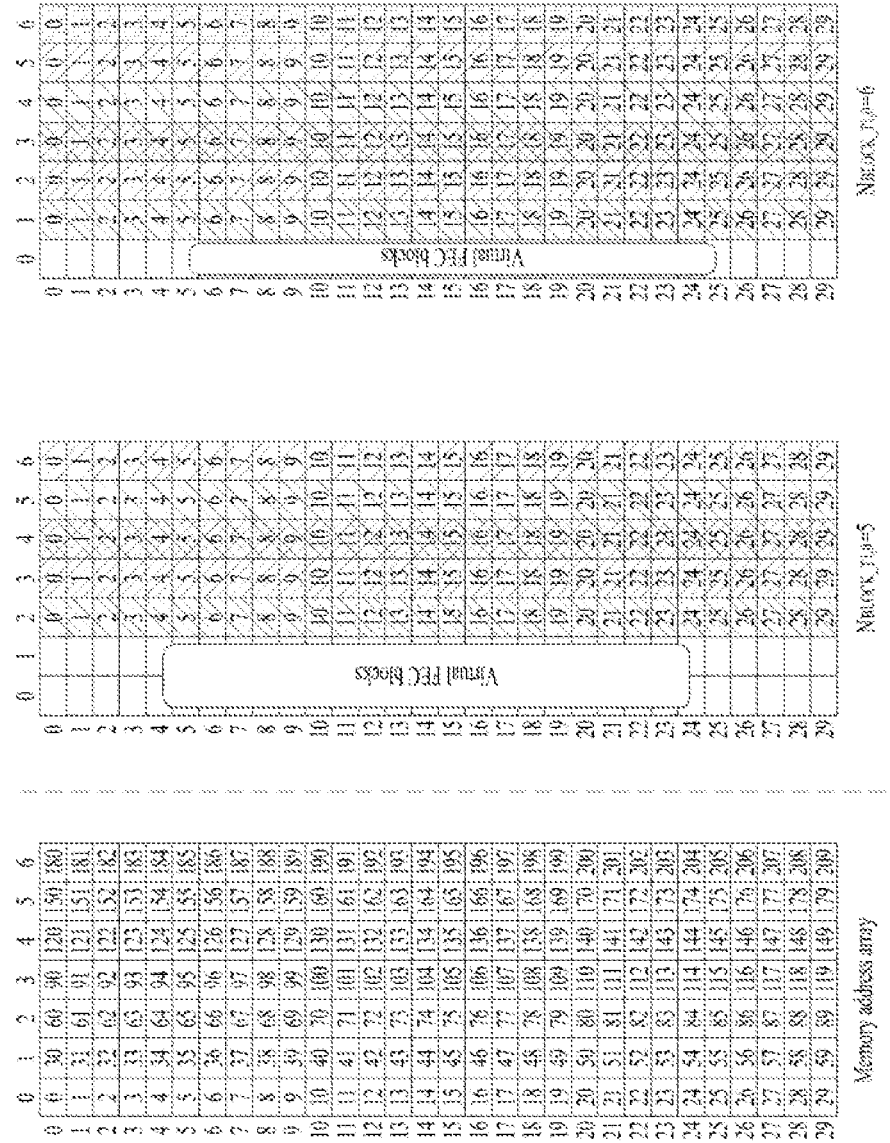
FIG. 35 illustrates a write operation of a time interleaver according to an embodiment of the present invention.

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

Figure 39:
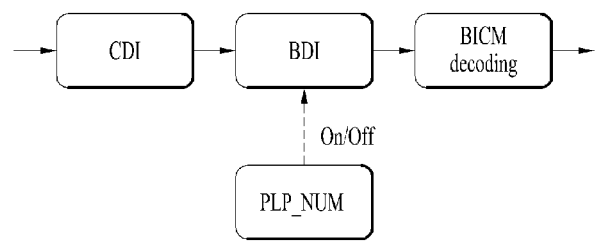
FIG. 39 is a block diagram including a first example of a structure of a hybrid time deinterleaver.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

Figure 40:
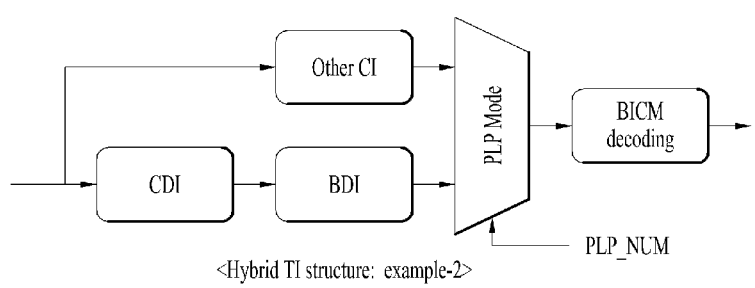
FIG. 40 is a block diagram including a second example of the structure of the hybrid time deinterleaver.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

Figure 41:
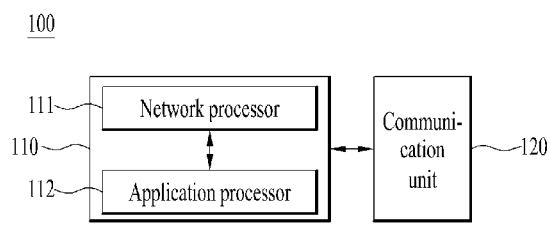
FIG. 41 is a block diagram of an electronic device according to an embodiment of the present invention.

FIG. 41 is a block diagram of an electronic device according to an embodiment of the present invention.

Referring to FIG. 41, the electronic device 100 includes a controller 110 and a communication unit 120. The controller 110 may establish a communication linkage with a companion device. In addition, when the communication linkage with the companion device is established, the communication unit 120 may exchange data with the companion device.

In addition, the controller 110 may include a network processor 111 and an application processor 112. The application processor 112 may request connection with the companion device from the network processor 111.

The network processor 111 may place the connection request received from the application processor 112 in a standby state since the network processor 111 has not been connected with the companion device. Thereafter, the network processor 111 may receive a connection request from the companion device. The network processor 111 may search for a matching connection request from the application processor 112 based on information received from the companion device. Upon finding the matching connection request, the network processor 111 may connect the companion device to the application processor 112.

As an example, the application processor 112 may correspond to an application module or an application browser. Alternatively, the application processor 112 may correspond to an HbbTV application. As an example, the network processor 111 may be implemented as a network module. Alternatively, the network processor 111 may correspond to a WebSocket server. The network processor 111 may interconnect the application processor 112 and the companion device. As an example, when the network processor 111 is implemented as the WebSocket server, each of the application processor 112 and the companion device may be regarded as one client. In other words, the WebSocket server may connect a first client and a second client. Alternatively, each of the first client and the second client may be referred to as a peer. Depending on cases, the WebSocket server may be implemented as a separate device outside the electronic device.

Meanwhile, the application processor 112 may operate one application. In addition, the companion device may operate one application. The application processor 112 may be connected to the companion device through the network processor 111. The companion device may receive data from the application processor 112 and receive and drive an application which is being driven by the application processor 112. Alternatively, each of the application processor 112 and the companion device may drive an application. The application processor 112 may be connected to the companion device to exchange data with the companion device. In this case, the electronic device 100 and the companion device may be considered to perform inter-application communication.

The WebSocket server may be used as a repeater and may generate a communication channel between applications. The generated communication channel may enable the electronic device 100 and the companion device to communicate with each other. The WebSocket server may connect a channel between applications requesting the same information using a name ID and an origin ID of an application desiring to perform communication to generate a communication channel. For example, the above-described method may connect an application (client) and an application (client) without correcting a WebSocket API in HbbTV 2.0.

In this specification, respective terms are interchangeable.

Figure 42:
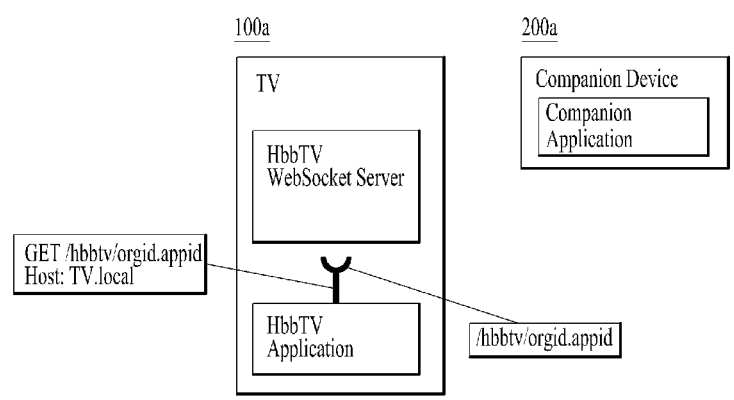
FIG. 42 is a diagram for description of connection of a first client according to an embodiment of the present invention.

FIG. 42 is a diagram for description of connection of a first client according to an embodiment of the present invention.

FIG. 42 illustrates an electronic device 100a and a companion device 200a. The electronic device 100a may include an application processor and a network processor. As an example, the application processor may correspond to an HbbTV application or a first application, and the network processor may correspond to an HbbTV WebSocket server. The companion device 200a may include a companion device processor. As an example, the companion device processor may correspond to a companion application or a second client. The WebSocket server may need to be changed to connect the clients. Hereinafter, an operation related to change of the WebSocket server will be described. The changed WebSocket server may be driven in HbbTV 2.0 TV.

Usually, a WebSocket client specifies the remote host to which it wishes to establish a connection, and the relative URI for the desired service on that host in the initial GET request along with the WebSocket connection upgrade header. In HbbTV, however, it cannot be assumed that, the peer with which communications are to be established, has contacted the WebSocket server yet. A connection request from a client in the special client-to-client mode, hence needs to be kept active until another, suitable peer arrives.

To achieve this, we define special uses for two fields of the WebSocket protocol upgrade GET request. The Request-URI—which is part of the Request-Line—takes a predefined format with a common prefix string. This field is used to match corresponding communication peers. The Host request-header field may either refer to the TV set running the WebSocket server (in which case communications with any peer with a matching Request-URI will be established), or to a specific companion device (in which case communications only with the designated device, and with a matching Request-URI will be established).

The format for the Request-URI field may be according to the following ABNF grammar:
HbbTV-Request-URI="/hbbtv/" org-id "." app-id
org-id=8HEX
app-id=4HEX In response to such a request, an HbbTV WebSocket server may create a stream head, that is a half open connection, which is associated with the Request-URI supplied in the upgrade GET request by the client. The server may not respond immediately with a WebSocket Protocol Handshake response, but instead wait for other peers to appear, and thereby keep the first client waiting. If the server wishes to implement a time-out, it may respond with a 504. Gateway Timeout response.

Clients may not use the Sec-WebSocket-Protocol header when requesting client-to-client connections. Servers may ignore the Sec-WebSocket-Protocol header in requests for client-to-client connections. Servers may respond with a 403. Forbidden response if the Host header field in a client-to-client connection request does not specify a device on any of the local sub-networks that the server is attached to. All HbbTV 2.0. WebSocket clients may use the method described in this section to request client-to-client connections from HbbTV 2.0. WebSocket servers.

Figure 43:
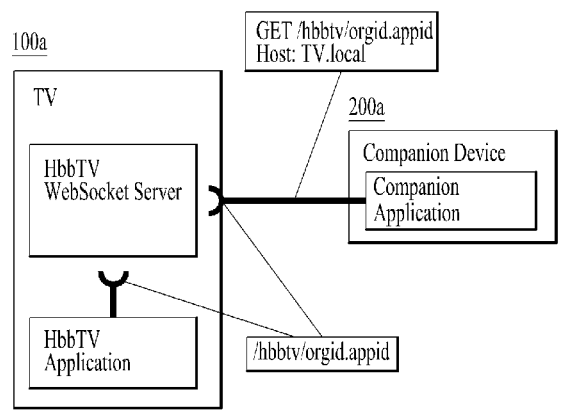
FIG. 43 is a diagram for description of connection of a second client according to an embodiment of the present invention.

FIG. 43 is a diagram for description of connection of a second client according to an embodiment of the present invention.

FIG. 43 illustrates an electronic device 100a and a companion device 200a. The electronic device 100a may include an application processor and a network processor. The network processor (for example, a WebSocket server) may receive a connection request from an HbbTV application and a companion application.

When another client requests a client-to-client connection using the method as above, the server may also create a stream head for that new request as shown in FIG. 3. After a new stream head is created, the server may search the collection of stream heads currently waiting to be connected, for Request-URI and Host header field values matching those of the newly created stream head. If no match is found, the server may add the newly created stream head to the collection of stream heads currently waiting to be connected, and may keep waiting for further client-to-client connection requests.

Figure 44:
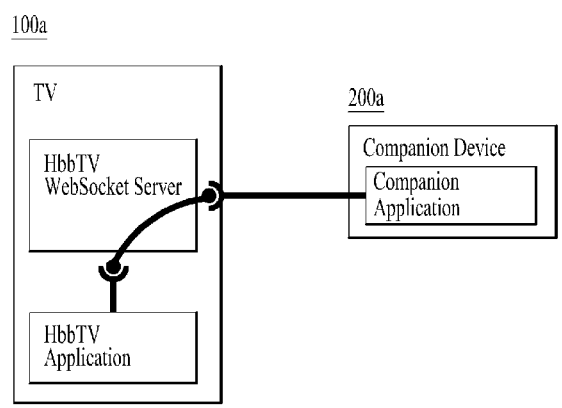
FIG. 44 is a diagram for description of connection between the first and second clients according to an embodiment of the present invention.

FIG. 44 is a diagram for description of connection between the first and second clients according to an embodiment of the present invention.

FIG. 44 illustrates an electronic device 100a and a companion device 200a. The electronic device 100a may include an application processor and a network processor. The network processor (for example, a WebSocket server) may connect an HbbTV application and a companion application.

If a newly created stream head is associated with the same Request-URI and Host header field values as a stream head in the collection of stream heads currently waiting to be connected, the server may remove the matching stream head from the collection, and may establish a full-duplex communications channel between the two stream heads.

Once the two stream heads are connected, the server outputs all data received from one stream head immediately and without alteration to the respective other stream head. Thereby, a transparent communications channel is established between the two clients.

If one of the two clients sends a Close frame, the server may send a corresponding Close frame to the other client. If one of the two clients disconnects without sending a Close frame, the server may generate a Close frame, and may send the same to the other client.

In other words, the network processor may generate a stream head of the application processor and include the stream head in a stream head group in response to a connection request from the application processor. In addition, in response to a connection request from the companion device, the network processor may generate a stream head of the companion device and verify whether a matching stream head is present. When the matching stream head is present, the network processor may connect a stream head of the application processor and a stream head of the companion device matching from the stream head group. In this instance, the network processor may remove the matching stream head of the application processor or the matching stream head of the companion device from the stream head group.

Figure 45:
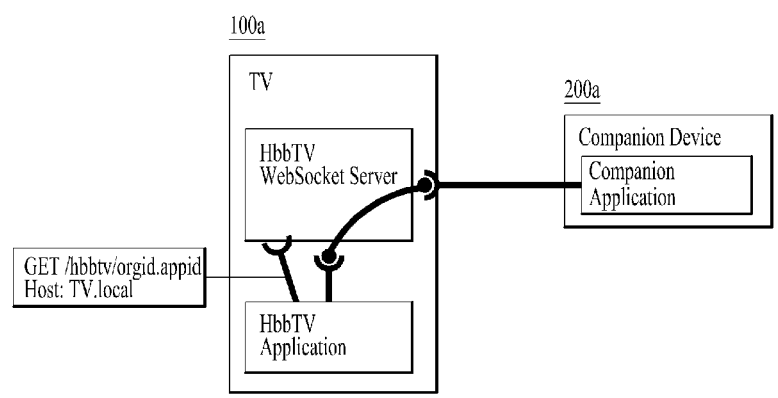
FIG. 45 is a diagram for description of an additional connection request according to an embodiment of the present invention.

FIG. 45 is a diagram for description of an additional connection request according to an embodiment of the present invention.

Referring to FIG. 45, an HbbTV application (client) is connected to a companion application (client) of a companion device 200a. In addition, the HbbTV application may generate another stream head for another client. The HbbTV application may be additionally connected to another application. Any stream head be removed from the collection of stream heads available for connecting, prior to establishing a client-to-client connection, such client-to-client connections are one-to-one only. If a client wishes to communicate with more than one other client, it may issue further connection requests to the server until the maximum number of client-to-client connections it is able to process, has been reached.

WebSocket servers may not allow more than one stream head for the same client with the same Request-URI and Host to be on the collection of stream heads currently waiting to be connected. If a client issues another client-to-client connection request with the same Request-URI and Host, before the previous one has been successfully connected or has timed-out, the server may respond with a 403. Forbidden response.

Clients may have several client-to-client connection requests with different Request-URI/Host combinations in the waiting to be connected state. Clients may not attempt to request another client-to-client connection with the same Request-URI/Host combination, before the previous one was either successfully connected or has timed-out.

An "/hbbtv/orgid.appid scheme" for the Request-URI may be used as an escape into the special server client-to-client behavior in order to allow it to be implemented along with other, standard WebSocket server functionalities, and without interfering with the same. The choice of matching the Request-URI and Host header field allows for two approaches: if a specific device is targeted by the Host header, the client only wishes to talk to that specific other client. It may have learnt about its existence through other means (e.g. SSDP as part of UPnP). Secondly, if the Host header field targets the server, it will be the same for all clients targeting the same server. This will result in only the Request-URI being the discriminating factor for choosing suitable communication peers. Hence, targeting the server in the Host header field effectively provides a wildcard match with any other client using the same Request-URI and also targeting the server. As such, both dedicated and opportunistic connection establishment strategies are possible.

Since the HbbTV 2.0 WebSocket server does not perform any authentication, authorization, or other verification, no trust can be associated with client-to-client connections, or between clients and WebSocket servers. Clients that wish to exchange private, or otherwise sensitive information through a WebSocket server should therefore employ end-to-end encryption to ensure the privacy of the communication. Likewise, such clients should employ cryptographic methods to establish the identity and authenticity of any communication peers with which they wish to communicate through a WebSocket server. Since an HbbTV 2.0 WebSocket server will establish connections only to clients who have indicated the intent of being connected, it is very unlikely that a successful denial-of-service attack could be staged against another client through an HbbTV WebSocket server. The client under attack can simply stop asking the server to be connected to other clients.

Since it is defined that a server may reject simultaneous connection attempts to a not yet connected Request-URI/Host combination, a denial-of-service attack might be attempted against the server itself. This could be done by repeatedly sending the same connection request to provoke error responses, or by sending random connection requests in an attempt to exhaust the server's resources by creating many open stream heads. Both techniques are general strategies for attacking HTTP servers, and are not specific to WebSocket or HbbTV. It is hence expected that any WebSocket server implementation (be it of the HbbTV flavor or not) will have suitable mitigation mechanisms (e.g. by stopping sending responses or creating stream heads).

Figure 46:
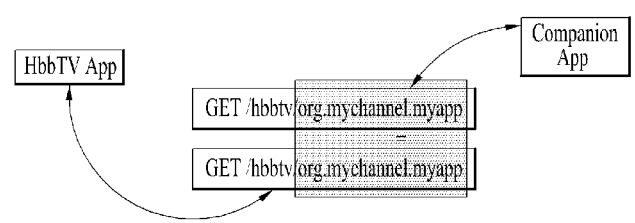
FIG. 46 is a diagram for description of connection between clients when an IP address is not present according to an embodiment of the present invention.

FIG. 46 is a diagram for description of connection between clients when an IP address is not present according to an embodiment of the present invention.

FIG. 46 illustrates a method of establishing a communication linkage between clients. The above-described inter-application communication method based on WebSocket may enable a WebSocket server to connect applications, URI paths (paths excluding a host name) of which are the same, to perform inter-application communication. Inter-client communication may divide an application driven in an electronic device (for example, a TV application) and an application driven in a companion device (for example, a CS application), thereby selectively performing inter-application communication.

As an example, in HbbTV, a Request-URI may be configured without including an IP address. A URI path may start with a reserved word ("hbbtv") indicating HbbTV after a root ("/"), and may include an organization or company ID (org-id) and an application ID (app-id) thereafter. The WebSocket server (network processor) may connect applications, WebSocket API call URI paths of which are the same.

Syntax) GET "/hbbtv/"org-id"."app-id

Example) GET/hbbtv/org.mychannel.myapp

Meanwhile, respective clients requesting connection may use the same port or different ports. When the clients use the same port, the WebSocket server may recognize that a called application is an HbbTV application if IPs of applications calling a WebSocket API are the same, and may recognize that a called application is a companion device application if the IPs are different from each other. When the same port is used, the WebSocket server may simplify server implementation and test, and discovery is unnecessary. (With most WebSocket libraries, need to start a different instance per port. Single port drastically simplifies server implementation and test. No discovery needed if app-2-app server listens on well-defined port on the TV.)

Next, a description will be given of a case in which the clients use different ports. This case refers to a case in which an application driven by a TV and an application driven by a companion device use the same URI path and use different ports. As an embodiment, an HbbTV application driven by the TV may use port 8900, and an application driven by the companion device may use port 8901. When the WebSocket server knows ports used by a TV application and a companion application, it is possible to distinguish between communication between the TV application and the companion application and inter-companion application communication. When different ports are used, if several companion devices are connected to a TV using the same host request-header, clients may be easily connected by distinguishing the companion devices and the TV. Since the TV and the companion devices communicate with each other by being connected to the WebSocket server through different ports while host request-headers are the same, it is possible to distinguish between the companion device and the TV. Therefore, it is possible to take complementary measures in terms of security.

Figure 47:
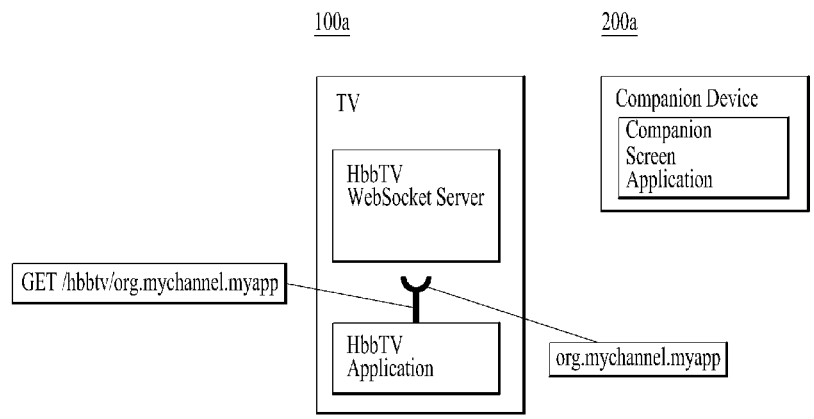
FIG. 47 is a diagram for description of standby connection for connection between applications according to an embodiment of the present invention.

FIG. 47 is a diagram for description of standby connection for connection between applications according to an embodiment of the present invention.

FIG. 47 illustrates an electronic device 100a and a companion device 200a. A TV application of the electronic device 100a may transmit a connection request to a WebSocket server. The TV application is included in the electronic device, and thus the WebSocket server may recognize the TV application as a local application. In addition, a companion application is present outside the electronic device, and thus the WebSocket server may recognize the companion application as a remote application. As an embodiment, an application may use methods below when requesting connection.

TABLE 27

| | |
|---|---|
| String getApp2AppLocalBaseURL( ) | |
| Description | Returns the base URL of the application to application communication service local end-point. |
| Arguments | No arguments |

TABLE 28

| | |
|---|---|
| String getApp2AppRemoteBaseURL( ) | |
| Description | Returns the base URL of the application to application communication service remote end-point. |
| Arguments | No arguments |

As an embodiment, a network processor may execute W3C WebSocket API, and may support a minimum of 200 simultaneous WebSocket connections.

The network processor may provide two service end points executed by a server side of a WebSocket protocol specification. A local end point is used for connection to the network processor by an HbbTV application. A remote end point may be connected to a home network by an application of another device, and is used to include a remote companion application or an HbbTV application driven by another HbbTV device. The HbbTV application may be connected to a local service end point of a network processor in which the application operates or a remote service end point of another hybrid terminal in the same home network. It is preferable that the network processor not be connected to a local service end point of another device in the home network. For example, this can be achieved by placing a local service end point of a local loopback interface of the network processor. When another service end point executes the service side of the WebSocket protocol specification, and the HbbTV application or the companion application uses the service end point, the hybrid terminal should not place the service end point on the same host and port combination as another service end point.

A basic URL for a service end point between applications may be a WebSocket URL. The WebSocket URL may define a host, a port, security, and a resource name of a service end point. A client needs to be connected to a host and a port specified by the WebSocket URL of the service end point. A resource name used in an initial protocol request by the client conforms to ABNF grammar.

resource-name=base-url-resource-name app-endpoint

Base-url-resource-name is a resource name derived from a WebSocket URL of a service end point. App-endpoint is an application specification and may be used for a client connection matching process corresponding to the client. A message of the corresponding client may be delivered through a WebSocket protocol. App-endpoint may be selected by an application developer to avoid collision. Therefore, app-endpoint may start with an ID formatted in reverse DNS notation uniquely related to the HbbTV application, the companion application, or a developer thereof. The hybrid terminal may support app-endpoint including a certain character permitted in a resource name by a minimum length of 1000 characters and the WebSocket protocol specification.

A service end point may support a minimum of ten simultaneous TCP socket connections from a client. When the client attempts to open connection between a server and a TCP socket, the server may reject a request if the server cannot manage simultaneous connection. Otherwise, the server may approve TCP socket connection, and start WebSocket protocol handshake. When the server receives a request handshake from the client, the server may not immediately respond with a handshake response. Instead, the server may wait until connection is paired or connection of the client is canceled. In this state, standby connection may be configured as connection. When the server attempts to execute time-out, the server may respond with a 504 gateway time-out response.

The server may ignore a certain origin header of a request handshake transmitted by the client. The client may not use a Sec-WebSocket-protocol header when requesting connection between clients. The server may ignore the Sec-WebSocket-protocol header in a request for connection between clients. The server may not approve a request from the client for protocol extension using the Sec-WebSocket-protocol header. When the client uses a Sec-WebSocket extension header, the server may not establish a connection using a scheme defined in the WebSocket protocol specification.

As illustrated in FIG. 47, an HbbTV application operating as a client may attempt connection with a local service end point which has app-endpoint of "org.mychannel.myapp" and base-url-resource-name of /hbbtv/. Connection with the companion device may be maintained in a standby state since the companion application has not been linked to communication between applications using the same app-endpoint.

Figure 48:
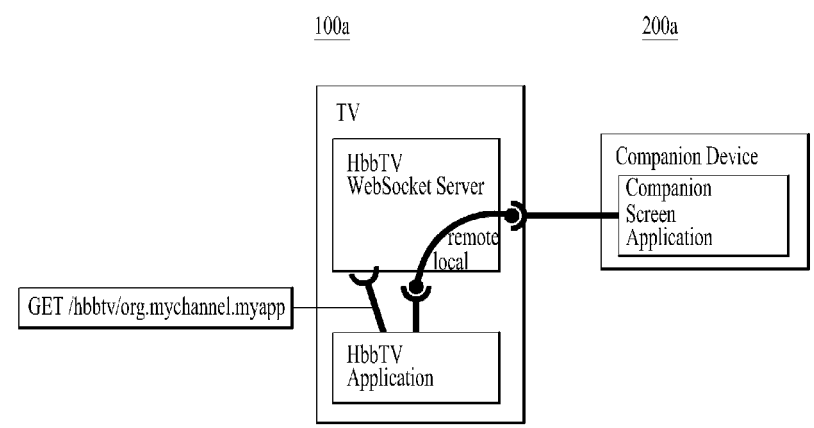
FIG. 48 is a diagram for description of a new connection request for connection with the second client according to an embodiment of the present invention.

FIG. 48 is a diagram for description of a new connection request for connection with a second client according to an embodiment of the present invention.

Referring to FIG. 48, an HbbTV application (client) is connected to a companion application (client) of a companion device 200a. In addition, the HbbTV application may generate another stream head for another client.

A server cannot permit one or more simultaneous standby connections from the same original IP address having the same app-endpoint. When successfully connected or when a client of an IP address prior to termination issues another connection request using the same app-endpoint, the server may respond with a 403. Forbidden response.

A client may desire establishment of connection between multiple simultaneous clients through the same service end points using different resource-name combinations. The client cannot attempt to request another connection from an existing service end point before standby to connect the service end point is successful or time-out or connection is canceled. This operation of the client may be defined by a WebSocket protocol specification.

According to FIG. 48, when a client desires to communicate with one or more clients, the client may wait until existing standby connection is paired. In this instance, an additional connection request may be issued to the server until a maximum number of processable inter-client connections is reached. In other words, the HbbTV application may generate a new standby connection request to permit establishment of inter-application communication.

Meanwhile, the client may include an IP address in a URI path.

Figure 49:
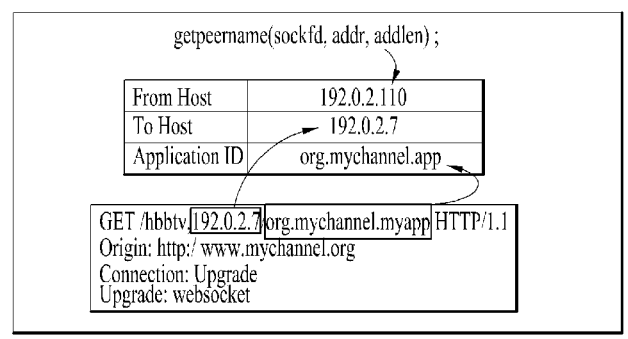
FIG. 49 is a diagram for description of setting of the first client when an IP address is included according to an embodiment of the present invention.

FIG. 49 is a diagram for description of setting of a first client when an IP address is included according to an embodiment of the present invention.

As an embodiment, the above-described URI path starts with a reserved word ("hbbtb") indicating HbbTV after a root ("/"), and may include an organization/company ID (org-id) and an application ID (app-id) thereafter. An application desiring to perform inter-application communication may add an IP address of a driven device to a URI path to designate a target application. A WebSocket server may connect applications, WebSocket API call URI paths of which are the same, according to IP to be used for communication.

Syntax) GET "/hbbtv/" target IP "/" org-id "." app-id
Example) GET /hbbtv/1.1.1.1/org.mychannel.myapp As an embodiment, a TV application A may be driven in IP 1.1.1.1, a companion application B may be driven in IP 1.1.1.2 (a first user terminal), and a companion application C may be driven in IP 1.1.1.3 (a second user terminal). In this instance, the TV application A may attempt to communicate with the companion application C. The TV application A may include IP (1.1.1.3) in which the companion application C is driven in a URI path which is included in a WebSocket request. In addition, the companion application C may include IP (1.1.1.1) of the TV application A in a URI path which is included in a WebSocket request.

According to FIG. 49, a URI path may correspond to hbbtv/192.0.2.7/org.mychannel.myapp HTTP/1/1. Here, 192.0.2.7 may correspond to an IP address of a target application. 192.0.2.110 may correspond to an IP address thereof. In addition, org.mychannel.myapp may correspond to an application ID.

Figure 50:
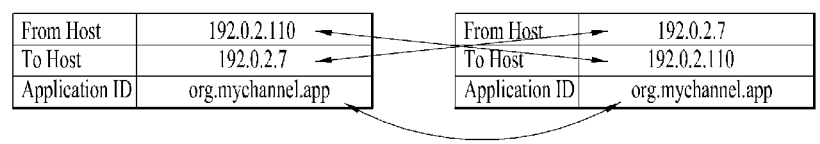
FIG. 50 is a diagram for description of setting of the first client and the second client when IP addresses are included according to an embodiment of the present invention.

FIG. 50 is a diagram for description of setting of a first client and a second client when IP addresses are included according to an embodiment of the present invention.

A WebSocket server may receive the URI request described with reference to FIG. 49 from each of the clients. Referring to FIG. 50, the first client has an IP address of 192.0.2.110, and the second client has an IP address of 192.0.2.7. When the first client requests connection from the second client, a start point (From Host) is 192.0.2.110, and a destination (To Host) is 192.0.2.7. In addition, an application ID may be org.mychannel.myapp. When the second client requests connection from the first client, a start point (From Host) is 192.0.2.7, and a destination (To Host) is 192.0.2.110. In addition, an application ID may be org.mychannel.myapp. That is, start points and destinations of the first client and the second client may be opposite to each other. However, application IDs may be the same. The WebSocket server may connect matching clients to each other.

In addition, a URI path including a host IP address may be used.

For example, the URI path may be used as below. Syntax) GET "/"hbbtv"/" host_address"/"org-id "." app-id, Example) GET /hbbtv/192.0.2.7/org.mychannel.myapp.

Figure 51:
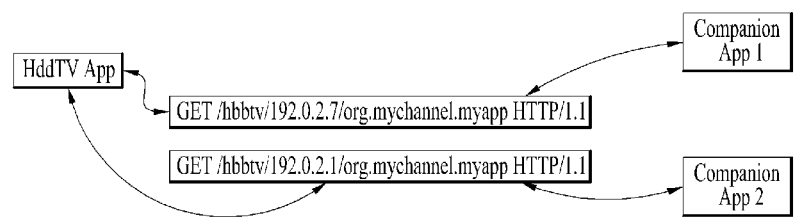
FIG. 51 is a diagram for description of an embodiment of connection to a plurality of second clients when IP addresses are included.

FIG. 51 is a diagram for description of an embodiment of connection to a plurality of second clients when IP addresses are included.

Referring to FIG. 51, an HbbTV has a certain IP address and includes an application ID of org.mychannel.myapp. A first companion application IP address is 192.0.2.7, and a second companion application IP address is 192.0.2.1. Application IDs of first and second companion applications correspond to org.mychannel.myapp. As described above with reference to FIG. 50, the WebSocket server may connect matching clients to each other. Therefore, the WebSocket server may connect matching clients to each other in response to requests from respective clients.

In this way, when an IP address is used in a URI path, both clients designate an object to be connected. Thus, security is improved, clients may be connected to each other, and all information may be matched without extra effort. Meanwhile, even when an IP address is used in a URI path, respective clients may use the same port or may use different ports.

Figure 52:
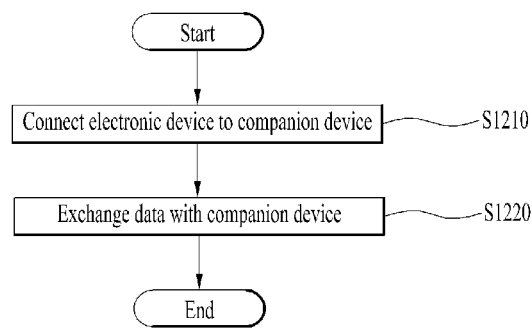
FIG. 52 is a flowchart of a method of controlling an electronic device according to an embodiment of the present invention.

FIG. 52 is a flowchart of a method of controlling an electronic device according to an embodiment of the present invention.

Referring to FIG. 52, in S1210, the electronic device is connected to a companion device. The electronic device may include a network processor and an application processor. In the electronic device, the application processor may request connection to a companion device from the network processor. Upon receiving a connection request from the companion device, the network processor may connect the application processor requesting connection to the companion device.

As described in the foregoing, the application processor may correspond to an application module or an application browser. Alternatively, the application processor may correspond to an HbbTV application. The network processor may be implemented as a network module. Alternatively, the network processor may correspond to a WebSocket server. When the network processor is implemented as the WebSocket server, each of the application processor and the companion device may be regarded as one client. Alternatively, each of a first client and a second client may be referred to as a peer.

The application processor may transmit information about an electronic device operating in the network processor or host request header information indicating companion device information to the network processor. In addition, in response to a connection request from the application processor, the network processor may generate a stream head of the application processor and include the stream head in a stream head group. Upon receiving a connection request from the companion device, the network processor may generate a stream head of the companion device and connect the generated stream head to a stream head of an application processor matched from a stream head group. In this instance, the network processor may remove the stream head of the matched application processor or the stream head of the companion device from the stream head group. Meanwhile, the application processor may transmit an IP address of a companion device to be connected, and respective applications may use the same port.

In S1220, the electronic device may exchange data with the companion device. Through this process, the electronic device may be connected to the companion device to perform communication.

The electronic device and the control method according to the specification are not restricted to configurations and methods of the above-described embodiments, and all or some of the respective embodiments may be selectively combined and variously changed.

Figure 53:
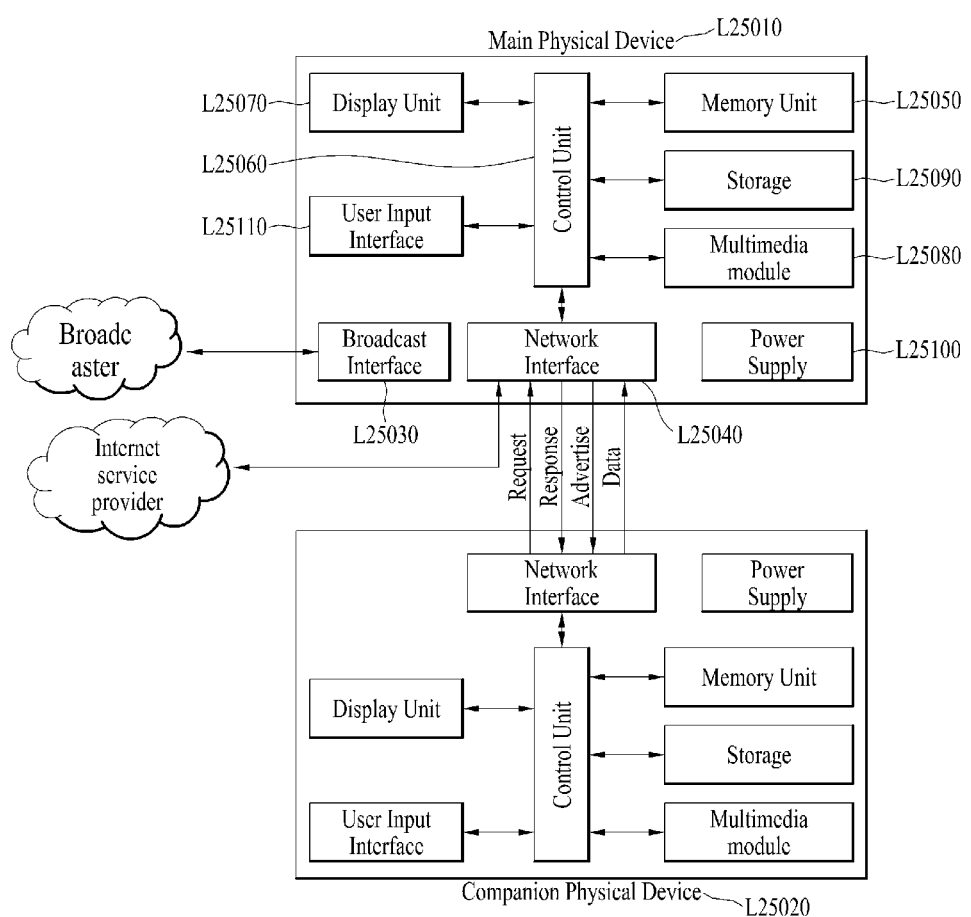
FIG. 53 is a block diagram illustrating a main physical device and a companion physical device according to an embodiment of the present invention.

FIG. 53 is a block diagram illustrating a main physical device and a companion physical device according to an embodiment of the present invention.

The embodiment of the present invention can provide a service guide in a terrestrial broadcast environment or a mobile broadcast environment. In addition, the embodiment of the present invention can provide a service guide regarding services available in the next generation hybrid broadcast environment based on interaction between a terrestrial broadcast network and the Internet.

The embodiment of the present invention can inform users of not only various services available in the next generation hybrid broadcast system, but also constituent content of the services and/or component elements of the services. As a result, the user can easily confirm, select, and view the corresponding service, resulting in increased user convenience.

The embodiment of the present invention may construct a single service, various constituent content of the service, and/or component elements of the service, and may make a cross reference to each other. As a result, the broadcast receiver can easily construct and provide the corresponding service, and can allow the user to easily recognize the corresponding service.

The embodiments of the present invention can extend the reference structure for linking one service to various content and/or component elements of the service, and can allow the broadcast receiver and/or the user to reduce the amount of resources and/or consumption time needed to search for content and/or component elements of the single service.

FIG. 53 is a block diagram illustrating a main physical device and a companion physical device according to an embodiment of the present invention.

The main physical device (L25010) according to an embodiment of the present invention is one of devices for interactive services, and may indicate a target device to be controlled by the companion physical device (L25020). The main physical device may be referred to as a main device, a main reception device, a main display, a main screen, or the like.

The main physical device (L25010) according to one embodiment of the present invention may include a broadcast interface (L25030), a network interface (L25040), a memory unit (L25050), a control unit (L25060), a display unit (L25070), a multimedia module (L25080), a storage unit (L25090), a power-supply unit (L25100), and/or a user input interface (L25110).

The broadcast interface (L25030) may indicate a physical device located between the broadcaster and the device, such that the broadcast interface (L25030) acting as the physical device can transmit various messages (such as the AV stream, service guide, and notification messages) and/or data. The broadcast interface (L25030) may receive broadcast signals, signaling information, data, etc. from the broadcaster.

The network interface (L25040) may indicate a physical device located between various devices (e.g., the main physical device and the companion physical device), such that the network interface (L25040) can transmit various messages (e.g., commands, requests, actions, response messages, etc.), and can perform advertising and/or data transmission. The network interface may receive broadcast services, broadcast content, signaling information, applications, data, etc. from the Internet service provider.

The memory unit (L25050) may be an optional or selective device implemented in various types of devices, and may indicate a volatile physical device capable of temporarily storing various types of data.

The control unit (L25060) may be configured to control the entire operation of the source device and/or the sink device, and may be implemented by software or hardware. In this case, the source device may indicate a device configured to transmit messages and/or data. The sink device may indicate a device configured to receive messages and/or data. Therefore, the main physical device and the companion physical device according to the embodiment of the present invention may correspond to the source device or the sink device.

The display unit (L25070) may display data received through the network interface or data stored in the storage unit on the screen. In this case, the display unit may be controlled by the control unit.

The multimedia module (L25080) may reproduce various types of multimedia. The multimedia module may be contained in the control unit, and may be located independently of the control unit.

The storage unit (L25090) may indicate a non-volatile physical device capable of storing various types of data therein. For example, the SC card may correspond to the storage unit.

The power-supply unit (L25100) may receive the external power-supply voltage and/or the internal power-supply voltage under control of the control unit, such that the power-supply unit (L25100) can provide a power-supply voltage needed to operate other constituent elements.

The user input interface (L25110) may indicate a device capable of receiving input signals or commands from the user.

The companion physical device (L25020) according to the embodiment of the present invention may be one of devices needed for interactive services, and may indicate a device configured to control the main device. Generally, the companion physical device may directly receive input signals from the user. The companion physical device may be referred to as a companion device, a second device, an additional device, an auxiliary device, a companion reception device, a companion receiver, a companion display, a second screen, or the like.

The physical device (L25020) according to the embodiment of the present invention may include a network interface, a memory unit, a control unit, a display unit, a multimedia module, a storage unit, a power-supply unit, and/or a user input interface.

From among all the constituent elements of the companion physical device according to the embodiment, some constituent elements having the same names as those of the main device may have the same functions as those of the constituent elements of the above-mentioned main device.

Figure 54:
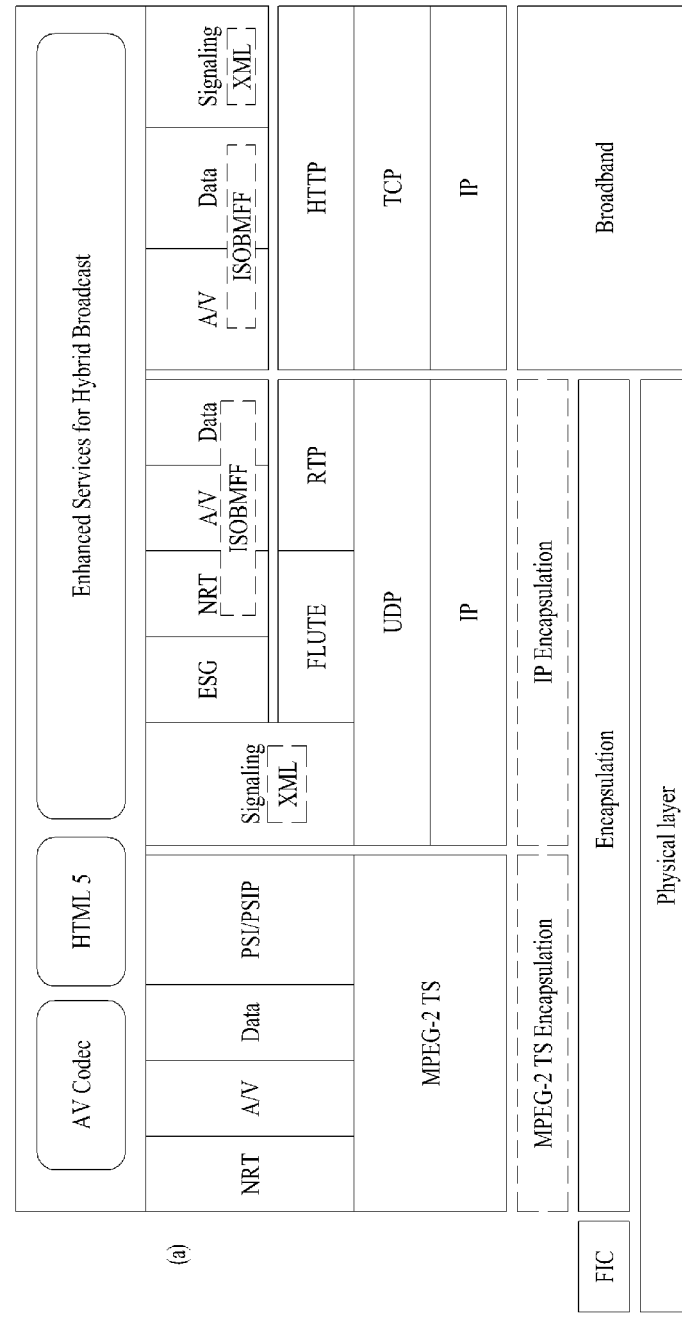
FIG. 54 is a block diagram illustrating a protocol stack to support a hybrid broadcast service according to an embodiment of the present invention.

FIG. 54 is a block diagram illustrating a protocol stack configured to support a hybrid broadcast service according to an embodiment of the present invention.

A physical layer may receive terrestrial broadcast signals, and may properly convert (or transform) the received terrestrial broadcast signals.

IP (Internet Protocol) Encapsulation may acquire an IP datagram using information acquired from the physical layer. In addition, the IP encapsulation may convert (or transform) the acquired IP datagram into a specific frame (e.g., RS Frame, GSE, etc.)

MPEG2 TS Encapsulation may acquire the MPEG2 TS using information acquired from the physical layer. In addition, the MPEG2 TS Encapsulation may convert the acquired MPEG2 TS datagram into a specific frame (e.g., RS Frame, GSE, etc.).

A Fast Information Channel (FIC) may transmit specific information (e.g., mapping information between the service ID and the frame) so as to access the service and/or content.

Signaling may include signaling information to support a hybrid broadcast service according to an embodiment of the present invention. This signaling information may include signaling information to support efficient acquisition of the services and/or content. This signaling information may be denoted in binary and/or XML format, and may be transmitted through the terrestrial broadcast network and/or the broadband network.

Real time A/V (Audio/Video) content and data may be represented by ISO Base Media File Format (ISOBMFF) or the like, and may be transmitted in real time through the terrestrial broadcast network and/or the broadband network. Non-real time content may be transmitted on the basis of IP/UDP/FLUTE. Real-time broadcast A/V (Audio/Video) content, data and/or signaling information may be transmitted in real time through the Internet. In this case, the real-time broadcast A/V (Audio/Video) content, data and/or signaling information may be transmitted by a request message. Alternatively, the real-time broadcast A/V (Audio/Video) content, data and/or signaling information may also be transmitted through real-time streaming.

The embodiment of the present invention may combine data through the above-mentioned protocol stack, and may also provide various enhanced services, for example, an interactive service, a second screen service, etc.

Figure 55:
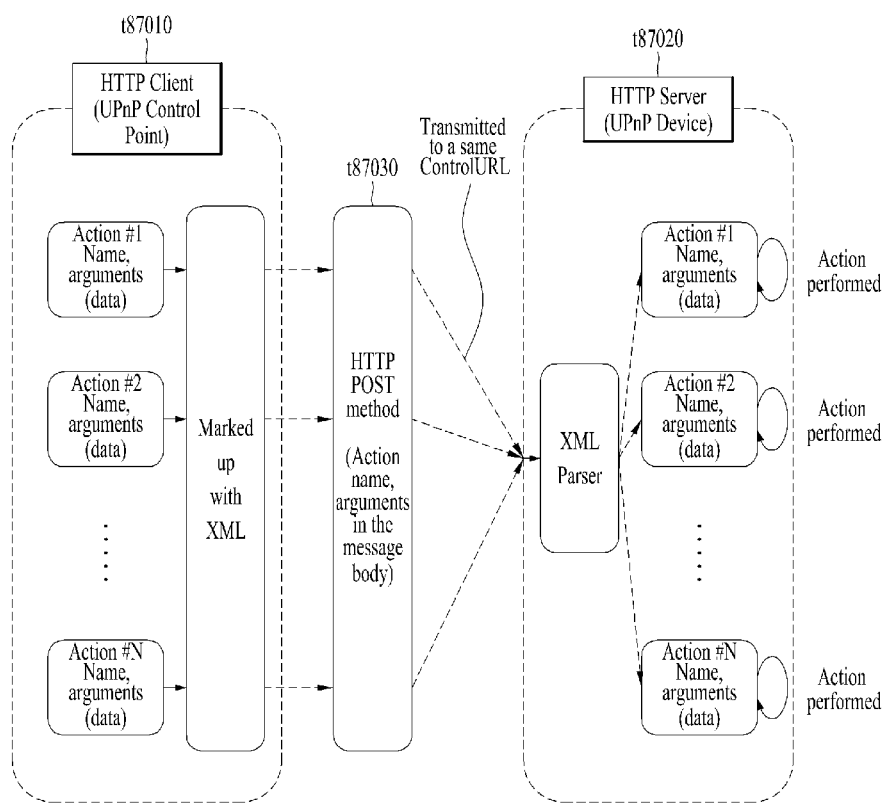
FIG. 55 is a view showing an UPnP type Action mechanism according to an embodiment of the present invention.

FIG. 55 is a view showing an UPnP type Action mechanism according to an embodiment of the present invention.

First, communication between devices in the present invention will be described.

The communication between devices may mean exchange of a message/command/call/action/request/response between the devices.

In order to stably transmit a message between devices to a desired device, various protocols, such as Internet Control Message Protocol (ICMP) and Internet Group Management Protocol (IGMP), as well as Internet Protocol (IP) may be applied. At this time, the present invention is not limited to a specific protocol.

In order to contain various information in a message used for communication between devices, various protocols, such as Hypertext Transfer Protocol (HTTP), Real-time Transport Protocol (RTP), Extensible Messaging and Presence Protocol (XMPP), and File Transfer Protocol (FTP), may be applied. At this time, the present invention is not limited to a specific protocol.

When a message used for communication between devices is transmitted, various components, such as a message header and a message body, defined by each protocol may be utilized. That is, each message component may be transmitted in a state in which data are stored in each message component and the present invention is not limited to a specific message component. In addition, data transmitted by a message may be transmitted various types (string, integer, floating point, boolean, character, array, list, etc.) defined by each protocol. In order to structurally express/transmit/store complex data, a Markup scheme, such as Extensible Markup Language (XML), Hypertext Markup Language (HTML), Extensible Hypertext Markup Language (XHTML), and JavaScript Object Notation (JSON), text, or an image format may be applied. At this time, the present invention is not limited to a specific scheme.

In addition, a message used for communication between devices may be transmitted in a state in which data are compressed. The present invention is not limited to application of a specific compression technology.

In the description of the above-described communication between devices in the present invention, one scheme, e.g. a UPnP scheme, will be described. The UPnP scheme may correspond to a case in which IP-TCP/UDP-HTTP protocols are combined in the description of the above-described communication between devices.

The UPnP type Action mechanism according to the embodiment of the present invention shown in the figure may mean a communication mechanism between a UPnP control point and a UPnP device. The UPnP control point t87010 may be an HTTP client and the UPnP device t87020 may be an HTTP server. The UPnP control point t87010 may transmit a kind of message called an action to the UPnP device t87020 such that the UPnP device t87020 can perform a specific action.

The UPnP control point t87010 and the UPnP device t87020 may be paired with each other. Pairing may be performed between the respective devices through a discovery and description transmission procedure. The UPnP control point may acquire a URL through a pairing procedure.

The UPnP control point t87010 may express each action in an XML form. The UPnP control point t87010 may transmit each action to the acquired control URL using a POST method t87030 defined by HTTP. Each action may be data which are to be actually transmitted as a kind of message. This may be transmitted to a HTTP POST message body in an XML form. Each action may include name, arguments, and relevant data. The HTTP POST message body may transmit name and/or arguments of each action.

At this time, each action may be transmitted to the same control URL. The UPnP device t87020 may parse the received action using an XML parser. The UPnP device t87020 may perform a corresponding operation according to each parsed action.

For the UPnP protocol, each action may be defined by name and used. In addition, since the name of the action is also transmitted to the HTTP POST message body, exchange between infinite kinds of actions may be possible even in a case in which only one URL for a target device exists and only one HTTP POST method is used.

Figure 56:
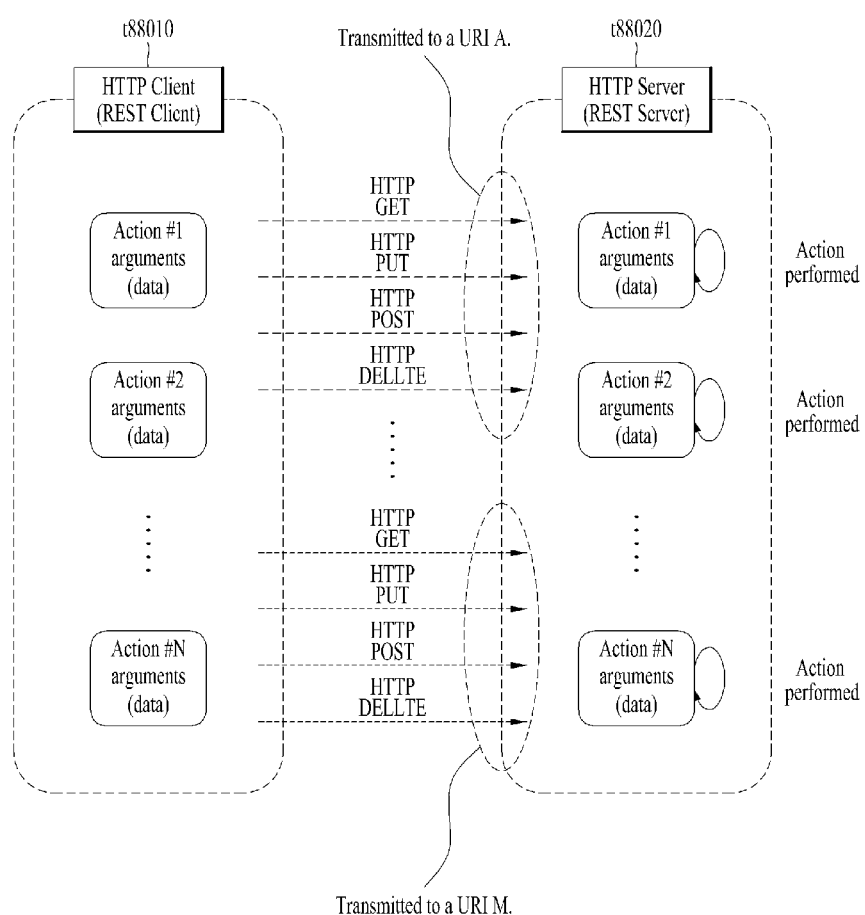
FIG. 56 is a view showing a REST mechanism according to an embodiment of the present invention.

FIG. 56 is a view showing a REST mechanism according to an embodiment of the present invention.

In the description of the above-described communication between devices in the present invention, one scheme, e.g. a REST scheme, will be described.

The REST mechanism according to the embodiment of the present invention shown in the figure may mean a communication mechanism between a REST client t88010 and a REST server t88020. The REST client t88010 may be an HTTP client and the REST server t88020 may be an HTTP server. In the same manner as in the above description, the REST client t88010 may transmit a kind of message called an action to the REST server t88020 such that the REST server t88020 can perform a specific action.

In this embodiment, the REST client t88010 may transmit each action to the REST server t88020 through a URI. Action name is not required for each action. Each action may include only arguments and data.

Among HTTP methods, various methods, such as GET, HEAD, PUT, DELETE, TRACE, OPTIONS, CONNECT, and PATCH, as well as POST may be utilized. In addition, a plurality of URIs that will access a target device for communication may be defined. Due to such characteristics, an action may be transmitted without definition of action name. A plurality of URI values necessary for such a REST scheme may be acquired during a discovery or description transmittance procedure.

Data or arguments necessary to be transmitted may be transmitted while being added to a corresponding URI. Alternatively, data or arguments may be transmitted while being included in the HTTP body in various forms (XML, JSON, HTML, TEXT, IMAGE, etc.).

The REST server t88020 may perform a specific operation according to the received action.

The above-described communication between devices is only an embodiment and all of the details proposed by the present invention are not limited to the UPnP scheme.

FIG. 57 is a diagram illustrating a service for exchanging electronic service guide (ESG) between a broadcast receiver and companion devices according to an embodiment of the present invention.

ESG may be a type of channel or information to be transmitted through service guide delivery descriptors in a specific session and may provide service guide of broadcast, radio, or other media applications. ESG may provide service scheduling or program related information items in the form of menu format, etc. to a user. ESG may be provided through a broadcast channel or an Internet channel (broadband).

Users may perform an operation such as service providing schedule, discovery of an entry point of currently available services, and service filtering according to preference, through ESG. Content providers may represent information on a service and/or content that are available, purchase/ subscription related information, and service access information, through ESG. The ESG may also be referred to as service guide, electronic program guide (EPG), or the like.

Conventionally, when service guide such as ESG is executed while a user watches a broadcast program through a broadcast receiver, ESG may be hidden by the watched broadcast program to cause inconvenience.

The present invention proposes a method of executing service guides such as ESG in a companion device to access ESG information without obstructing watch of the currently watched broadcast program. In this case, a user may access ESG while does not experience inconvenience during watching of a broadcast program. The user may protect his or her privacy using a personal companion device for ESG search. In general, ESG may be searched for through a UI of a companion device instead of a UI of a broadcast receiver with degraded convenience, thereby enhancing convenience.

The present invention may overcome the aforementioned problem by defining a protocol for transmitting ESG information to a companion device from a broadcast receiver in a next-generation hybrid broadcast environment based on interaction between a terrestrial broadcast network and the Internet. The present invention proposes a protocol of changing a service of a broadcast receiver by transmitting channel information in a companion device when a user selects a new service through ESG provided by the companion device.

Although the embodiments of the present invention have been described based on UPnP, this is merely for convenience of description and a protocol for communication between a broadcast receiver and a companion device is not limited thereto. Although XML-based ESG has been exemplified according to the embodiments of the present invention, this is merely for convenience of description and format for configuring ESG is not limited thereto.

An example of a service for exchanging the illustrated ESG may be referred to as an ESG service.

The ESG service may be a service for exchanging ESG between a broadcast receiver and a companion device. In some embodiments, a service type of an ESG service may be defined as atsc3.0ESG-1 and a service ID may be defined as urn:atsc.org:serviceId:atsc3.0ESG.

Compatibility between services may be required for an ESG service. In some embodiments, an UPnP device type may be defined. A broadcast receiver may have a device type of urmatsc.org:device:atsc3.0rcvr and operate as a UPnP controlled device. A companion device may operate as an UPnP control point.

A state variable, an action, etc. for an ESG service will be described below.

FIG. 58 is a diagram illustrating an ESGData state variable according to an embodiment of the present invention.

For the aforementioned ESG service, the ESGData state variable may be defined. The ESGData state variable may be a state variable indicating ESG. The ESGData state variable may store ESG data of ESG received through a broadcast/ Internet network. The illustrated ESGData may be written in XML format.

The ESGData state variable may store ESG data items indicating ESG, that is, elements, attributes, and sub elements in ESG.

A Service element t54010 in the ESGData state variable may be an element having information related to a service indicated by ESG among contents included in the ESG. Lower information of the element may include Service@id indicating a service ID, Service@version indicating a service version, Service.Name indicating a service name, Service.Description indicating service description, and/or Service. ServiceType indicating a service type. Here, A.B may refer to a B element as a lower element of an A element and A@a may refer to @a as lower attribute of the A element.

Here, Service.ServiceType, that is, an ServiceType element as a lower element of a service may indicate a service type indicated by a corresponding service. In some embodiments, 0 may be unspecified, 1 may refer to Basic TV, 2 may refer to Basic Radio, . . . , 14 may refer to a linear service, 15 may refer to an app based service, and 16 may refer to a companion screen service or the like. A value indicated by the element may be changed in some embodiments.

A Schedule element t54020 in the ESGData state variable may be an element having schedule information of services/programs indicated by ESG among contents included in the ESG. Lower information of the element may include Schedule@id indicating a schedule ID, Schedule@version indicating schedule version, and so on. Lower information of the element may include Schedule.ServiceReference indicating a service related to schedule, Scheudle.InteractivityDataReference indicating interactivity data related to schedule, Scheudle.ContentReference indicating content related to schedule, and so on.

A Content element t54030 in the ESGData state variable may be an element having content information indicated by ESG among contents included in the ESG. Lower information of the element may include Content@id indicating a content ID, Content@version indicating a content version, Content.Name indicating a content name, Content.Description indicating content description, Content. StartTimie indicating presentation start time of content, and/or Content.EndTime indicating presentation end time of content. ComponentReference as a lower element of the Content element may include information for referencing a component of corresponding content, related to the corresponding content. Thereby, the related component may be recognized and corresponding component related information items in ESG may be referenced.

A Component element t54040 in the ESGData state variable may be an element having component information of content indicated by ESG among contents included in the ESG. Lower information of the element may include Component@id indicating a component ID, Component@version indicating a component version, and so on. Lower information of the element may include Language indicating a component language, Length indicating a component length, ParentalRating indicating component rating, ComponentType indicating a component type, ComponentRole indicating a component role, TargetDevice indicating a device targeted by a component, and so on. According to whether a component is a presentable video, audio, closed caption, or app, information such as PresentableVideoComponent, PresentableAudioComponent, PresentableCCComponent, and PresentableAppComponent may be included in the element, respectively.

In some embodiments, the ESGData state variable may be transmitted to a companion device using an eventing method or an action method.

The aforementioned element, attributes, and so on are merely embodiments of ESGData and element/attributes, etc. in ESGData may be further added, modified, or deleted according to configuration, format, etc. of ESG.

FIG. 59 is a diagram illustrating an ESGData state variable according to another embodiment of the present invention.

The illustrated ESGData state variable is similar to the aforementioned ESGData state variable but is different from the aforementioned ESGData state variable in that the Component element is included as a lower element of the Content element.

A plurality of components are combined to constitute one content and, thus, the Component element may be included as a lower element of the Content element. Capability of devices for supporting each component may be defined as DeviceCapability as a lower element and may be included as a lower element of a Component element.

Figure 60:
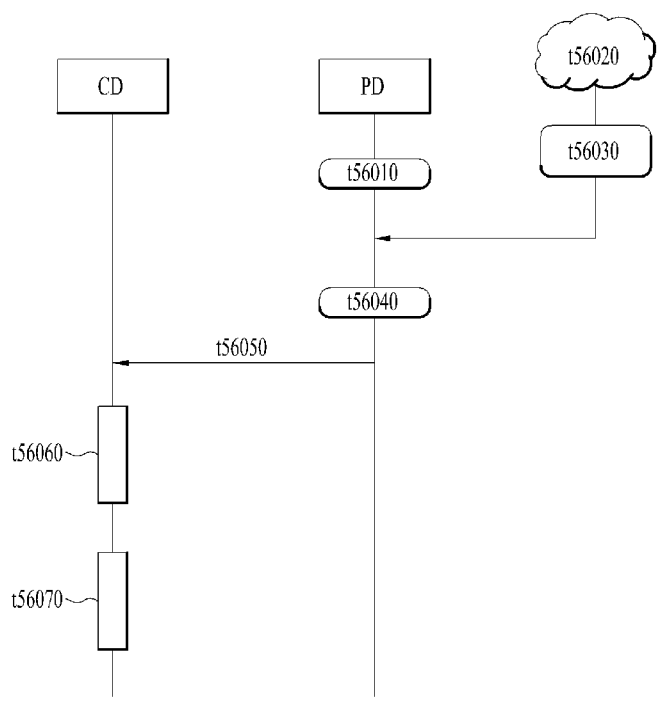
FIG. 60 is a diagram illustrating an operation of transmitting an ESGData state variable to a companion device using an eventing method according to an embodiment of the present invention.

FIG. 60 is a diagram illustrating an operation of transmitting an ESGData state variable to a companion device (CD) using an eventing method according to an embodiment of the present invention.

First, the illustrated DC may refer to a companion device and a primary device (PD) may refer to a receiver or a broadcast receiver. According to the present embodiment, the two devices are assumed to be paired with each other. The companion device is assumed to subscribe to the aforementioned ESG service. In this initial state t56010, the ESGData state variable may not have any value.

A service/content provider may transmit ESG through a broadcast network or a broadband channel (t56020). The ESG may be received through a network interface or a receiving unit of a receiver. Here, the receiving unit may be the aforementioned broadcast interface or tuner.

The receiver may signal the received ESG (t56030). The ESG data may be stored in the ESGData state variable (t56040).

The ESGData may be transmitted to the companion device through eventing (t56050). The companion device that receives the ESGData state variable may parse the ESGData (t56060) and ESG may be exposed to the companion device through a UI according to the parsed value (t56070). In this case, in order to show the ESG to the user, the UI may be represented at a native level of the companion device or represented in an application of the companion device.

There may be various exemplary embodiments of a method of representing ESG by a companion device. In some embodiments, upon receiving ESG, the companion device may immediately expose ESG to the user in any form. According to another embodiment of the present invention, upon receiving ESG, the companion device may transmit a notification message to a user, and when the user executes the notification message, ESG may be exposed. According to another embodiment of the present invention, upon receiving the ESG, the companion device owns ESG information in a background and then the user executes an application in which ESG is viewable at a time desired by a user, the ESG may be exposed to the user at last.

FIG. 61 is a diagram illustrating LastChangedESGData state variable according to an embodiment of the present invention.

For the aforementioned ESG service, the LastChangedESGData state variable may be defined. As described above, when an entire portion of ESG is transmitted to a companion device, even if even some ESG data items are modified, it may not be effective that all ESG data items are transmitted. To this end, the LastChangedESGData state variable for storing only the modified ESG data may be defined. The LastChangedESGData state variable may store only ESG data that is added/modified/deleted in newly received ESG compared with previous ESG.

The LastChangedESGData state variable may include an Addition element (t57010). The element may store ESG data added to the newly received ESG compared with existing ESG data. As a sub element of the element, newly added ESG data items, i.e., element/attributes may be stored. For example, when ESG data related to a new service with a new service ID compared with existing ESG data is added to newly received ESG, element/attributes related to the new service may be included in a lower tree of the Addition element. In the illustrated embodiment, a service with an ID of "atsc.org/esg/service/3 is newly added and, thus, it may be seen that a Service element of a corresponding service is included in the Addition element. In addition, a service with an ID of "atsc.org/esg/service/4 and a name of ABC is newly added and, thus, it may be seen that the Service element of the corresponding service is added to the Addition element. In addition, information such as Service, Content, and Schedule may be included in the element.

The LastChangedESGData state variable may include an element Modification (t57020). The element may store ESG data modified in newly received ESG compared with existing ESG data. As a sub element of the element, the modified ESG data items, that is, element/attributes may be stored. For example, when any one of lower information items of schedule with an ID of "atsc.org/esg/schedule/3" is modified, an element Schedule of corresponding schedule may be stored in the element Modification. In addition, information such as Service, Content, and Schedule may be included in the element.

The LastChangedESGData state variable may include an element Deletion (t57030). The element may store ESG data deleted in newly received ESG compared with existing ESG data. As a sub element of the element, the deleted ESG data items, that is, element/attributes may be stored. For example, when the Content element with an ID of "atsc.org/esg/content/1" and "atsc.org/esg/content/2" is deleted in newly received ESG, the Content element of corresponding content may be stored in an element Deletion. In addition, information such as Service, Content, and Schedule may be included in the element.

In some embodiments, the LastChangedESGData state variable may be transmitted to a companion device using an eventing method or an action method. When the state variable is transmitted using the eventing method, if a value of the state variable is modified, the state variable may be transmitted to the companion device. When the state variable is transmitted using the action method, the LastChangedESGData state variable may be configured with respect to mostly recently modified content of ESG data at a time of receiving a request for the value of the state variable and transmitted to the companion device.

The companion device may update only the modified ESG data items compared with pre-stored ESG with respect to the received LastChangedESGData state variable. Thereby, effective transmission may be performed compared with the case in which an entire portion of ESG is transmitted.

The aforementioned element, attributes, and so on are merely embodiments of LastChangedESGData and element/attributes, etc. in LastChangedESGData may be further added, modified, or deleted according to configuration, format, etc. of ESG.

Figure 62:
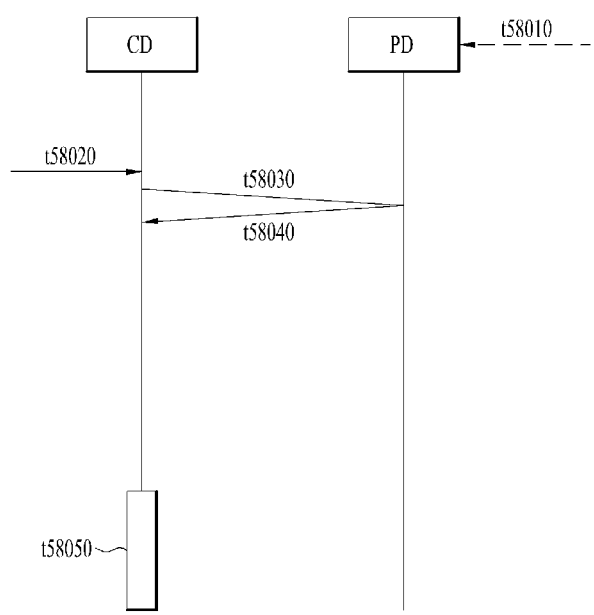
FIG. 62 is an operation of transmitting ESG data to a companion device according to a GetESGData action according to an embodiment of the present invention.

FIG. 62 is an operation of transmitting ESG data to a companion device according to a GetESGData action according to an embodiment of the present invention.

As described above, an ESGData state variable may be transmitted to the companion device using an eventing method. However, when a receiver transmits ESG data to the companion device using an eventing method whenever ESG is modified, this results in network overload and a burden to the companion device. Accordingly, a GetESGData( ) action may be defined to transmit ESG data only when the companion device wants this.

The GetESGData( ) action may be an action for transmitting the ESGData state variable to the companion device using an action method. That is, when the companion device makes a request for ESG data to the receiver through the action, the receiver may transmit the ESGData state variable to companion data. An input argument of the action may be none and an output argument may be the ESGData state variable.

The GetESGData( ) action may be performed when a user wants to see ESG through the companion device and an ESG application, etc. are executed. In this case, ESG data may be received as a result of the corresponding action and the received ESG data may be exposed through the ESG application. In some embodiments, when the GetESGData( ) action is executed using a periodic polling method to store ESG data in the companion device and, then, the ESG application is executed, the stored ESG data may be exposed to the user.

The GetESGData( ) action may also be simultaneously supported when the ESGData state variable supports an eventing method. However, in this case, when ESG data is received using an eventing method and, simultaneously, ESG data is also received using an action whenever ESGData is modified, ESG data may be redundantly received. Accordingly, when the action method and the eventing method are simultaneously supported, a policy of receiving ESG data using an eventing method only when a first ESG service is subscribed and, then, receiving ESG data using the GetESGData( ) action periodically or when an ESG application is executed.

First, in the present embodiment, two devices are assumed to be already paired with each other. In addition, the companion device is assumed to subscribe the aforementioned ESG service.

The receiver may have own ESG data (t58010). The ESG data may be stored in the ESGData state variable. A user may take a specific action of executing an ESG application (t58020). The specific action may be an operation that requires ESG data.

The companion device may perform the GetESGData( ) action to make a request for the ESGData state variable to the receiver (t58030). The receiver may simultaneously output the ESGData state variable as an output argument of the GetESGData( ) action to the companion device while transmitting call back of 200 OK in response to the request (t58040).

The companion device may perform an operation of parsing the received ESGData and exposing the ESGData through an ESG application using the ESG data (t58050). The companion device may perform an operation of immediately exposing ESG data or storing the ESG data once in order to expose the ESG data, like in the aforementioned embodiments.

The illustrated embodiment may be an embodiment of performing the GetESGData( ) action when the user performs a specific action. However, in some embodiments, as described above, when the GetESGData( ) action is periodically performed (irrespective of whether the specific action is performed) and, then, the user executes the ESG application or the like at a predetermined time, ESG data that has been received and stored through the corresponding action may be exposed.

Figure 63:
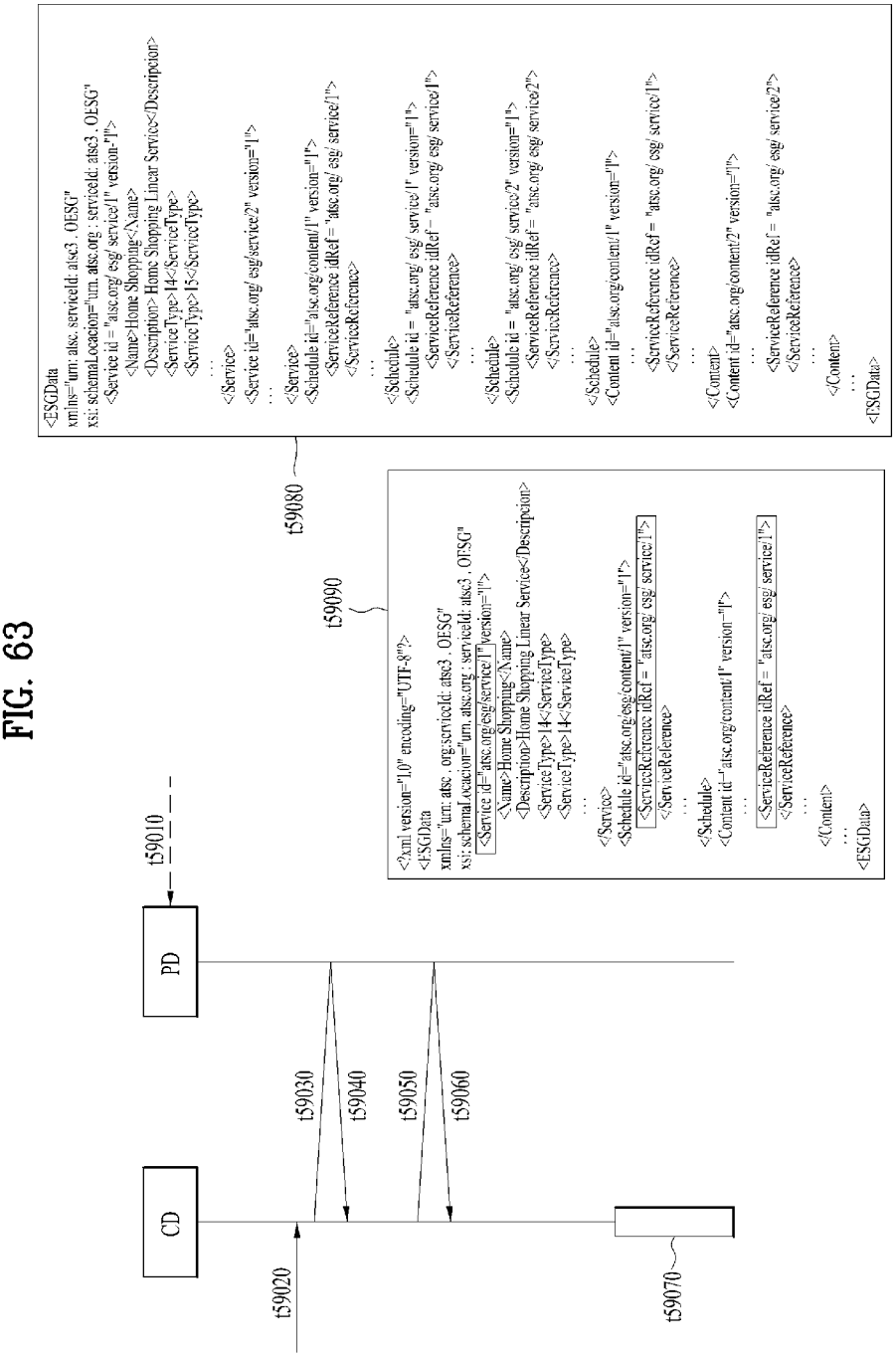
FIG. 63 is a diagram illustrating an operation of transmitting ESG data to a companion device according to a GetServiceIds action or a GetESGbyServiceIds action according to an embodiment of the present invention.

FIG. 63 is a diagram illustrating an operation of transmitting ESG data to a companion device according to a GetServiceIds action or a GetESGbyServiceIds action according to an embodiment of the present invention.

In order to minimize a network burden between a broadcast receiver and a companion device and/or a burden used to process entire ESG data by the companion device, only ESG data related to a specific service may be transmitted to the companion device. To this end, a ServiceIdsList state variable and a A_ARG_TYPE_ESGData_by_ServiceIds state variable may be defined.

The ServiceIdsList state variable may be a state variable for transmitting IDs of services described by ESG to the companion device. That is, the state variable may include service ID information items among ESG data items that have been parsed and stored by the receiver. The state variable may have a type of a list of strings or a list of URIs. Here, any type of URI may be used. In some embodiments, the state variable may be represented in the form of CSV. For example, the state variable may be represented according to atsc.org/esg/service/1, atsc.org/esg/service/2, . . . , etc.

The A_ARG_TYPE_ESGData_by_ServiceIds state variable may be a state variable for storing some ESG data of ESG. The state variable may be defined to transmit only some ESG data to the companion device. The state variable may have a fragment type of a specific form of Markup Language for representing the ESGData state variable. For example, when the ESGData state variable is an XML document, the state variable may have an XML fragment type.

Service IDs of ESG owned by the receiver may be first transmitted to the companion device using the aforementioned state variables and, accordingly, only the requested required ESG data may be transmitted to the companion device. To this end, a GetServiceIds action and a GetESGbyServiceIds action may be defined.

The GetServiceIds action may be an action of receiving IDs of a service from the receiver by the companion device. The receiver may transmit service IDs in the form of a list to the companion device among information items on a service described by ESG owned by the receiver. An input argument of the action may be none and an output argument may be the ServiceIdsList state variable.

The GetServiceIds action may be performed when a user wants to see ESG through the companion device and an ESG application, etc. are executed. In this case, ESG data may be received as a result of the corresponding action and the received ESG data may be exposed through the ESG application. In some embodiments, when the GetServiceIds action is executed using a periodic polling method to store ESG data in the companion device and, then, the ESG application is executed, the stored ESG data may be exposed to the user.

The GetESGbyServiceIds action may be defined to receive only ESG data corresponding to a specific service from the receiver by the companion device. The companion device may select a service ID of a desired service using a list of service IDs received through the GetServiceIds action. Then, the action may be performed using a list of service IDs using an input argument in order to receive ESG data of a desired service. As a result, the companion device may receive ESG data about a desired service. An input argument of the action may be a ServiceIdsList state variable and an output argument may be an A_ART_TYPE_ESGData_by_ServiceIds state variable.

The GetESGbyServiceIds action may be performed when an ESG application, etc. are executed if a user wants to see ESG through the companion device. In this case, ESG data may be received as a result of the corresponding action and the received ESG data may be exposed through the ESG application. In some embodiments, when the GetESGbyServiceIds action is executed using a periodic polling method to store ESG data in the companion device and, then, the ESG application is executed, the stored ESG data may be exposed to the user.

In some embodiments, when an input argument is set as "*" in the GetESGbyServiceIds action, all ESG data items may be set to be requested irrespective of a service ID. In some embodiments, when an input argument is set as "empty" in the GetESGbyServiceIds action, ESG data about a currently watched service may be set to be requested.

According to the present embodiment, the two devices are assumed to be paired with each other. The companion device is assumed to subscribe to the aforementioned ESG service.

The receiver may own ESG data (t59010). The ESG data may be stored in the ESGData state variable. The ESG data stored in ESGData may be ESG data about two services identified according to "atsc.org/esg/service/1" or "atsc.org/esg/service/2" (t59080). A user may take a specific action of executing an ESG application (t59020). The specific action may be an operation that requires ESG data.

The companion device may make a request for a list of service IDs through the GetServiceIds action (t59030). The receiver may output ServiceIdsList to the companion device along with 200 OK (t59040). According to the present embodiment, a value of ServiceIdsList may be the same as (atsc.org/esg/service/1, atsc.org/esg/service/2).

When a specific service desired by a user or a companion device is a service identified according to "atsc.org/esg/service/1", the GetESGbyServiceIds action may be performed using the service ID as an input argument (t59050). The receiver may output A_ART_TYPE_ESGData_by_ServiceIds to the companion device along with 200 OK (t59060). In the present embodiment, a value of A_ART_TYPE_ESGData_by_ServiceIds may be ESG data related to a service identified according to "atsc.org/esg/service/1" (t59090). As illustrated in the drawing, the output argument may include a Schedule element having atsc.org/esg/service/1 as a reference value and a Content element as well as a Service element having atsc.org/esg/service/1 as a service ID value. Here, the Schedule element and the Content element may be schedule and content information related to a service identified according to atsc.org/esg/service/1.

The companion device may perform an operation of parsing the received ESG data and exposing the ESG data through an ESG application using the ESG data (t59070). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been received and stored through the corresponding action may be exposed.

Figure 64:
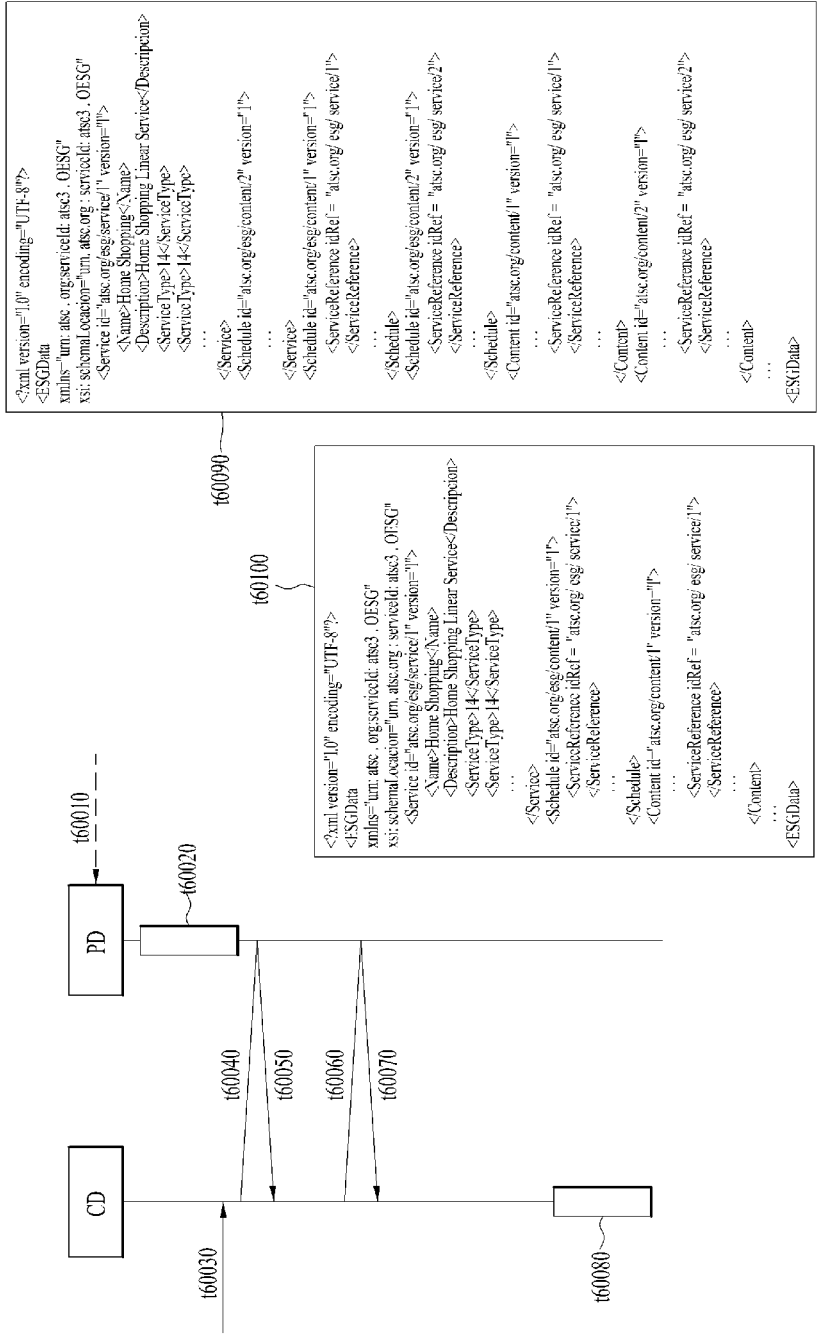
FIG. 64 is a diagram illustrating an operation of transmitting ESG data to a companion device according to a GetCurrentServiceId action according to an embodiment of the present invention.

FIG. 64 is a diagram illustrating an operation of transmitting ESG data to a companion device according to a GetCurrentServiceId action according to an embodiment of the present invention.

It may be needed to transmit ESG data about a currently watched service in a receiver to the companion device. To this end, a service ID of the currently watched service may be transmitted to the companion device. To this end, a CurrentServiceId state variable and a GetCurrentServiceId action may be defined.

The CurrentServiceId state variable may store a service ID of a currently watched service in a receiver among ESG data items of the receiver. The state variable may be a string or specific URI type.

The GetCurrentServiceId action may be an action for receiving a service ID of a currently watched service in a receiver by the companion device. An input argument of the action may be none and an output argument may be the CurrentServiceId state variable.

The GetCurrentServiceId action may be performed when a user wants to see ESG through the companion device and an ESG application, etc. are executed. In this case, ESG data may be received as a result of the corresponding action and the received ESG data may be exposed through the ESG application. In some embodiments, when the GetCurrentServiceId action is executed using a periodic polling method to store ESG data in the companion device and, then, the ESG application is executed, the stored ESG data may be exposed to the user.

According to the present embodiment, the two devices are assumed to be paired with each other. The companion device is assumed to subscribe to the aforementioned ESG service.

The receiver may own ESG data (t60010). The ESG data may be stored in the ESGData state variable. The ESG data stored in ESGData may be ESG data about two services identified according to "atsc.org/esg/service/1" or "atsc.org/esg/service/2" (t60090). The receiver may periodically signal currently watched broadcast and update a service ID of a currently watched service to the CurrentServiceId state variable. The user may take a specific action of executing an ESG application (t60030). The specific action may be an operation that requires ESG data.

The companion device may make a request for an ID of a currently watched service through the GetCurrentServiceId action (t60040). The receiver may output the CurrentServiceId state variable to the companion device along with 200 OK (t60050). According to the present embodiment, a value of the CurrentServiceId state variable may be "atsc.org/esg/service/1".

The companion device may perform the GetESGbyServiceIds action to make a request for ESG data related to a currently watched service (t60060). According to the present embodiment, an input argument of the GetESGbyServiceIds action may be atsc.org/esg/service/1. The receiver may output the A_ART_TYPE_ESGData_by_ServiceIds state variable to the companion device along with 200 OK (t60070). According to the present embodiment, a value of the A_ART_TYPE_ESGData_by_ServiceIds may be ESG data related to a service identified according to "atsc.org/esg/service/1" (t60100). As illustrated in the drawing, an output argument may include a Schedule element having atsc.org/esg/service/1 as a reference value and a Content element as well as a Service element having atsc.org/esg/service/1 as a service ID value. Here, the Schedule element and the Content element may be schedule and content information related to a service identified according to atsc.org/esg/service/1.

The companion device may perform an operation of parsing the received ESG data and exposing the ESG data through an ESG application using the ESG data (t60080). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

Figure 65:
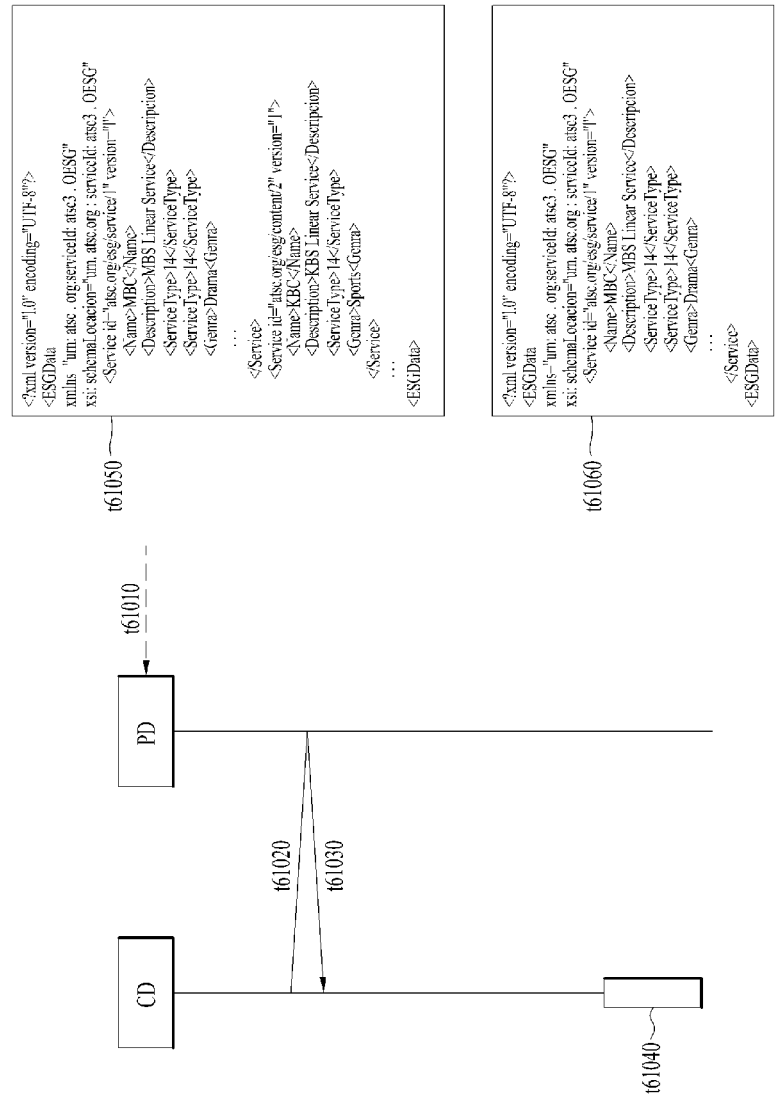
FIG. 65 is a diagram illustrating an operation of transmitting ESG data to a companion device according to a SearchESG action according to an embodiment of the present invention.

FIG. 65 is a diagram illustrating an operation of transmitting ESG data to a companion device according to a SearchESG action according to an embodiment of the present invention.

Upon making a request for ESG data to the receiver, the companion device may make a request for corresponding ESG data only when a specific field of the ESG data has a specific value (target value). To this end, the A_ART_TYPE_SearchField state variable, the A_ART_TYPE_TargetValue state variable, and the SearchESG action may be defined.

The A_ART_TYPE_SearchField state variable may indicate a specific field to be determined by the companion device. That is, the state variable may be a list of names of element/attributes of the ESGData state variable. For example, a value of the Service@id, Service.Genre, etc. may be stored in the state variable. The state variable may have a list type of strings. The state variable may also be referred to as SearchField.

The A_ART_TYPE_TargetValue state variable may store a specific value of a specific field determined by the companion device, that is, a target value. The target value may be used to determine whether the determined specific field has the corresponding target value. ESG data may be searched for using the target value. The state variable may have a list type of strings. The state variable may also be referred to as TargetValue.

The SearchESG action may be an action for searching for and making a request for ESG data in the receiver by the companion device. As an input argument of the action, a specific field (SearchField) and/or a target value (TargetValue) may be defined. The receiver may search for ESG data according to whether the corresponding specific field has a corresponding target value. Upon searching for ESG data that satisfies a corresponding condition, the receiver may output all related ESG data items to the companion device. When any data is not matched, no data may be output. In some embodiments, only some ESG data items are matched, ESG information may also be transmitted.

As an output argument, the A_ART_TYPE ESGData state variable may be defined and may be a state variable for storing some ESG data items of ESG like the aforementioned A_ART_TYPE_ESGData_by_ServiceIds state variable. The A_ART_TYPE_ESGData state variable may also be referred to as SearchedESGData.

The SearchESG action may be performed when a user wants to see ESG through the companion device and an ESG application, etc. are executed. In this case, ESG data may be received as a result of the corresponding action and the received ESG data may be exposed through the ESG application. In some embodiments, when the SearchESG action is executed using a periodic polling method to store ESG data in the companion device and, then, the ESG application is executed, the stored ESG data may be exposed to the user.

First, in the present embodiment, two devices are assumed to be already paired with each other. In addition, the companion device is assumed to subscribe the aforementioned ESG service.

The receiver may have own ESG data (t61010). The ESG data may be stored in the ESGData state variable. ESG data stored in the ESGData may be ESG data about a service identified according to "atsc.org/esg/service/1" and having a Service.Genre value of Drama and a service identified according to "atsc.org/esg/service/2" and having a Service. Genre value of Sports (t61050).

The companion device may make a request for ESG data using the SearchESG action (t61020). Here, an input argument of the corresponding action may be the same as ("Service@id, Service.Genre", "atsc.org/esg/service/1, Drama"). This is used to search for ESG data with a service ID of atsc.org/esg/service/1 and Drama as a value of sub element Genre of the Service element.

The receiver may search for ESG data matched with a corresponding condition and output the corresponding ESG data to the companion device along with 200 OK (t61030). In the present embodiment, ESG data related to a service identified according to "atsc.org/esg/service/1" matched with the corresponding condition may be output.

The companion device may perform an operation of parsing the received ESG data and exposing the ESG data through an ESG application using the ESG data (t61040). The companion device may perform an operation of immediately exposing ESG data or storing the ESG data once in order to expose the ESG data, like in the aforementioned embodiments.

Figure 66:
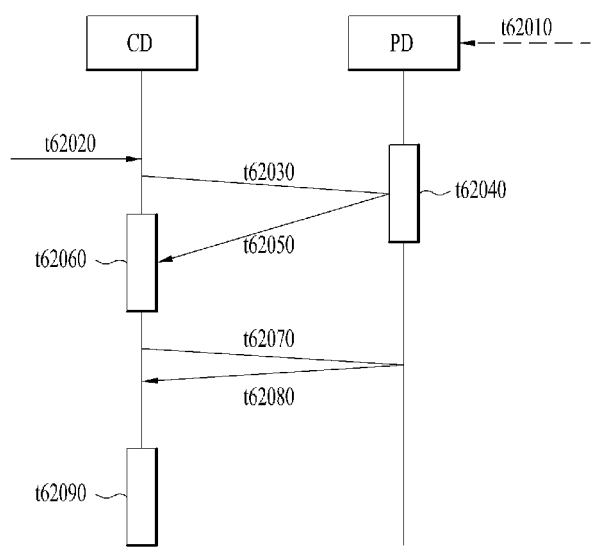
FIG. 66 is a diagram illustrating an authentication procedure of transmitting ESG data according to a DoAuthenticationForESG action according to an embodiment of the present invention.

FIG. 66 is a diagram illustrating an authentication procedure of transmitting ESG data according to a DoAuthenticationForESG action according to an embodiment of the present invention.

During exchange of ESG data between a receiver and a companion device, an unintended application, for example, an application for hacking may make a request for ESG information. In order to prevent this, authentication procedure for security may be required. To this end, a CompanionDeviceId state variable, a CompanionDeviceAppId state variable, a CompanionDeviceAppVersion state variable, a PrimaryDeviceId state variable, and a DoAuthenticationForESG action may be defined.

The CompanionDeviceId state variable may be a state variable for storing ID information of the companion device. A unique value for identifying the companion device may be stored in the state variable. As a device ID, a MAC address or the like may be used and may also be encrypted for security (e.g. hashed Mac address). The state variable may be a string or a specific URI type.

The CompanionDeviceAppId state variable may be a state variable for storing ID information of an application to be executed to use ESG by the companion device. Here, the application may be a concept including both a native app of the companion device and a browser-based app. The state variable may be a string or a specific URI type.

The CompanionDeviceAppVersion state variable may be a state variable for storing version information of an application to be executed to use ESG by the companion device. The receiver may determine whether ESG information is provided using the version information. The state variable may be a hexBinary or integer type.

The PrimaryDeviceId state variable may be a state variable for storing device ID information of a receiver, that is, a primary device. The companion device may identify the receiver using the state variable. The companion device may determine whether received information is from an unintended receiver or whether a searched receiver is a specific receiver that has made a request for ESG when a plurality of receivers are searched in a home network, using the state variable. The state variable may be a string or a specific URI type.

The DoAuthenticationForESG action may be an action for performing an authentication procedure for security before the companion device makes a request for ESG data to a receiver. Through the authentication procedure, whether ESG data is permitted to be exchanged may be determined. As an input argument, an ID of the companion device, an app ID of the companion device, and/or app version information of the companion device may be input and transmitted to the receiver. The information items may be referred to as authentication information. Upon receiving the authentication information, the receiver may determine whether a companion device or an app for ESG makes a request for the authentication information. Upon receiving an app of a normal companion device, the receiver may output a device ID of the receiver to the companion device. The companion device may check whether the receiver is a target to which the companion device makes a request for ESG with reference to the received ID of the receiver. After the authentication procedure is terminated, actual ESG data may be receive according to a mechanism such as action/eventing proposed according to the present invention. An input argument of the action may be states variables of CompanionDeviceId, CompanionDeviceAppId, and CompanionDeviceAppVersion and an output argument of the action may be a PrimaryDeviceId state variable.

The DoAuthenticationForESG action may be performed when a user wants to see ESG through the companion device and an ESG application, etc. are executed. In some embodiments, the DoAuthenticationForESG action may be performed using a periodic polling method and an authentication procedure may be performed.

According to the present embodiment, the two devices are assumed to be paired with each other. The companion device is assumed to subscribe to the aforementioned ESG service.

The receiver may own ESG data (t62010). The ESG data may be stored in the state variable ESGData. The user may take a specific action of executing an ESG application (t62020). The specific action may be an operation that requires ESG data.

The companion device may perform the DoAuthenticationForESG action (t62030). Thereby, authentication information may be transmitted to the receiver. The receiver may determine whether a corresponding companion device is authenticated using the received authentication information (t62040). When the companion device is authenticated, the receiver may output a device ID of the receiver to the companion device along with 200 OK (t62050). The companion device may determine whether the companion device is a receiver that is permitted to make a request for ESG data using the received ID of the receiver (t62060).

Then, in some embodiments, the companion device may make a request for and receive ESG data (t62070 and t62080). The companion device may perform an operation of parsing the received ESG data and exposing the ESG data through an ESG application using the ESG data (t62070). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, the authentication procedure is already terminated and, thus, operations of transmitting ESG data may be immediately performed.

Figure 67:
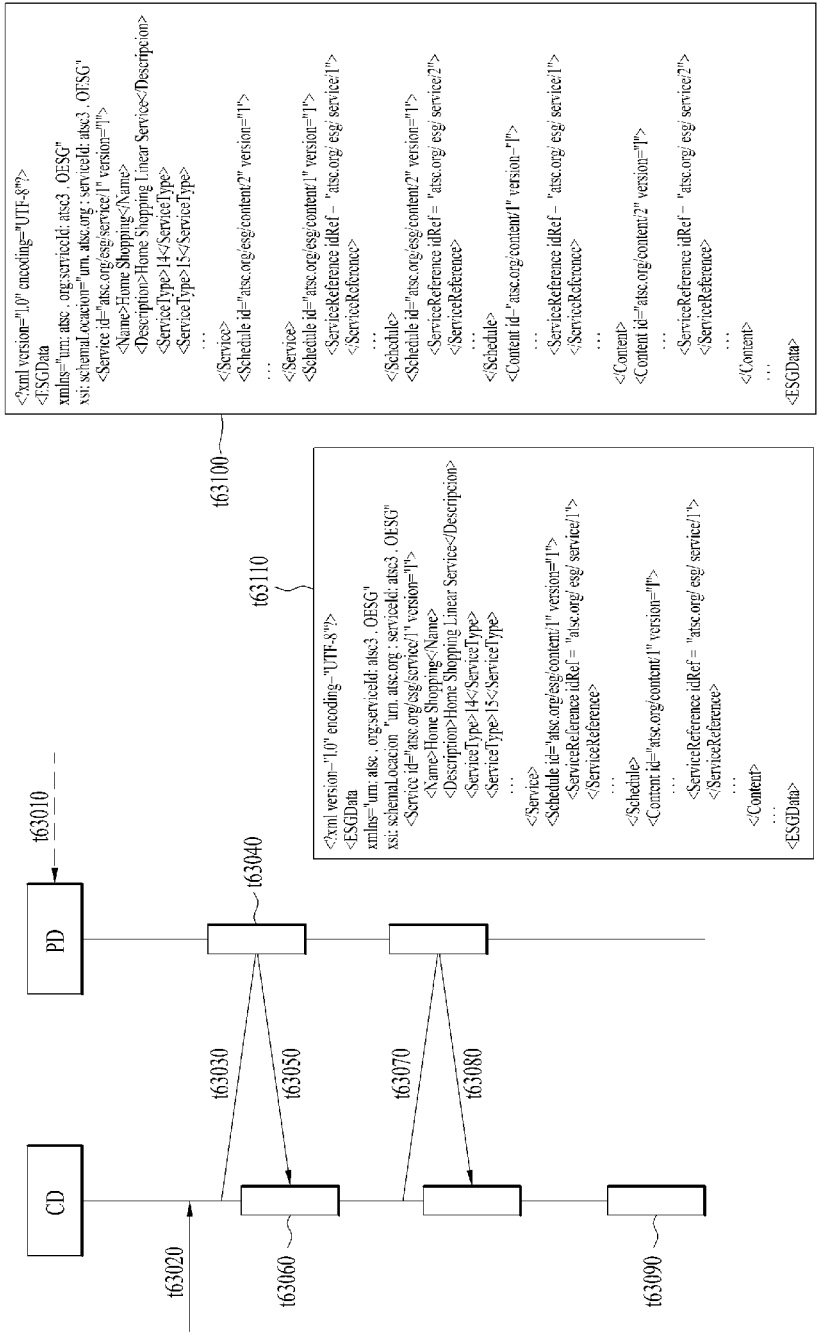
FIG. 67 is a diagram illustrating an operation of transmitting ESG data to a companion device simultaneously with device authentication according to GetServiceIds and GetESGbyServiceIds actions according to another embodiment of the present invention.

FIG. 67 is a diagram illustrating an operation of transmitting ESG data to a companion device simultaneously with device authentication according to GetServiceIds and GetESGbyServiceIds actions according to another embodiment of the present invention.

As described above, a separate action may be defined for authentication. In the present embodiment, existing actions may be extended and authentication may be performed without definition of a separate action and, simultaneously, original purpose of the existing actions may be performed. Here, actions as an extension target may be the all actions stated in the present invention. With regard to the actions as an extension target, as well as the existing defined an input/output argument, CompanionDeviceId, CompanionDeviceAppId, and CompanionDeviceAppVersion state variables may be added as an input argument and a PrimaryDeviceId state variable may be added as an output argument.

According to the present embodiment, the GetServiceIds action and the GetESGbyServiceIds action may be extended. The present invention may not be limited only to extension of the corresponding action.

The GetServiceIds action may be extended to have CompanionDeviceId, CompanionDeviceAppId, and CompanionDeviceAppVersion state variables as an input argument and to have a PrimaryDeviceId state variable as well as an existing ServiceIdsList state variable as an output argument. Upon receiving authentication information and determining that transmission is permitted according to the action, the receiver may transmit IDs of services along with a device ID of the receiver to the companion device. The companion device may determine whether the received service IDs are available with reference to the received device ID of the receiver.

The GetESGbyServiceIds action may be extended to have CompanionDeviceId, CompanionDeviceAppId, and CompanionDeviceAppVersion state variables as well as an existing ServiceIdsList state variable as an input argument and to have an existing A_ART_TYPE_ESGData_by_ServiceIds state variable as an output argument. Upon receiving authentication information and service IDs and determining that transmission is permitted according to the action, the receiver may transmit ESG data of a related service along with a device ID of the receiver to the companion device. The companion device may determine whether the received ESG data is available with reference to the received device ID of the receiver.

The extended actions may be performed when a user wants to see ESG through the companion device and an ESG application, etc. are executed. In this case, ESG data may be received as a result of the corresponding action and the received ESG data may be exposed through the ESG application. In some embodiments, the extended actions are executed using a periodic polling method to store ESG data in the companion device and, then, the ESG application is executed, the stored ESG data may be exposed to the user.

First, in the present embodiment, two devices are assumed to be already paired with each other. In addition, the companion device is assumed to subscribe the aforementioned ESG service.

The receiver may have own ESG data (t63010). The ESG data may be stored in the ESGData state variable. The ESG data stored in ESGData may be ESG data about two services identified according to "atsc.org/esg/service/1" and "atsc.org/esg/service/2" (t63100). A user may take a specific action of executing an ESG application (t63020). The specific action may be an operation that requires ESG data.

The companion device may make a request for a list of service IDs through the GetServiceIds action (t63030). In this case, authentication information may also be transmitted to the receiver. The receiver may determine whether the companion device is authenticated using the authentication information (t63040). When the companion device is authenticated, the receiver may output ServiceIdsList along with 200 OK to the companion device (t63050). According to the present embodiment, a value of ServiceIdsList may be the same as (atsc.org/esg/service/1, atsc.org/esg/service/2). In this case, a device ID of the receiver may also be transmitted. The companion device may determine whether the companion device is a receiver that is permitted to make a request for ESG data using the received ID of the receiver (t63060).

When a specific service desired by a user or a companion device is identified according to "atsc.org/esg/service/1", the GetESGbyServiceIds action may be performed using this as an input argument (t63070). In this case, authentication information may also be transmitted to a receiver. In some embodiments, the authentication procedure may be considered to be redundant and, thus, may be omitted. When the authentication procedure is omitted, an existing general GetESGbyServiceIds action may be performed. When the receiver is authenticated, the receiver may output A_ART_TYPE_ESGData_by_ServiceIds along with 200 OK to the companion device (t63080). According to the present embodiment, a value of A_ART_TYPE_ESGData_by_ServiceIds may be ESG data related to a service identified according to "atsc.org/esg/service/1" (t63110). As illustrated in the drawing, the output argument may include a Schedule element with atsc.org/esg/service/1 as a reference value and a Content element as well as a Service element with atsc.org/esg/service/1 as a service ID value. Here, the Schedule element and the Content element may be schedule and content information related to a serviced identified according to atsc.org/esg/service/1.

The companion device may perform an operation of parsing the received ESG data and exposing the ESG data through an ESG application using the ESG data (t63090). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has pre-received and stored through the corresponding action may be exposed.

Figure 68:
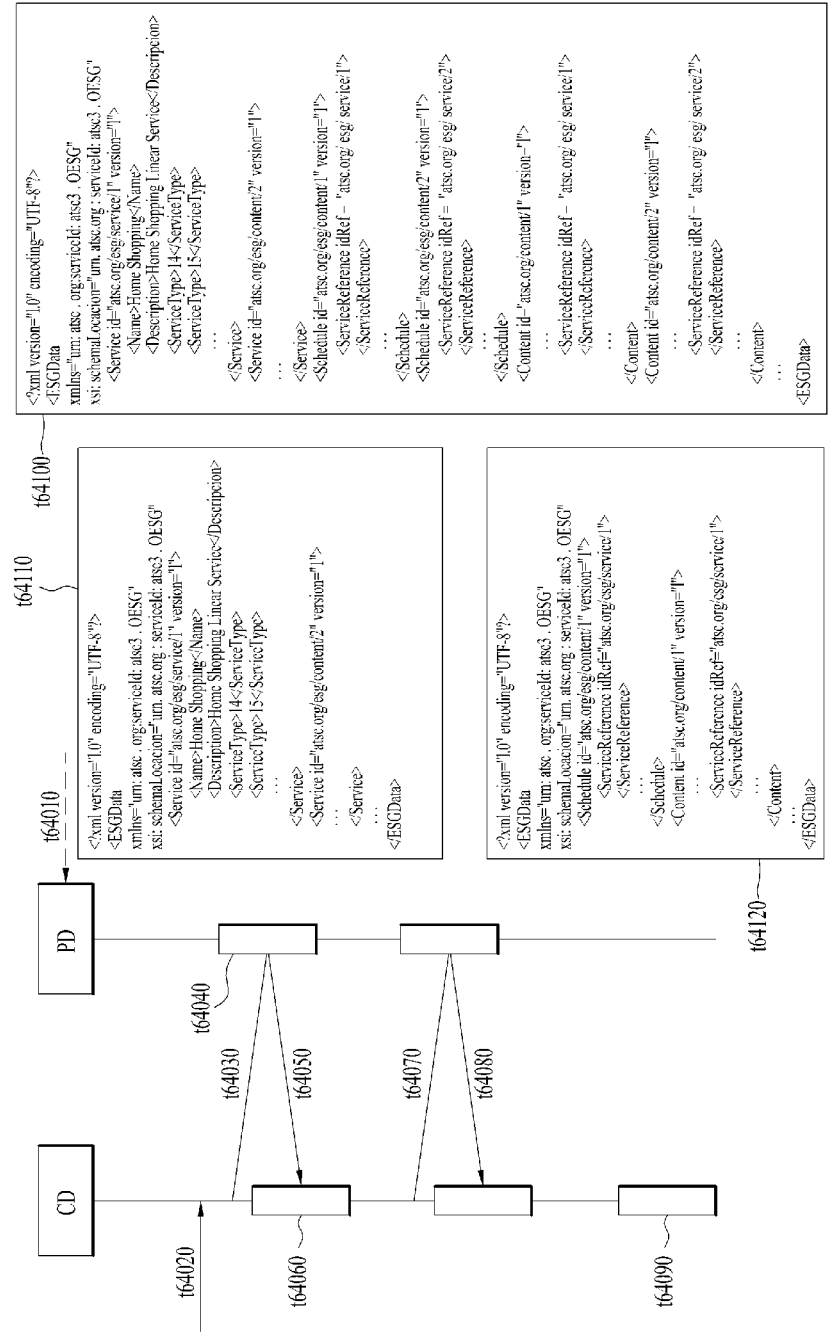
FIG. 68 is a diagram illustrating an operation of transmitting ESG data to a companion device according to a GetService action according to an embodiment of the present invention.

FIG. 68 is a diagram illustrating an operation of transmitting ESG data to a companion device according to a GetService action according to an embodiment of the present invention.

In the case of a service of ESG data, an updating frequency of adding a new service or deleting a service may be low. Accordingly, when ESG data about a service is continuously requested/transmitted, unnecessary network overload may be caused. To overcome this, a NumOfServices state variable, an A_ARG_TYPE_ESGData_Service state variable, and a GetService action may be defined. In addition, another embodiment of the aforementioned GetESGbyServiceIds action may be defined.

The NumOfServices state variable may be a state variable for storing the total number of services described by ESG of the receiver. A value of the state variable may be referred to configure a service list. For example, a value of the state variable may be used to check validation during configuration of a service list. The state variable may be a type of an integer.

The A_ARG_TYPE_ESGData_Service state variable may be a state variable for storing only ESG data corresponding to a Service element of ESG of the receiver. The state variable may have a fragment type of a specific form of Markup Language for representing the ESGData state variable. For example, when the ESGData state variable is an XML document, the state variable may have an XML fragment type.

The GetService action may be an action for receiving ESG data related to a service among ESG information items from the receiver by the companion device. The companion device may receive ESG data (ESG data items except for Service element) related to a specific service using ESG data (Service elements) received through the action. The companion device may compare the total number of services indicated by a NumOfServices state variable and the number of the received Service elements to refer the result to configure a service list. During this procedure, the aforementioned authentication procedure may be used. That is, the GetService action may be extended form including additional input/output argument for authentication. In some embodiments, a GetService action without additional variable for authentication may be used.

An input argument of the action may be state variables corresponding to the aforementioned authentication input argument. An output argument may be a PrimaryDeviceId state variable, a NumOfServices state variable, or an A_ARG_TYPE_ESGData_Service state variable.

Another embodiment of the aforementioned GetESGbyServiceIds action may be defined. The GetESGbyServiceIds action according to another embodiment may be an action for receiving the remaining ESG data related to a specific service using service IDs of a specific service as input by the companion device. Here, the remaining ESG data may be ESG data except for the corresponding Service element, that is, ESG data corresponding to Content and Schedule elements related to the corresponding service. Similarly, the action may also be defined in an extended form including additional variables for the aforementioned authentication.

The GetService and GetESGbyServiceIds actions may be performed when a user wants to see ESG through the companion device and an ESG application, etc. are executed. In this case, ESG data may be received as a result of the corresponding action and the received ESG data may be exposed through the ESG application. In some embodiments, when the GetService and GetESGbyServiceIds actions are executed using a periodic polling method to store ESG data in the companion device and, then, the ESG application is executed, the stored ESG data may be exposed to the user.

According to the present embodiment, the two devices are assumed to be paired with each other. The companion device is assumed to subscribe to the aforementioned ESG service.

The receiver may own ESG data (t64010). The ESG data may be stored in the ESGData state variable. The ESG data stored in ESGData may be ESG data about two services identified according to "atsc.org/esg/service/1" or "atsc.org/esg/service/2" (t64100). A user may take a specific action of executing an ESG application (t64020). The specific action may be an operation that requires ESG data.

The companion device may perform the GetService action to make a request for ESG data about a service (t64030). Upon determining that the companion and/or app are authenticated (t64040), the receiver may output the A_ARG_TYPE_ESGData_Service state variable along with 200 OK to the companion device (t64050). Here, the A_ARG_TYPE_ESGData_Service state variable may include only ESG data about a Service element of ESG data of the receiver (t64110). The companion device may perform authentication using the received device ID of the receiver to determine whether the data is reliable information (t64060).

The companion device may perform the GetESGbyServiceIds action to make a request for the remaining ESG data related to a specific service (t64070). In the present embodiment, a ServiceIdsList input argument value of the GetESGbyServiceIds action may be atsc.org/esg/service/1. Upon determining that the companion and/or app are authenticated, the receiver may output the A_ARG_TYPE_ESGData_by_ServiceIds state variable along with 200 OK (t64080). According to the present embodiment, the output A_ARG_TYPE_ESGData_by_ServiceIds state variable may be ESG data related to a service identified according to atsc.org/esg/service/1 (t64120). As illustrated in the drawing, the output argument may include a Schedule element having atsc.org/esg/service/1 as a reference value and a Content element. The output argument may not include a Service element identified according to atsc.org/esg/service/1.

The companion device may perform an operation of parsing the received ESG data and exposing the ESG data through an ESG application using the ESG data (t64090). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

Figure 69:
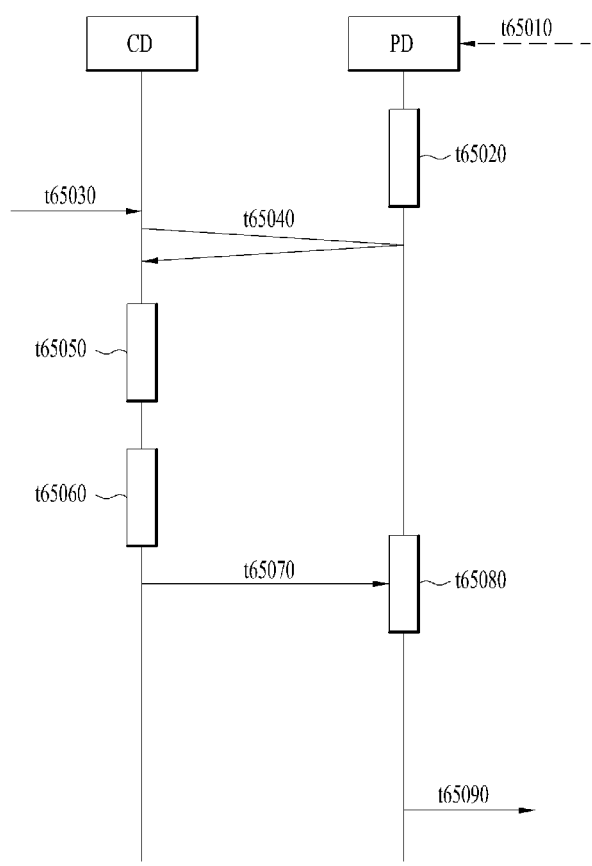
FIG. 69 is a diagram illustrating a procedure of changing a service of a broadcast receiver by a companion device according to a SetChangeChannel action according to an embodiment of the present invention.

FIG. 69 is a diagram illustrating a procedure of changing a service of a broadcast receiver by a companion device according to a SetChangeChannel action according to an embodiment of the present invention.

ESG information transmitted to the companion device may be exposed to the user through a user interface (UI). A service indicated by the ESG may be checked and selected by a user. In this case, a device to which a service is actually provided is a receiver and, thus, information for changing a service needs to be transmitted to the receiver to change a service. To this end, the A_ARG_TYPE_SelectedServiceId state variable and the SetChangeChannel action may be defined.

The A_ARG_TYPE_SelectedServiceId state variable may be a state variable for storing a service ID of the service that is selected through ESG data by a user in a companion device. The state variable may be a string or a specific URI type.

The SetChangeChannel action may be an action for changing a service provided to a receiver by a companion device. The input argument may be an A_ARG_TYPE_SelectedServiceId state variable. The user may select a specific service while seeing ESG through the companion device. In this case, an ID of a corresponding service may be stored as an input argument. When the corresponding action is performed, the receiver may change a channel to a service with a corresponding service ID according to a value of the input argument. The output argument may be none.

According to the present embodiment, the two devices are assumed to be paired with each other. The companion device is assumed to subscribe to the aforementioned ESG service.

The receiver may own ESG data (t65010). The ESG data may be stored in the ESGData state variable. The user may take a specific action of executing an ESG application (t65030). The specific action may be an operation that requires ESG data.

The companion device may make a request for ESG data through the aforementioned GetESGData action and receive ESG data (t65040). The The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

The companion device may perform an operation of parsing the received ESG data and exposing the ESG data through an ESG application using the ESG data (t65050). The companion device may perform an operation of immediately exposing ESG data or storing the ESG data once in order to expose the ESG data, like in the aforementioned embodiments.

The user may select a service through the UI of the companion device while seeing ESG (t65060). For example, the user may attempt to change a current channel to an NBCU channel. The companion device may perform the SetChangeChannel action (t65070). A service ID corresponding to the NBCU channel may be transmitted to the receiver through the action.

The receiver may change a channel to a corresponding service using the received service ID (t65080). The service may be changed to NBCU and provided to the user (t65090).

Figure 70:
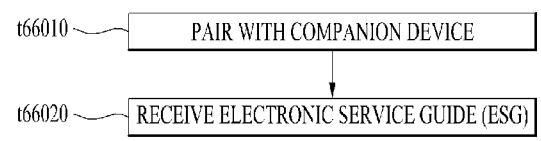
FIG. 70 is a diagram illustrating a method of providing a broadcast service according to an embodiment of the present invention.

FIG. 70 is a diagram illustrating a method of providing a broadcast service according to an embodiment of the present invention.

The method of providing a broadcast service by a broadcast receiver according to an embodiment of the present invention may include paring the broadcast receiver with a companion device and/or receiving electronic service guide (ESG).

A network interface unit of the broadcast receiver may be paired with the companion device (t66010). Here, the network interface unit may correspond to a network interface of the aforementioned broadcast receiver. For pairing, technology such as UPnP may be used but technology for pairing may not be limited thereto.

A receiving unit of the broadcast receiver may receive ESG and specific service guide. Here, the receiving unit may be a broadcast interface or a network interface of the aforementioned broadcast receiver. When ESG is received through a broadcast network, the receiving unit may correspond to a broadcast interface and when ESG is received through the Internet, the receiving unit may correspond to a network interface. That is, in some embodiments, the network interface unit and the receiving unit may be the same block/module.

According to the present embodiment, ESG may include ESG data about at least one broadcast service. Here, the ESG data may refer to data included in the ESG or element/ attributes in the ESG. The broadcast service may correspond to the aforementioned service or channel.

The method of providing a broadcast service according to an embodiment of the present invention, the ESG data may be service type information, schedule information, related content information, or related component information of the aforementioned at least one broadcast service. The ESG data may be each of the aforementioned type attributes of the Service element, the Schedule element, the Content element, or the Component element. Here, related content and related components may refer to content related to a service described by the ESG and a component related thereto.

The method of providing a broadcast service according to an embodiment of the present invention may further include transmitting information on modified content of the received ESG to the companion device. The operation may be performed by the aforementioned network interface unit. Here, the information on modified content may include added, modified, or deleted ESG data of the received ESG compared with pre-stored ESG data. Here, the information on modified content may be the aforementioned LastChangedESGData state variable. The added, modified, and deleted ESG data may be Addition, Modification, and Deletion elements, respectively.

The method of providing a broadcast service according to an embodiment of the present invention may further include transmitting an ID list of broadcast services included in the received ESG to the companion device, receiving a request for ESG data related to specific broadcast services identified according to at least one ID of an ID list from the companion device, and transmitting ESG data related to the requested specific broadcast service to the companion device. The service ID list may be transmitted through the aforementioned GetServiceIds action. The request and transmission of the ESG data according to an ID may be performed through the aforementioned GetESGbyServiceIds action.

The method of providing a broadcast service according to an embodiment of the present invention may further include receiving a request for an ID of a currently watched broadcast service from the companion device and transmitting the ID of the currently watched broadcast service to the companion device, receiving a request for ESG data related to the currently watched broadcast service, and transmitting the requested ESG data related to the currently watched broadcast service to the companion device. The ID of the currently watched service may be transmitted through the aforementioned GetCurrentServiceId action. The request and transmission of the ESG data according to an ID may be performed through the aforementioned GetESGbyServiceIds action.

The method of providing a broadcast service according to an embodiment of the present invention may further include receiving a target value of a search field indicating a specific field of ESG data and a target value of a specific field from the companion device, selecting ESG data having the target value of the specific field indicated by the search field by a control unit, and transmitting the selected ESG data to the companion device. The search field and the target value of the specific field may correpodn to the aforementioned A_ART_TYPE_SearchField state variable and A_ART_TYPE_TargetValue state variable, respectively. Selection and transmission of ESG data may be performed through the aforementioned SearchESG action. Here, the control unit may correspond to a control unit of a main physical device of the aforementioned broadcast receiver.

The method of providing a broadcast service according to an embodiment of the present invention may further include receiving authentication information of a companion device from a companion device, the authentication information including device ID information of the companion device, checking whether the companion device is authenticated using the authentication information by an authentication module, and when the companion device is checked to be authenticated, transmitting device ID information of the broadcast receiver to the companion device. Here, the authentication information may correspond to the aforementioned CompanionDeviceId, CompanionDeviceAppId, and/or CompanionDeviceAppVersion state variables. The device ID of the broadcast receiver may correspond to the aforementioned PrimaryDeviceId state variable. An operation of transmitting the authentication information, checking authentication, and transmitting a receiver device ID may be performed through the aforementioned DoAuthenticationForESG action. Here, the authentication module may be a block/module that is positioned inside/outside the broadcast receiver and performs the aforementioned operations related to authentication. In some embodiments, the authentication module may be integrated with the aforementioned control or network interface.

In the method of providing a broadcast service according to an embodiment of the present invention, the transmitting of the ID list to the companion device may include receiving a request for the ID list from the companion device, the request for the ID list including authentication information of the companion device, checking whether the companion device is authenticated using the authentication information by an authentication module; and when the companion device is checked to be authenticated, transmitting the ID list and device ID information of a broadcast receiver to the companion device. The present embodiment may be obtained by extending the aforementioned embodiment of transmission of ESG through a service ID list to the case in which the GetServiceIds action performs authentication.

The method of providing a broadcast service according to an embodiment of the present invention may further include receiving a request for change in a currently watched broadcast service from the companion device, the request for change in the currently watched broadcast service being based on the received ESG data, and changing a broadcast service watched in a broadcast receiver according to the request for change in the broadcast service by a control unit. The receiving of the request for broadcast and the changing of the service based on the request may be performed by the aforementioned SetChangeChannel action.

The aforementioned method of providing a broadcast service may be described in terms of a companion device. The present invention also includes the case in which the aforementioned embodiments are performed in terms of the companion device. For example, the companion device may receive information of modified content of ESG or may request an ID list of a service and receive related ESG data using the ID. The companion device may make a request for an ID of a currently watched service and receive related ESG data using the ID. The companion device may transmit a search field indicting a specific field and a specific value to a receiver and receive matched ESG data and may transmit authentication information to the receiver and perform authentication. The companion device may make a request for change in a currently watched service. Communication with the receiver may be performed by the aforementioned network interface inside/outside the companion device. Overall operations such as a search field related operation, a service change request related operation, and an ESG data related processing operation may be performed by the aforementioned control unit inside/outside the companion device. The companion device may include an authentication module that performs an authentication related operation.

Each of the aforementioned operations may be omitted or replaced with another operation with the same or similar function.

Figure 71:
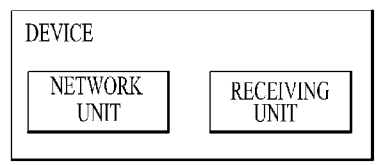
FIG. 71 is a diagram of a broadcast receiver according to an embodiment of the present invention.

FIG. 71 is a diagram of a broadcast receiver according to an embodiment of the present invention.

The broadcast receiver according to an embodiment of the present invention may include a network interface unit and/or a receiving unit. The broadcast receiver according to another embodiment of the present invention may further include a control unit and/or an authentication module. Each block, module, and unit are the same as the aforementioned description.

According to an embodiment of the present invention, the broadcast receiver and module/block/units therein may perform embodiments of providing the aforementioned method of providing a broadcast service by a broadcast receiver.

According to an embodiment of the present invention, the companion device may include a network interface unit and/or a receiving unit. According to another embodiment of the present invention, the companion device may further include a control unit and/or an authentication module. Each block, module, and unit are the same as the aforementioned description.

According to an embodiment of the present invention, the companion device and module/block/units therein may perform the aforementioned embodiments of providing a broadcast service by the companion device.

The aforementioned broadcast receiver, the block/module/unit, etc. in the companion device may be processors that perform consecutive procedures stored in a memory or, in some embodiments, may be hardware elements positioned inside/outside a device.

Each of the aforementioned block/module/units may be omitted or replaced with another block/module with the same or similar function.

Figure 72:
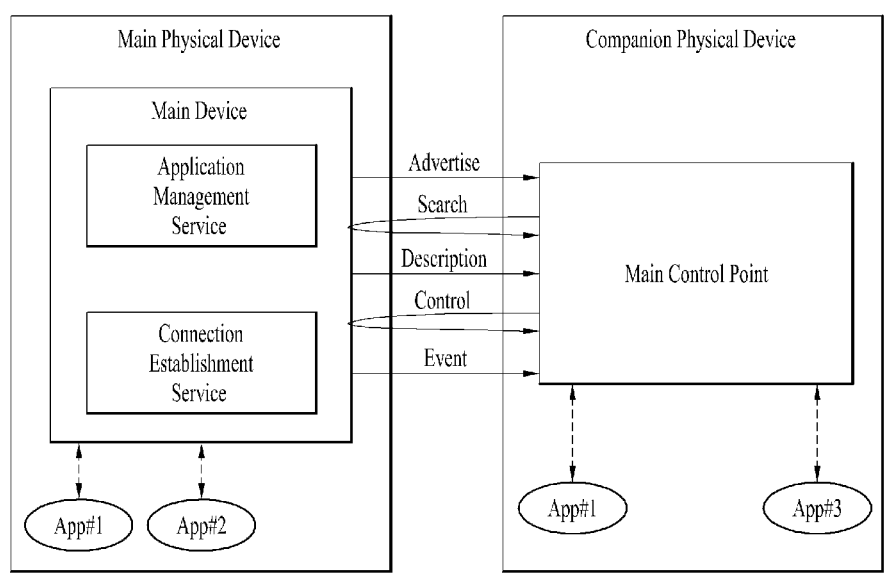
FIG. 72 illustrates a UPnP based PD-CD architecture according to an embodiment of the present invention.

FIG. 72 illustrates a UPnP based PD-CD architecture according to an embodiment of the present invention.

A main physical device may correspond to a TV receiver (broadcast reception apparatus, PD). A companion physical device may correspond to the aforementioned CD (companion device). The two devices are physical devices and may refer to a PD or a CD.

In the present embodiment, the main physical device may include a main device. Here, the main device may correspond to a controlled device defined in UPnP. Hereinafter, the main device will be called a controlled device for convenience of description.

In the present embodiment, the companion physical device may include a main control point. Here, the main control point may correspond to a control point defined in UPnP. The main control point may refer to a control point that communicates with a main controlled device.

The controlled device may be positioned in the TV receiver in the UPnP architecture and perform various operations. When the TV receiver joins a home network, the controlled device can multicast an advertisement message or deliver a UPnP service description provided by a PD to the control point. In addition, the controlled device may deliver a state variable to the control point in an eventing manner or deliver information to the control point when the control point requests a specific operation according to an action method. A PC such as the TV receiver may be called a controlled device.

The controlled device may provide an Application Management Service and/or a Connection Establishment Service. These services may be UPnP services provided by the controlled device. The application management service may refer to services related to management of applications executed in the controlled device and the control point. App-to-app communication or services for delivering specific information to an application may correspond to the application management service. In the illustrated embodiment, applications App #1 and App #2 in the PD may communicate with applications App #1 and App #3 in the CD according to the application management service.

The connection establishment service may be a service related to establishment and management of connection between the controlled device and the control point. A discovery process between the controlled device and the control point may conform to a discovery process defined in UPnP.

First, when a PD joins a home network, the PD can multicast a discovery message for advertising the PD. When a CD joins the home network later, the CD can multicast a search message for arbitrary PDs. A PD that has received the search message may unicast a response message to the CD. The advertising message and the search message may be exchanged irrespective of home network join time or order of the PD and the CD and may be periodically exchanged.

Upon reception of a response message to the advertising message or the search message of the PD, the CD may send an HTTP GET request message to request information about a UPnP service provided by the PD. The PD may deliver description information about services to the CD in response to the request. Then, the CD can subscribe to a service of the PD. The CD can obtain desired information using an action, transmit information or receive information in an eventing manner.

The main device and the main control point may be called a screen device and a screen control device according to an embodiment.

Figure 73:
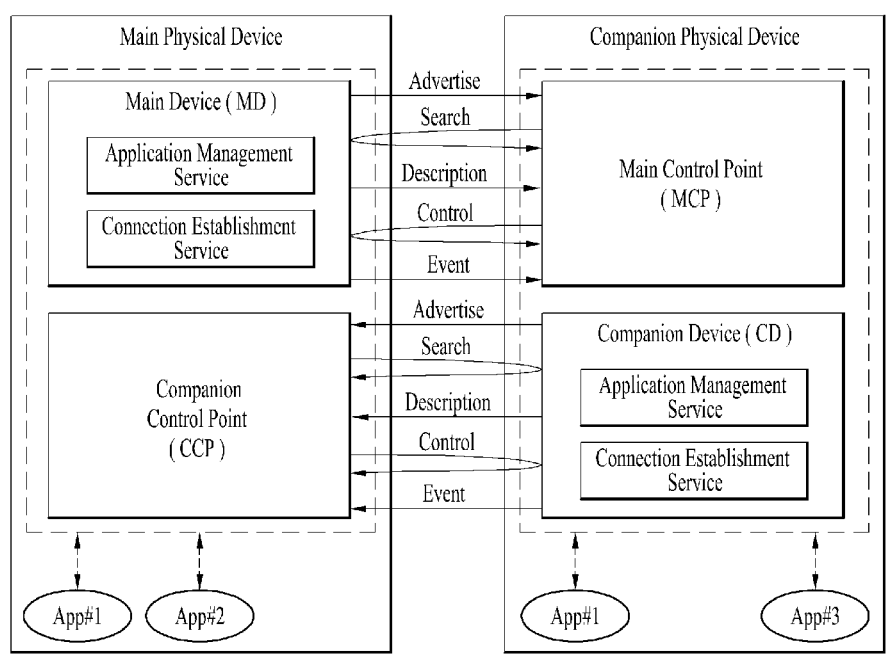
FIG. 73 illustrates a UPnP based PD-CD architecture according to another embodiment of the present invention.

FIG. 73 illustrates a UPnP based PD-CD architecture according to another embodiment of the present invention.

In the present embodiment, a main physical device PD may include a main controlled device and/or a companion control point. In addition, a companion physical device CD may include a main control point and/or a companion control device.

In general, operations and roles of a controlled device and a control point are asymmetrical in a UPnP architecture. That is, an operation that can be performed by the control device may not be performed by the control point.

To compensate for this, the companion physical device CD may include a companion controlled device in the same manner as the main physical device PD includes a main controlled device. The main physical device may have a companion control point corresponding to each controlled device and the companion physical device may have a main control point. The main controlled device may communicate with the main control point and the companion controlled device may communicate with the companion control point.

The companion controlled device and the companion control point may exchange a discovery message and perform operations such as events/actions. Accordingly, the CD may play a leading role in communication. However, the companion controlled device and the companion control point may have different operations, roles and rights from the main controlled device/control point. Specific operations or the scope of rights may be set by designer.

The companion controlled device and the companion control point may be called a screen (controlled) device and a screen control point according to an embodiment.

Figure 74:
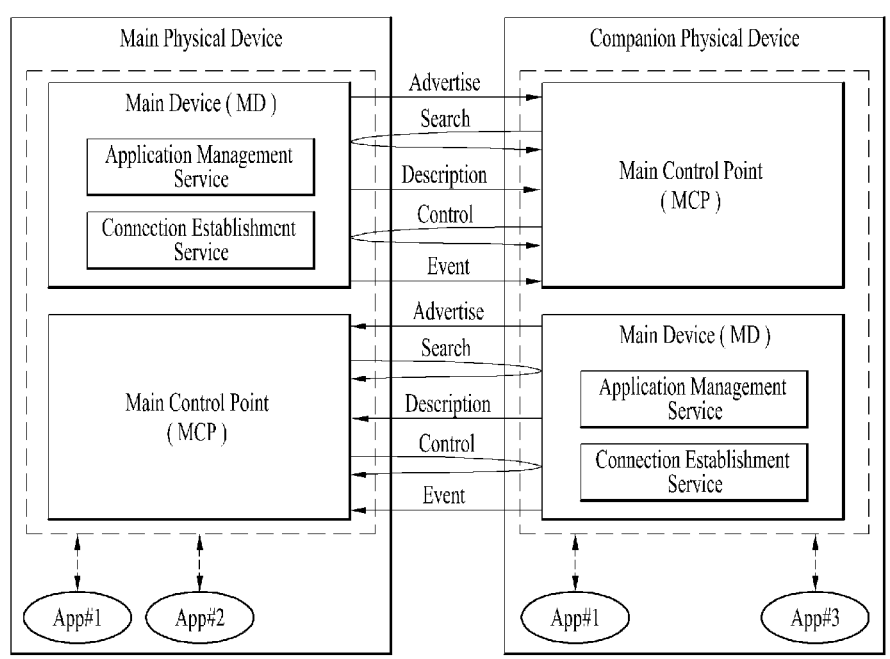
FIG. 74 illustrates a UPnP based PD-CD architecture according to another embodiment of the present invention.

FIG. 74 illustrates a UPnP based PD-CD architecture according to another embodiment of the present invention.

In the present embodiment, a main physical device PD may include a main controlled device and/or a main control point. In addition, a companion physical device CD may include a main control point and/or a main controlled device.

As described above, the PD and the CD may perform asymmetrical operations in a UPnP architecture. To solve this, an architecture in which the PD and the CD further includes a pair of a main control point and a main controlled device in addition to the main controlled device and the main control point, respectively, may be configured. In this case, both the PD and the CD can include the equivalent main controlled device/the control point, distinguished from the aforementioned embodiment in which the companion controlled device/control point perform different operations from the main controlled device/control point. Accordingly, an architecture can be configured in such a manner that the TV receiver and the companion physical device have equal communication rights.

Figure 75:
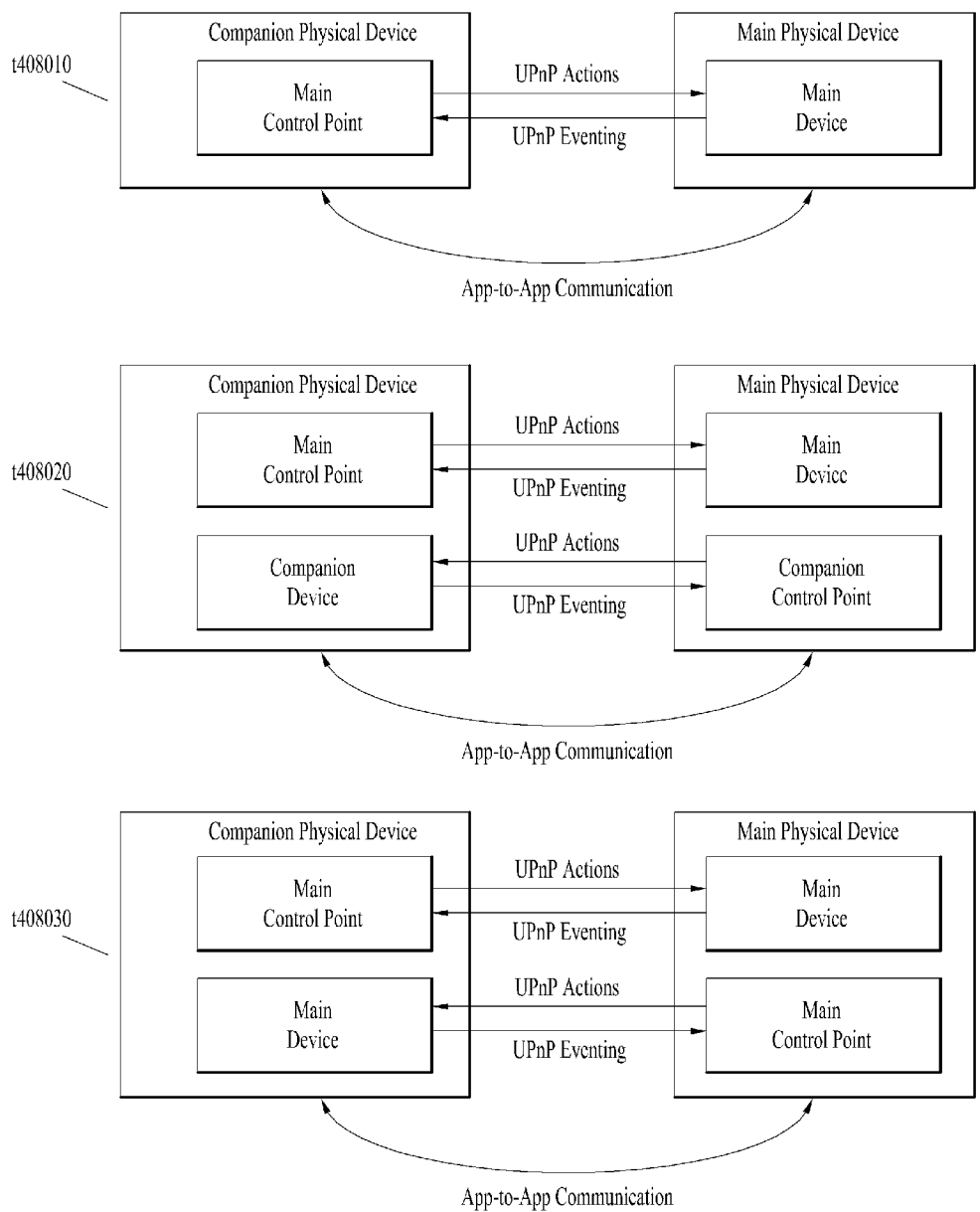
FIG. 75 illustrates interactions in a UPnP based PD-CD architecture according to an embodiment of the present invention.

FIG. 75 illustrates interactions in a UPnP based PD-CD architecture according to an embodiment of the present invention.

FIG. 75 sequentially illustrates embodiments of the aforementioned UPnP based PD-CD architectures. The first embodiment t408010 may be an embodiment in which the aforementioned PD includes a controlled device and the CD includes a control point. The second embodiment t408020 may be an embodiment in which the aforementioned PD includes a main controlled device and a companion control point and the CD includes a main control point and a companion controlled device. The third embodiment t408030 may be an embodiment in which the aforementioned PD includes a main controlled device and a main control point and the CD includes a main control point and a main controlled device.

In the first embodiment t408010, the controlled device can deliver information such as a state variable to the control point through UPnP eventing. Simultaneously, the control point can request information or a specific operation from the controlled device through a UPnP action. This may be the most fundamental architecture.

In the second embodiment t408020, the main controlled device can communicate with the main control point and the companion controlled device can communicate with the companion control point. The main controlled device can deliver information such as a state variable to the main control point through UPnP eventing. Simultaneously, the main control point can request information or a specific operation from the main controlled device through a UPnP action. In addition, the companion controlled device can deliver information such as a state variable to the companion control point through UPnP eventing. Simultaneously, the companion control point can request information or a specific operation from the companion controlled device through a UPnP action. As described above, the companion controlled device and the companion control point may have different operations, roles and rights from the main controlled device/control point.

In the third embodiment t408030, the main controlled devices of the PD and the CD can communicate with main control points corresponding thereto. The main controlled devices can deliver information such as a state variable to the main control points through UPnP eventing. Simultaneously, the main control points can request information or a specific operation from the main controlled devices through a UPnP action.

Figure 76:
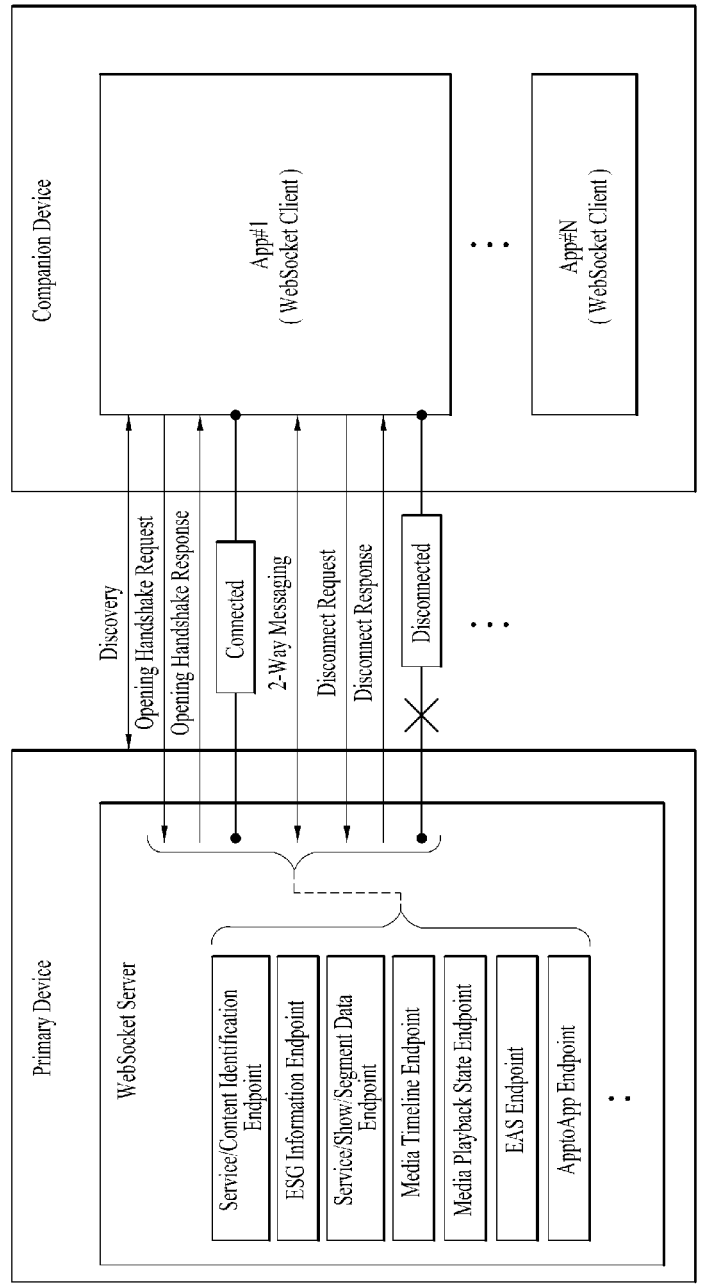
FIG. 76 illustrates a Websocket based PD-CD architecture according to an embodiment of the present invention.

FIG. 76 illustrates a Websocket based PD-CD architecture according to an embodiment of the present invention.

In the Websocket based architecture, communication can be performed between a PD and an application executed in a CD. In the Websocket based architecture, the PD may include a Websocket server and the CD may include applications. Here, applications of the CD may be called Websocket clients.

The Websocket server in the PD may have endpoints with respect to operations/functions provided by the PD. The endpoints may be connected to applications of the CD to deliver an ESG or media timeline and perform communication between an application of the PD and an application of the CD.

First, a discovery process may be performed between the PD and an application executed in the CD. The discovery process will be described below. In this process, information about the endpoints of the Websocket server may be delivered to the application of the CD.

For each endpoint, the application of the CD and the Websocket server can perform a handshake process. When the application of the CD requests handshake opening, the Websocket server can send a response to the request. Accordingly, the Websocket server and the application of the CD can be connected through an endpoint.

In the Websocket architecture, when the Websocket server and the application of the CD are connected through the endpoint, information can be transmitted through the endpoint. Messages can be freely relayed between applications of the PD and the CD.

When disconnection is required, the application of the CD can request disconnection for the endpoint (Disconnect Request). The Websocket server sends a response to the request (Disconnect Response) and connection with the endpoint can be terminated. Disconnection may be performed by the PD first and may be automatically performed in various situations.

The aforementioned process may be a process of interacting with a single Websocket endpoint. When there are multiple endpoints, the aforementioned process can be equally performed for the endpoints to activate desired endpoints. This process may be performed for multiple endpoints simultaneously or sequentially.

In the present embodiment, the Websocket server may have endpoints for provided functions, respectively. That is, a single endpoint can be provided to a single function.

Such endpoints may include a service/content identification endpoint, an ESG information endpoint, a service/show/segment data endpoint, a media timeline endpoint, a media playback state endpoint, an EAS endpoint and/or an app-to-app endpoint.

The service/content identification endpoint may execute a function of delivering information for identifying a service/content that is being played or will be played in a PD. An application of a CD can receive the information through this endpoint.

The ESG information endpoint may be used for a CD to receive an ESG. An application of the CD can receive the ESG through this endpoint. The service/show/segment data endpoint may receive various types of data about services.

The media timeline endpoint may deliver the current time and media time information of a currently played service/content. The aforementioned service time information may be delivered through this endpoint. The media playback state endpoint may deliver information related to presentation of a currently played service/content. The information related to presentation may refer to information indicating whether a currently played service/content is played at normal speed, fast-forwarded at 3X or reversed. The aforementioned playback state information may be delivered to an application of the CD through this endpoint.

The EAS endpoint may deliver EAS information to the CD. When the EAS information is delivered to a TV receiver, it is possible to signal a dangerous situation more efficiently by delivering the EAS information to the CD. The app-to-app end point may be an endpoint for communication between an application executed in a PD and an application executed in a CD. The application of the PD and the application of the CD can exchange information by transmitting/receiving messages using this endpoint.

Since each endpoint is provided for each function, an application of the CD can access an endpoint to perform a connection process and obtain desired information to communicate with an application of the PD through the endpoint.

Hereinafter, this architecture may be referred to as Websocket based architecture embodiment #1 for convenience of description. This embodiment can be combined with various embodiments based on UPnP and HTTP as well as other Websocket based architectures.

Figure 77:
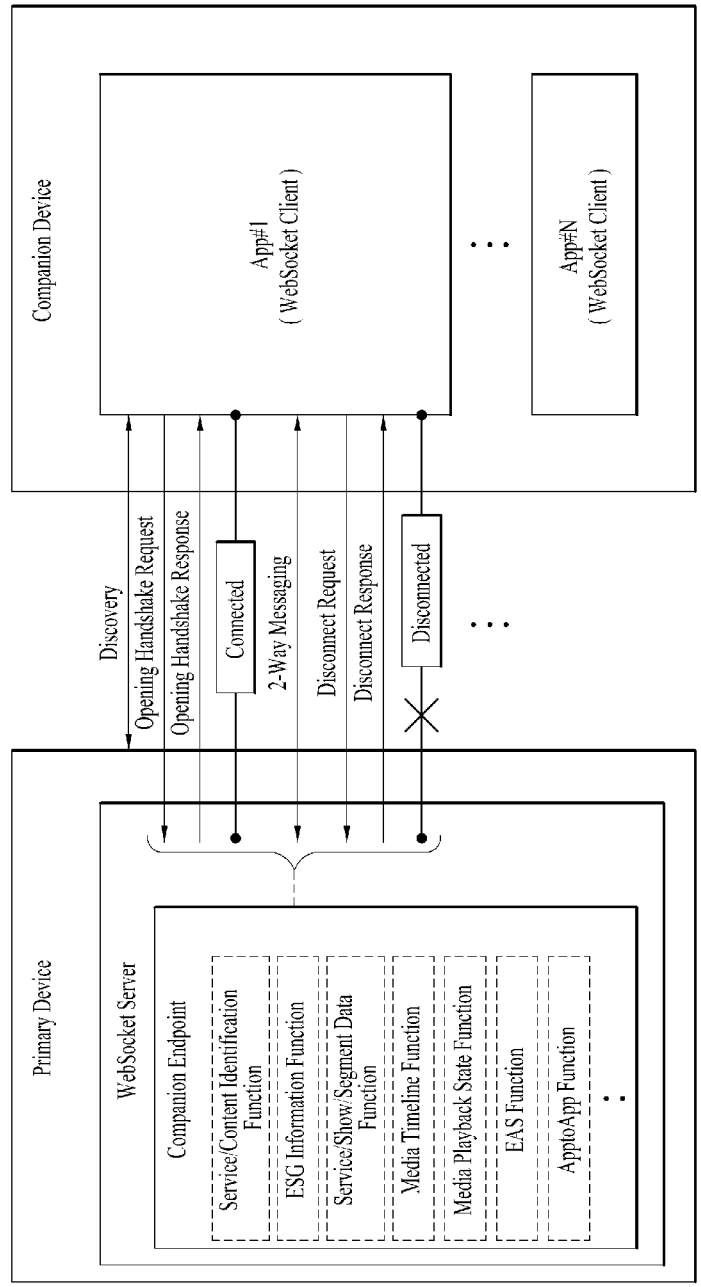
FIG. 77 illustrates a Websocket based PD-CD architecture according to another embodiment of the present invention.

FIG. 77 illustrates a Websocket based PD-CD architecture according to another embodiment of the present invention.

In the present embodiment, an endpoint may not be provided to each function. In the present embodiment, a Websocket server of a PD provides a single endpoint which can execute all the aforementioned functions. This endpoint may be called a companion endpoint. Other components of the Websocket architecture may be the same as the aforementioned embodiment.

The aforementioned endpoint may execute all functions executed by multiple endpoints in the aforementioned embodiment. That is, this endpoint can execute the functions executed by the aforementioned service/content identification endpoint, the ESG information endpoint, the service/show/segment data endpoint, etc. Accordingly, an application of the CD can perform operations such as receiving an ESG, receiving media time information and communicating with an application of the PD only by connecting to the endpoint. In this case, however, a function for which a message is exchanged between the application of the CD and the Websocket server needs to be identified. Accordingly, the message may include more specific information or may be extended.

Since the companion endpoint executes all functions, all the functions can be executed when connection to the endpoint is established. A process of connecting to the endpoint may be the same as the aforementioned process of connecting to a normal endpoint. In this case, connection to the endpoint cannot be partially terminated even when a certain function need not be accessed because there is a single endpoint. On the contrary, even when only one function is required, connection to the companion endpoint must be established.

Hereinafter, this architecture may be referred to as Websocket based architecture embodiment #2 for convenience of description. This embodiment can be combined with various embodiments based on UPnP and HTTP as well as other Websocket based architectures.

Figure 78:
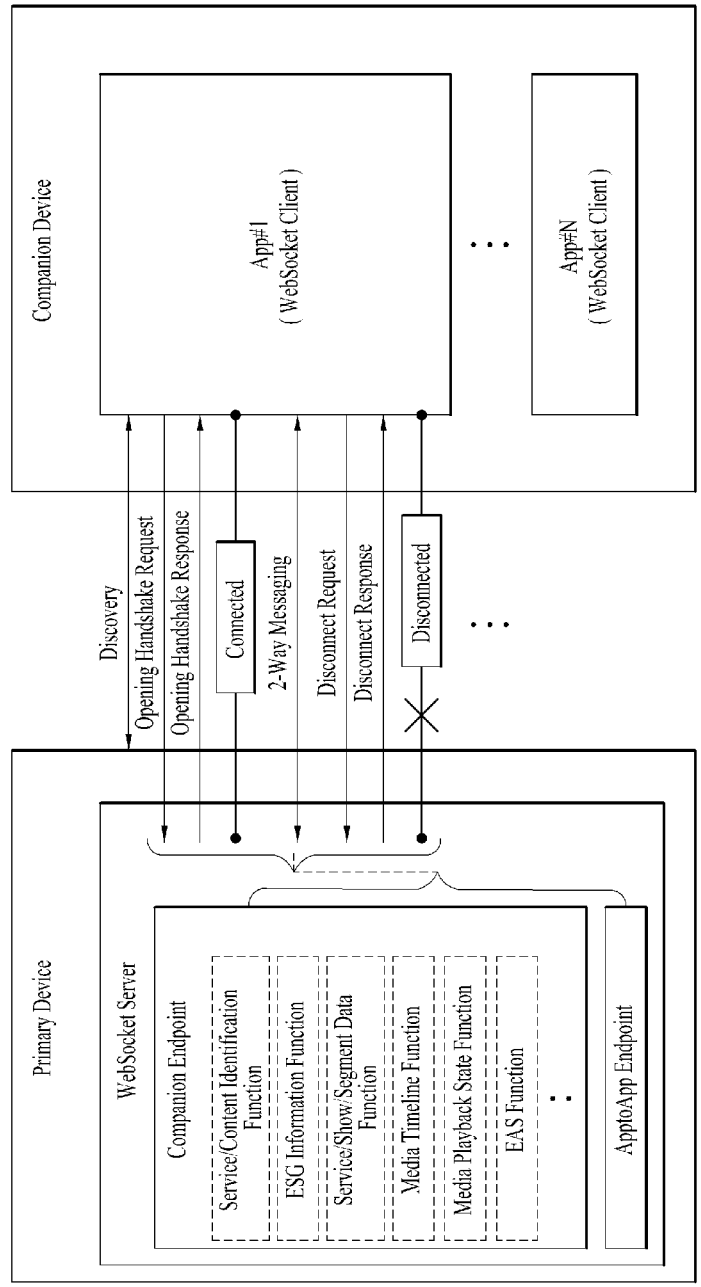
FIG. 78 illustrates a Websocket based PD-CD architecture according to another embodiment of the present invention.

FIG. 78 illustrates a Websocket based PD-CD architecture according to another embodiment of the present invention.

In the present embodiment, n endpoints are provided and can execute m functions. Here, n may be equal to or less than m, and n and m may be integers. That is, a plurality of (n) endpoints each of which can execute one or more functions can be provided.

In the illustrated embodiment, an endpoint that executes a service/content identification function, an ESG delivery function and the like may be provided as a companion endpoint and an endpoint that executes an app-to-app function may be provided as a separate "app-to-app endpoint".

The architecture of the present embodiment may be regarded as a combination of the aforementioned Websocket based architectures #1 and #2. Various architectures can be configured depending on values of n and m. Various numbers of endpoints may be provided and each endpoint may provide various numbers of functions.

The above-described connection to and disconnection from endpoints may need to be performed for each endpoint. That is, the process may need to be performed n times for n endpoints.

Hereinafter, this architecture may be referred to as Websocket based architecture embodiment #3 for convenience of description. This embodiment can be combined with various embodiments based on UPnP and HTTP as well as other Websocket based architectures.

Figure 79:
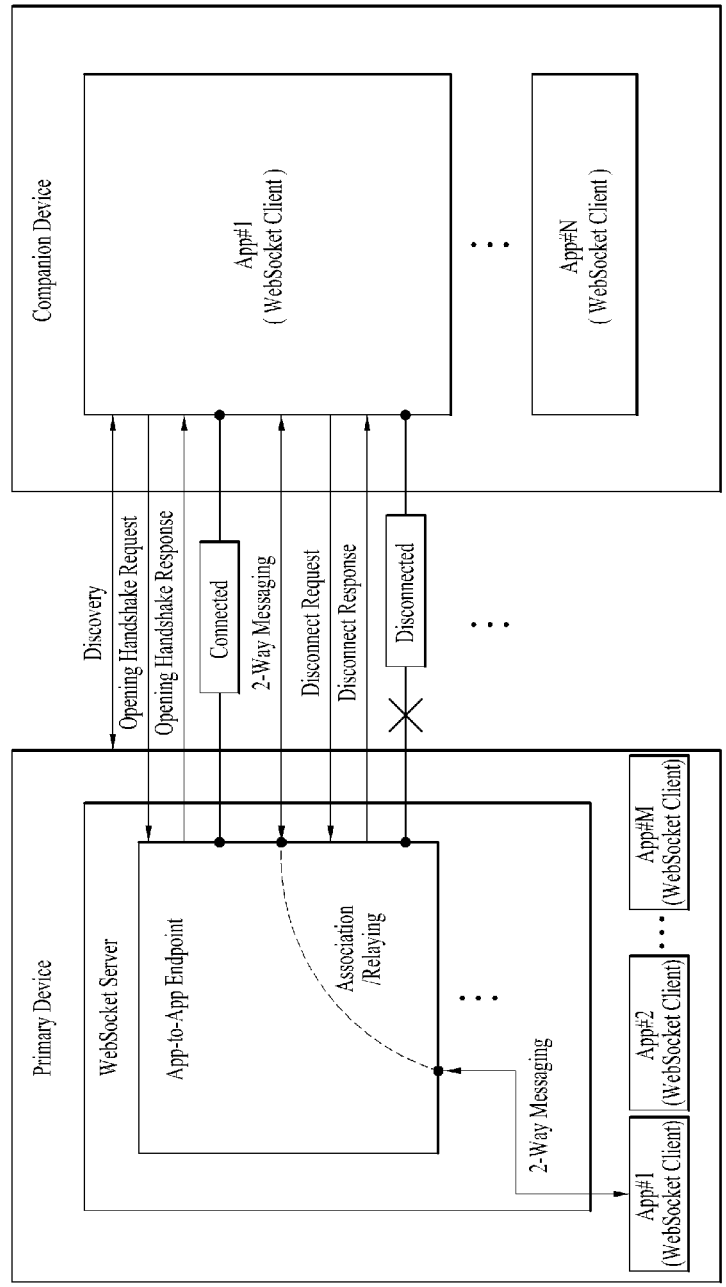
FIG. 79 illustrates app-to-app communication in a Websocket based PD-CD architecture according to an embodiment of the present invention.

FIG. 79 illustrates app-to-app communication in a Websocket based PD-CD architecture according to an embodiment of the present invention.

App-to-app communication may be performed between an application executed in the PD and an application executed in the CD. In a Websocket based architecture, applications can communicate through a Websocket server. Here, the aforementioned app-to-app endpoint can be used. Alternatively, an endpoint executing the app-to-app communication function and other functions may be used according to an embodiment.

The application of the CD can connect to the app-to-app communication endpoint of the Websocket server through the aforementioned process. Applications executed in the PD correspond to Websocket clients, and the application of the PD can connect to the app-to-app communication endpoint of the Websocket server. The Websocket server can connect matching connection requests from among received connection requests to enable message exchange.

When the applications of the PD and the CD are connected, the applications can exchange messages through the Websocket server. The messages can be delivered bidirectionally. The Websocket server can relay a message sent from one application to the other application.

Figure 80:
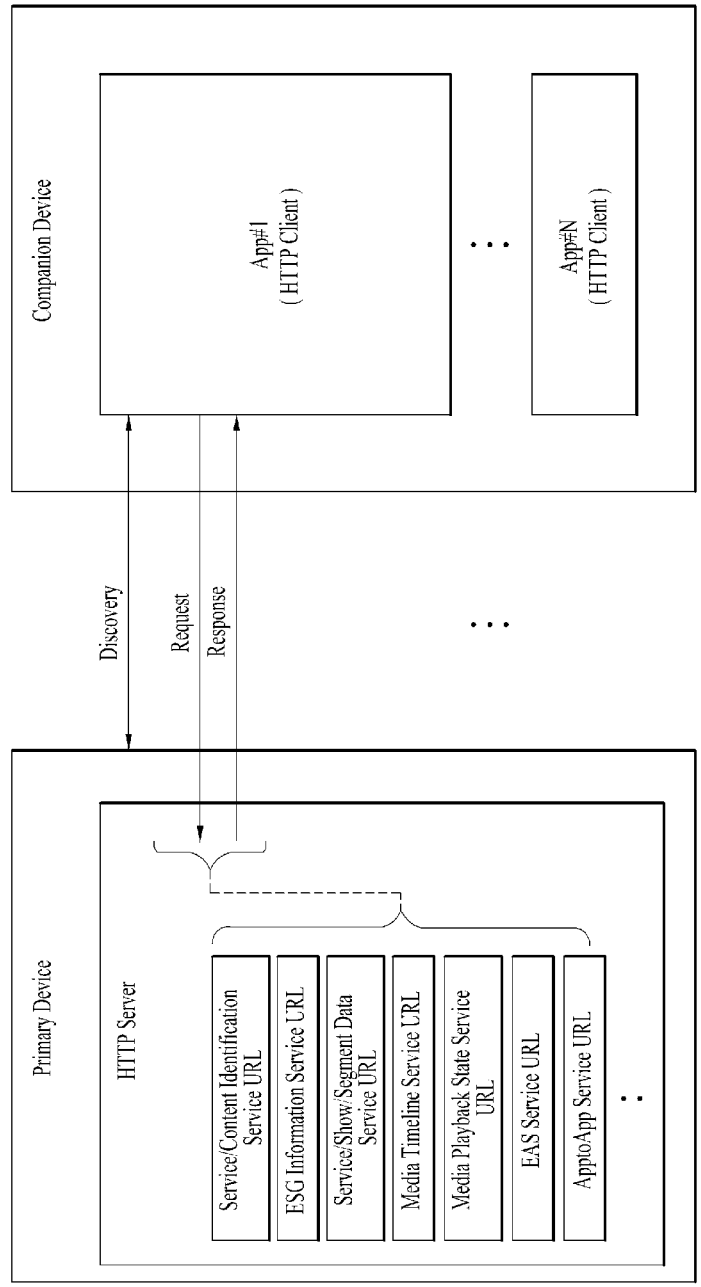
FIG. 80 illustrates an HTTP based PD-CD architecture according to an embodiment of the present invention.

FIG. 80 illustrates an HTTP based PD-CD architecture according to an embodiment of the present invention.

In the HTTP based architecture, communication can be performed between a PD and an application executed in a CD. In the HTTP based architecture, the PD may include an HTTP server and the CD may include applications. Here, applications of the CD may be called HTTP clients.

The HTTP server included in the PD may be a server for performing various operations/functions. To access each function of the server, a service URL for a corresponding service may be needed. An application of the CD may send a request to the corresponding service URL to receive desired information.

First, a discovery process may be performed between the PD and the application executed in the CD. In this process, information about URLs of the HTTP server may be delivered to the application of the CD. HTTP clients of the CD may access desired URLs using the delivered URL information to receive desired information.

In the present embodiment, the HTTP server may have different URLs for functions. That is, a single URL can be provided for a single function.

Services provided through such service URLs may be similar to functions provided by the aforementioned Websocket server. For example, when the application of the CD accesses a service/content identification service URL, the application can receive information for identifying a service/content that is being played or will be played in the PD. That is, the application of the CD can send a request for service/content identification information to the service/content identification service URL and the HTTP server of the PD can deliver the requested information to the application of the CD. An ESG information service, a media timeline service and the like corresponding to the functions provided by the aforementioned ESG information endpoint, media timeline endpoint and the like can be defined. The application of the CD can receive desired information by sending a request to each service URL.

Since service URLs are respectively provided to services, the application of the CD needs to know information about each URL and to access a desired URL to obtain desired information or communicate with an application of the PD.

Hereinafter, this architecture may be referred to as HTTP based architecture embodiment #1 for convenience of description. This embodiment can be combined with various embodiments based on UPnP and HTTP as well as other HTTP based architectures.

Figure 81:
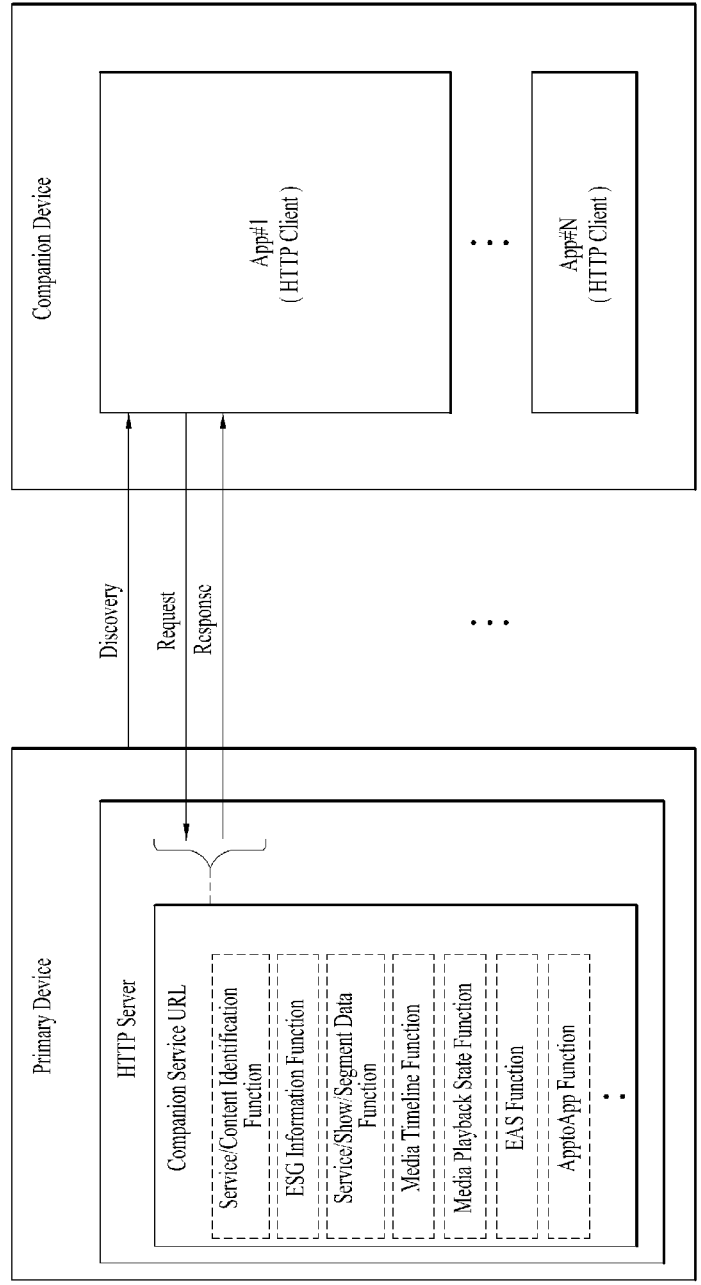
FIG. 81 illustrates an HTTP based PD-CD architecture according to another embodiment of the present invention.

FIG. 81 illustrates an HTTP based PD-CD architecture according to another embodiment of the present invention.

In the present embodiment, service URLs may not be provided to respective services. In the present embodiment, an HTTP server of a PD provides a single service URL through which all the aforementioned functions can be executed. This service URL may be called a companion service URL. Other components of the HTTP architecture may be the same as the aforementioned embodiment.

The single service URL may be a service URL through which all functions executed through multiple service URLs in the aforementioned embodiment can be executed. That is, this service URL can execute the functions executed by the aforementioned service/content identification service URL, ESG information service URL, the service/show/segment data service URL, etc. Accordingly, an application of the CD can receive an ESG or media time information only by sending a request to the service URL.

In this case, when a request is sent to the HTTP server, the request message may be extended in such a manner that a new variable is attached to the query term. This is because it is necessary to identify information that the application of the CD wants to receive by sending a request to the companion service URL. The HTTP server can analyze the request and deliver the information that the application of the CD desires.

Hereinafter, this architecture may be referred to as HTTP based architecture embodiment #2 for convenience of description. This embodiment can be combined with various embodiments based on UPnP and HTTP as well as other HTTP based architectures.

Figure 82:
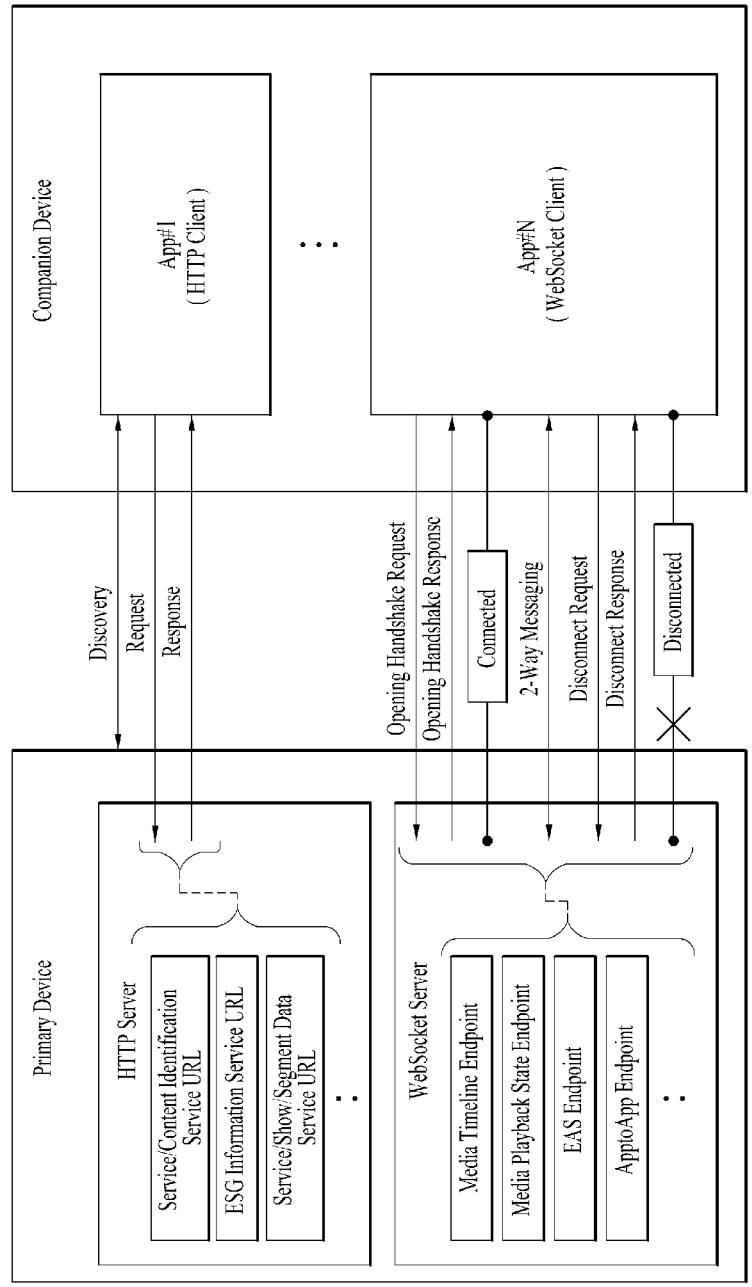
FIG. 82 illustrates a Websocket & HTTP based PD-CD architecture according to an embodiment of the present invention.

FIG. 82 illustrates a Websocket & HTTP based PD-CD architecture according to an embodiment of the present invention.

The aforementioned UPnP based architectures, Websocket based architectures and HTTP based architectures may be combined. For example, a PD may simultaneously have an HTTP server and a Websocket server. According to an embodiment, the PD may have the HTTP server and the Websocket server and serve as a controlled device in a UPnP architecture.

In addition, a combined UPnP architecture may be one of the aforementioned first, second and third UPnP architecture embodiments #1, #2 and #3. A combined Websocket architecture may be one of the aforementioned first, second and third Websocket architecture embodiments #1, #2 and #3, and a combined HTTP architecture may be one of the aforementioned first, second and third HTTP architecture embodiments #1 and #2.

In the present embodiment, the PD simultaneously has the HTTP server and the Websocket server, HTTP based architecture #2 can be used as an HTTP architecture, and Websocket based architecture #3 can be used as a Websocket architecture. That is, in the HTTP server, a single service URL address can execute a plurality of functions. The Websocket server provides n endpoints that can execute a plurality of functions. Specifically, two endpoints are provided, one endpoint serves as an endpoint for app-to-app communication, and the other endpoint serves as an endpoint executing all other functions in the present embodiment.

Although only the above-described embodiments are described herein, the technical scope of the present invention includes all other combinations as embodiments. Various architectures can be designed according to such combinations and selected and used according to designer.

In the architecture as in the present embodiment, functions may be divided and executed by the HTTP server and the Websocket server. That is, the HTTP server may be used to execute specific functions and a single HTTP service URL may be used to receive requests for executing the functions. In addition, the Websocket server may provide endpoints for executing other functions.

Such function division may be performed depending on characteristics of corresponding functions. The HTTP may be used for asynchronous communication whereas the Websocket may be used for synchronous communication.

According to an embodiment, the ESG information delivery function, the service/show/segment data delivery function and the like may be performed by the HTTP server. That is, information such as an ESG or service data can be acquired by sending a request to a service URL of the HTTP server.

In addition, the service/content identification function, the media playback state function, the app-to-app communication function and the like may be performed by the Websocket. The Websocket server may provide the companion endpoint for executing the media playback state function and the app-to-app endpoint for executing the app-to-app communication function.

According to an embodiment, the media timeline function may be executed by the HTTP and/or Websocket. The media timeline function may be provided by both the HTTP and the Websocket or provided by one of the HTTP and the Websocket. The EAS information delivery function may be executed by the Websocket or a multicast sender in the PD. When the multicast sender is used, the multicast sender in the PD can multicast EAS information to devices in a multicast group.

FIG. 83 illustrates formats of messages used for discovery of a PD (Primary Device) according to an embodiment of the present invention.

The PD can be discovered by a CD or an application executed in the CD. In this process, an SSDP (Simple Service Discovery Protocol) may be used. The PD may have an ST (Search Target) value for identifying a technical standard to which the PD conforms. For example, the PD can use urn:atsc:device:atsccompanion:3 or urn:atsc:service:atsccompanion:3 as a device type or service type thereof. These values can be used in a discovery process through ST matching.

For a discovery process, the PD may advertise itself to CDs. Alternatively, a CD may discover the PD through search.

First, when the PD advertises itself to CDs, the PD can multicast a discovery message. This discovery message may be transmitted through a NOTIFY method. The discovery message for advertising of the PD may be as illustrated in embodiment t413010.

When a CD discovers the PD through search, the CD or an application executed in the CD can multicast a discovery message. This discovery message may be transmitted through an M-SEARCH method. The discovery message for searching of the CD may be as illustrated in embodiment t413020.

The application of the CD can discover PDs conforming to a specific technical standard using the ST value. The PD can receive the aforementioned search message. When the ST value of the PD matches the ST value of the message, the PD can send a response to the application of the CD which has sent the message (200 OK). This response message may be as illustrated embodiment t413030.

The illustrated message formats are merely embodiments of the present invention and parameters included in the messages may have different values according to embodiments.

The discovery process described herein can be applied to HTTP architectures as well as Websocket architectures.

Figure 84:
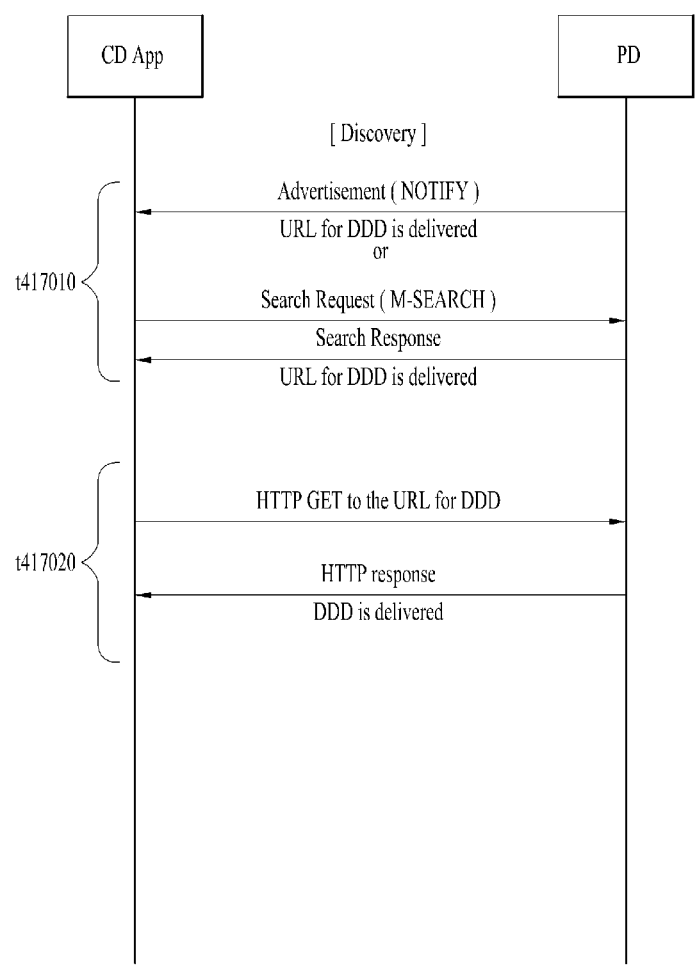
FIG. 84 illustrates a process for discovering a Websocket endpoint or an HTTP service URL using a DDD (Device Description Document) according to an embodiment of the present invention.

FIG. 84 illustrates a process for discovering a Websocket endpoint or an HTTP service URL using a DDD (Device Description Document) according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. The URL may be a URL through which a DDD (Device Description Document) can be acquired. The application of the CD may acquire the DDD using the URL to obtain device description information.

Specifically, the PD may multicast a discovery message for advertising the PD through the NOTIFY method as described above. In this process, URL information for acquiring a DDD may be delivered to the application executed in the CD. Alternatively, when the application of the CD multicasts a discovery method for searching using the M-SEARCH method, the PD may send a response message thereto to the CD. In this process, the URL information for acquiring the DDD may also be delivered to the application executed in the CD (t417010).

Then, the application of the CD may send a request for the DDD to the acquired URL using HTTP GET. The PD may deliver the DDD to the application of the CD using a response message (t417020). The body of the response message may include the DDD.

Addresses of Websocket endpoints may be provided to the application of the CD through the DDD. According to an embodiment, addresses of service URLs of an HTTP architecture may be provided to the application of the CD through the DDD. When an architecture in which two or more protocols are combined is used, addresses of Websocket endpoints and/or addresses of service URLs of the HTTP may be provided to the application.

FIG. 85 illustrates a DDD request message and a DDD format in a process for discovering a Websocket endpoint or an HTTP service URL using a DDD according to an embodiment of the present invention.

As described above, an application of a CD may request a DDD using HTTP GET. Here, the GET message may have a format as illustrated in embodiment t418010. A DDD request message using GET may be transmitted to a URL of a DDD acquired from a PD. In addition, host information of an IP address/port of the description may be used. Furthermore, a language preferred by a control point may be used.

As described above, a response message to the DDD request message may be returned. The body of the response message may include the DDD. The DDD may have a format as illustrated in embodiment t418020.

The DDD may include specification version information, base URL information, device related information, etc. The specification version information specVersion can indicate version information of a corresponding DDD specification as a major version/minor version. The base URL information can include base URL information that can be used for all related URLs delivered by the DDD.

The device related information can include type information of a device described by the DDD, short device name information readable by a user (friendlyName), manufacture information of a corresponding device, service list information, etc.

The service list information can include service type information indicating the type of each service provided by the corresponding device, service ID information indicating the ID of the service, service description URL information indicating a URL related to service description, control URL information used for control of the corresponding service and/or URL information used for eventing of the corresponding service.

The illustrated formats are merely embodiments of the present invention and structures thereof, elements included therein and values of the elements may be varied according to embodiments.

FIG. 86 illustrates DDD formats in a process for discovering a Websocket endpoint or an HTTP service URL using a DDD according to an embodiment of the present invention.

As described above, addresses of Websocket endpoints or addresses of HTTP service URLs may be delivered to an application of a CD through DDD delivery. The application of the CD may connect to a Websocket endpoint or send a request to a service URL using the addresses.

In the aforementioned Websocket based architecture embodiment #1, the DDD format according to the illustrated embodiment t419010 or the DDD format according to the embodiment t419020 may be used.

In the illustrated embodiment t419010, device information of the DDD may include address information of various Websocket endpoints in addition to the device type information. As shown, address information about endpoints such as the service/content identification endpoint and the ESG information endpoint is included in the device information of the DDD. Since the DDD format is used in Websocket based architecture embodiment #1, the pieces of address information about the endpoints may be arranged. The DDD format according to illustrated embodiment t419020 may also include address information about various Websocket endpoints. In this case, the address information about the endpoints may be included in the service information of the DDD.

While the address information is positioned below the device information and the service information in the present embodiment, the address information may be arranged at other positions in the DDD. In the illustrated embodiment, other elements of the aforementioned DDD are omitted. Other elements may be configured according to various embodiments.

The DDD formats according to the illustrated embodiments t419010 and t419020 may be used in the aforementioned HTTP based architecture embodiment #1. In this case, the address information of the Websocket endpoints can be replaced by URL address information of service URLs. Accordingly, element names may be changed. Similarly, since the DDD formats are used in HTTP based architecture embodiment #1, the pieces of address information of the service URLs may be arranged.

Addresses of Websocket endpoints may be configured in the form of ws://localhost:8030/ESGInformation, ws://localhost:8030/Data and ws://localhost:8030/MediaTimeline. Addresses of HTTP service URLs may be configured in the form of http://192.16814:8080/serviceidentification and http://localhost:8030/ESGInformation.

FIG. 87 illustrates DDD formats in a process for discovering a Websocket endpoint or an HTTP service URL using a DDD according to another embodiment of the present invention.

In the aforementioned Websocket based architecture embodiment #2, a DDD format according to the illustrated embodiment t420010 or a DDD format according to the illustrated embodiment t420020 may be used.

In the illustrated embodiment t420010, the device information of the DDD may include addresses of Websocket endpoints in addition to the device type information. Since the DDD format is used in Websocket based architecture embodiment #2, only address information about a single companion endpoint may be included therein. The DDD format according to the illustrated embodiment t420020 may also include only address information about a single companion endpoint. In this case, the address information of the corresponding endpoint can be included in the service information of the DDD.

The DDD formats according to the illustrated embodiments t420010 and t420020 may be used in the aforementioned HTTP based architecture embodiment #2. In this case, the address information of the Websocket companion endpoint can be replaced by URL address information of a companion service URL. Accordingly, element names may be changed. Similarly, since the DDD formats are used in HTTP based architecture embodiment #2, only address information of a single service URL can be included therein.

In the aforementioned Websocket based architecture embodiment #3, the DDD format according to the illustrated embodiment t420030 or the DDD format according to the illustrated embodiment t420040 may be used.

In the illustrated embodiment t420030, the device information of the DDD may include address information of n Websocket endpoints in addition to the device type information. For example, the device information may include address information of a companion endpoint that executes the service/content identification function, the ESG information delivery function, etc. and address information of the app-to-app communication endpoint. The DDD format according to the illustrated embodiment t420040 may also include address information of n Websocket endpoints. In this case, address information of corresponding endpoints can be included in the service information of the DDD.

While the address information is positioned below the device information and the service information in the present embodiment, the address information may be arranged at other positions in the DDD. In the illustrated embodiment, other elements of the aforementioned DDD are omitted. Other elements may be configured according to various embodiments.

Figure 88:
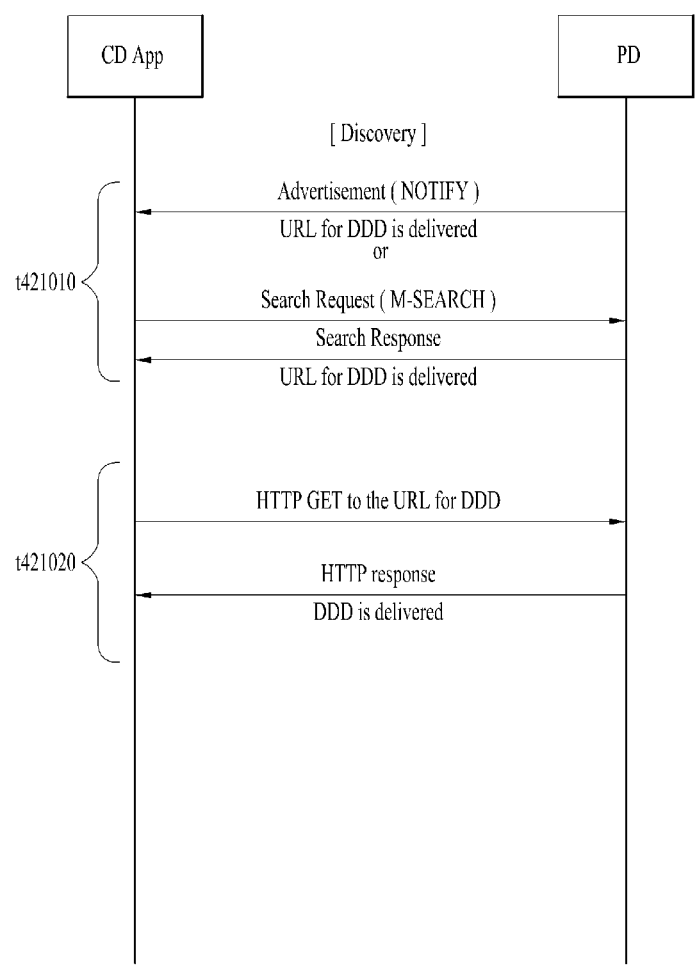
FIG. 88 illustrates a process for discovering a Websocket endpoint or an HTTP service URL using a response header to a DDD request according to an embodiment of the present invention.

FIG. 88 illustrates a process for discovering a Websocket endpoint or an HTTP service URL using a response header to a DDD request according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. This process may be the same as the process in the aforementioned embodiment.

The URL may be a URL through which a DDD can be acquired, and the application of the CD may send a message for requesting the DDD to the URL using HTTP GET. The DDD is delivered through the body of a response message to the request and thus the application of the CD can obtain device description information (t421020).

In the above-described embodiment, addresses of Websocket endpoints or address information of HTTP service URLs are delivered through the DDD of the response message. In the present embodiment, the address information may be delivered through the header of the response message. In this case, the body of the response message may include no information or may include the DDD.

FIG. 89 illustrates a format of a response header in a process for discovering a Websocket endpoint or an HTTP service URL using a response header to a DDD request according to an embodiment of the present invention.

As described above, an application of a CD may request a DDD using HTTP GET. Here, the GET message may have a format as illustrated in embodiment t422010. A DDD request message using GET may be transmitted to a URL of a DDD acquired from a PD. Furthermore, host information of an IP address/port of description may be used. In addition, a language preferred by a control point may be used. The GET message may be the same as the message in the aforementioned embodiment.

As described above, a response message to the DDD request message may be returned. Address information may be delivered through the header of the response message.

In the aforementioned Websocket based architecture embodiment #1, a response header format according to the illustrated embodiment t422020 may be used. The response header according to the embodiment can include address information of various Websocket endpoints in addition to basic 200 OK message information. As shown, address information about endpoints such as the service/content identification endpoint and the ESG information endpoint may be included in the response header. Since the response header format is used in Websocket based architecture embodiment #1, the pieces of address information about the endpoints may be arranged. Here, the structure and form in which address information is included in the response header may be configured in various manners according to embodiments.

The response header format according to the illustrated embodiment t422020 may be used in the aforementioned HTTP based architecture embodiment #1. In this case, the address information of the Websocket endpoints can be replaced by URL address information of service URLs. Accordingly, element names may be changed. Similarly, since the response header format is used in HTTP based architecture embodiment #1, the pieces of address information of the service URLs may be arranged.

In the aforementioned Websocket based architecture embodiment #2, a response header format according to the illustrated embodiment t422030 may be used. The response header according to the embodiment can include address information of a Websocket endpoint in addition to basic 200 OK message information. Since the response header format is used in Websocket based architecture embodiment #2, only address information about a companion endpoint can be included therein. Here, the structure and form in which the address information is included in the response header may be configured in various manners according to embodiments.

The response header format according to the illustrated embodiment t422030 may be used in the aforementioned HTTP based architecture embodiment #2. In this case, the address information of the Websocket companion endpoint can be replaced by address information of a companion service URL. Accordingly, element names may be changed. Similarly, since the response header format is used in HTTP based architecture embodiment #2, only the address information of the companion service URL may be included therein.

In the aforementioned Websocket based architecture embodiment #3, a response header format according to the illustrated embodiment t422040 may be used. The response header according to the embodiment can include address information of n Websocket endpoints in addition to basic 200 OK message information. For example, address information of a companion endpoint that executes the service/content identification function, the ESG information delivery function, etc. and address information of the app-to-app communication endpoint may be included in the response header. Here, the structure and form in which address information is included in the response header may be configured in various manners according to embodiments.

Figure 90:
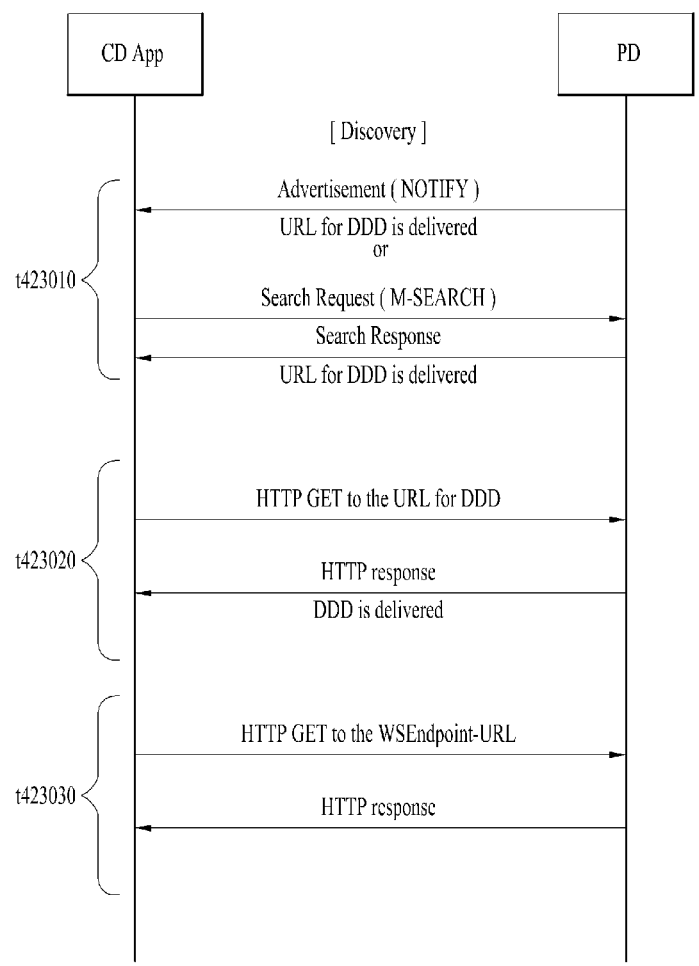
FIG. 90 illustrates a process for discovering a Websocket endpoint or an HTTP service URL using a URL of a response header to a DDD request according to an embodiment of the present invention.

FIG. 90 illustrates a process for discovering a Websocket endpoint or an HTTP service URL using a URL of a response header to a DDD request according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. The URL may be a URL through which a DDD can be acquired, and the application of the CD may send an HTTP GET request to the URL. The processes t42310 and t42320 may be the same as the aforementioned embodiment.

Here, a response message may be received as a response to the HTTP GET request. In the aforementioned embodiment, address information has been delivered through a DDD included in the body of the response message or the response message header. In the present embodiment, a URL through which address information can be acquired may be delivered through the response message header. In this case, the body of the response message may include no information and or may include a DDD (t423020).

The application of the CD may request address information by sending the HTTP GET request to the delivered URL for the address information. The PD may send a response message to the application of the CD. The address information can be delivered to the CD through the response message (t423030). The address information may be delivered through the body of the response message. According to an embodiment, the address information may be delivered through the header of the response message.

FIG. 91 illustrates a GET request and response message formats according thereto in a process for discovering a Websocket endpoint or an HTTP service URL using a URL of a response header to a DDD request according to an embodiment of the present invention.

As described above, an application of a CD may request a DDD using HTTP GET. Here, the GET message may have a format as illustrated in embodiment t424010. A DDD request message using GET may be transmitted to a URL of a DDD acquired from a PD. Furthermore, host information of an IP address/port of description may be used. The GET message may be the same as the message in the aforementioned embodiment.

A response message may be received in response to the HTTP GET request. The response message may have a format as shown in embodiment t424020. The response message may include a URL through which address information can be acquired in addition to basic 2000K message information. The URL may be URL information for acquiring the address of a Websocket endpoint or URL information for acquiring the address of an HTTP service URL. Alternatively, the URL may be URL information for obtaining both. In the illustrated format, the URL information for acquiring the address of a Websocket endpoint is included.

The application of the CD may send a request for address information to the URL using HTTP GET. Here, the GET message may have a format shown in embodiment t424030. The request message using GET may be transmitted to a URL of address information acquired from the PD. In addition, host information of an IP address/port of description may be used. Furthermore, a language preferred by a control point may be used.

For example, when the URL for acquiring the address information is http://192.168.1.10:8080/WSEndpoints (assuming Websocket), the GET message using this URL may be configured as shown in embodiment t424040.

Subsequently, a response message to the address information request message may be returned as described above. The response message may include address information. The address information may be the address of the Websocket endpoint or the address of the HTTP service URL.

FIG. 92 illustrates formats of a response message delivering address information in a process for discovering a Websocket endpoint or an HTTP service URL using a URL of a response header to a DDD request according to an embodiment of the present invention.

In the aforementioned Websocket based architecture embodiment #1, a response message format according to the illustrated embodiment t425010 may be used.

As shown, address information about endpoints such as the service/content identification endpoint and the ESG information endpoint may be included in the message. Since the message format is used in Websocket based architecture embodiment #1, the pieces of address information about the endpoints may be arranged.

The message format according to the illustrated embodiment t425010 may be used in the aforementioned HTTP based architecture embodiment #1. In this case, the address information of the Websocket endpoints can be replaced by URL address information of service URLs. Accordingly, element names may be changed. Similarly, since the message format is used in HTTP based architecture embodiment #1, the pieces of address information of the service URLs may be arranged.

In the aforementioned Websocket based architecture embodiment #2, a message format according to the illustrated embodiment t425020 may be used.

The message format according to the illustrated embodiment t425020 may be used in the aforementioned HTTP based architecture embodiment #2. In this case, the address information of the Websocket companion endpoint can be replaced by address information of a companion service URL. Accordingly, element names may be changed. Similarly, since the message format is used in HTTP based architecture embodiment #2, only the address information of the companion service URL may be included therein.

In the aforementioned Websocket based architecture embodiment #3, a message format according to the illustrated embodiment t425030 may be used.

The message format according to the illustrated embodiment t425030 may include n Websocket endpoints. For example, address information of a companion endpoint that executes the service/content identification function, the ESG information delivery function, etc. and address information of the app-to-app communication endpoint may be included in the message format.

While the illustrated formats include address information in an additionalData element, the message may include other pieces of information according to embodiments. Here, a structure and a form in which address information is included in the message may be configured in various manners according to embodiments.

Figure 93:
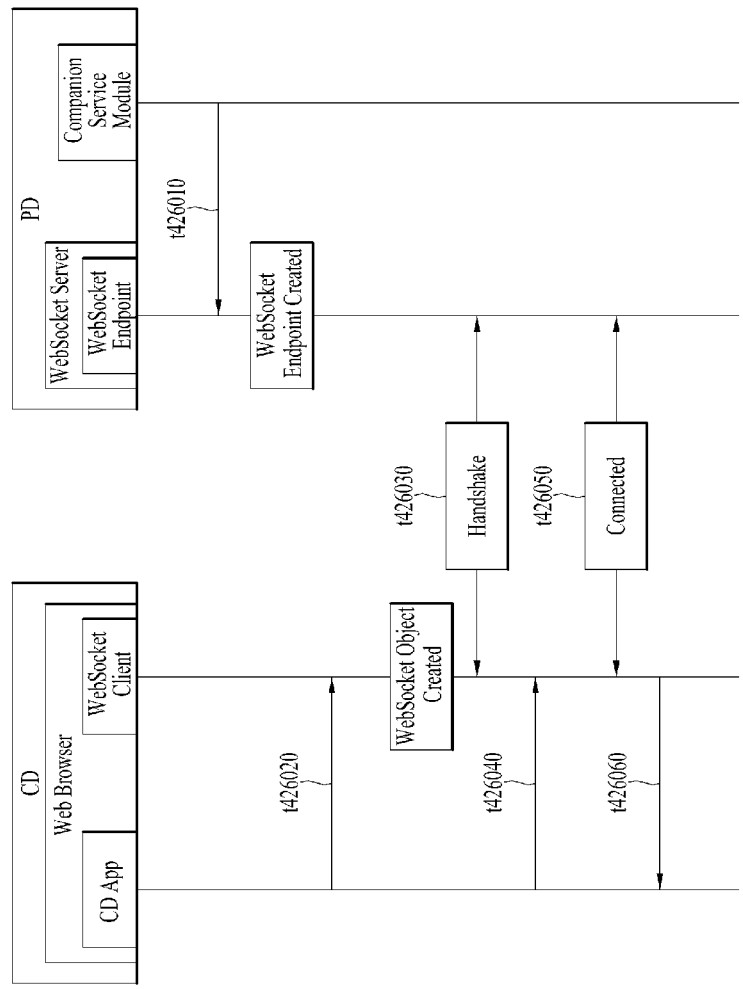
FIG. 93 illustrates a Websocket based handshake & connection process (after discovery) according to an embodiment of the present invention.

FIG. 93 illustrates a Websocket based handshake & connection process (after discovery) according to an embodiment of the present invention.

As described above, a PD may serve as a Websocket server and a CD may correspond to a Websocket client. The PD may include a Websocket server and/or a companion service module. The companion service module may provide information necessary for a companion device or perform overall management related to companion services. The companion service module may be a hardware module.

The Websocket server of the PD may provide Websocket endpoints. An application available in a web browser in the CD may be executed. The web browser may also provide a Websocket client.

First, the companion service module of the PD may request generation of a Websocket endpoint from the Websocket server (t426010). For example, a request in the form of @ServerEndpoint("/WS_AA") in Java format may be delivered. Here, "/WS_AA" may refer to a related URL. Through this process, the Websocket server can generate the Websocket endpoint.

An application of the CD may call an API for generating a Websocket object (t426020). The API in the name of newWebsocket may have the address of the Websocket endpoint as a variable thereof. For example, ex Websocket can be defined in the form of ex Websocket=newWebsocket (ws://192.168.1.11:8080/WS_AA). Through this process, the Websocket object can be generated in the CD. Here, handshake between the endpoint of the Websocket server in the PD and the Websocket object of the CD can be performed (t426030).

The application of the CD may call an APR for adding OpenEventHandler (t426040). The API may be WebsocketObject.onopen( ). For example, a handler can be added in a manner of ex_Websocket.onopen( . . . ). In this process, the Websocket server and a client can be connected (t426050).

The Websocket client can notify the application of the CD of opening of connection (t426060).

Figure 94:
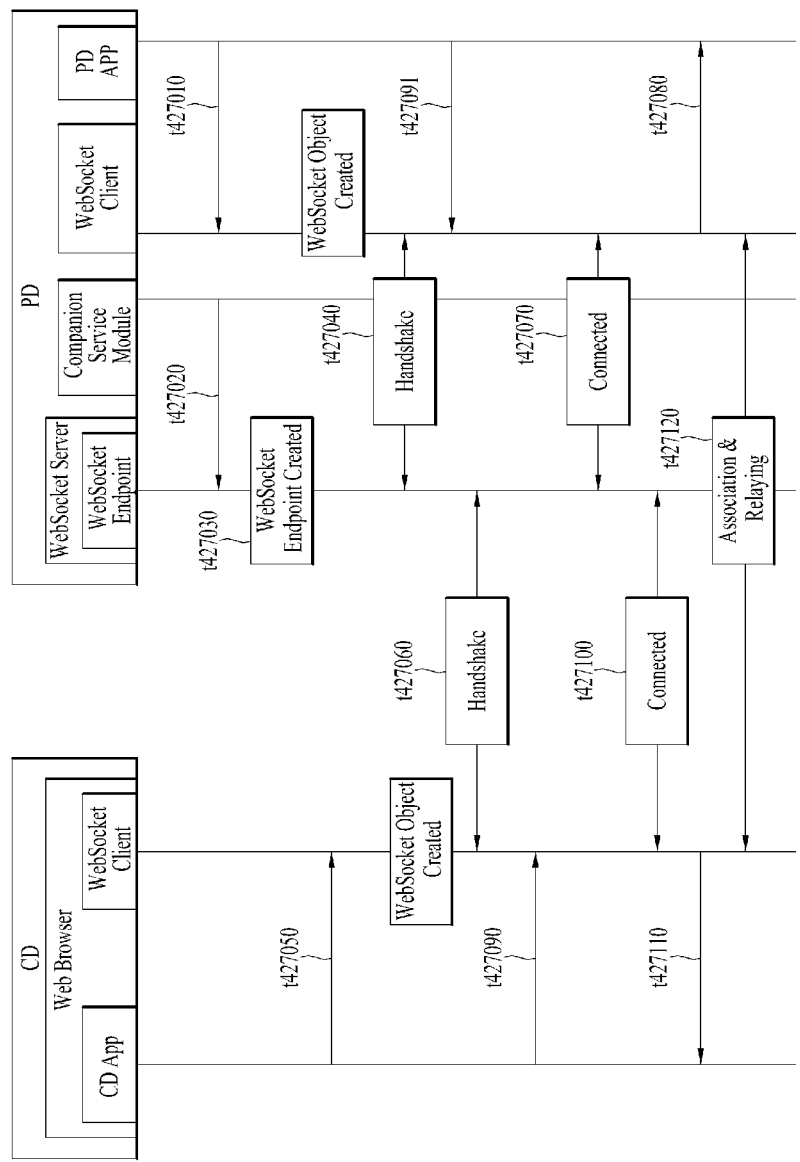
FIG. 94 illustrates a handshake & connection process for Websocket based app-to-app communication (after discovery) according to an embodiment of the present invention.

FIG. 94 illustrates a handshake & connection process for Websocket based app-to-app communication (after discovery) according to an embodiment of the present invention.

In a Websocket based architecture, app-to-app communication can be performed between an application executed in a PD and an application executed in a CD. As described above, when the application of the PD is connected to a Websocket server and the application of the CD is also connected to the Websocket server, the Websocket server can relay messages and data between the applications.

First, the application of the PD may call an API in order to generate a new Websocket object in a Websocket client in the PD. The aforementioned newWebsocket API may be used. For example, the API can be used such as local Websocket=newWebsocket(ws://localhost:8080/App-toApp). In this process, the Websocket object for the application of the PD can be generated.

A companion service module of the PD may call an API from the Websocket server to generate a Websocket endpoint (t427020 and t427030). This process has been described above. In this case, an endpoint for app-to-app communication needs to be generated, and thus a URL (e.g., /App-toApp) related to app-to-app communication can be used as a variable. Thereafter, the local Websocket client of the PD and the Websocket server can perform a handshake process (t427040).

The application of the CD may also generate a Websocket object (t427050). The process for generating the Websocket object is the same as the aforementioned process. In this case, since the Websocket object is a Websocket object for app-to-app communication, the Websocket object can be defined in the form of remote Websocket=newWebsocket (ws://192.168.1.11:8080/ApptoApp). Subsequently, the Websocket server of the PD and the Websocket object of the CD can perform a handshake process (t427060).

The Websocket client of the PD and the Websocket client of the CD may call an API in order to add OpenEventHandler (t427091 and t427090). This process is the same as the aforementioned process. Accordingly, the Websocket clients can be connected to the Websocket server (t427070 and t427100). Upon connection, the Websocket clients can notify the applications of opening of connection through an event (t427080 and t427110).

Upon completion of the aforementioned processes, the application of the CD and the application of the PD can communicate each other (t427120). The applications of both sides can deliver messages to each other through the Websocket server. That is, the Websocket server can relay a message sent from one client to the other client. Such a two-way communication process will be described in detail below.

Figure 95:
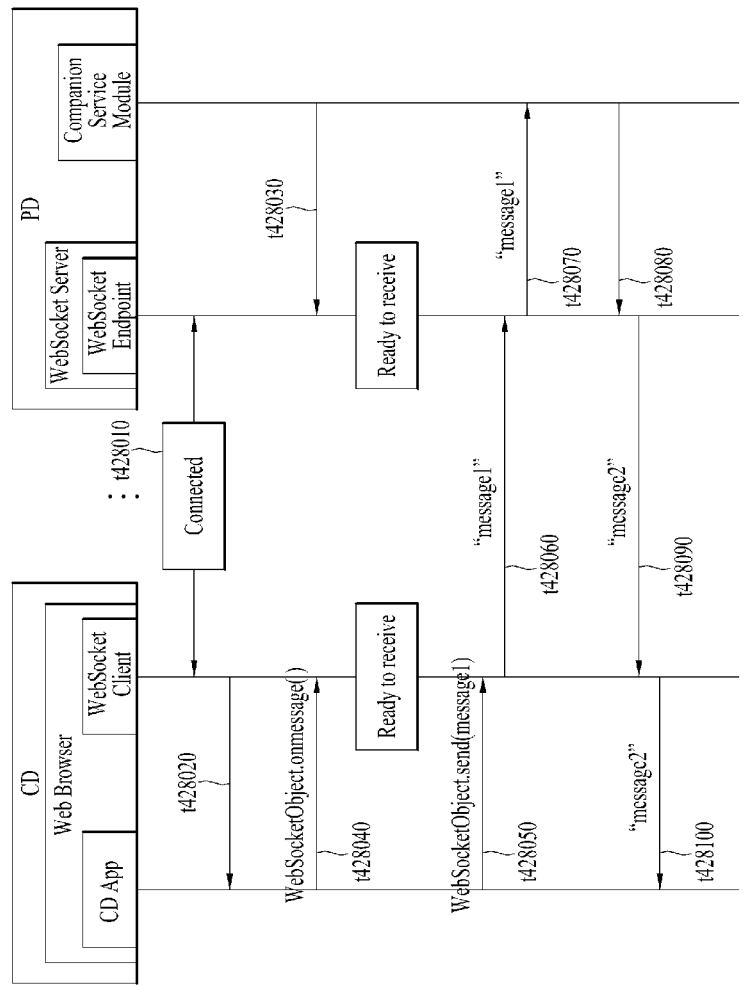
FIG. 95 illustrates a Websocket based two-way communication process (after connection) according to an embodiment of the present invention.

FIG. 95 illustrates a Websocket based two-way communication process (after connection) according to an embodiment of the present invention.

A case in which the application of the CD and the Websocket server of the PD have been connected through the aforementioned processes is assumed (t428010). As described above, the Websocket client can notify the application of the CD of opening of connection (t428020).

The companion service module may call an API in order to receive a message (t428030). For example, an API such as @OnMessage in the Java format can be used. Accordingly, the Websocket server may be ready to receive a message (ready receive).

The application of the CD may call an API for adding MessageEventHandler (t428040). For example, an API such as WebsocketObject.onmessage( ) can be called. In the case of an object such as ex_Websocket in the aforementioned example, an API may be called in the form of ex_Websocket.onmessage( . . . ). Through this process, the Websocket client of the CD may be ready to transmit/receive messages.

The application of the CD may call an API for sending a message (t428050). For example, an API such as WebsocketObject.send(message1) can be called. In the case of an object such as ex_Websocket in the aforementioned example, an API such as ex_Websocket.send(message1) can be called. Accordingly, a message (message 1) can be delivered to the Websocket server (t428060).

The Websocket server may deliver the received message (message 1) to the companion service module (t428070). The companion service module may deliver a message (message 2) in response to the message (message 1) (t428080, t428090 and t428100). The companion service module may call an API for sending the message (t428080). To transmit an object in a text or JSON format, a Java API such as session.getBasicRemote( ).sendText(message2) or session. getBasicRemote( ).sendObject (message2) can be called.

Figure 96:
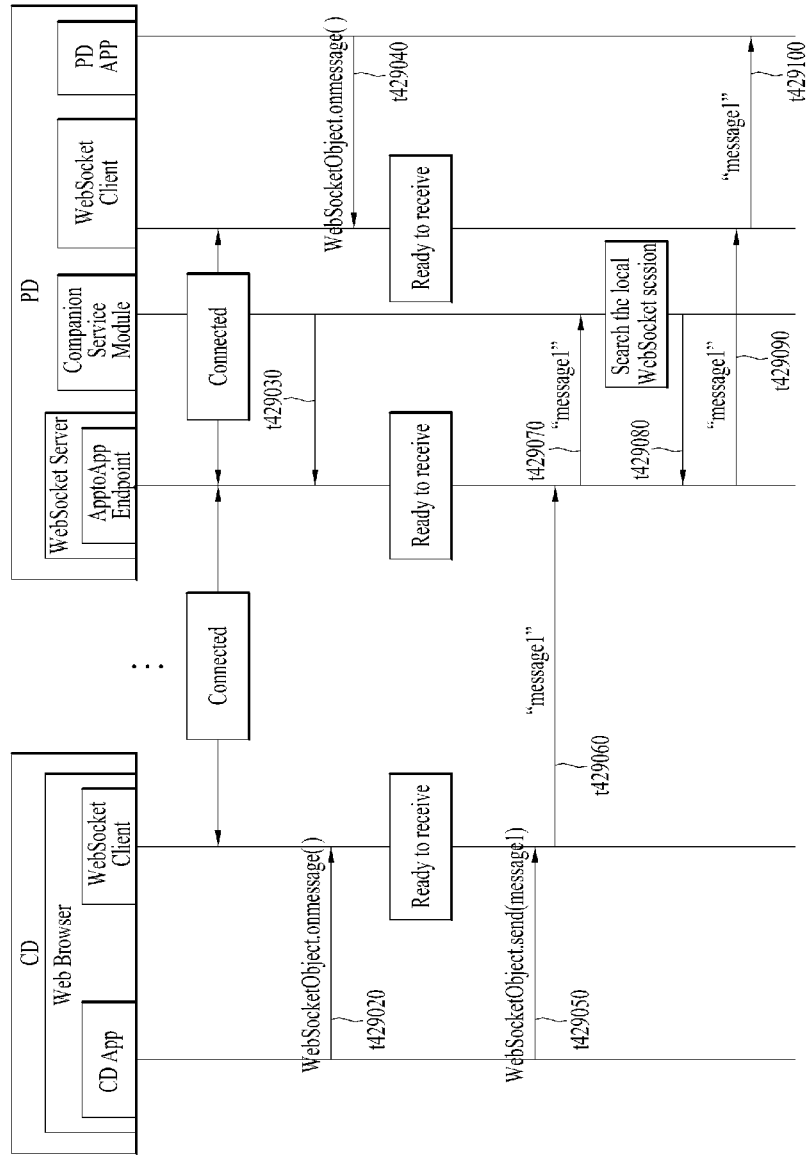
FIG. 96 illustrates a Websocket based app-to-app two-way communication process (after connection/CD to PD) according to an embodiment of the present invention.

FIG. 96 illustrates a Websocket based app-to-app two-way communication process (after connection: CD-to-PD) according to an embodiment of the present invention.

A case in which the application of the CD, the Websocket server of the PD and the application executed in the PD have been connected through the aforementioned processes is assumed. The applications may have received information indicating opening of connection from the Websocket client through an event.

As described above, the companion service module may call an API in order to receive a message and the Websocket server may be ready to receive a message through the API (t429030). The application of the PD may call an API in order to add MessageEventHandler and the Websocket client of the PD may be ready to receive a message (t429040). The application of the CD may call an API such that the Websocket client is ready to receive a message (t429020). The detailed process has been described above.

The application of the CD may call an API in order to send a message (t429050). The API may be the aforementioned API. For example, an API such as remote_Websocket.send (message1) can be used. A message can be delivered to the Websocket server through the API (t429060). The Websocket server can deliver the message (message 1) to the companion service module (t429070).

The companion service module may search for a local Websocket session in order deliver the message to the local Websocket client of the PD. The companion service module may call an API in order to deliver the message (message 1) when the local Websocket session is found (t429080). Here, a Java API such as session.getBasicRemote( ).sendText (message1) or session.getBasicRemote( ).sendObject (message1) can be called in order to transmit an object in a text or JSON format, as described above.

The Websocket server can deliver the message (message 1) to the Websocket client (t429090) and the Websocket client can deliver the message (message 1) to the application of the PD (t429100).

Figure 97:
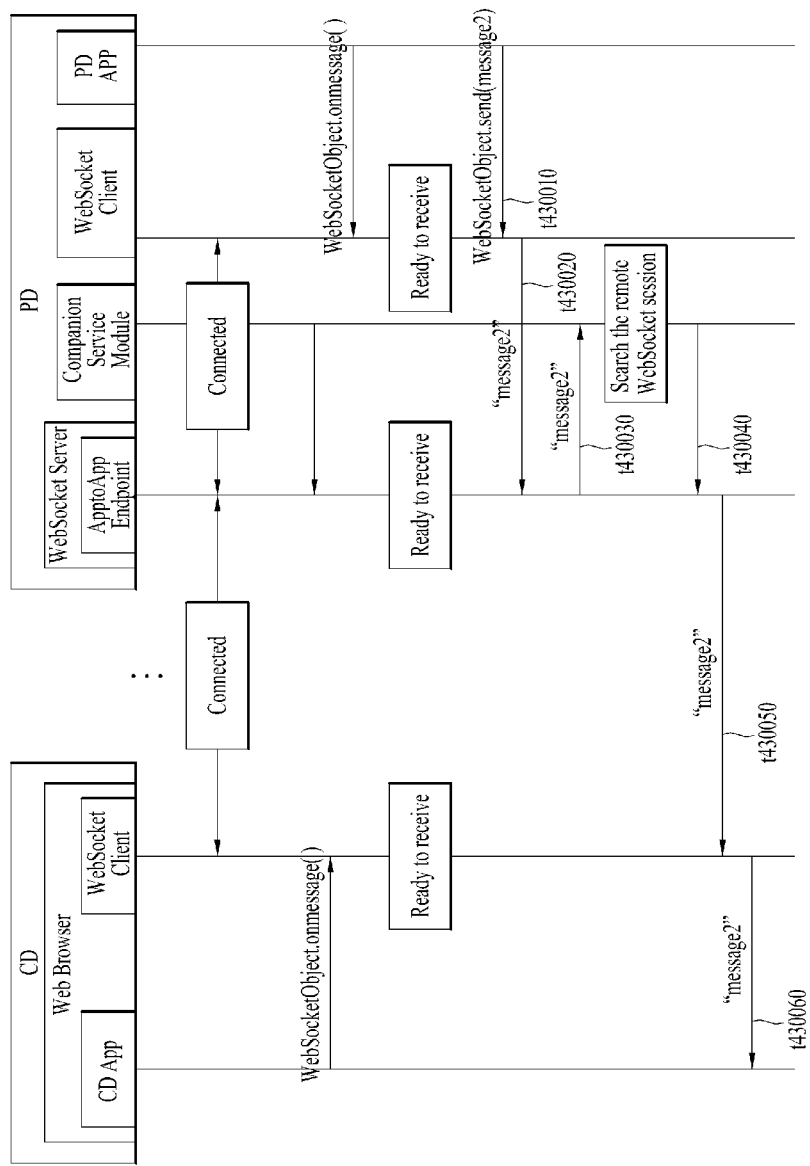
FIG. 97 illustrates a Websocket based app-to-app two-way communication process (after connection/PD to CD) according to an embodiment of the present invention.

FIG. 97 illustrates a Websocket based app-to-app two-way communication process (after connection: PD-to-CD) according to an embodiment of the present invention.

A case in which the application of the CD, the Websocket server of the PD and the application executed in the PD have been connected through the aforementioned processes is assumed. The applications may have received information indicating opening of connection from the Websocket client through an event.

The Websocket server and the Websocket clients may have been ready to transmit/receive messages through the aforementioned processes.

The application of the PD may call an API in order to send a message (t430010). The API may be the aforementioned API. For example, an API such as local Websocket.send (message2) can be used. A message can be delivered to the Websocket server through the API (t430020). The Websocket server can deliver the message (message 2) to the companion service module (t430030).

The companion service module may search for a remote_Websocket session in order deliver the message to a remote_Websocket client of the PD. The companion service module may call an API in order to deliver the message (message 2) when the remote Websocket session is found (t430040). Here, a Java API such as session. getBasicRemote( ).sendText(message2) or session. getBasicRemote( ).sendObject (message2) can be called in order to transmit an object in a text or JSON format, as described above.

The Websocket server can deliver the message (message 2) to the Websocket client (t430050) and the Websocket client can deliver the message (message 2) to the application of the CD (t430060).

Figure 98:
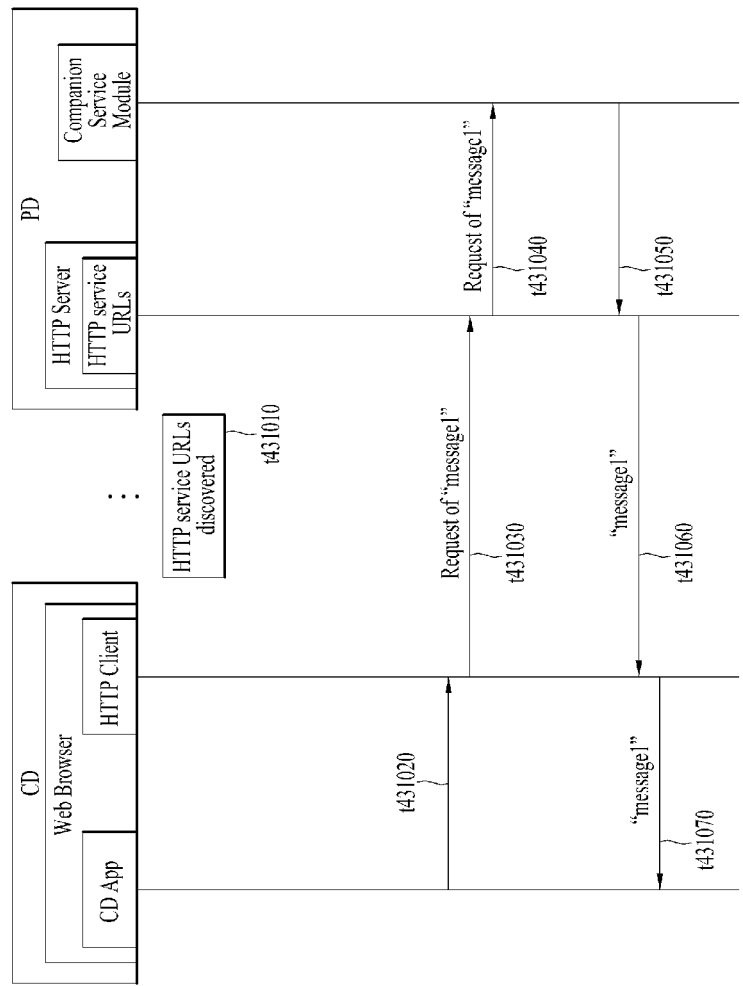
FIG. 98 illustrates an HTTP based request-response process (after discovery) according to an embodiment of the present invention.

FIG. 98 illustrates an HTTP based request-response process (after discovery) according to an embodiment of the present invention.

It is assumed that all HTTP service URLs have been discovered through the above-described discovery process in an HTTP based architecture (t431010).

An application of a CD may call an API and send a request for a message to an HTTP client (t431020). The HTTP client may send the request to an appropriate URL corresponding to the request of the application from among the HTTP service URLs discovered in the discovery process (t431030). Alternatively, the HTTP client may send the request to a companion service URL according to the aforementioned embodiment. In this case, content of the request can be identified through the query term of the request.

An HTTP server may deliver the request to a companion service module in a PD (t431040). The companion service module may call an API in order to deliver the requested message (message1) to the CD (t431050).

The HTTP server may deliver the message (message 1) to the HTTP client (t431060) and the HTTP client may deliver the message to the application of the CD (t431070).

Figure 99:
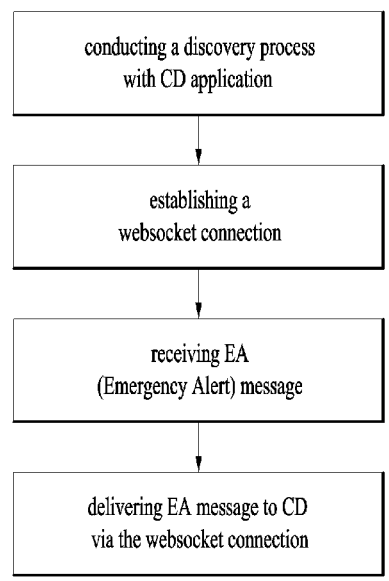
FIG. 99 illustrates a method for providing a broadcast service in a PD according to an embodiment of the present invention.

FIG. 99 illustrates a method for providing a broadcast service by a PD according to an embodiment of the present invention.

The method for providing a broadcast service by the PD according to an embodiment of the present invention may include a step of performing a discovery process with a CD application, a step of establishing Websocket connection, a step of receiving an EA (Emergency Alert) message and/or step of delivering the EA message to a CD through Websocket connection.

First, a companion module of a broadcast reception apparatus which operates as a PD may perform a discovery process with a CD application executed in a companion device (CD). The discovery process has been described above. Here, it is assumed that the CD application is not launched by the PD. The CD may multicast an M-SEARCH message. Upon reception of the M-SEARCH message, the PD may reply to the message with a 200 OK message. The header of the 200 OK message may include a location URL of the PD.

The CD application may send a request for device description to the location URL. The request may be performed using the HTTP GET method. Upon reception of the request, the PD or the companion module of the PD may transmit a first response message to the CD application. Here, the first response message may include a first URL in the header thereof. The first URL may be used as an endpoint of a web server provided by the PD. Here, the endpoint of the web server may refer to a service URL provided by the web server. The first URL may correspond to a companion service URL used in the aforementioned HTTP based architectures. There may be service URLs depending on functions according to an embodiment. In such a case, the first URL may be one of multiple HTTP service URLs.

The companion module of the PD may receive an application information request from the CD application. The CD application may send the application information request to the first URL. The companion module may transmit a second response message in response to the application information request. The second response message may include the second URL in a response message body. The second URL may be used as an endpoint of a Websocket server provided by the PD. Here, the second URL which is address information of the corresponding Websocket endpoint may be a companion Websocket endpoint or an app-to-app Websocket endpoint.

The present embodiment may correspond to the aforementioned embodiment in which an HTTP based web server and a Websocket based Websocket server are provided by the PD. Specifically, the present embodiment may correspond to the embodiment from among the aforementioned embodiments, in which only one companion service URL is provided as an HTTP service URL and one companion endpoint and one app-top-app endpoint are provided as Websocket server endpoints. Here, the Websocket companion endpoint may be an endpoint providing functions other than the app-to-app communication function. Communication between the PD and the CD may be performed by a web server (HTTP) or a Websocket server depending on functions. For example, ESG delivery may be performed by the web server and service & content identification, EA (Emergency Alert) message delivery and media playback information delivery may be performed by the Websocket server. Media timeline information may be delivered through the web server and/or the Websocket server.

Subsequently, the companion module of the PD may establish Websocket connection between the Websocket server and the CD application. In this process, the second URL may be used. The method of establishing Websocket connection (session) has been described above in detail. Here, the Websocket connection may be Websocket connection for connecting a PD application and a CD application for app-to-app communication or Websocket connection for exchanging information between the PD and the CD application.

A reception module of the PD may receive an EA message including EA information over a broadcast network or a broadband network. The reception module may be one of a tuner that receives data through a broadcast network and a network interface that receives data over broadband or may include both the tuner and the network interface. The EA message may refer to a message including EA information for announcing an emergency situation. This has been described above.

The Websocket server of the PD may deliver the received EA message to the CD through Websocket connection. The delivery process will be described below in detail. Here, the Websocket server may refer to a hardware module or a processor that performs operation corresponding to the aforementioned Websocket server.

In a method for providing a broadcast service by a PD according to another embodiment of the present invention, the step of delivering the EA message to the CD may further include a step of executing a PD application for processing EA information, a step of executing an EA application of the CD by the PD application and/or a step of delivering the EA message from the PD application to the EA application of the CD through Websocket connection.

When the EA message is received, an internal control module of the PD may execute an application of the PD related to the EA message. The application of the PD may render the EA message and manage a process of delivering the EA message to the CD. The application of the PD may execute the EA application in the CD. The EA application may be an application having a function of rendering and processing the EA message in the CD. When the EA application is executed in the CD, app-to-app Websocket connection may be established between the EA application and the application of the PD. This process has been described above. The application of the PD may deliver the received EA message to the EA application. The EA application may render and process the EA message in the CD.

In a method for providing a broadcast service by a PD according to another embodiment of the present invention, the EA message may include ID information for identifying the EA message, expiration time information indicating a time at which the EA message expires and/or category information indicating a type of an emergency alert indicated by the EA message. Information that can be included in the EA message has been described above.

A method for providing a broadcast service by a PD according to another embodiment of the present invention may further include a step in which the CD application requests timeline information using the HTTP GET method and/or a step in which the PD delivers an HTTP response message to the CD application. The aforementioned web server of the PD may be requested to provide the timeline information. Here, the timeline information may refer to information about a media timeline of a broadcast service being provided by the PD. The web server of the PD transmits the response message to the request to the CD application. The response message may include UTC information and media time information in a pair. The UTC information may refer to absolute time information which is current UTC time information and the media time information may refer to media time information at the UTC time.

A method for providing a broadcast service by a PD according to another embodiment of the present invention may further include a step in which the CD application requests a service identification message from the Websocket server of the PD and/or a step in which the Websocket server delivers the service identification message to the CD application. The request and a response thereto may be performed through Websocket connection. Here, the PD may deliver the service identification message to the CD application through notification without a request of the CD application according to an embodiment. The service identification message may include at least one piece of service related information or at least one piece of content related information acquired from electronic service guide (ESG) data. Service related information may be included in the service identification message in the form of a service element and content related information may be included in the service identification message in the form of a content element.

In a method for providing a broadcast service by a PD according to another embodiment of the present invention, the service identification message may include component information and/or content item information related to each piece of content. The content element of the service identification message may include component elements that describe components included in the corresponding content and/or content item elements that describe files/data related to the corresponding content. Here, content may correspond to a program of the corresponding broadcast service (channel).

Here, the component information may include information about components having continuous and presentable data of the corresponding content. For example, the components may correspond to an audio component, a video component, a closed caption component, etc. In addition, each piece of component information may include URL information for accessing the corresponding component. The URL information may be service URL information of the PD or URL information of a server provided by a service provider.

The content item information may include information about additional data components of the corresponding content. Here, additional data components may refer to data such as the aforementioned app-based enhancement components or applications, and signaling information related to applications. In addition, each piece of content item information may include URL information for accessing the corresponding data. The URL information may be service URL information of the PD or URL information of a server provided by the service provider.

In a method for providing a broadcast service by a PD according to another embodiment of the present invention, URL information for accessing an additional data component may be used to acquire data for providing app-based enhancement for a broadcast service.

A method for providing a broadcast service by a CD according to an embodiment of the present invention will be described. This method is not shown in the drawings.

The method for providing a broadcast service by a CD according to an embodiment of the present invention may include a step in which a launcher of the CD executes an application of the CD, a step in which the application of the CD performs a discovery process with a PD using a network interface of the CD, a step in which the application of the CD establishes Websocket connection with a Websocket server of the PD using a Websocket client of the CD and/or a step in which the application of the CD receives an EA message using the Websocket client of the CD. The discovery process between the CD application and the PD may be performed by a companion module of the CD. The CD application may send a device description request using the companion module, send an application information request to the aforementioned first URL and acquire a response to the requests. In addition, an EA application of the CD may be executed by a PD application to perform app-to-app communication through Websocket connection. The EA application may receive an EA message through the app-to-app communication.

Methods for providing a broadcast service by a CD according to embodiments of the present invention may correspond to the above-described method for providing a broadcast service by a PD according to embodiments of the present invention. Methods for providing a broadcast service by a CD may be performed by hardware modules corresponding to modules (e.g., the companion module, the reception module, the internal control module, the web server and the Websocket server) used in the methods for providing a broadcast service by a PD. Methods for providing a broadcast service by a CD may have embodiments corresponding to the above-described embodiments of the method for providing a broadcast service by a PD.

The aforementioned steps may be omitted or replaced by other steps performing similar/identical operations according to embodiments.

Figure 100:
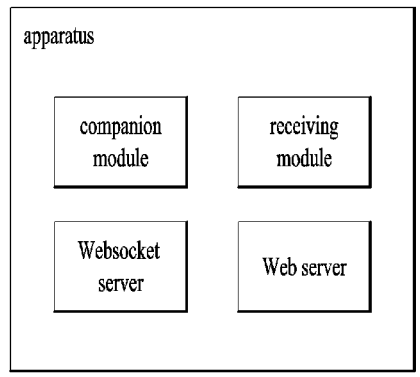
FIG. 100 illustrates a broadcast reception apparatus operating as a PD according to an embodiment of the present invention.

FIG. 100 illustrates a broadcast reception apparatus operating as a PD according to an embodiment of the present invention.

The broadcast reception apparatus operating as a PD according to an embodiment of the present invention may include the aforementioned companion module, reception module, internal control module, web server and/or Websocket server. The blocks and modules have been described above. Here, the web server/Websocket server may refer to hardware modules or processors that perform operations corresponding to the aforementioned web server/Websocket server.

The broadcast reception apparatus operating as a PD according to an embodiment of the present invention and internal modules/blocks thereof may perform the aforementioned embodiments of the methods for providing a broadcast service by a PD.

An apparatus operating as a CD according to an embodiment of the present invention will be described. This apparatus is not shown in the drawings.

The apparatus operating as a CD according to an embodiment of the present invention may include the aforementioned launcher, companion module and/or network interface. The blocks and modules have been described above.

The apparatus operating as a CD according to an embodiment of the present invention and internal modules/blocks thereof may perform the aforementioned embodiments of the methods for providing a broadcast service by a CD.

The internal blocks/modules of the aforementioned apparatus may be processors that perform continuous processes stored in a memory and may be hardware elements provided inside/outside the apparatus according to an embodiment.

The aforementioned modules may be omitted or replaced by other modules performing similar/identical operations according to embodiments.

FIG. 101 illustrates conversion of an ESGData state variable in XML format into an ESGData state variable in JSON format according to another embodiment of the present invention.

The broadcast reception apparatus according to an embodiment of the present invention may employ various protocols such as HTTP (Hypertext Transfer Protocol), RTP (Real-time Transport Protocol), XMPP (Extensible Messaging and Presence Protocol), FTP (File Transfer Protocol) and Websocket in order to deliver messages including various types of information (e.g., ESG data) used for communication between devices for various purposes.

When the broadcast reception apparatus according to an embodiment of the present invention delivers a message used for communication between devices through the various protocols, the broadcast reception apparatus may deliver data in various types (e.g., a string, an integer, a floating point, Boolean, a character, an array, a list, etc.) defined in the protocols. To more structurally represent, deliver and store complex data, the broadcast reception apparatus may use Markup formats such as XML (Extensible Markup Language), HTML (Hypertext Markup Language), XHTML (Extensible Hypertext Markup Language) and JSON (JavaScript Object Notation) or text and image format. The formats employed by the broadcast reception apparatus are not limited to a specific format.

A description will be given of a method for delivering a message (e.g., a state variable) including ESG data by the broadcast reception apparatus to a companion device using the Websocket protocol. In this case, the broadcast reception apparatus may convert an ESGData state variable including ESG data into an ESGData state variable in the JSON format and deliver the ESGData state variable in the JSON format to a companion screen device using the Websocket protocol.

FIG. (a) illustrates an embodiment in which ESG data is set to the ESGData state variable in XML (or XML data structure). The ESGData state variable has been described above in detail.

Referring to FIG. (b), the ESGData state variable in XML of FIG. (a) can be converted into the ESGData state variable in the JSON format. Details of the ESGData state variable in the JSON format are the same as details of the ESGData state variable in XML.

In this manner, any data in XML (XML data structure) can be converted into data in JSON format. Data in JSON format may be referred to as a JSON object. The JSON object may be delivered from the broadcast reception apparatus (e.g., a primary device) to a companion device through the Websocket protocol.

Figure 102:
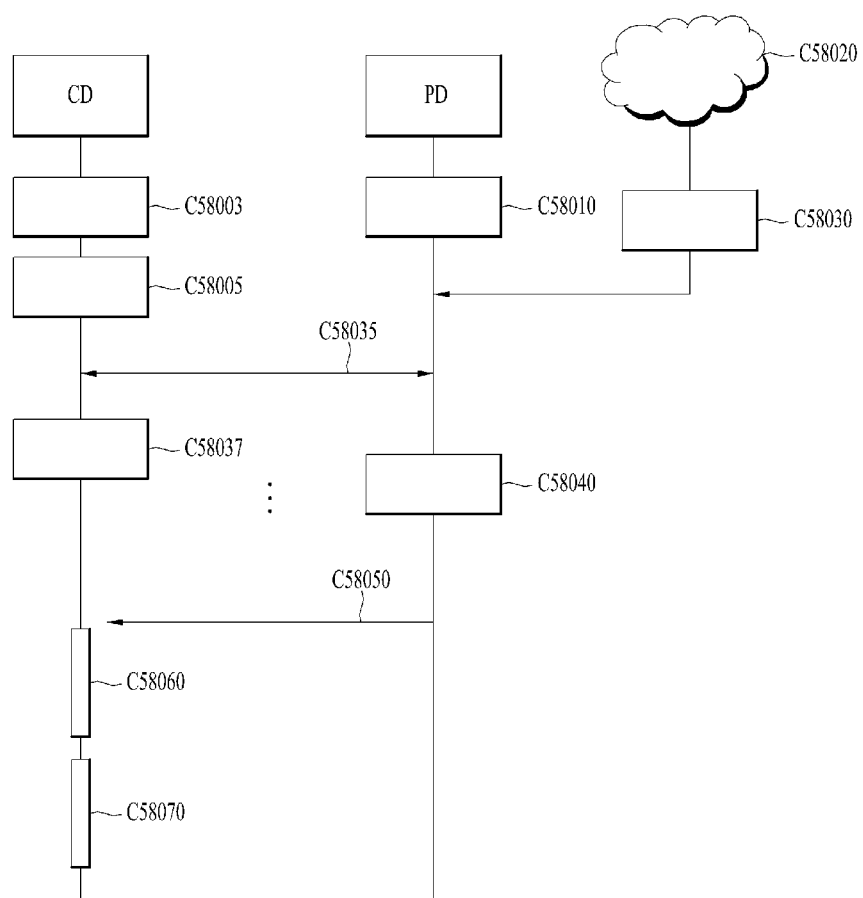
FIG. 102 illustrates a process of delivering the ESGData state variable in JSON format to a companion device using a Websocket protocol according to another embodiment of the present invention.

FIG. 102 illustrates a process for delivering the ESGData state variable in JSON format to a companion device using WetSocket protocol according to another embodiment of the present invention.

The illustrated CD may refer to a companion device and the illustrated PD (Primary Device) may refer to a receiver or a broadcast reception apparatus.

The CD may generate a Websocket object by calling a Websocket API using the following syntax (C58003).

[Construct Websocket Object]
Websocketobjectname=new Websocket(Websocket address)
Ex) WS_ESG=new Websocket("ws://Tvhost:8080/ESG-Server")

Here, the name of the generated Websocket object may be "WS_ESG", the called Websocket API may be "new Websocket" for generating a new Websocket, and the address of the Websocket server may be "ws://Tvhost:8080/ESG-Server".

Then, the companion device may open Websocket connection by calling a Websocket API using the following syntax (C58005).

[Open a Websocket connection]
Ex) WS_ESG.onopen=function {~~~}

Here, "WS_ESG.onopen" may be an open event handler for opening Websocket. "function {~~~}" may be a Websocket API opening Websocket connection.

In this state (C58010), the ESGData state variable of the broadcast reception apparatus may not have any value.

A service/content provider may transmit ESG data over a broadcast network or a broadband channel (C58020). The ESG data may be received through a reception unit or a network interface of the broadcast reception apparatus. Here, the reception unit may be the aforementioned broadcast interface or tuner.

The broadcast reception apparatus may signal the received ESD data (C58030).

Then, the broadcast reception apparatus and the companion device may open Websocket connection (C58035).

The method of opening Websocket connection has been described above. For example, an application processor (not shown) included in the broadcast reception apparatus may send a request for connection with the companion device to a network processor (not shown). Then, the network processor may receive the connection request from the companion device. The network processor may search for a matching connection request of the application processor on the basis of information received from the companion device. The network processor may connect the companion device with the application processor of the broadcast reception apparatus when the matching connection request is found. Here, the application processor may be an application module or an application browser. The network processor may be a Websocket server.

When Websocket connection between the broadcast reception apparatus and the companion device is open, the broadcast reception apparatus and the companion device switch to a state in which they can transmit and/or receive messages.

Then, the companion device may transmit/receive various messages to/from the broadcast reception apparatus using the following event handler (C58037).

For example, the event handler may include a Message Event Handler, an Error Event Handler and/or a Close Event Handler.

Here, the Message Event Handler is an event handler for transmitting and/or receiving messages between the broadcast reception apparatus and the companion screen and a syntax therefor is as follows.

[Message Event Handler]
EX) WS_ESG.onmessage=function {~~~}

Here, the Error Event Handler is an event handler for transmitting and/or receiving messages related to errors in Websocket connection, the broadcast reception apparatus and/or the companion device and a syntax therefor is as follows.

[Error Event Handler]
EX) WS_ESG.onerror=function {~~~}

Here, the Close Event Handler is an event handler for closing Websocket connection and a syntax therefor is as follows.

[Close Event Handler]
EX) WS_ESG.onclose=function {~~~}

Thereafter, the broadcast reception apparatus may store (or set) the ESG data in the ESGData state variable (C58040).

For example, the ESGData state variable may be in XML or JSON format.

When the broadcast reception apparatus initially sets the ESG data in the ESGData state variable in XML, the broadcast reception apparatus may convert the state variable in XML into a state variable in the JSON format.

Then, the broadcast reception apparatus may deliver the JSON object of the ESGData state variable to the companion device through the Websocket protocol (C58050).

Upon reception of the ESGData state variable, the companion device may parse the ESGData state variable (C58060) and then expose the ESG data through a UI according to the parsed value (C56070).

Here, to show the ESG data to a user, the companion device may represent the UI at a native level or represent the same in an application.

The companion device may represent the ESG data in various manners according to various embodiments. When the ESG data is received, the companion device may immediately expose the ESG data in any form to the user according to an embodiment. In another embodiment, when the ESG data is received, the companion device may send a notification message to the user and expose the ESG data when the user executes the corresponding application. In another embodiment, when the ESG data is received, the companion device has the ESG data in the background and exposes the ESG data to the user when the user directly executes an application for seeing the ESG data.

Figure 103:
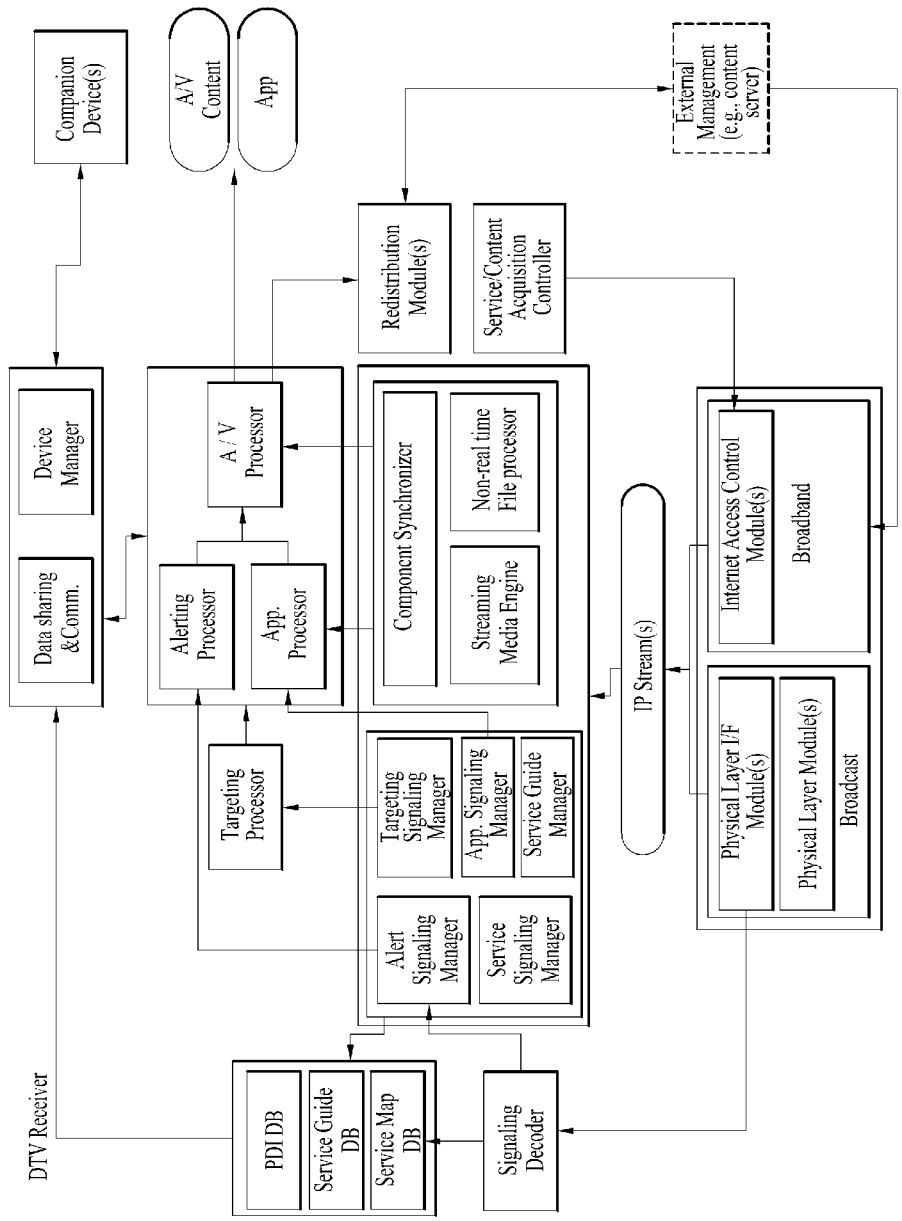
FIG. 103 illustrates a hybrid broadcast reception device according to an embodiment of the present invention.

FIG. 103 illustrates a hybrid broadcast reception device according to an embodiment of the present invention. The hybrid broadcast system may transmit a broadcast signal in conjunction with a terrestrial broadcast network and an Internet network. The hybrid broadcast reception device may receive a broadcast signal through a terrestrial broadcast network (broadcast) and an Internet network (broadband). The hybrid broadcast reception device may include a physical layer module, a physical layer I/F module, a service/content acquisition controller, an Internet access control module, a signaling decoder, a service signaling manager, a service guide manager, an App signaling manager, an alert signal manager, an alert signal parser, a targeting signal parser, a streaming media engine, a non-real-time file processor, a component synchronizer, a targeting processor, an application processor, an A/V processor, a device manager, a data sharing and communication unit, a redistribution module, a companion device and/or an external module.

The physical layer module(s) may receive and process broadcast-related signals through a terrestrial broadcast channel, convert the same into appropriate forms, and transmit the converted signals to the physical layer I/F module.

The physical layer I/F module(s) may acquire IP datagrams from the information obtained from the physical layer module. In addition, the physical layer I/F module may convert the acquired IP datagram or the like into a specific frame (for example, RS frame, GSE).

The service/content acquisition controller may perform control operations for acquiring services, content and signaling data associated therewith over a broadcast and/or broadband channel.

The Internet access control module(s) may control receiver operations to acquire services, content, and the like over a broadband channel.

The signaling decoder may decode the signaling information acquired over a broadcast channel or the like.

The service signaling manager may extract, parse, and manage signaling information related to service scan and services/content from the IP datagram and the like.

The service guide manager may extract announcement information from IP datagrams, manage an SG (Service Guide) database, and provide a service guide.

The App signaling manager may extract, parse, and manage signaling information related to application acquisition and the like from IP datagrams and the like.

The alert signal parser may extract, parse, and manage alerting related signaling information from IP datagrams and the like.

The targeting signal parser may extract, parse, and manage signaling information related to service/content personalization or targeting from IP datagrams and the like. The targeting signal parser may also deliver the parsed signaling information to the targeting processor.

The streaming media engine may extract and decode audio/video data for A/V streaming from IP datagrams and the like.

The non-real time file processor may extract, decode, and manage NRT data and file type data such as applications from IP datagrams and the like.

The component synchronizer may synchronize services and content such as streaming audio/video data and NRT data.

The targeting processor may process operations related to personalization of the service/content based on the targeting signaling data received from the targeting signal parser.

The application processor (App processor) may process application-related information, the status of a downloaded application and display parameters.

The A/V processor may perform audio/video rendering related operations based on decoded audio and video data, application data, and the like.

The device manager may perform connection and data exchange with an external device. The device manager may also perform management of external devices such as addition/deletion/update of operatively connectable external devices.

The data sharing and communication unit (Data Sharing & Comm.) may process information related to data transmission and exchange between the hybrid broadcast receiver and an external device.

Here, the data that may be transmitted and exchanged may be signaling, A/V data, and the like.

The redistribution module(s) may acquire related information about the next generation broadcast service and content when the broadcast receiver cannot directly receive the terrestrial broadcast signal. The redistribution module may also support acquisition of broadcast services and content by the next generation broadcast system when the broadcast receiver cannot directly receive the terrestrial broadcast signal.

The companion device(s) may be coupled to the broadcast receiver of the present invention to share audio, video, or signaling-containing data. The companion device may refer to an external device connected to the broadcast receiver.

An external management module (External Management) may refer to a module for providing broadcast service/content, for example, a next generation broadcast service/content server. The external module may refer to an external device connected to the broadcast receiver.

Figure 104:
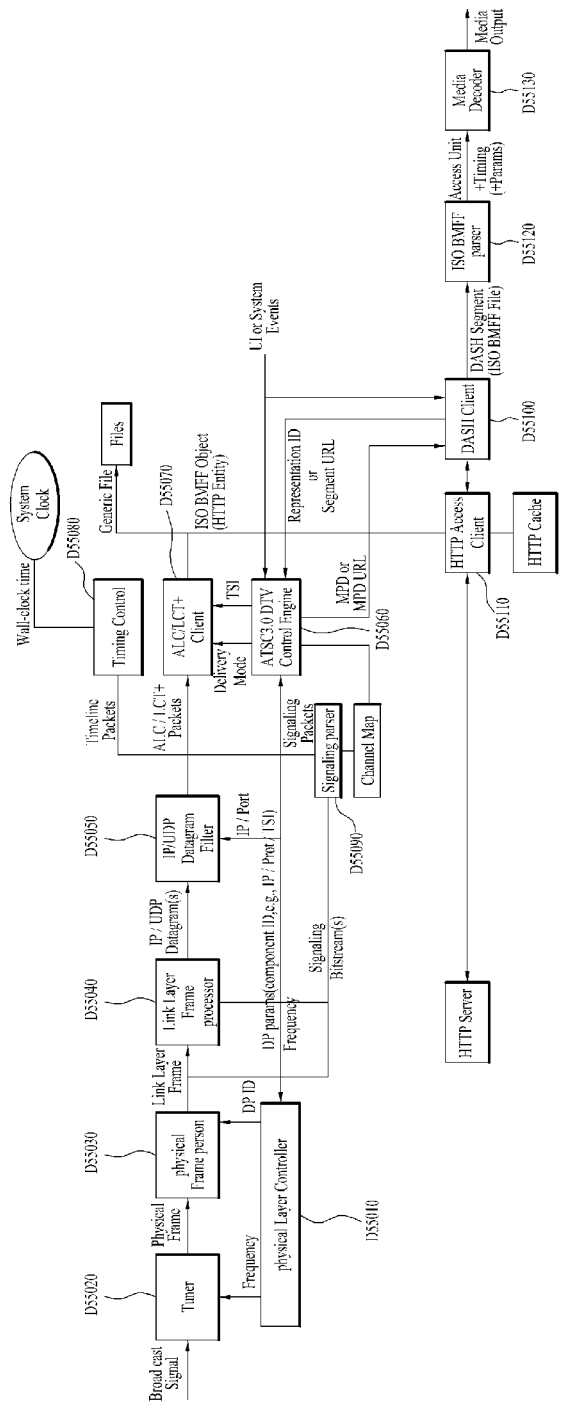
FIG. 104 is a block diagram illustrating a hybrid broadcast receiver according to an embodiment of the present invention.

FIG. 104 is a block diagram illustrating a hybrid broadcast receiver according to an embodiment of the present invention.

The hybrid broadcast receiver may receive the hybrid broadcast service through operative connection of terrestrial broadcast and broadband in the DTV service of the next generation broadcast system. The hybrid broadcast receiver may receive broadcast audio/video (A/V) content transmitted through a terrestrial broadcast and receive part of enhancement data or broadcast A/V content associated therewith in real time through broadband. In this specification, the broadcast audio/video (A/V) content may be referred to as media content.

The hybrid broadcast receiver may include a physical layer controller D55010, a tuner D55020, a physical frame parser D55030, a link layer frame parser D55040, an IP/UDP datagram filter D55050, an ATSC 3.0 DTV (Digital Television) Control Engine D55060, an ALC/LCT+ Client D55070, a timing control D55080, a signaling parser D55090, a DASH (Dynamic Adaptive Streaming over HTTP) client D55100, an HTTP access client D55110, an ISO BMFF parser D55120, and/or a media decoder D55130. The physical layer controller D55010 may control operations of the tuner D55020, the physical frame parser D55030, and the like using radio frequency (RF) information about a terrestrial broadcast channel to be received by the hybrid broadcast receiver.

The tuner D55020 may receive and process broadcast related signals through a terrestrial broadcast channel and convert the same into an appropriate form. For example, the tuner D55020 may convert a received terrestrial broadcast signal into a physical frame.

The physical frame parser D55030 may parse the received physical frame and acquire a link layer frame through related processing.

The link layer parser D55040 may acquire link layer signaling from the link layer frame or perform related operations to acquire an IP/UDP datagram or an MPEG-2 TS. The link layer parser D55040 may output at least one IP/UDP datagram or the like.

The IP/UDP datagram filter D55050 may filter a specific IP/UDP datagram from at least one received IP/UDP datagram or the like. That is, the IP/UDP datagram filter D55050 may selectively filter an IP/UDP datagram selected by the ATSC 3.0 DTV control engine D55060 among the at least one IP/UDP datagram output from the link layer parser D55040. The IP/UDP datagram filter D55050 may output an application layer transport protocol packet such as ALC/LCT+.

The ATSC 3.0 DTV control engine D55060 may serve as an interface between modules included in each hybrid broadcast receiver. The ATSC 3.0 DTV control engine D55060 may also provide necessary parameters for each module, thereby controlling the operation of each module. In the present invention, the ATSC 3.0 DTV control engine D55060 may deliver a media presentation description (MPD) and/or an MPD URL to the DASH client D55100. In the present invention, the ATSC 3.0 digital television control engine D55060 may also deliver a delivery mode and/or a transport session identifier (TSI) to the ALC/LCT+ client D55070. Here, TSI may represent the identifier of a session for transmitting a transport packet including a signaling message such as MPD or MPD URL related signaling, for example, the identifier of a FLUTE session or an ALC/LCT+ session, which is an application layer transmission protocol. The TSI may correspond to the Asset id of MMT.

The ALC/LCT+ client D55070 may process application layer transport protocol packets such as ALC/LCT+, and collect and process a plurality of packets to create one or more ISO Base Media File Format (ISOBMFF) objects. The application layer transport protocol packets may include ALC/LCT packets, ALC/LCT+ packets, ROUTE packets, and/or MMTP packets.

The timing control D55080 may process a packet including system time information to control the system clock.

The signaling parser D55090 may acquire and parse DTV broadcast service related signaling, and generate and manage a channel map and the like based on the parsed signaling. In the present invention, the signaling parser may parse the extended MPD or MPD related information from the signaling information.

The DASH client D55100 may perform operations related to real-time streaming or adaptive streaming. The DASH client D55100 may receive DASH content from the HTTP server through the HTTP access client D55110. The DASH client D55100 may process the received DASH segment and output an ISO Base Media File Format object. In the present invention, the DASH client D55100 may deliver a Fully Qualified Representation ID or a segment URL to the ATSC 3.0 DTV control engine D55060. Here, the Fully Qualified Representation ID may refer to an ID that combines, for example, the MPD URL, period@id, and representation@id. The DASH client D55100 may also receive the MPD or MPD URL from the ATSC 3.0 DTV control engine D55060. The DASH client D55100 may receive a desired media stream or DASH segment from the HTTP server using the received MPD or MPD URL. In this specification, the DASH client D55100 may be referred to as a processor.

The HTTP access client D55110 may make a request for specific information to the HTTP server, and may receive and process a response from the HTTP server. Here, the HTTP server may process the request received from the HTTP access client and provide a response thereto.

The ISO BMFF parser D55120 may extract audio/video data from the ISO Base Media File Format object.

The media decoder D55130 may decode the received audio and/or video data and perform processing to present the decoded audio/video data.

The hybrid broadcast receiver of the present invention is required to extend or modify the MPD in order to provide the hybrid broadcast service through operative connection between the terrestrial broadcast network and the broadband. The terrestrial broadcast system may transmit the extended or modified MPD, and the hybrid broadcast receiver may receive the broadcast or broadband content using the extended or modified MPD. That is, the hybrid broadcast receiver may receive the extended or modified MPD through terrestrial broadcasting and receive content via terrestrial broadcasting or broadband based on MPD. The following describes elements and attributes that should be additionally included in the extended or modified MPD compared to the existing MPD. In the following description, the extended or modified MPD may be referred to as an MPD.

The MPD may be extended or modified to represent ATSC 3.0 services. An extended or modified MPD may additionally include MPD@anchorPresentationTime, Common@presentable, Common.Targeting, Common.TargetDevice and/or Common@associatedTo.

MPD@anchorPresentationTime may represent the presentation time anchor of segments included in the MPD, that is, a base time. Hereinafter, MPD@anchorPresentationTime may be used as an effective time of the MPD.

MPD@anchorPresentationTime may represent the earliest playback point in time among the segments included in the MPD.

The MPD may further include common attributes and elements. The common attributes and elements may be applied to the AdaptionSet, Representation, SubRepresentation, and the like in the MPD. Common@presentable may indicate that the media described by MPD is a presentable component.

Common.Targeting may indicate the targeting properties and/or personalization properties of the media described by the MPD.

Common.TargetDevice may represent a target device or target devices of the media described by the MPD.

Common@associatedTo may represent an adaptationSet and/or representation associated with the media described by the MPD.

In addition, the MPD@id, Period@id, and AdaptationSet@id included in the MPD may be required to specify the media content described by the MPD. In other words, the DASH client may specify the content to be received as MPD@id, Period@id, and AdaptationSet@id based on the MPD and deliver the same to the ATSC 3.0 DTV control engine. The ATSC 3.0 DTV control engine may receive the content and deliver the same to the DASH client.

Figure 105:
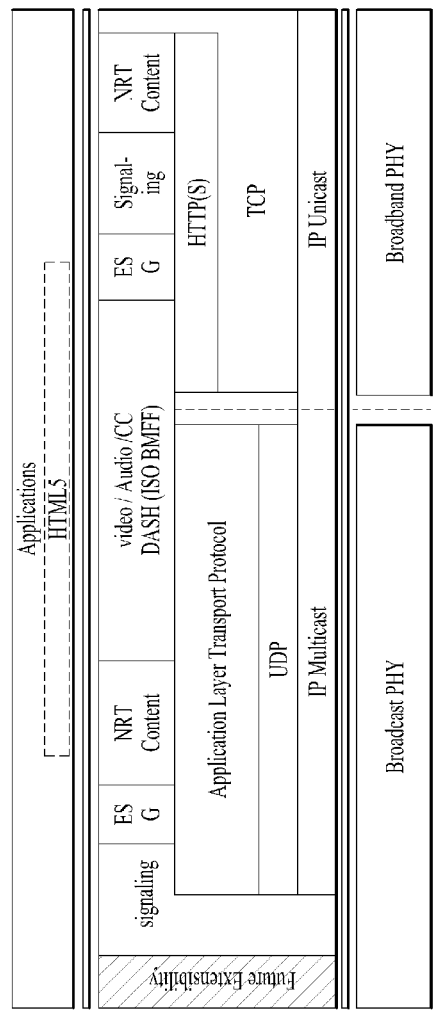
FIG. 105 shows a protocol stack of a next generation hybrid broadcast system according to an embodiment of the present invention.

FIG. 105 shows a protocol stack of a next generation hybrid broadcast system according to an embodiment of the present invention.

As shown in the figure, a next generation broadcast system supporting IP-based hybrid broadcasting may encapsulate audio or video data of a broadcast service in an ISO Base Media File Format (hereinafter referred to as ISO BMFF). Here, the encapsulation may be in the form of a DASH segment or an MPU (Media Processing Unit) of MMT. In addition, the next generation broadcast system may transmit encapsulated data over the broadcast network and the Internet network equally or differently according to the properties of each transmission network. The next generation broadcast system may also transmit the encapsulated data using at least one of broadcast or broadband. In case of broadcast network, the broadcast system may transmit data encapsulated in ISO Base Media File (ISO BMFF) through an application layer transport protocol packet supporting real time object transmission. For example, the broadcast system may encapsulate the data with Real-Time Object Delivery over Unidirectional Transport (ROUTE) or MMTP transport packet. Then, the broadcast system may generate an IP/UDP datagram from the encapsulated data, and transmit the same through a broadcast signal. When broadband is used, the broadcast system may transmit the encapsulated data to the receiving side based on a streaming technique such as DASH.

In addition, the broadcast system may transmit the signaling information of the broadcast service in the following manner. In the case of a broadcast network using broadcasting, the broadcast system may transmit signaling information through the physical layer of the next generation broadcast transmission system and the broadcast network according to the attribute of the signaling. Here, the broadcast system may transmit signaling information through a specific data pipe (DP) of a transport frame included in the broadcast signal. The broadcast signaling may be encapsulated in a bit stream or an IP/UDP datagram. When using broadband, the broadcast system may return signaling data in response to the request of the receiver.

In addition, the broadcast system may transmit the ESG or NRT content of the broadcast service in the following manner. In the case of a broadcast network, the broadcast system may encapsulate ESG or NRT content in an application layer transport protocol packet, for example, Real-Time Object Delivery over Unidirectional Transport (ROUTE), MMTP transport packet, or the like. Then, the broadcast system may generate an IP/UDP datagram from the encapsulated ESG or NRT content and transmit the same through a broadcast signal. When using broadband, the broadcast system may return the ESG or NRT content in response to the request of the receiver.

Figure 106:
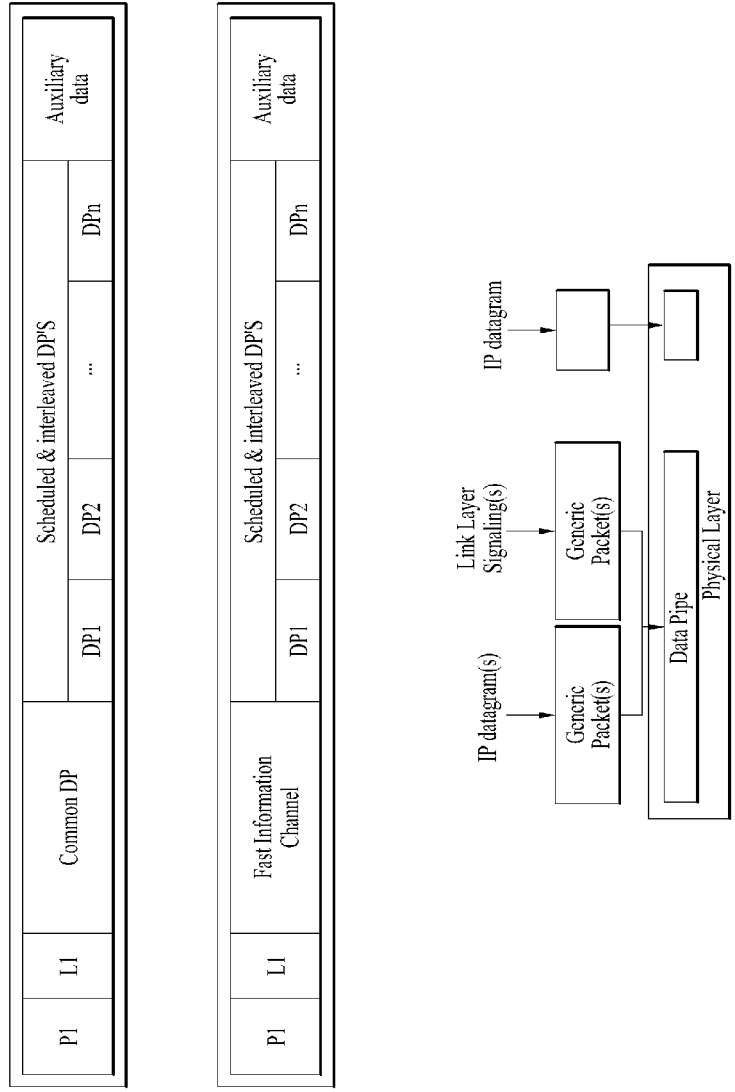
FIG. 106 shows a structure of a transport frame transmitted to a physical layer of a next generation broadcast transmission system according to an embodiment of the present invention.

FIG. 106 shows a structure of a transport frame transmitted to a physical layer of a next generation broadcast transmission system according to an embodiment of the present invention. The next generation broadcast system may broadcast a transport frame. In the figure, P1, located at the front part of a transport frame, may refer to a symbol including information for transport signal detection. P1 may contain tuning information and the receiver may decode the L1 part located after P1 based on the parameters contained in the P1 symbol. The broadcast system may include information on the configuration of the transport frame and the characteristics of each data pipe (DP) in the L1 part. That is, the receiver may obtain information on the configuration of the transport frame and the characteristics of each DP by decoding the L1 part. In addition, the receiver may acquire information to be shared between the DPs via a common DP. Depending on the embodiment, the transport frame may not include the common DP.

In the transport frame, components such as Audio, Video, and Data are transmitted in the interleaved DP area composed of DP1 to DP n. Here, a DP through which a component constituting each service (channel) is transmitted may be signaled through L1, common PLP, or the like.

In addition, the next generation broadcast system may transmit information for quickly acquiring information on a service included in a transport frame. That is, the next generation broadcast system may enable the next generation broadcast receiver to quickly acquire the broadcast service and the content related information included in the transport frame. In addition, when a service/content generated by one or more broadcast stations exists in the frame, the next generation broadcast system may enable the receiver to efficiently recognize the service/content according to the broadcast stations. That is, the next-generation broadcast system may transmit service list information for a service in a transport frame.

The broadcast system may transmit broadcast service related information through a separate channel, for example, a Quick Information Channel (FIC), in order to enable the receiver to quickly scan the broadcast service and content within the frequency.

As shown in the middle part of FIG. 106, the broadcast system may transmit information for scan and acquiring broadcast services in a transport frame. Herein, the area including the information for scan and acquisition of broadcast services may be referred to as FIC. The receiver may acquire information on the broadcast service generated and transmitted by one or more broadcast stations through the FIC, thereby making it possible to easily and quickly perform scan of the broadcast services available on the receiver.

In addition, a specific DP included in the transport frame may operate as a base DP for quickly and robustly transmitting signaling of a broadcast service and content transmitted in the corresponding transport frame. The data transmitted through each DP of the transport frame of the physical layer are exemplarily shown at the bottom of FIG. 57. That is, link layer signaling or IP datagrams may be encapsulated in a specific type of generic packet and then transmitted through the DP. Here, the generic packet may include signaling data. Link (low) layer signaling may include signaling related to quick service scan/acquisition, context information of IP header compression, emergency alert, and the like.

Figure 107:
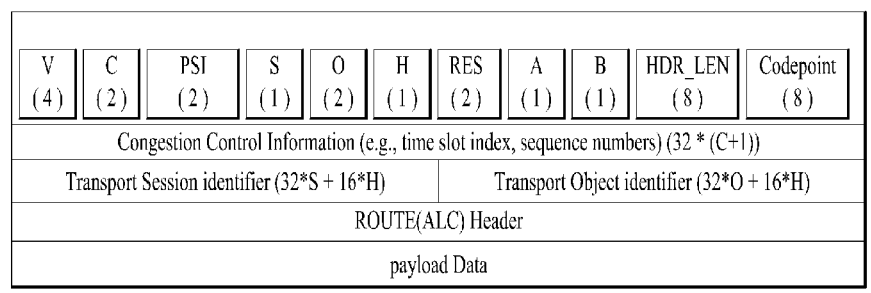
FIG. 107 is a diagram illustrating a transport packet of an application layer transmission protocol according to an embodiment of the present invention.

FIG. 107 is a diagram illustrating a transport packet of an application layer transmission protocol according to an embodiment of the present invention.

The application layer transport session may be configured by a combination of an IP address and a port number. If the application layer transport protocol is Real-Time Object Delivery over Unidirectional Transport (ROUTE), the ROUTE session may consist of one or more Layered Coding Transport (LCT) sessions. For example, when one media component (e.g., a DASH Representation or the like) is transmitted through one LCT transport session, one or more media components may be multiplexed and transmitted through one application transport session. Further, one or more transport objects may be delivered through one LCT transport session, and each transport object may be a DASH segment associated with a DASH representation delivered through the transport session.

For example, if the application layer transport protocol is an LCT-based protocol, transport packets may be configured as follows. The transport packet may include an LCT header, a ROUTE header, and payload data, and a plurality of fields may be included in the transport packet.

The LCT header may include the following fields. The V (version) field may indicate the version information of the corresponding transport protocol packet. The C field may indicate a flag associated with the length of the Congestion Control Information field described below. The PSI field is protocol-specific information and may indicate information specified for the protocol. The S field may indicate a flag associated with the length of the transport session identifier (TSI) field. The 0 field may indicate a flag associated with the length of the transport object identifier (TOI) field. The H field may indicate whether a half-word (16 bits) is added to the length of the TSI and TOI fields. A (Close Session flag) field may indicate that the session is terminated or that termination is imminent. The B (Close Object flag) field may indicate that the object being transmitted is ending or that the end is imminent. The Code point field may indicate information related to encoding or decoding the payload of a packet. For example, the payload type may correspond to this information. The Congestion Control Information field may contain information associated with congestion control. For example, the information associated with congestion control may be the current time slot index (CTSI), the channel number, or the packet sequence number within the channel. The Transport Session Identifier field may indicate the identifier of the transport session. The Transport Object Identifier field may represent an identifier of an object transmitted through the transport session.

The ROUTE (ALC) header may include transmission of additional information of the preceding LCT header, such as the payload identifier associated with the forward error correction scheme. The payload data may represent the substantial data portion of the payload of the packet.

FIG. 108 illustrates a method of transmitting signaling data in a next generation broadcast system according to an embodiment of the present invention. The signaling data of the next generation broadcast system may be transmitted as shown in the figure. In order to support quick service/content scan and acquisition by the receiver, the next generation broadcast transmission system may deliver signaling data for a broadcast service delivered by a corresponding physical layer frame through a Fast Information Channel (FIC). In the present specification, FIC may mean information on a service list. If there is no separate FIC, the signaling data may be transmitted through the path along which the link layer signaling is delivered. In other words, signaling information including a service and information on components (audio, video, etc.) in the service may be encapsulated and transmitted in IP/UDP datagrams through one or more DPs in the physical layer frame. According to an embodiment, the signaling information on a service and service components may be encapsulated and transmitted in an application layer transport packet (e.g., ROUTE packet or MMTP packet).

The upper part of FIG. 108 shows an embodiment in which the above-described signaling data is transmitted via FIC and one or more DPs. Signaling data for supporting rapid service scan/acquisition may be transmitted through FIC, and signaling data including detailed information about services and the like may be encapsulated in an IP datagram and transmitted through a specific DP. In the present specification, the signaling data including detailed information on services and the like may be referred to as service layer signaling.

The middle part of FIG. 108 shows an embodiment in which the above-described signaling data is transmitted through the FIC and one or more DPs. Signaling data for supporting rapid service scan/acquisition may be transmitted through FIC, and signaling data including detailed information about services and the like may be encapsulated in an IP datagram and transmitted through a specific DP. In addition, a portion of the signaling data, including information about a specific component included in the service may be transmitted through one or more transport sessions in the application layer transmission protocol. For example, a portion of the signaling data may be delivered over one or more transport sessions within a ROUTE session.

The lower part of FIG. 108 shows an embodiment in which the above-described signaling data is transmitted through the FIC and one or more DPs. Signaling data for supporting rapid service scan/acquisition may be transmitted through FIC, and signaling data containing detailed information about the service may be transmitted through one or more transport sessions in the ROUTE session.

FIG. 109 shows signaling data transmitted by a next generation broadcast system according to an embodiment of the present invention for rapid broadcast service scan of a receiver.

The present specification proposes signaling information used for a next generation broadcast reception device to scan and acquire a broadcast service.

In the next generation broadcast system, broadcast services and content generated by one or more broadcast stations within a specific frequency may be transmitted. The receiver may use the above-described signaling information to rapidly and easily scan broadcast stations existing within the frequency and the service/content of the corresponding broadcast stations. This may be represented by syntax as shown in the figure or may be represented in other formats such as XML.

Signaling information for rapid service scan and acquisition may be delivered over a rapid information channel (FIC), which is a separate channel in the physical layer transport frame. In addition, the signaling information may be transmitted through a common DP, which may transmit information that may be shared among the data pipes of the physical layer. Also, In addition, the signaling information may be transmitted through a path along which the signaling of the link layer is transmitted. The above-described signaling information may be encapsulated in an IP datagram and transmitted through a specific DP.

The signaling information may be transmitted through a service signaling channel through which service signaling is delivered, or a transport session of the application layer.

The signaling information (FIC information) for rapid service scan and acquisition may include at least one of the following fields. Herein, the FIC information may be referred to as service acquisition information. The FIC_portocol_version field may indicate the protocol version of the FIC signaling information (version of the structure of FIC). The TSID field may indicate an identifier of the overall broadcast stream.

The FIC_data_version field may indicate the data version of the FIC instance. The FIC_data_version field may be incremented if there is a change in the content of the FIC.

The num_partitions field may represent the number of partitions in the broadcast stream. It is assumed that each broadcast stream can be transmitted in one or more partitions in order for the num_partitions field to be used. Each partition may contain a plurality of DPs by one broadcaster.

Each partition may represent a portion of the broadcast stream used by one broadcaster. The partition_protocol_version field may indicate the version of the partition structure described above. The base_DP_ID field may indicate an identifier for the base DP of the partition. The base DP may include a service signaling table. The service signaling table may include a list of all services in the partition.

That is, the service signaling table may list the services to be transmitted. Default properties for each service may also be defined. The base DP may be a robust DP within the partition and may contain other signaling tables for the partition. The base DP version field may indicate version information indicating a change in data transmitted through the base DP. For example, in transmitting service signaling or the like through the base DP, the base_DP_version field may be incremented by 1 when a change in service signaling occurs. The num_services field may indicate the number of at least one service belonging to the partition. The service id field may indicate an identifier for the service. The channel_number field may indicate the channel number associated with the service. The service_category field may indicate a category of the corresponding service and may indicate, for example, A/V, audio, ESG, CoD, or the like. The short_service_name_length field may indicate the length of the name representing the service.

The short_Service_name field may indicate a name representing the service. The service_status field may indicate the status of the service and may indicate an active or suspended, hidden or shown attribute depending on the value thereof.

The service_distribution field may have attributes similar to the "multi-ensemble" flag of the ATSC M/H document. For example, the service_distribution field may indicate information about whether the service is included in the partition, whether the service is partially included in the partition but is presentable with the partition, whether another partition is required for presentation, or whether another broadcast stream is required for presentation.

The sp_indicator field is a service protection flag that may indicate whether one or more components needed for the presentation are protected.

FIG. 61 shows signaling data transmitted by a next generation broadcast system according to an embodiment of the present invention for rapid broadcast service scan of a receiver. FIC information (service acquisition information) to support rapid broadcast service scan and service/component acquisition may include information about an application layer transport session carrying service and component data. As shown in the figure, the FIC information may be expressed in binary format, but may be represented in other formats such as XML according to an embodiment. The FIC information may include the fields as illustrated. The FIC_portocol_version field may indicate the protocol version of the FIC signaling information (version of the structure of FIC). The TSID field may indicate an identifier of the overall broadcast stream. The FIC_data_version field may indicate the data version of the FIC instance. The FIC_data_version field may be incremented if there is a change in the content of the FIC. The num_partitions field may represent the number of partitions in the broadcast stream. It is assumed that each broadcast stream can be transmitted in one or more partitions in order for the num_partitions field to be used. Each partition may contain a plurality of DPs by one broadcaster.

Each partition may represent a portion of the broadcast stream used by one broadcaster. The partition_id field may indicate the identifier of the partition.

The partition_protocol_version field may indicate the version of the partition structure described above.

The num_services field may indicate the number of at least one component belonging to the partition.

The service id field may indicate an identifier for the service. The service_data_version field may indicate a change in service loop data in the FIC or a change in service signaling data associated with the service.

The service_data_version field may be incremented by 1 each time a change occurs in the included service data. The receiver may use the service_data_version field to detect a change in the service loop data of the FIC or a change in the signaling associated with the service.

The channel_number field may indicate the channel number associated with the service.

The service_category field may indicate a category of the corresponding service and may indicate, for example, A/V, audio, ESG, CoD, or the like. The short_service_name_length field may indicate the length of the name representing the service. The short_service_name field may indicate a name representing the service. The service_status field may indicate the status of the service and may indicate an active or suspended, hidden or shown attribute depending on the value thereof. The service distribution field may have attributes similar to the "multi-ensemble" flag of the ATSC M/H document. For example, the service distribution field may indicate information about whether the service is included in the partition, whether the service is partially included in the partition but presentable with the partition, whether another partition is required for presentation, or whether another broadcast stream is required for presentation. The sp_indicator field is a service protection flag that may indicate whether one or more components needed for the presentation are protected. The IP_version_flag field may indicate the format of the IP address that follows. If the value of the field is 0, it indicates that IPv4 format is used, and if 1, it indicates that IPv6 address format is used. The source_IP_address_flag field may indicate whether source_IP_addr is included. If the value of this field is 1, it indicates that source_IP_addr exists. The num_transport_session field may indicate the number of transport sessions (for example, ROUTE or MMTP sessions) for transmitting component data of the corresponding service in the broadcast stream. The source_IP_addr field may indicate the source IP address of the IP datagram including the component data of the corresponding service when the value of the source_IP_address_flag is 1. The dest_IP_addr field may indicate the destination IP address of the IP datagram including the component data of the corresponding service. The dest_UDP_port field may indicate the UDP port number of the UDP datagram that contains the component data of the corresponding service. The LSID_DP field may represent a data pipe identifier of the physical layer carrying signaling including detailed information about the transport session. Here, the signaling including the detailed information about the transport session may be, for example, an LCT session instance description including information on the detailed LCT transport session of each ROUTE session in the case of ROUTE.

The service_signaling_flag field may indicate whether the transport session transmits service signaling. When the value of service_signaling_flag is 1, it may indicate that the data transmitted through the corresponding transport session (for example, ROUTE or MMTP session) includes service signaling. The Transport session descriptors field may contain descriptors at the transport session level. Each descriptor is extensible, and each descriptor may include a num_descriptors field. Each descriptor may include as many descriptor loops as the value indicated by the num_descriptors field.

The transport session descriptors field may contain descriptors at the transport session level. The service descriptors field may include service level descriptors. The Partition descriptors field may include a partition level descriptor, and one partition may indicate a part of a broadcast stream used by one broadcaster or the like. The FIC session descriptors field may contain FIC level descriptors. According to an embodiment, each of the fields included in the FIC described above may be included in a table other than the FIC and transmitted together with a broadcast signal.

Figure 111:
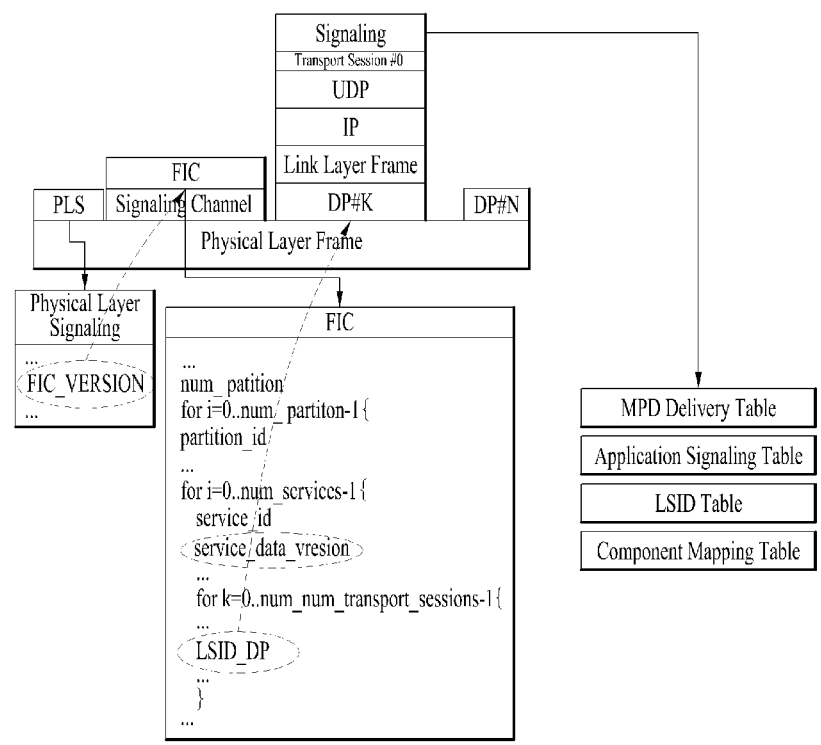
FIG. 111 illustrates a method of signaling a location of service layer signaling through FIC as signaling for rapid service scan and acquisition to acquire service layer signaling from the corresponding location according to an embodiment of the present invention.

FIG. 111 illustrates a method for transmitting FIC-based signaling according to an embodiment of the present invention.

The above-mentioned FIC-based signaling may be delivered as shown in the figure.

The FIC-based signaling may be referred to as service acquisition information or service acquisition signaling. As shown in the figure, the physical layer signaling may include a field for service acquisition information. The field for the service acquisition information may inform the receiver of whether the service acquisition information (FIC) is parsed. The receiver may parse the service acquisition information and check whether the data of the service signaling is changed through the service_data_version information. When the service signaling data is changed, the broadcast signal receiver may check the data pipe identifier of the physical layer that carries signaling including detailed information on the transport session, using the LSID_DP field. The broadcast receiver may verify the details of the transport session by parsing the DP indicated by the corresponding DP identifier. That is, the signaling method of the next generation broadcast system includes a procedure of signaling whether the physical layer signaling parses the service acquisition information, and the service acquisition information signals the location of the detailed information about the transport session to check the detailed information about the transport session. Here, the detailed information about the transport session may include an MPD transport table, an application signaling table, a transport session descriptor (LSID), and/or a component mapping table (CMT).

FIG. 112 shows signaling data transmitted by a next generation broadcast system according to an embodiment of the present invention for rapid broadcast service scan of a receiver. FIC information (service acquisition information) to support rapid broadcast service scan and service/component acquisition may include information about an application layer transport session carrying service and component data. As shown in the figure, the FIC information may be expressed in binary format, but may be represented in other formats such as XML according to an embodiment. The FIC information may include the following fields. The FIC_protocol_version field may indicate the protocol version of the FIC signaling information (version of the structure of FIC). The TSID field may indicate an identifier of the overall broadcast stream. The FIC_data_version field may indicate the data version of the FIC instance. The FIC_data_version field may be incremented if there is a change in the content of the FIC. The num_partitions field may represent the number of partitions in the broadcast stream. It is assumed that each broadcast stream can be transmitted in one or more partitions in order for the num_partitions field to be used. Each partition may contain a plurality of DPs by one broadcaster.

Each partition may represent a portion of the broadcast stream used by one broadcaster. The partition_id field may indicate the identifier of the partition.

The partition_protocol_version field may indicate the version of the partition structure described above.

The num_services field may indicate the number of at least one component belonging to the partition. The service id field may indicate an identifier for the service.

The service_data_version field may indicate a change in service loop data in the FIC or a change in service signaling data associated with the service.

The service_data_version field may be incremented by 1 each time a change occurs in the included service data. The receiver may use the service_data_version field to detect a change in the service loop data of the FIC or a change in the signaling associated with the service.

The channel_number field may indicate the channel_number associated with the service.

The service_category field may indicate a category of the corresponding service and may indicate, for example, A/V, audio, ESG, CoD, or the like. The short_service_name_length field may indicate the length of the name representing the service. The short_service_name field may indicate a name representing the service. The service_status field may indicate the status of the service and may indicate an active or suspended, hidden or shown attribute depending on the value thereof. The service distribution field may have attributes similar to the "multi-ensemble" flag of the ATSC M/H document. For example, the service_distribution field may indicate information about whether the service is included in the partition, whether the service is partially included in the partition but presentable with the partition, whether another partition is required for presentation, or whether another broadcast stream is required for presentation. The sp_indicator field is a service protection flag that may indicate whether one or more components needed for the presentation are protected. The IP_version_flag field may indicate the format of the IP address that follows. If the value of the field is 0, it indicates that IPv4 format is used, and if 1, it indicates that IPv6 address format is used. The source_IP_address_flag field may indicate whether source_IP_addr is included. If the value of this field is 1, it indicates that source_IP_addr exists. The num_transport_session field may indicate the number of transport sessions (for example, ROUTE or MMTP sessions) for transmitting component data of the corresponding service in the broadcast stream. The source_IP_addr field may indicate the source IP address of the IP datagram including the component data of the corresponding service when the value of the source_IP_address_flag is 1. The dest_IP_addr field may indicate the destination IP address of the IP datagram including the component data of the corresponding service. The dest_UDP_port field may indicate the UDP port number of the IP datagram that contains the component data of the corresponding service. The LSID_DP field may represent a data pipe identifier of the physical layer carrying signaling including detailed information about the transport session. Here, the signaling including the detailed information about the transport session may be, for example, an LCT session instance description including information on the detailed LCT transport session of each ROUTE session in the case of ROUTE.

The service_signaling_flag field may indicate whether the transport session transmits service signaling. If the value of the service_signaling_flag value is 1, it may indicate that there is a DP including service signaling. The signaling_data_version field may indicate a change in the associated service signaling data. Each time the service signaling data changes, the field may be incremented by 1. The receiver may use the signaling_data_version field to detect changes in the signaling associated with the service.

The signaling DP field may indicate the data pipe identifier of the physical layer carrying the service signaling. The Transport session descriptors field may contain descriptors at the transport session level. Each descriptor is extensible, and each descriptor may include a num_descriptors field. Each descriptor may include as many descriptor loops as the value indicated by the num_descriptors field.

The Transport session descriptors field may contain descriptors at the transport session level. The service descriptors field may include service level descriptors. The Partition descriptors field may include a partition level descriptor, and one partition may indicate a part of a broadcast stream used by one broadcaster or the like. The FIC session descriptors field may contain FIC level descriptors. According to an embodiment, each of the fields included in the FIC described above may be included in a table other than the FIC and transmitted together with a broadcast signal.

Figure 113:
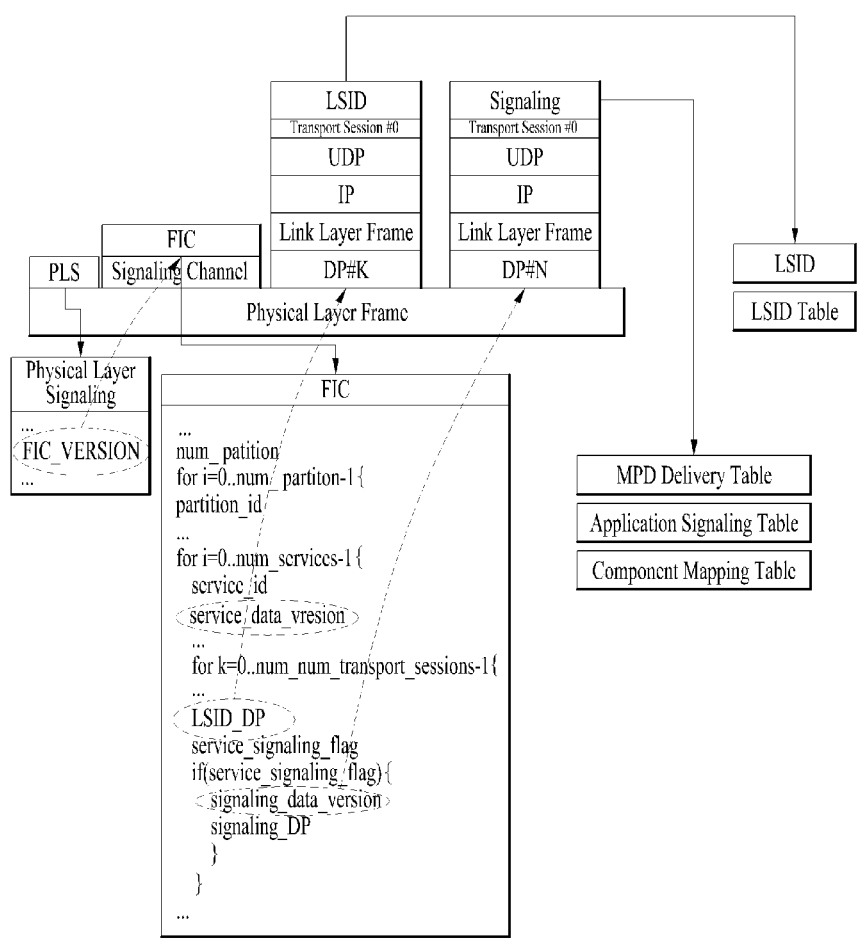
FIG. 113 illustrates a method of signaling a location of service layer signaling through FIC as signaling for rapid service scan and acquisition to acquire service layer signaling from the corresponding location according to another embodiment of the present invention.

FIG. 113 illustrates a method for transmitting FIC-based signaling according to another embodiment of the present invention. The above-mentioned FIC-based signaling may be delivered as shown in the figure.

The FIC-based signaling may be referred to as service acquisition information or service acquisition signaling. As shown in the figure, the physical layer signaling may include a field for service acquisition information. The field for the service acquisition information may inform the receiver of whether the service acquisition information (FIC) is parsed. The receiver parses the service acquisition information and may check whether the data of the service signaling is changed through the service_data_version information. When the service signaling data is changed, the broadcast signal receiver may acquire the LSID or LSID Table including detailed information on the transport session using the LSID_DP field through the DP identified from the LSID_DP field. In addition, the receiver may recognize change of the signaling data using information such as service_signaling_flag, signaling_data_version, signaling_DP, etc., and acquire the signaling data through the DP identified from the signaling_DP.

That is, the signaling method of the next generation broadcast system includes a procedure of signaling whether the physical layer signaling parses the service acquisition information, and the service acquisition information signals the location of the detailed information about the transport session to check the detailed information about the transport session. Here, the detailed information about the transport session may include an MPD transport table, an application signaling table, a transport session descriptor (LSID), and/or a component mapping table (CMT), and each detail of the transmission session may be delivered by different examples.

FIG. 114 is a diagram illustrating a service signaling message format of a next generation broadcast system according to an embodiment of the present invention. In this specification, the service signaling message may be referred to as signaling data or service layer signaling including detailed information on services and the like. The service signaling message may include a signaling message header and a signaling message. The signaling message may be expressed in binary or XML format. It may be sent in an IP datagram or a payload of application layer transport packets (e.g., ROUTE or MMTP).

The syntax of the signaling message header may be as follows, which may be represented in other formats such as XML. The Signaling message header may include the following fields. The signaling_id field may indicate an identifier of a signaling message. For example, if the signaling message is in the form of a section, it may indicate the id of the signaling table section. The signaling_length field may indicate the length of the included signaling message. The signaling_id extension field may indicate extension information about an identifier for the signaling message.

The signaling_id extension field together with the signaling_id field may be used as information for identifying the signaling. For example, the signaling_id extension field may include a protocol version of the signaling message. The version number field may indicate the version information of the signaling message. The version number field may be changed if the content of the signaling message changes. The current next indicator field may indicate whether the included signaling message is currently available.

If the value of this field is "1", it indicates that the included signaling message is currently available. If the value of this field is "0", it indicates that the signaling message is not currently available and that a signaling message containing the same signaling_id, signaling_id_extension, or fragment_number will be available later. The fragmentation indicator field may indicate whether the signaling message has been fragmented. If the value of this field is "1", this may indicate that the message has been fragmented. This may in turn indicate that part of the signaling data is included in signaling_message_data( ). If the value of this field is "0", this may indicate that the entire signaling data is included in signaling_message_data( ) The payload_format_indicator field may indicate whether the payload_format_indicator field currently contains the value of payload_format in the signaling message header. If the value of this field is "1", this may indicate that the payload format value is included in the header part of the signaling message. The expiration_indicator field may indicate whether the header part of the signaling message currently contains an expiration value. If the value of this field is "1", it may indicate that the expiration value is included in the header part of the signaling message. The fragment_number field may indicate the fragment number of the current signaling message when a signaling message transmitted is divided into multiple fragments. The last fragment_number field indicates the number of the fragment containing the last data of the signaling message when one signaling message is divided into several fragments. The payload_format field may indicate the format of the signaling_message_data contained in the payload. For example, the field may indicate binary, XML, or the like. The expiration field may indicate the valid time of the signaling message included in the payload.

FIG. 115 shows a service signaling table used in a next generation broadcast system according to an embodiment of the present invention.

In the present invention, the following service signaling tables/messages may be used in the next generation broadcast network and signal the following information. The information contained in each table/message may be individually transmitted in different tables and is not limited by the illustrated embodiment. In some embodiments, the signaling information belonging to different tables may be merged into one table and transmitted. The service mapping table may include attributes of a service and information related to the service. The attribute information of the service may include, for example, as an ID, a name, and a category. The information associated with the service may include path information for acquiring the service. The MPD Delivery table may contain DASH MPD associated with the service/content or path information for acquiring the DASH MPD. The component mapping table may contain information about components in the service and information associated with the components. The component information may include associated DASH representation information, and the information associated with the component may include path information for acquiring the component. The LSID table may contain information about a transport session for transmitting a service/component and the like and a configuration of a transport packet. The Initialization Segment Delivery table may contain Initialization Segment information about the DASH Representation associated with the component in the service or a path for acquiring the same. The application parameter table may contain related information such as detailed information about an application associated with a broadcast service and a path for acquiring the same.

These signaling messages/tables may be transmitted over the broadcast network, through a Rapid Information Channel (FIC), a Service Signaling Channel (SSC), or an application layer transport session (for example, ROUTE or MMTP session). Further, the signaling messages/tables may be transmitted over the Internet network (broadband).

FIG. 116 is a diagram illustrating a service mapping table used in a next generation broadcast system according to an embodiment of the present invention.

The content described below may be included in a portion of the service signaling message following the signaling message header.

The service mapping table may contain information on service mapping signaling and may be expressed in XML format or binary format. The service mapping table, which is one of service signaling, may contain a service identifier (id), a service type, a service name, a channel number, ROUTE session related information, MPD related information, and component signaling location information.

The service identifier may indicate information for identifying the service and may be expressed by an id attribute. The service type information may indicate the type of the service, and may be expressed by the serviceType attribute. The service name information may indicate the name of the service, and may be expressed by the serviceName attribute. The channel number information may indicate a channel number associated with the service, and may be expressed by the channelNumber attribute.

The ROUTE session related information may include a sourceIP attribute, a destinationIP attribute, and a destinationPort attribute. The sourceIP attribute may indicate the source address of the IP datagrams containing the associated data. The destinationIP attribute may indicate the destination address of the IP datagrams containing the associated data. The destinationPort attribute may indicate the destination port number of the UDP packet header in the IP datagram containing the associated data.

The ROUTE session related information may include detailed information (LSID) about the transport sessions, and may include, for example, each LSID location and delivery mode information for each LSID location information. The detailed information (LSID) about the transport sessions may also include bootstrap information. The bootstrap information included in the LSID may include bootstrap information about the LSID according to the delivery mode. The attributes included in the bootstrap information are described in detail below.

The MPD related information may include information about the MPD or MPD signaling location.

The information about the MPD may include the version attribute and indicate the version of the MPD DT.

The MPDSignalingLocation information may indicate a location where signaling associated with the MPD or MPD URL can be acquired. The deliveryMode information included in the MPD signaling location may indicate the delivery mode of the MPD location signaling. The Bootstrapinfo information included in the MPDSignalingLocation may include bootstrap information about the MPD or MPD URL according to the delivery mode.

The ComponentSignalingLocation information may include a deliveryMode attribute.

The deliveryMode attribute may indicate the delivery mode of the corresponding component signaling location information. The bootstrap information included in the MPDSignalingLocation may include bootstrap information of the corresponding component location signaling according to the delivery mode.

The bootstrap information may include at least one of the following attributes depending on the delivery mode.

The sourceIP attribute may indicate the source address of the IP datagrams containing the associated data. The destinationIP attribute may indicate the destination address of the IP datagrams containing the associated data. The destinationPort attribute may indicate the destination port number of the UDP packet header containing the associated data. The tsi attribute may indicate an identifier for the transport session carrying transport packets carrying the associated data. The URL attribute may indicate a URL where the associated data can be acquired. The packetid may indicate the identifier of transport packets carrying the associated data.

FIG. 117 shows a service signaling table of a next generation broadcast system according to an embodiment of the present invention.

The next generation broadcast system may provide broadcast service signaling to allow the receiver to receive broadcast services and content. This allows the receiver to acquire relevant signaling if the signaling data is transmitted over the same Transport session Identifier (TSI). The service signaling table may be represented in a binary format as shown in the figure and may be represented in other forms such as XML according to an embodiment. The service signaling table may also be encapsulated in the signaling message format described above. The service signaling table may contain the following fields. The SST_portocol_version field may indicate the version of the service signaling table. The partition_id field may indicate the identifier of the partition. The SST_data_version field may indicate the data version of the service signaling table. The num_services field may indicate the number of at least one service included in the partition. The service_id field may indicate the identifier of the corresponding service. The service_name field may indicate the name of the service.

The MPD_availability field may indicate whether the MPD can be acquired over the broadcast, cellular network, and/or wife/Ethernet. The CMT availability field may indicate whether a Component Mapping Table (CMT) is available over the broadcast, cellular network and/or wife/Ethernet. The ASL_availability field may indicate whether the Application Signaling Table (AST) is available over the broadcast, cellular network, and/or wife/Ethernet. The DP_ID field may indicate the identifier of the DP that delivers the MPD, CMT, and/or ASL through broadcast. The LCT_IP_address field may indicate the IP address of the LCT channel carrying the MPD, CMT and/or ASL. The LCT UDP_port field may indicate the UDP port of the LCT channel carrying the MPD, CMT and/or ASL. The LCT TSI field may indicate a Transport Session Identifier (TSI) of the LCT channel carrying MPD, CMT and/or ASL. The MPD_TOI field may indicate a Transport Object Identifier of an application transport packet that carries the MPD when the MPD is delivered through broadcast. The CMT TOI field may indicate a Transport Object Identifier of an application transport packet that carries the CMT when the CMT is delivered through broadcast. The AST_TOI field may indicate a transport object identifier of an application transport packet that carries the AST when the AST is delivered via broadcast. The MPD_URL field may indicate URL information for acquiring MPD over broadband.

The CMT_URL field may indicate URL information for acquiring CMT over broadband. AST_URL_Broadband may indicate URL information for acquiring AST.

Figure 118:
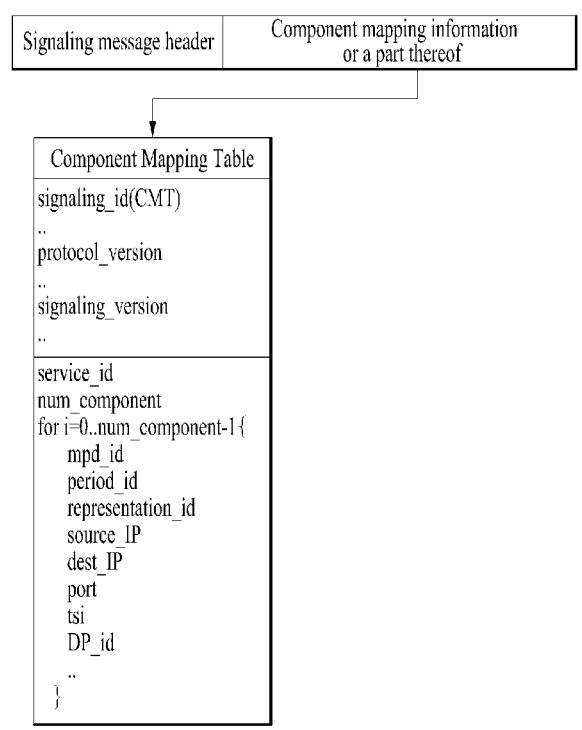
FIG. 118 is a diagram illustrating a component mapping table used in a next generation broadcast system according to an embodiment of the present invention.

FIG. 118 is a diagram illustrating a component mapping table used in a next generation broadcast system according to an embodiment of the present invention. The content described below may be included in a portion of the service signaling message located after the signaling message header. The component mapping table may contain information on component mapping signaling and may be expressed in the XML format or binary format. The component mapping table, which is one of the service signaling, may include the following fields. The Signaling_id field may contain an identifier indicating that the corresponding table is a component mapping table.

The protocol_version field may indicate the protocol version of the component mapping table, such as the component mapping table syntax. The Signaling_version field may indicate a change in the signaling data of the component mapping table. The Service_id field may indicate an identifier for a service associated with the components.

The Num_component field may indicate the number of components included in the service.

The Mpd_id field may indicate the DASH MPD identifier associated with the component. The Period_id field may indicate a DASH period identifier associated with the component.

The representation_id field may indicate a DASH representation identifier associated with the component. The Source_IP field may indicate the source IP address of the IP/UDP datagram containing the component data. The Dest_IP field may indicate a destination IP address of an IP/UDP datagram including the component data. The port field may indicate the port number of the IP/UDP datagram containing the component data. The tsi field may indicate the identifier of the application layer transport session containing the component data. The DP_id field may indicate the identifier of a physical layer data pipe carrying the corresponding component data. With the above information, the CMT may define the components associated with each service and inform the receiver of the location or path where the components can be received.

FIG. 119 illustrates a component mapping table description according to an embodiment of the present invention.

The Component Mapping Table Description may signal information on a transmission path of components included in a broadcast service in a next generation broadcast system. It may be expressed by a bitstream in the XML format or binary format. The component mapping table description may include the following elements and attributes. The service_id attribute may indicate the identifier of the service associated with the component. BroadcastComp may indicate one or more components transmitted over the same broadcast stream. BroadcastComp may include at least one of mpdID, perID, reptnID, baseURL, and/or datapipeID. The mpdID attribute may indicate the DASH MPD identifier associated with BroadcastComp. The perID attribute may indicate the associated period identifier in the corresponding MPD. The reptnID attribute may indicate the DASH Representation identifier associated with the component. The baseURL attribute may indicate the Base URL associated with the DASH segment associated with that component.

The datapipeID attribute may indicate the identifier of a data pipe through which the corresponding component data is transmitted in a broadcast stream.

BBComp may indicate one or more components transmitted over a broadband network. BBComp may include at least one of mpdID, perID, reptnID, and/or baseURL. The mpdID attribute may indicate the DASH MPD identifier associated with BBComp. The perID attribute may indicate the associated period identifier in the corresponding MPD. The reptnID attribute may indicate the DASH Representation identifier associated with the component. The baseURL attribute may indicate the Base URL associated with the DASH segment associated with that component.

The ForeignComp may indicate one or more components transmitted through another broadcast stream. The ForeignComp may include at least one of mpdID, perID, reptnID, baseURL, transportStreamID, sourceIPAddr, destIPAddr, and/or destUDPPort.

The mpdID attribute may indicate the DASH MPD identifier associated with ForeignComp.

The perID attribute may indicate the associated period identifier in the corresponding MPD. The reptnID attribute may indicate the DASH Representation identifier associated with the component.

The baseURL attribute may indicate the base URL of the DASH segment associated with the component. The transportStreamID attribute may indicate the identifier of the broadcast stream containing the component data. The sourceIPAddr attribute may indicate the source IP address of the IP datagram containing the component data. The destIPAddr attribute may indicate the destination IP address of the IP datagram containing the component data.

The destUDPPort attribute may indicate the destination UDP port number of the IP datagram containing the component data. The datapipeID attribute may indicate the identifier of a data pipe through which the corresponding component data is transmitted in the broadcast stream. The Component Mapping Description may be encapsulated in a single XML file or in the signaling message format proposed above. As shown in the lower part of FIG. 70, the Signaling message header may take the form described above, and the component message description or a part thereof may be included in the service message part. With the above information, the CMT may define the components associated with each service and inform the receiver of the location or path where information related to the components can be received.

FIG. 120 shows syntax of a component mapping table of a next generation broadcast system according to an embodiment of the present invention.

The next generation broadcast system may signal the component mapping table (CMT) to allow the receiver to acquire the components of the broadcast service. The CMT may be expressed in other formats such as the binary format or XML format and may be encapsulated in the signaling message format described above. The CMT may contain the following fields. The CMT_portocol_version field may indicate the version of the structure of the Component Mapping Table (CMT). The service id field may indicate an identifier of a service related to a component location provided by the corresponding CMT. The CMT_data_version field may indicate a data version of the corresponding CMT. The num_broadcast_streams field may indicate the number of broadcast streams including at least one component associated with the service. The TSID field may indicate the transport session identifier of the broadcast stream. The num_partitions field may indicate the number of partitions of the broadcast stream including at least one component associated with the service. The CMT may include a plurality of partitions. The partition_id field may indicate the identifier of the partition. The num_data_pipes field may indicate the number of data pipes in the partition that includes at least one component associated with the service. The DP_ID field may indicate the identifier of each data pipe. The num_ROUTE_sessions field may indicate the number of transport sessions (e.g., ROUTE sessions) included in each datapipe. Each data pipe may include at least one component associated with the service. The IP_address field may indicate the IP address of each transport session. The UDP_port field may indicate the UDP port of each transport session. The num_LCT_channels field may indicate the number of LCT channels in the transport session including the component associated with the service. The LCT_TSI field may indicate a Transport Session Identifier (TSI). The Representation ID field may indicate the identifier of the DASH Representation carried by the corresponding LCT channel. According to an embodiment, the CMT may further include an MPD id field and a Period id field. In this case, a globally unique ID may be acquired by combining MPD id, Period id, and Representation id. The Internet availability field may be an identifier that indicates whether the Representation can be received over the Internet or broadband.

The num_internet_only_reptns field may indicate the number of Representations that may be received only over the Internet or broadband. The Representation_ID field may indicate an identifier of a DASH Representation that can be received only over the Internet or broadband within a loop of num_internet_only_reptns. As described above, according to embodiments, a globally unique identifier may be configured by combining MPD id, Period id, and Representation id. With the above information, the CMT may define the components associated with each service and inform the receiver of the location or path where the components can be received.

FIG. 121 illustrates a method for delivering signaling associated with each service over a broadband network in a next generation broadcast system according to an embodiment of the present invention.

The next generation broadcast system may transmit signaling related to the service to the receiver over the broadband network or the like. The next generation broadcast system may transmit signaling to the receiver through a broadband network or the like using URL Signaling Table Description. It may be represented in other formats such as XML or binary. The URL Signaling Table Description may include the following attributes. The service_id attribute may indicate the identifier of the service associated with the signaling. The mpdURL attribute may indicate the URL of the broadband MPD. The cstURL attribute may indicate the URL of the broadband CMT. The CMT may contain information on the component data acquisition path in the broadcast service. The astURL attribute may indicate the URL of the broadband AST. The AST may include information about an application associated with the broadcast service. The receiver may receive the description and receive the corresponding signaling based on the URL for each signaling. The URL Signaling Table Description may be encapsulated in a single XML file or in the signaling message format proposed above. As shown in the lower part of the figure, the signaling message header may conform to the form proposed above, and the header may include a URL Signaling Table Description or a part thereof.

FIG. 122 illustrates a method for signaling MPD in a next generation broadcast system according to an embodiment of the present invention.

The signaling message for the MPD of the broadcast service available in the next generation broadcast network may include a signaling message header and a signaling message as shown in the upper part of the figure. The Signaling message header may conform to the above-described format, and the MPD delivery table information may include the following information. The Signaling_id information may identify that the corresponding signaling message is a signaling message that includes the MPD or path information for acquiring the MPD. The protocol_version information may indicate the protocol version of the MPD delivery table, such as the syntax of the signaling message.

The Signaling_version information may indicate a change in the signaling data of the MPD delivery table. The Service_id information may indicate a service identifier associated with the signaling information. The Mpd_id information may indicate the identifier of the DASH MPD associated with the signaling message. The MPD_version information may represent version information indicating a change of the corresponding MPD or the like. The Delivery_mode information may indicate whether the signaling message includes the corresponding MPD or whether the MPD is transmitted through another path.

The MPD_data( ) information may include the MPD data if the signaling message includes the MPD. The MPD_path information may include information on a path for acquiring the MPD. For example, a path may represent a URL, etc.

The MPD delivery table description may contain the following information.

The service id attribute may indicate the identifier of the service associated with the signaling. The MPD_id attribute may indicate the identifier of the MPD. MPD_version may indicate version information that may indicate the MPD change information. The MPD_URL attribute may include URL information for acquiring an MPD. The MPD element may also include MPD information. The MPD Delivery Table Description may be encapsulated in a single XML file or in the signaling message format proposed above. That is, the signaling message header may conform to the previously proposed format, followed by an MPD Delivery Table Description or a part thereof.

FIG. 123 shows syntax of an MPD delivery table of a next generation broadcast system according to an embodiment of the present invention.

The information of the MPD delivery table or a part thereof may be included after the signaling message header, and the information of the MPD delivery table may contain the following fields. The service_id field may indicate the identifier of an associated broadcast service. The MPD_id_length field may indicate the length of subsequent MPD_id_bytes( ).

The MPD_id_bytes field may indicate the identifier of the MPD file included in the signaling message. The MPD_version field may indicate version information such as a change in data of the MPD. The MPD_URL_availability field may indicate whether the URL information of the MPD exists in the corresponding signaling table/message. The MPD_data_availability field may indicate whether the MPD is included in the signaling table/message. If the value of this field is '1', this may indicate that the MPD is included in the signaling table/message.

The MPD URL length field may indicate the length of subsequent MPD_URL_bytes( ).

The MPD_URL_bytes field may indicate the MPD URL included in the signaling message.

The MPD_coding field may indicate the encoding scheme of the MPD file included in the signaling message. As shown in the lower part of the figure, the MPD coding field may indicate that MPD files are encoded in different encoding schemes according to the values. For example, if the value of the MPD_coding field is '0 x00', this may indicate that the MPD file includes the MPD file. If the value of the field is '0x01', this may indicate that MPD file compressed by gzip is included. For example, if the MPD compressed by gzip is divided into a plurality of messages/tables, the corresponding MPD_bytes( ) may be concatenated and ungziped. The MPD_byte_length field may indicate the following MPD_bytes( ) length. The MPD_bytes field may contain the actual data of the MPD file included in the signaling message according to the encoding scheme specified in MPD_coding. The next generation broadcast system allows the receiver to receive or acquire the MPD associated with the service through the MPD delivery table including the fields described above.

FIG. 124 shows a description of a transmission session instance of a next generation broadcast system according to an embodiment of the present invention. When the application layer transmission method is Real-Time Object Delivery over Unidirectional Transport (ROUTE), a ROUTE session may include one or more Layered Coding Transport (LCT) sessions. The details of one or more transport sessions may be signaled through a transport session instance description. The transport session instance descriptor may be referred to as LCT Session Instance Description (LSID) if it is ROUTE. In particular, the transport session instance description may define what is delivered by each LCT transport session constituting the ROUTE session. Each transport session may be uniquely identified by the Transport Session Identifier (TSI). The transport session identifier may be included in the LCT header. The transport session instance description may describe all transport sessions that are transmitted through the session. For example, the LSID may describe a mode LCT session carried by a ROUTE session. The transport session instance description may be delivered through the same ROUTE session as the transport sessions, or may be delivered through different ROUTE sessions or unicast.

When delivered in the same ROUTE session, the transport session instance description may be transmitted in the transport session with a specified transport session identifier (TSI) 0. Other objects referenced in the transport session instance description may also be delivered with TSI=0, but may have a TOI value different from the transport session instance description. Alternatively, it may be delivered in a separate session with TSI 0. The transport session instance description may be updated using at least one of the version number, validity information, and expiration information. The transport session instance description may be represented in a bitstream or the like in addition to the illustrated format.

The transport session instance description may include a version attribute, a validFrom attribute, an expiration attribute, and may include TSI attributes and SourceFlow and RepairFlow information for each transport session. The version attribute may indicate the version information about the corresponding transport session instance description, and the version information may be incremented each time the content is updated. The transfer session instance description with the highest version number may indicate the most recent valid version. The validFrom attribute may indicate when the transfer session instance description begins to be valid. The validFrom attribute may not be included in the transport session instance description according to an embodiment. This indicates that the transport session instance description is valid immediately upon receiving the description. The expiration attribute may indicate when the transfer session instance description expires.

The expiration attribute may not be included in the transport session instance description according to the embodiment. This indicates that the transport session instance description is continuously valid. If a transport session instance description with an expiration attribute is received, expiration may conform to the expiration attribute. The TSI attribute may indicate a transport session identifier, and the SourceFlow element provides information about the source flow to be transmitted to the TSI, the details of which will be described below. The RepairFlow element may provide information about the repair flow sent to the corresponding TSI.

FIG. 125 shows a SourceFlow element of a next generation broadcast system according to an embodiment of the present invention.

The source flow element may include an EFDT element, an idRef attribute, a realtime attribute, a minBufferSize attribute, an Application Identifier element, and a PayloadFormat element. The EFDT element may include detailed information of the file delivery data. An EFDT may indicate an extended File Delivery Table (FDT) instance, described in more detail below. The idRef attribute may indicate the identifier of the EFDT and may be represented as a URI by the corresponding transport session. The realtime attribute may indicate that the corresponding LCT packets include an extension header. The extension header may include a timestamp indicating the presentation time of the delivery object. The minBufferSize attribute may define the maximum amount of data needed to be stored in the receiver. The Application Identifier element may provide additional information that may be mapped to an application carried by that transport session. For example, the Representation ID of the DASH content or the Adaptation Set parameter of the DASH representation for selecting a transport session for rendering may be provided as additional information. The PayloadFormat element may define the payload format of a ROUTE packet carrying an object of the source flow. The PayloadFormat element may include a codePoint attribute, a deliveryObjectFormat attribute, a fragmentation attribute, a deliveryOrder attribute, a sourceFecPayloadID attribute, and/or a FECParameters element. The codePoint attribute may define the structure of the packet with the code point value used in the payload. This may indicate the value of the CP field in the LCT header.

The deliveryObjectFormat attribute may indicate the payload format of the delivery object. The fragmentation attribute may define fragmentation rules when an object to be transmitted is divided into one or more transport packets. The deliveryOrder attribute may indicate the order of transmission of the content of each transport packet carrying one transport object. The sourceFecPayloadID attribute may define the format of the source FEC payload identifier. The FECParameters element may define FEC parameters. This may include FEC encoding id and instance id.

FIG. 126 shows an EFDT of a next generation broadcast system according to an embodiment of the present invention.

The EFDT may include detailed information of the file delivery data. The EFDT may include an idRef attribute, a version attribute, a maxExpiresDelta attribute, a maxTransportSize attribute, and a FileTemplate element. The idRef attribute may indicate the identifier of the EFDT. The version attribute may indicate the version of the EFDT instance descriptor. This attribute may be incremented by 1 when EFDT is updated. It may indicate that the EFDT having the highest version number among the received EFDTs is the currently valid version. The maxExpiresDelta attribute may indicate the maximum expiry time of the object after the first packet associated with the object is sent.

The maxTransportSize attribute may indicate the maximum transmission size of the object described by the EFDT. For the FileTemplate element, the file URL or file template of the body part may be specified.

The transport session instance descriptor (LSID) element may be transmitted by the Transport Session Instance Descriptor Table (LSID Table) at the bottom of the figure. The LSID table may be transmitted by the above-described signaling message, which may be divided into a signaling message header and a signaling message data part. The signaling message data part may include a transport session instance descriptor (LSID) or a part thereof. The signaling message data may include a Transport Session Instance Descriptor (LSID) Table and may include the following fields. The Signaling_id field may indicate identifier information indicating that the signaling table includes a transport session instance descriptor (LSID). The protocol_version field may indicate a protocol version of the signaling, such as a signaling syntax that includes a transport session instance descriptor (LSID). The Signaling_version field may indicate a change in signaling data, including a transport session instance descriptor (LSID). In addition, the transport session instance descriptor table may further include the content of the LSID element described above.

Figure 127:
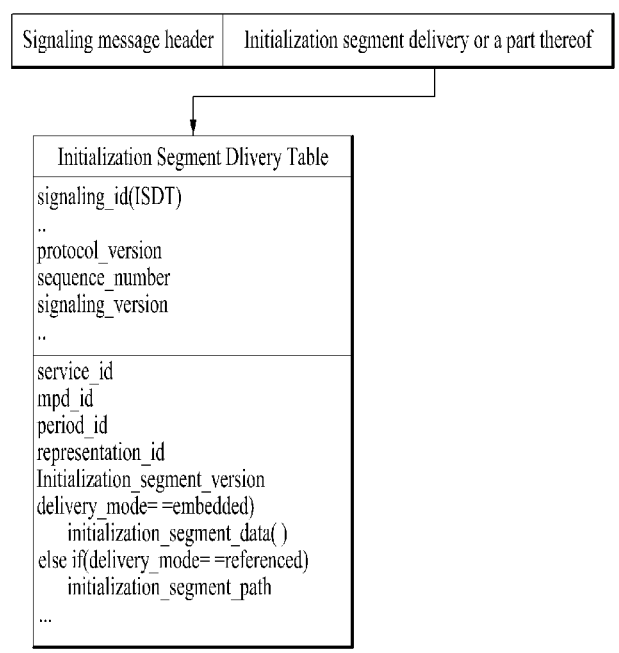

FIG. 127 shows a method for transmitting an ISDT used by a next generation broadcast system according to an embodiment of the present invention.

The next generation broadcast system may transmit signaling information for the initialization segment of the DASH Representation associated with the component in the broadcast service by transmitting the Initialization Segment Delivery Table (ISDT). A signaling message for the initialization segment of a DASH Representation associated with a component in a broadcast service may include a header and data. The signaling message header may conform to the above-described format, and the signaling message data may include initialization segment delivery information or a part thereof.

The initialization segment delivery information may include the following information.

The Signaling_id information may identify the initialization segment or a signaling message including path information. The protocol_version information may indicate the protocol version of the initialization segment delivery table, such as the syntax of the corresponding signaling message. The Sequence_number information may indicate the identifier for an instance of the initialization segment delivery table. The Signaling_version information may indicate a change in the signaling data of the initialization segment delivery table. The Service id information may identify the service associated with the component.

The Mpd_id information may indicate an associated DASH MPD identifier associated with the component.

The period_id information may indicate an associated DASH Period identifier associated with the component. The representation_id information may indicate a DASH representation identifier associated with the component. The initialization_segment_version information may be version information indicating a change of the corresponding MPD or the like. The Delivery_mode information may indicate information about whether the initialization segment is included or is transmitted through another route. Initialization_segment_data( ) information may contain the initialization segment data itself. The initialization segment path information may include information on a path for acquiring an initialization segment, such as a URL for an initialization segment. Through the ISDT, the receiver may receive information about the Initialization segment of the DASH Representation associated with the component.

FIG. 128 shows a delivery structure of a signaling message of a next generation broadcast system according to an embodiment of the present invention.

The above signaling data may be communicated as shown in the figure if it is sent based on an application layer transport, for example, ROUTE. That is, a part signaling may be transmitted through a fast information channel in order to support rapid service scan. And a part of the signaling may be transmitted over a specific transport session and may also be delivered mixed with the component data.

The signaling information for supporting the rapid service scan and acquisition may be received on a channel separate from the transport session. Here, the separate channel may mean a separate data pipe (DP). Further, detailed information about the service may be received through a separately designated transport session. The transport session may have a value of TSI=0. The information delivered through the transport session designated herein may include an MPD delivery table, an application signaling table, a transport session instance description table, and/or a component mapping table. In addition, a part of signaling information may be delivered in the transport session along with the component data. For example, an initialization segment delivery table may be delivered with the component data.

The lower part of the figure shows an embodiment of acquiring a broadcast service in a next generation broadcast network. The receiver may tune the broadcast and acquire and parse information for rapid service scanning and acquisition when the service is selected. The location of the service layer signaling or transport session instance description (e.g., LSID) is then determined from the information for rapid service scan and acquisition to acquire and parse the description. In addition, the receiver may identify the transport session including the signaling, from which it may acquire and parse the signaling table, and determine a desired component. Through this process, the desired component may be presented. That is, the broadcast service may be provided to the user by acquiring information about the transport session from the information for rapid service scan and acquisition, checking the position of the desired component from the information about the transport session, and reproducing the component.

Hybrid broadcast can provide services through applications. Specifically, a broadcaster may provide broadcast content related information through applications. For example, the broadcaster may provide an application through which products used by actors in broadcast content can be purchased. For such an application, a broadcast transmission device 10 may transmit application signaling information for signaling an application. The application signaling information may include at least one of a trigger for triggering an application action and triggering application information for signaling information about a triggered application. This will be described with reference to the attached drawings.

The triggering application information may include additional information necessary to execute the application. Specifically, the triggering application information may include application properties. Further, the triggering application information may include information on a position at which a file included in the application can be downloaded and received. In addition, the triggering application information may include information on a position at which an NRT content item used by the application can be received.

Furthermore, the triggering application information may signal life-cycle variation of the application. Specifically, the lift-cycle of the application may include at least one of preparing, executing, terminating and suspending. For example, execution of the application may be prepared through the preparing state. In addition, the application may be executed in the preparing state. The application may enter the terminating state by terminating execution thereof. Further, execution of the application may be suspended in the suspending state.

The triggering application information may include an action to be executed by the application. Specifically, the triggering application information may include data necessary to execute an application action.

The triggering application information may include media time. Specifically, the triggering application information may include media time of content synchronized with the application.

Specifically, the broadcast transmission device 10 may transmit a trigger for triggering an application action. Further, a broadcast reception device 100 may cause the application to execute a specific action on the basis of the trigger. Specifically, the trigger may have the format below.

The trigger may include a domain part indicating a registered Internet domain name. In addition, the trigger may include a directory path part indicating a random character string for identifying a directory path of the domain name indicated by the domain part. Further, the trigger may include a parameter part indicating a parameter for triggering the application. Specifically, the trigger may have the following format.

<domain name part>/<directory path>[?<parameter>]

Here, the domain name part and the directory path part may be mandatory parts essentially included in the trigger. In addition, the parameter part is an optional part optionally included in the trigger. The parameter part may include at least one of an event ID for identifying an event, an application ID for identifying a target application of the trigger, and a timing value indicating a time when an event is performed. Furthermore, the parameter part may include content media time. Moreover, the parameter part may include a content ID for identifying content reproduced by the broadcast reception device 100. In addition, the parameter part may include spread information for spreading triggering application information request traffic of the broadcast reception device 100. Further, the parameter set may include version information indicating a version of triggering application information related to the trigger.

Specifically, the parameter part may include at least one of the following strings.

<media time>
<media time> and <spread>
<media time> and <version>
<media time> and <version> and <spread>
<event time>
<event time> and <spread>
<event time> and <version>
<event time> and <version> and <spread>

<event time> may include an event ID for identifying an event. Here, the event may refer to execution of an action by the application according to the trigger. Here, the event ID may be designated by "e=". In addition, the event ID may include two or three decimals following "e=". Here, the decimals may be discriminated using a period ("."). Further, <event time> may include an application ID for identifying the application that is a target of the trigger. Here, the application may be called a triggered declarative object (TDO). The application ID may be matched to an application ID of the triggering application information. Accordingly, the broadcast reception device 100 may acquire information about the application that is a target of the trigger from the triggering application information on the basis of the application ID of the trigger. Here, the triggering application information may be a TDO parameter table (TPT) for signaling trigger information. In addition, the parameter part may include a data ID for identifying a data element used for the event. Further, the parameter part may include a timing value indicating a time when the event is performed. Here, the timing value may be designated by "t=". In a specific embodiment, the timing value may be designated as a hexadecimal represented by one to eight characters following "t=". When <event time> does not include the timing value, the trigger may trigger the application to execute the event at the trigger reception time.

<media time> may include media time of content. Specifically, <media time> may indicate a media time stamp of content synchronized with the application triggered by the trigger. Specifically, the media time may be designated by "m=". The media time may be designated as a hexadecimal represented by one to eight characters following "m=". Further, <media time> may be denoted in milliseconds. In addition, <media time> may indicate a content ID for identifying content currently reproduced by the broadcast reception device 100. The content ID may be designated by "c=". Specifically, when an application is executed according to a direct execution model, <media time> may include the content ID. In a specific embodiment, the broadcast reception device 100 may receive a time base trigger delivering reference time for application synchronization and extract the content ID from the time base trigger. Here, the broadcast reception device 100 may receive an interactive service for content currently reproduced thereby by transmitting the content ID to a server for the interactive service.

<version> may include version information indicating a version of the triggering application information related to the trigger. Here, the triggering application information may be a TPT. Specifically, the version information may be designated by "v=". Further, the version information may be designated by a decimal represented by one to three characters following "v=". The broadcast reception device 100 may extract the version information from the trigger and acquire the triggering application information on the basis of the version information.

<spread> may include spread information that is a criterion for calculation of a time for which the broadcast reception device 100 needs to wait to request that a server providing the application signaling information provide the triggering application information. Specifically, the broadcast reception device 100 may calculate a random value on the basis of the time indicated by the spread information, wait for the random value and then request the triggering application information. The spread information may be designated by "s=". Specifically, the spread information may be designated by a decimal represented by one to three characters following "s=". The broadcast reception device 100 can request the triggering application information through the spread information to prevent traffic of the server providing the triggering application information from being concentrated on the trigger reception time.

<others> may include information other than the aforementioned parameters. The broadcast reception device 100 may ignore parameters that are not recognizable.

A trigger including a media time of content may be called a time base trigger. Specifically, the time base trigger may deliver a media time stamp of content reproduced by the broadcast reception device 100. In addition, the broadcast reception device 100 may generate a reference time for synchronization between an application action and content on the basis of the time base trigger.

A trigger including an event time may be called an activation trigger because the activation trigger designates a time when the corresponding event is performed. The broadcast reception device 100 may perform a triggered operation on the basis of the event time of the trigger. Specifically, the broadcast reception device 100 may extract the event time from the trigger and perform an operation triggered at the event time.

In addition, the parameter part of the trigger may include not only a timing value indicating a time when an event starts to be performed but also a timing value indicating a time when the event is ended. Further, when the broadcast reception device 100 receives the trigger after an event start time and before an event end time, the broadcast reception device 100 may perform the event triggered by the trigger. Specifically, the parameter part may include <event start time> and <event end time>.

<event start time> may include a timing value indicating a time when an event starts to be performed. The timing value may be designated by "st=" following "e=" identifying the event.

<event end time> may include a timing value indicating a time when the event is ended. The timing value may be designated by "et=" following "e=" identifying the event.

FIG. 129 illustrates a trigger according to the aforementioned trigger syntax.

The trigger syntax according to another detailed embodiment may have a time text format indicated at a predetermined time. In detail, the timed text may be a closed caption.

FIG. 130 illustrates the syntax of triggering application information according to an embodiment of the present invention.

As described above, the triggering application information may be referred to as TPT. The triggering application information may signal a corresponding application corresponding to all program segments or some program segments according to time. In this case, the program segment may indicate a time period including a program.

The triggering application information may include protocol version information indicating a protocol version of triggering application information. In detail, the triggering application information may include major protocol version information indicating main version information of a protocol and minor protocol version information indicating additional version information of a protocol. In this case, the major protocol version information may correspond to a 3-bit integer. When the broadcast receiving apparatus 100 is not capable of supporting any one of the major protocol version information and the minor protocol information, the broadcast receiving apparatus 100 may disregard the triggering application information. The major protocol version information may be referred to as MajorProtocolVersion. The minor protocol version information may be referred to as MinorProtocolVersion. In a detailed embodiment, the major protocol version information may be a 3-bit element. The minor protocol version information may be a 4-bit element.

The triggering application information may include an identifier for identifying the triggering application information. In detail, the triggering application information may be an identifier for identifying a program segment. In a detailed embodiment, the identifier for identifying the program segment may be generated by combining a domain name and a program ID. For example, the identifier may be domain_name/program_id.

The triggering application information may include version information for indicating an update history of the triggering application information. A value of the version information may be changed whenever the triggering application information is changed. The broadcast receiving apparatus 100 may determine whether detailed information included in the triggering application information is extracted based on the version information. In a detailed embodiment, the version information may be referred to as tptVersion. In a detailed embodiment, the version information may be an 8-bit element.

The triggering application information may include expiration time information indicating expiration date and time of the triggering application information. In detail, the broadcast receiving apparatus 100 may store the triggering application information and reuse the triggering application information prior to the expiration date and time indicated by the expiration time information. In a detailed embodiment, the expiration time information may be referred to as expirationDate. In a detailed embodiment, the expiration time information may be a 16-bit element.

The triggering application information may include time interval information indicating a time interval for checking update of the triggering application information. In detail, the broadcast receiving apparatus 100 may update the triggering application information at a time interval indicated by the time interval information. In a detailed embodiment, the time interval information may be referred to as updatingTime. In a detailed embodiment, the time interval information may be a 16-bit integer.

The triggering application information may include a service identifier for identifying a service including an application. In a detailed embodiment, the service identifier may indicate an identifier of an NRT service defined in the ATSC standard. In a detailed embodiment, the service identifier may be referred to as serviceId. In a detailed embodiment, the service identifier may be a 16-bit integer.

The triggering application information may include a base URL indicating a basic address of a URL included in the application information. In a detailed embodiment, the base URL may be referred to as baseURL.

The triggering application information may include capability information indicating capability required for presentation of an application signaled by the application information. The capability information may comply with a definition of capabilities descriptor defined in the ATSC standard. In a detailed embodiment, the capability information may be referred to as capabilities.

The triggering application information may include live trigger information that is generated in real time and transmitted via the Internet together with transmission of content. In detail, the live trigger information may include a URL of a server for transmitting a live trigger. The live trigger information may include a polling period when a live trigger is transmitted using a polling method. In a detailed embodiment, the live trigger information may be referred to as LiveTrigger. In addition, a URL of a server for transmitting the live trigger may be referred to as a URL. In addition, the polling period may be referred to as pollPeriod.

The triggering application information may include information on an application. The application information may include detailed information on an application as a sub-element. In a detailed embodiment, the application information may be referred to as TDO.

The application information may include an application identifier for identifying an application. In a detailed embodiment, the application identifier may be referred to as appID. In a detailed embodiment, the application identifier may be a 16-bit element.

The application information may include application type information indicating a type of an application. In a detailed embodiment, when a value of the application type information is 1, the application type information may indicate TDO. In a detailed embodiment, the application type information may be referred to as appType. In a detailed embodiment, application type information may be a 16-bit element.

The application information may include application name information indicating a name of an application. In a detailed embodiment, the application name information may be referred to as appName.

The application information may include a global identifier for globally uniquely identifying an application. The global identifier may be used to indicate the same application as in other application information as well as corresponding triggering application information. In a detailed embodiment, the global identifier may be referred to as globalID.

The application information may include application version information that is version information indicating an update history of an application. In a detailed embodiment, the application version information may be referred to as appVersion. In a detailed embodiment, the appVersion may be an 8-bit element.

The application information may include cookie space information indicating a size of a persistent storage space required to execute an application by the broadcast receiving apparatus 100. The cookie space information may indicate a size of a storage space required to execute an application in kilobytes. In a detailed embodiment, the cookie space information may be referred to as cookieSpace. In a detailed embodiment, the cookie space information may be an 8-bit element.

The application information may include use frequency information indicating a use frequency of an application. The use frequency information may indicate at least one of only once, every time, every day, every week, and every month. In a detailed embodiment, the use frequency information may have a value of 1 to 16. In a detailed embodiment, the use frequency information may be referred to as frequencyOfUse.

The application information may include expiration time information indicating expiration time and date of an application. In a detailed embodiment, expiration time information may be referred to as expireDate.

The application information may include test application information indicating an application for test broadcast. The broadcast receiving apparatus 100 may disregard an application for test broadcast based on test application information. In a detailed embodiment, the test application information may be referred to as testTDO. In a detailed embodiment, the test application information may be a Boolean element.

The application information may include Internet available information indicating that an application is capable of being received through the Internet. In a detailed embodiment, the Internet available information may be referred to as availableInternet. In a detailed embodiment, the Internet available information may be a Boolean element.

The application information may include broadcast available information indicating that an application is capable of being received through a broadcast network. In a detailed embodiment, the broadcast available information may be referred to as availableBroadcast. In a detailed embodiment, the broadcast available information may be a Boolean element.

The application information may include URL information for identifying a file as a part of an application. In a detailed embodiment, the application information may be referred to as URL.

The URL information may include entry information indicating whether a corresponding file is an entry file. In detail, the entry file may indicate a file to be first executed in order to execute a corresponding application.

The application information may include capability information indicating necessary capability information required for presentation of an application. In a detailed embodiment, the capability information may be referred to as Capabilities.

The application information may include application boundary information indicating a boundary of an application. In a detailed embodiment, the application boundary information may be referred to as ApplicationBoundary.

The application boundary information may include origin URL information required to add a boundary of an application. The origin URL information may be referred to as originURL.

The application information may include content item information indicating information on a content item used by an application. The content item information may include detailed information content item. In a detailed embodiment, the content item information may be referred to as contentItem.

The content item may include URL information for identifying a file as a part of a corresponding content item. The URL information may be referred to as URL.

The URL information may include entry information indicating whether a corresponding file is an entry content file. In detail, the entry file may indicate a file to be first executed in order to execute a corresponding content item. In a detailed embodiment, the entry information may be referred to as entry.

The content item information may include update information indicating whether a corresponding content item is capable of being updated. In detail, the update information may indicate whether a content item includes a fixed file or the content item is real time data feed. In a detailed embodiment, the update information may be referred to as updateAvail. The update information may be a Boolean element.

The content item information may include a polling period when the content item is updated and when whether a file included in the content item is updated is checked using a polling method. In detail, the broadcast receiving apparatus 100 may check whether the content item is updated based on the polling period. The polling period may be referred to as pollPeriod.

The content item information may include size information indicating a size of the content item. In a detailed embodiment, the size information may indicate a size of the content item in a kilo byte. The size information may be referred to as a size.

The content item information may include Internet available information indicating that the content item is capable of being received through the Internet. In a detailed embodiment, the Internet available information may be referred to as availableInternet. In a detailed embodiment, the Internet available information may be a Boolean element.

The content item information may include broadcast available information indicating that the content item is capable of being received through a broadcast network. In a detailed embodiment, the broadcast available information may be referred to as availableBroadcast. In a detailed embodiment, the broadcast available information may be a Boolean element.

The application information may include event information indicating information on an event of an application. In a detailed embodiment, the event information may be referred to as event.

The event information may include an event identifier for identifying an event. In detail, the event identifier may uniquely identify an event within a corresponding application range. In a detailed embodiment, the event identifier may be referred to as eventID. In a detailed embodiment, the event identifier may be a 16-bit element.

The event information may include action information indicating an operation of an event. In detail, the event information may include preparing, execution, termination or kill, and/or suspending. In a detailed embodiment, the action information may be referred to as an action.

The event information may include destination information indicating target information targeted by an application. The destination information may indicate that an application is used only for a primary device for receiving a broadcast signal. The destination information may indicate that an application is used only for one or more associated devices that are operatively associated with a primary device for receiving a broadcast signal. The destination information may indicate that an application is used for both a primary device and an associated device. In a detailed embodiment, the destination information may be referred to as destination.

The event information may include diffusion information for diffusion of a triggering application information request. In detail, the broadcast receiving apparatus 100 may calculate a random value based on diffusion information, may be on standby by as much as the random value and, then may make a request for the triggering application information to a server. In detail, the broadcast receiving apparatus 100 may be on standby by as much as a value obtained by multiplying the random value by 10 ms and then may make a request for the triggering application information to the server. In a detailed embodiment, the diffusion information may be referred to as diffusion. In a detailed embodiment, the diffusion information may be an 8-bit element.

The event information may include data information indicating data associated with an event. Each event may have a data element associated with an event. In a detailed embodiment, the data information may be referred to as data.

The data information may include a data identifier for identifying data. The data identifier may be referred to as dataID. The data identifier may be a 16-bit element.

Transmission of the event of the MPEG-DASH through the MPD will be described below with reference to FIGS. 131 to 132.

FIG. 131 illustrates the syntax of an event stream element including an MPD according to an embodiment of the present invention. FIG. 132 illustrates the syntax of an event element of an event stream element included in the MPD according to an embodiment of the present invention.

Presentation time of an event sequence of the MPEG-DASH may be provided at a period level. In detail, the period element of the MPD may include an event stream element indicating information on an event stream. The broadcast receiving apparatus 100 may terminate an event when termination time of a period including an event elapses. In particular, even if an event is started at a boundary time of a period, the broadcast receiving apparatus 100 may also terminate the event when the termination time of the period including the event elapses.

The period element may include an event stream element including information on an event stream. In a detailed embodiment, the event stream element may be referred to as an event stream.

The event stream element may include a format identifier element for identifying format of a message included in an event. In a detailed embodiment, the format identifier element may be referred to as schemeIDUri.

The event stream element may include a value element indicating a value for an event stream. In a detailed embodiment, value attribute may be referred to as a value.

When an event including an event stream is a timed event, the event stream element may include time scale attribute indicating a time unit. In a detailed embodiment, the time scale attribute may be referred to as a timescale.

The event stream element may specify each event and include an event element including a message that is information of the event. In a detailed embodiment, the event element may be referred to as an event.

The event element may include presentation start time attribute indicating presentation start time of an event. In detail, the presentation start time attribute may indicate relative presentation start time based on the period start time. When the presentation start time attribute is not present, a value of the presentation start time may be 0. In a detailed embodiment, the presentation start time attribute may be referred to as presentationTime.

The event element may include presentation duration attribute indicating event presentation duration. When the presentation duration attribute is not present, a value of the presentation duration may be unknown. In a detailed embodiment, the presentation duration attribute may be referred to as duration.

The event element may include identifier attribute for identifying an event. Events with the same content and events with the same attribute value of an event element may have the same identifier element value.

Transmission of an event of the MPEG-DASH through an inband stream will be described with reference to FIG. 133.

FIG. 133 illustrates the syntax of an event message box for inband event signaling according to an embodiment of the present invention.

The broadcast server 10 may multiplex an event stream of the MPEG-DASH together with representation. In detail, the broadcast server 10 may multiplex the event stream of the MPEG-DASH as a part of a segment together with representation.

The event stream of the MPEG-DASH may be inserted into selected representation. In a detailed embodiment, the broadcast server 10 may insert an event stream into partial representation included in an adaptation set. In another detailed embodiment, the broadcast server 10 may insert the event stream into all representation included in the adaptation set.

The inband event stream included in representation may be represented by an inband event stream element included in the adaptation set or representation level. In a detailed embodiment, the inband event stream element may be referred to as InbandEventStream. In a detailed embodiment, one representation may include a plurality of inband event streams. Each of the plurality of inband event streams may be represented by a separate inband event stream element.

An event message box 'emsg' may provide signaling for a general event related to media presentation time. The event message box may signal a specific operation related to the DASH operation. When a media segment is encapsulated in the form of ISO BMFF, the media segment may include one or more event message boxes. The event message box may be positioned prior to a moof box 'moof'.

A scheme of the event message box may be defined in the MPD. The broadcast receiving apparatus 100 may disregard the event message box with a scheme that is not defined in the MPD.

The event message box may include a scheme identifier field for identifying a scheme of the event message box. In a detailed embodiment, the scheme identifier field may be referred to as shceme id uri.

The event message box may include a value field indicating a value of an event. A value of the value field may have a different scheme and meaning according to a scheme identified according to a scheme identifier field. In a detailed embodiment, the value field may be referred to as a value.

The event message box may include a time scale field indicating a unit of time related to the event message box. In detail, the event message box may indicate a presentation start time delay field including the event message box and a time unit of the presentation duration field. In a detailed embodiment, the time scale field may be referred to as timescale.

The event message box may include a presentation start time delay field indicating a degree by which presentation start time of an event is delayed from an earliest presentation time of a segment. In detail, the broadcast receiving apparatus 100 may extract earliest presentation time of a segment from a segment index box 'sidx'. In this case, the broadcast receiving apparatus 100 may add time indicated by the presentation start time delay field to the segment presentation time to acquire event presentation start time. In a detailed embodiment, the event presentation start time may be referred to as presentation_time_delta.

The event message box may include an event presentation duration field indicating presentation duration of an event. When a value of the event presentation duration field is 0xffff, this may indicate that the event presentation duration is unknown. In a detailed embodiment, the event presentation duration may be referred to as event_duration.

The event message box may include identifier attribute for identifying an event. Events with the same content and events with the same attribute value of the event message box may have the same identifier element value.

The event message box may include a message data field indicating a body of the message box. Data of the message data field may be changed according to a scheme of the message box.

Attribute of a trigger may be matched with the event message box indicating the inband event stream and an element of the MPD indicating an event stream of the MPEG-DASH and the application signaling information may be transmitted, which will be described below.

First, for clarity for distinguishing terms, an event of MPEG-DASH and an event described with regard to the triggering application information will be described. The event of the MPEG-DASH may be additional information related to media time for aperiodic transmission to a DASH client and/or an application. The event described with regard to the triggering application information may indicate a time for triggering by a trigger. In detail, the event triggered by the trigger may indicate that an application performs a specific operation. In addition, the event triggered by the trigger may indicate a state change of an application. For distinguishing between the event of the MPEG-DASH and the event triggered by the trigger, the event triggered by the trigger will be referred to as a triggering event. In detail, the triggering event may indicate an event that is generated by the trigger.

FIG. 134 illustrating a matching relationship of trigger attribute, the MPD element, and the event message box, for signaling trigger type information, according to an embodiment of the present invention.

The trigger type information may indicate a type of a trigger for triggering an application. For example, the trigger type information may include at least one of a trigger for signaling a position of triggering application information (i.e. TPT), a trigger for signaling a state of an application, a trigger for signaling an action of an application, and/or a trigger for signaling media time.

The broadcast server 10 may transmit the trigger type information as the event of the MPEG-DASH. In this case, the scheme identifier element included in the event stream element of the MPD may include information for identifying a scheme of a message included in the event. For example, the scheme identifier element may include information using syntax of uniform resource name (URN) or uniform resource locator (URL). The value element included in the event stream element of the MPD may include a value for the event stream. For example, the value element may include trigger type information indicating a type of a trigger for triggering an application. The broadcast receiving apparatus 100 may receive the trigger type information based on the event stream element of the MPD. In detail, the broadcast receiving apparatus 100 may extract a scheme identifier element and/or a value element from the event stream element of the MPD and receive the trigger type information.

In another detailed embodiment, a scheme identifier field included in the event message box may include information for identifying a scheme of the event message box. for example, the scheme identifier field may include information using syntax of uniform resource name (URN) or uniform resource locator (URL). The value field including the event message box may include a value of an event. For example, the value field may include trigger type information indicating a type of a trigger for triggering an application. The broadcast receiving apparatus 100 may receive the trigger type information based on the event message box. In detail, the broadcast receiving apparatus 100 may extract a scheme identifier field and/or value field of the event message box and receive trigger type information.

FIG. 135 illustrates trigger type information according to an embodiment of the present invention.

The trigger type information may indicate a type of a trigger for triggering an application. For example, the trigger type information may include at least one of a trigger for signaling a location of triggering application information (i.e. TPT), a trigger for signaling a state of an application, a trigger for signaling an action of an application, and/or a trigger for signaling media time.

According to an embodiment of the present invention, the broadcast server 10 may identify the trigger type information based on a value field of the value element and/or the event message box of the event stream element of the MPD and transmit the trigger type information to the broadcast receiving apparatus 100. Hereinafter, the value element and/or the value field value will be referred to as value information. A value corresponding to the value information may be changed and/or added.

For example, when the value information indicates "tpt", the trigger type information may indicate a trigger for triggering a location of the triggering application information (i.e. TPT). The location of the triggering application information may be represented in the form of a uniform resource identifier (URI). The URI may include uniform resource locator (URL) and/or uniform resource name (URN). The URL may be information indicating a location of a network of web resource. The URN may be information for identifying resource according to a name of a specific namespace. When the URN indicates a location in On-line, a location of the triggering application information may be represented as "http://[domain]/[directory]". When the URN indicates a location on a session (e.g. FLUTE session, ROUTE session, and ALC/LCT session), the location of the triggering application information may be represented as "file://[ip_address]/[path]". That is, the scheme identifier element and/or the scheme identifier field may be represented as http://[domain]/[directory] and/or "file://[ip_address]/[path]".

When the value information indicates "status", the trigger type information may indicate a trigger for signaling a status (or lifecycle) of an application. The status of the application may include at least one of preparing, execution, termination, and/or suspending.

When the value information indicates "action", the trigger type information may indicate a trigger for signaling an action of an application.

When the value information indicates "mediatime", the trigger type information may indicate a trigger for signaling media time.

FIG. 136 illustrates the syntax of triggering application information according to an embodiment of the present invention.

According to an embodiment of the present invention, in a next-generation hybrid broadcast system, when the broadcast server 10 transmits trigger type information using a trigger, action information may be omitted from the aforementioned triggering application information.

FIG. 137 illustrates a matching relationship of trigger attribute, the MPD element, and the event message box, for signaling a position of information on a triggered application, according to an embodiment of the present invention.

The broadcast server 10 may transmit a position of the triggering application information as an event of MPEG-DASH. In this case, the identifier attribute included in the event element of the MPD may indicate an identifier for identifying the triggering application information. In addition, the position of the event may indicate a position of the triggering application information. The broadcast receiving apparatus 100 may receive triggering application information based on the event element. In detail, the broadcast receiving apparatus 100 may extract a position of the triggering application information from a message of the event and receive triggering application information.

In another detailed embodiment, an identifier field included in the event message box may indicate an identifier for identifying triggering application information. The message data field included in the event message box may indicate a position of the triggering application information. The broadcast receiving apparatus 100 may receive triggering application information based on the event message box. In detail, the broadcast receiving apparatus 100 may extract a position of the triggering application information from the message data field of the event message box and receive the triggering application information.

As described above, the triggering application information may be TPT.

FIG. 138 illustrates a matching relationship of trigger attribute, the MPD element, and the event message box, for signaling a status of an application, according to an embodiment of the present invention.

The broadcast server 10 may transmit the status of the application as an event of MPEG-DASH. In this case, the presentation start time element included in the event element of MPD may indicate start time of the triggering event. The identifier attribute included in the event element of the MPD may indicate an identifier for identifying the triggering application information. A message included in the event element may indicate a status of an application. The broadcast receiving apparatus 100 may change the application status based on the event element. In detail, the broadcast receiving apparatus 100 may extract the application status from the message included in the event element and change the application status. In detail, the broadcast receiving apparatus 100 may extract a state of an application from a message included in an event element, extract event start time from the presentation start time element, and change the state of the application at start time of the triggering event.

In another detailed embodiment, a presentation start delay time field including the event message box may indicate start tie of the triggering event. An identifier field including the event message box may indicate an identifier for identifying the triggering application information. A message data field included in the event message box may indicate a state of an application. The broadcast receiving apparatus 100 may change a state of the application based on the event message box. In detail, the broadcast receiving apparatus 100 may extract the state of the application from the message data field of the event message box and change the state of the application. In a detailed embodiment, the broadcast receiving apparatus 100 may extract the state of the application from the message data field of the event message box, extract start time of the triggering event from the presentation start time delay field, and change the state of the application at start time of the triggering event.

The state of the application may indicate at least one of preparing, execution, termination, and suspending.

As described above, the triggering application information may be TPT.

FIG. 139 is a matching relationship of trigger attribute, an MPD element, and an event message box, for signaling an action of an application, according to an embodiment of the present invention.

The broadcast server 10 may transmit an action of an application as an event of MPEG-DASH. In this case, a presentation start time element included in an event element of MPD may indicate start time of the triggering event. The presentation duration element included in the event element of MPD may indicate a difference between start time of the triggering event and termination time of the triggering event. In another detailed embodiment, the presentation duration element included in the event element of MPD may indicate termination time of the triggering event. The identifier attribute included in the event element of MPD may indicate an identifier for identifying the triggering application information. A message included in the event element may indicate a carried-out action of an application. In detail, the message included in the event element may include at least one of an application identifier for identifying a triggered application, an identifier of an event for identifying a triggering event, and a data identifier for identifying data. In detail, the message included in the event element may have the aforementioned trigger format. In this case, the message included in the event element may not include start time of the triggering event included in the aforementioned attribute, termination time of the triggering event, and an identifier for identifying the program segment. For example, the message included in the event element may be xbc.tv/e12?e=7.5. The broadcast receiving apparatus 100 may perform the action of the application based on the event element. In detail, the broadcast receiving apparatus 100 may extract the action of the application from the message included in the event element and perform the action of the application. In detail, the broadcast receiving apparatus 100 may extract the action of the application from the message included in the event element, extract start time of the triggering event from the presentation start time element, and perform the action of the application at start time of the triggering event. In a detailed embodiment, the broadcast receiving apparatus 100 may extract the action of the application from the message included in the event element, extract start time of the triggering event from the presentation start time element, and perform the action of the application prior to termination time of the triggering event after start time of the triggering event. The broadcast receiving apparatus 100 may disregard the event message of MPEG-DASH upon receiving the MPEG-DASH event message after the termination time of the triggering event.

In another detailed embodiment, a presentation start delay time field including the event message box may indicate start time of the triggering event. The presentation duration field included in the event message box of the MPD may indicate a difference between start time of the triggering event and termination time of the triggering event. In another detailed embodiment, a presentation duration field including the event message box of the MPD may indicate termination time of the triggering event. The identifier field included in the event message box may indicate an identifier for identifying the triggering application information. The message data field included in the event message box may indicate the action of the application. In detail, the message data field included in the event message box may include at least one of an application identifier for identifying a triggered application, an identifier of an event for identifying a triggering event, and a data identifier for identifying data. In detail, the message data field included in the event message box may have the aforementioned trigger format. In this case, the message data field included in the event message box may not include start time of a triggering event included in the aforementioned attribute, termination time of the triggering event, and an identifier for identifying the program segment. For example, the message data field included in the event message box may be xbc.tv/e12?e=7.5. The broadcast receiving apparatus 100 may perform the action of the application based on the event message box. In detail, the broadcast receiving apparatus 100 may extract the action of the application from the message data field of the event message box and perform the action of the application. In a detailed embodiment, the broadcast receiving apparatus 100 may extract the action of the application from the message data field of the event message box, extract start time of the triggering event from the presentation start time delay field, and perform the action of the application at start time of the triggering event. In a detailed embodiment, the broadcast receiving apparatus 100 may extract the action of the application from the message data field of the event message box, extract start time of the triggering event from the presentation start time delay field, and perform the action of the application prior to termination time of the triggering event after start time of the triggering event. The broadcast receiving apparatus 100 may disregard the event message box upon receiving the event message box after termination time of the triggering event.

FIG. 140 is a matching relationship of trigger attribute, an MPD element, and an event message box, for signaling media time, according to an embodiment of the present invention.

The broadcast server 10 may transmit media time of content as an event of MPEG-DASH. In this case, the presentation start time element included in the event element of MPD may indicate media time of the content. In this case, the content may be content presented by the broadcast receiving apparatus 100. The identifier attribute included in the event element of the MPD may indicate an identifier for identifying the triggering application information. The broadcast receiving apparatus 100 may extract media time of content based on the event element. The broadcast receiving apparatus 100 may generate a time line as a reference of synchronization between a triggering event and content based on the media content of the content. In detail, the broadcast receiving apparatus 100 may extract the media time of the content from the presentation start time element included in the event element and generate a time line as a reference of synchronization between the triggering event and the content.

The presentation start time delay field included in the event message box of MPD may indicate media time of the content. In this case, the content may be content presented by the broadcast receiving apparatus 100. The identifier attribute included in the event element of MPD may indicate an identifier for identifying the triggering application information.

The broadcast receiving apparatus 100 may extract media time of the content based on the event message box. The broadcast receiving apparatus 100 may generate a time line as a reference of synchronization between the triggering event and the content based on the media time of the content. In this case, the content may be content presented by the broadcast receiving apparatus 100. In detail, the broadcast receiving apparatus 100 may extract media time of content from the presentation start time delay field included in the event message box and generate a time line as a reference of synchronization between the triggering event and the content.

Thereby, the broadcast receiving apparatus 100 may synchronize content and triggering event even if the media time information included in the content is not extracted.

FIG. 141 illustrates definition of value attribute for signaling all trigger attributes as one event according to an embodiment of the present invention.

In order to transmit a trigger as an event of MPEG-DASH, an event element may indicate a type of information signaled by a trigger. In detail, value attribute included in the event stream element may indicate that a trigger included in the message of an event signals a position of the triggering application information. In this case, a value of the value attribute may be tpt. The value attribute included in the event stream element may indicate that a trigger included in the message of the event signals a state of the application. In this case, the value of the value attribute may be status. The value attribute included in the event stream element may indicate that a trigger included in the message of the event signals the action of the application. In this case, the value of the value attribute may be an action. The value attribute included in the event stream element may indicate that a trigger included in the message of the event signals media time of the content. In this case, the value of the value attribute may be mediatime. The value attribute included in the event stream element may indicate that all information items included in the trigger included in the message of the event are included. In this case, the value of the value attribute may be a trigger.

In another detailed embodiment, the value field included in the event message box may indicate that a trigger included in the data message field of the event message box signals a position of the triggering application information. In this case, the value of the value field may be tpt. The value field included in the event message box may indicate that a trigger included in the data message field of the event message box signals a state of the application. In this case, the value of the value field may be status. The value field included in the event message box may indicate that a trigger included in the data message field of the event message box signals the action of the application. In this case, the value of the value field may be action. The value field included in the event message box may indicate that a trigger included in the data message field of the event message box signals media time of content. In this case, the value of the value field may be mediatime. The value field included in the event message box may indicate that all trigger attributes included in a trigger of the data message field of the event message box are included. In this case, the value of the value field may be trigger, which will be described below in detail.

FIG. 142 illustrates a matching relationship of identifier attribute and message attribute of an event element, an identifier field of an event message box, and a message data field, for signaling all trigger attributes as one event, according to an embodiment of the present invention.

As described above, all attributes to be included in a trigger may be signal as one event of MPEG-DASH.

When value information indicates "trigger", the trigger type information may indicate a trigger for signaling all trigger attributes as one event.

In detail, the message of the event of the MPEG-DASH may include at least one of an identifier for identifying a triggered application, an identifier for identifying a triggering event, an identifier for identifying data, start time of a triggering event, and termination time of the triggering event.

In this case, the identifier attribute of the event element may indicate an identifier for identifying triggering application information. The message included in the event element may include a trigger itself. In detail, the message of the event element may have the aforementioned trigger format. The message included in the event element may be timed text format of trigger.

The identifier field of the event message box may indicate an identifier for identifying the triggering application information. The message data field included in the event message box may include a trigger itself. In detail, the message data field included in the event message box may include the aforementioned format of trigger. The message data field included in the event message box may include the timed text format of trigger.

Thereby, the broadcast server 10 may transmit a plurality of trigger attributes through one MPEG-DASH event message. The broadcast receiving apparatus 100 may acquire a plurality of trigger attributes through one MPEG-DASH event message.

Furthermore, a trigger may be signaled through the MMT protocol. This will be described below with reference to the attached drawings.

FIG. 143 shows a structure of a package of the MMT protocol according to an embodiment of the present invention.

As described above, the MMT protocol can be used as a protocol for transmitting media content in hybrid broadcast. Transmission of media content through the MMT protocol will be described through a package, an asset, a media processing unit (MPU) and presentation information (PI).

The package is a logical transmission unit of content transmitted through the MMT protocol. Specifically, the package can include the PI and the asset.

The asset is an encoded media data unit included in the package. In a specific embodiment, the asset may indicate an audio track included in content. Further, the asset may represent a video track included in content. The asset may indicate a captioning track included in content. The asset may include one or more MPUs.

The MPU is a media processing unit of content transmitted through the MMT protocol. Specifically, the MPU may include a plurality of access units. Further, the MPU may include data in a different format such as MPEG-4 AVC or MPEG-TS.

The PI is media content presentation information described above. Specifically, the PI may include at least one of spatial information and temporal information necessary to consume the asset. In a specific embodiment, the PI may be composition information defined in ISO-IEC 23008-1.

The broadcast transmission device 10 may transmit the package in an MMTP packet corresponding to a transmission unit of the MMT protocol. Data types included in a payload of the MMTP packet will be described with reference to the following figure.

FIG. 144 shows a structure of an MMTP packet and data types included in the MMTP packet according to an embodiment of the present invention.

The MMTP packet according to an embodiment of the present invention may have the structure shown in FIG. 92(a). Particularly, the MMTP packet can represent the type of data included therein through a type field.

The MMTP packet may include a fragment of the MPU in the payload. Further, the MMTP packet may include a generic object indicating general data in the payload. Specifically, the generic object may be one complete MPU. Further, the generic object may be an object of a different type. The MMTP packet may include a signaling message in the payload. Specifically, the MMTP packet may include one or more signaling messages. Further, the MMTP packet may include a fragment of a signaling message. The signaling message may be a unit of signaling information that signals media content transmitted through the MMT protocol. The MMTP packet may include one repair symbol. In a specific embodiment, the broadcast transmission device 10 can transmit application signaling information through the MMTP packet including a fragment of the MPU. Specifically, the broadcast transmission device 10 can transmit a trigger through the MMTP packet including a fragment of the MPU.

FIG. 145 shows a syntax of an MMTP payload header when the MMTP packet includes a fragment of the MPU according to an embodiment of the present invention.

When the MMTP packet includes a fragment of the MPU, the payload header of the MMTP packet may include a length field indicating length information of the payload of the MMTP packet. In a specific embodiment, the length field may be referred to as "length". In a specific embodiment, the length field is a 16-bit field.

When the MMTP packet includes a fragment of the MPU, the payload header of the MMTP packet may include a type field indicating the type of the MPU included in the payload of the MMTP packet. Specifically, when the MMTP packet includes a fragment of the MPU, the payload of the MMTP packet may include at least one of a media fragment unit, MPU metadata and movie fragment metadata. The MPU metadata may include ftyp, mmpu and moov of ISO BMFF and other boxes included among ftyp, mmpu and moov. The movie fragment metadata includes a moof box and a media data excluded mdat box. The media fragment unit may include at least one of a sample of media data and a sub-sample. Here, the media data may be one of timed media data and non-timed media data. In a specific embodiment, the type field may be referred to as FT. In a specific embodiment, the length field may be a 4-bit field.

When the MMTP packet includes a fragment of the MPU, the payload header of the MMTP packet may include a timed flag indicating whether the fragment of the MPU includes timed media. Specifically, when the value of the timed flag is 1, the timed flag can indicate that the MPU fragment included in the MMTP packet includes timed media. In a specific embodiment, the timed flag may be referred to as T. In a specific embodiment, the timed flag may be 1-bit flag.

When the MMTP packet includes a fragment of the MPU, the payload header of the MMTP packet may include a fragment indicator indicating fragment information of a data unit included in the payload. The data unit may represent the unit of data included in the payload of the MMTP packet.

The payload of the MMTP packet may include one or more data units. In a specific embodiment, the fragment indicator may be referred to as f_i. In a specific embodiment, the fragment indicator may be a 2-bit field.

When the MMTP packet includes a fragment of the MPU, the payload header of the MMTP packet may include an aggregation flag indicating that the payload includes one or more data units. In a specific embodiment, the aggregation flag may be referred to as A. In a specific embodiment, the aggregation flag may be a 1-bit flag.

When the MMTP packet includes a fragment of the MPU, the payload header of the MMTP packet may include a fragment counter field indicating the number of fragments included in the same data unit included in the payload. When the aggregation flag indicates that one or more data units are included in the payload, the value of the fragment counter field may be 0. In a specific embodiment, the fragment counter field may be referred to as frqg_counter. In a specific embodiment, the fragment counter field may be an 8-bit field.

When the MMTP packet includes a fragment of the MPU, the payload header of the MMTP packet may include an MPU sequence field indicating a number of a sequence including the MPU fragment. In a specific embodiment, the MPU sequence field may be referred to as MPU_sequence_number.

When the MMTP packet includes a fragment of the MPU, the payload header of the MMTP packet may include a data unit length field indicating the length of a data unit. Specifically, when the payload of the MMTP packet includes one or more data units, the payload header of the MMTP packet may include the data unit length field indicating a data unit length. In a specific embodiment, the data unit length field may be referred to as DU length. In a specific embodiment, the data unit length field may be a 16-bit field.

When the MMTP packet includes a fragment of the MPU, the payload header of the MMTP packet may include a data unit header field indicating a header of a data unit. The data unit header field has a format depending on the type of data included in the data unit. Specifically, the data unit header field may have a format depending on the value of the aforementioned type field. Transmission of application signaling information using this payload header syntax will be described with reference to the following figure.

FIG. 146 shows synchronization of content with a trigger transmitted through an MPU according to an embodiment of the present invention.

The broadcast transmission device 10 may transmit application signaling information through a track of ISO BMFF by transmitting the same through an MPU. Accordingly, the broadcast transmission device 10 can transmit the application signaling information such that the application signaling information is synchronized with content on a frame-by-frame basis. Specifically, the broadcast transmission device 10 can transmit the application signaling information through the aforementioned payload header syntax of the MMTP packet such that the application signaling information can be synchronized with content on a frame-by-frame basis. In a specific embodiment, the broadcast transmission device 10 can set the fragment type of the MPU to the media fragment unit, insert the application signaling information into the data unit payload and transmit the application signaling information. Further, the broadcast transmission device 10 may set the timed flag such that the timed flag indicates transmission of timed media. Specifically, the broadcast transmission device 10 can set the timed flag such that the timed flag indicates transmission of timed media when the application signaling information needs to be transmitted at a specific time like a trigger. When application signaling information included in a data unit is a trigger, the trigger may have the aforementioned form. In another specific embodiment, the trigger may have a timed text form. Further, the trigger may be XML. In addition, the trigger may include an application ID that identifies a triggered application. Further, the trigger may include a triggering event ID that identifies a triggering event. The trigger may include an action indicating an action of a triggered application. Further, the trigger may include a data ID that identifies data necessary for a triggering event. In addition, the trigger may include a triggering event start time. The trigger may include a triggering event end time. As described above, the broadcast reception device 10 can perform an action after the triggering event start time and before the triggering event end time. Specifically, the application signaling information can be synchronized with a movie fragment presented in a decided sequence at a decided time through the trigger. In a specific embodiment, the broadcast transmission device 10 may set the triggering event start time and triggering event end time on the basis of a media time in the movie fragment. Further, the broadcast transmission device 10 may set the triggering event start time and triggering event end time to relative time in the trigger. Otherwise, the broadcast transmission device 10 may set the triggering event start time and triggering event end time to time based on wall-clock provided through out-of-band. For example, the broadcast transmission device 10 can set the triggering event start time and triggering event end time to time based on wall-clock provided by CI. Further, the broadcast transmission device 10 may set the triggering event start time and triggering event end time to time based on wall-clock provided by timestamp descriptor( ).

In the embodiment of FIG. 146, a first trigger (Trigger 1) is synchronized with a first movie fragment (Movie Fragment 1) and a second trigger (Trigger 2) is synchronized with a second movie fragment (Movie Fragment 2). Specifically, the first trigger signals the position of triggering application information according to the above-described trigger format and triggers a triggering event having a triggering event ID of 5 to be immediately executed for an application having an application ID of 7. The second trigger signals the position of triggering application information according to the above-described trigger format and triggers a triggering event having a triggering event ID of 3 to be executed between 77ee to 80ee for an application having an application ID of 8.

The broadcast transmission device 10 may transmit an application signaling message as a signaling message of the MMT protocol. This will be described with reference to the following figure.

FIG. 147 shows a syntax of an MMT signaling message according to another embodiment of the present invention.

The MMT signaling message according to an embodiment of the present invention may include a message ID identifying the signaling message. In a specific embodiment, the message ID may be referred to as message_id. In a specific embodiment, the message ID may be a 16-bit field.

In addition, the MMT signaling message may include version information indicating update history of the signaling message. In a specific embodiment, the version information may be referred to as "version". In a specific embodiment, the version information may be an 8-bit field.

The signaling message may include length information indicating the length of data included therein. The length information may be referred to as "length". In a specific embodiment, the length information may be a 16-bit or 32-bit field.

The signaling message may include extension information indicating later extension of the signaling message. The signaling message may include various types of information. This will be described with reference to the following figure.

FIG. 148 shows a relationship between a value of an ID identifying an MMT signaling message and data signaled by the MMT signaling message according to another embodiment of the present invention.

Specifically, the signaling message may be a PA message indicating information of all signaling tables. Here, the message ID may be 0x0000. The signaling message may be an MPI message including media content presentation information. Here, the message ID may be 0x0001 to 0x000F. The signaling message may be an MPT message including an MP table indicating information of an asset included in a package. Here, the message ID may be 0x0011 to 0x001F. Further, the signaling message may be a CRI message including a CRI table indicating synchronization information. Here, the message ID may be 0x0200. The signaling message may be a DCI message including a DCI table indicating device performance necessary to consume a package. Here, message ID may be 0x0201. Further, the signaling message may be an AL_FEC message indicating FEC information necessary to receive an asset. Here, the message ID may be 0x0202. The signaling message may be an HRBM message indicating a memory and end-to-end transmission delay necessary for the broadcast reception device 100. Here, the message ID may be 0x0203. To transmit application signaling information, the signaling message may be an application signaling message including application signaling information other than the aforementioned messages. The broadcast reception device 100 can identify the type of a message included in the signaling message through the above-described message ID. Here, the message ID may be 0x8000. The form of the application signaling message will be described with reference to the following figure.

FIG. 149 shows a syntax of a signaling message including application signaling information according to another embodiment of the present invention.

The application signaling message according to another embodiment of the present invention may include an application signaling table including application signaling information in the signaling message. In a specific embodiment, the signaling message may include a plurality of application signaling tables.

The application signaling message may include table number information indicating the number of application tables included in the application signaling message. In a specific embodiment, the table number information may be referred to as number_of_tables. The table number information may be an 8-bit field.

The application signaling message may include table ID information that identifies an application table included therein. In a specific embodiment, the table ID information may be referred to as table_id. The table ID information may be an 8-bit field.

The application signaling message may include table version information indicating signaling table update history. In a specific embodiment, the table version information may be referred to as table_version. In a specific embodiment, the table version information may be an 8-bit field.

The application signaling message may include table length information indicating the length of a signaling table.

In a specific embodiment, the table length information may be referred to as table length. In a specific embodiment, the table length information may be an 8-bit field. A detailed syntax of the application signaling table will be described with reference to the following figure.

FIG. 98 shows a syntax of an application signaling table including application signaling information according to another embodiment of the present invention.

The application signaling table according to another embodiment of the present invention may include an ID that identifies the application signaling table. In a specific embodiment, the ID may be called table_id. The ID may be an 8-bit field.

The application signaling table may include version information indicating application signaling table update history. In a specific embodiment, the version information may be called "version". In a specific embodiment, the version information may be an 8-bit field.

The application signaling table may include length information indicating the length thereof. In a specific embodiment, the length information may be called "length". In a specific embodiment, the length information may be a 16-bit field.

The application signaling table may include trigger type information indicating the type of a trigger included therein. The signaling table may include various types of triggers. This will be described with reference to the following figure.

FIG. 151 shows a relationship between trigger type information included in the application signaling table and trigger properties included in triggers according to another embodiment of the present invention.

A trigger included in the signaling table can signal the position of triggering application information. Here, the trigger type information may be 1. Further, the trigger included in the signaling table can signal the lifecycle of an application. Specifically, the trigger included in the signaling table can signal an application status. Here, the trigger type information may be 2. The trigger included in the signaling table can signal an application action. Here, the trigger type information may be 3. In addition, the trigger included in the signaling table can signal a media time of content. Here, the trigger type information may be 4. Further, the trigger included in the signaling table can include all types of information that can be included in the trigger. Here, the trigger type information may be 5. Description will be given with reference to FIG. 150.

In a specific embodiment, the trigger type information may be called trigger_type. In a specific embodiment, the trigger type information may be an 8-bit field.

Signaling information table may include text indicating a trigger. Specifically, the signaling information table may include character information indicating characters included in the trigger. In a specific embodiment, the signaling information table may include multiple pieces of character information. In a specific embodiment, the character information may be called URI character. Further, the trigger may have the aforementioned form. In a specific embodiment, the character information may be an 8-bit field.

In the embodiment described with reference to FIGS. 150 and 151, trigger types are represented through the trigger type information in the application signaling message table. In this case, the broadcast reception device 100 needs to parse the application signaling table to recognize a trigger type. Accordingly, the broadcast reception device 100 cannot selectively receive only a necessary trigger. A method for solving this problem will be described with reference to the following figure.

FIG. 152 shows a relationship between a value of an ID identifying an MMT signaling message and data signaled by the MMT signaling message according to another embodiment of the present invention.

The broadcast transmission device 10 can set the message ID for identifying an application signaling message depending on the type of a trigger included in the application signaling message. Specifically, the broadcast transmission device 10 can set the message ID depending on whether the trigger is a trigger signaling the position of triggering application information, a trigger signaling an application lifecycle, a trigger signaling an application action, a trigger signaling a content media time or a trigger including all trigger information. Specifically, when the message ID is 0x8000 to 0x8004, the message ID can indicate that the signaling message is an application signaling message. In a specific embodiment, when a trigger included in the application signaling message signals the position of triggering application information, the message ID may be 0x8000. When the trigger included in the application signaling message signals an application lifecycle, the message ID may be 0x8001. When the trigger included in the application signaling message signals an application action, the message ID may be 0x8002. When the trigger included in the application signaling message signals a content media time, the message ID may be 0x8003. When the trigger included in the application signaling message includes all trigger information, the message ID may be 0x8004. Since the message ID of the signaling message indicates the type of a trigger included in the application signaling message, the application signaling table may not include the trigger type information. In the embodiment of FIG. 153, the application signaling table does not include the trigger type information differently from the aforementioned application signaling table.

When the message ID identifying the application signaling message is set depending on the type of a trigger included in the signaling message, as described above, the broadcast reception device 100 can recognize a trigger type without parsing the application signaling table included in the application signaling message. Accordingly, the broadcast reception device 100 can selectively receive a specific type of trigger efficiently.

The broadcast transmission device 10 can transmit the application signaling information through a generic packet. This will be described with reference to the following figure.

FIG. 154 shows a structure of an MMTP packet according to another embodiment of the present invention.

First of all, the syntax of the MMTP packet will be described.

The MMTP packet may include version information indicating the version of the MMTP protocol. In a specific embodiment, the version information may be referred to as V. In a specific embodiment, the version information may be a 2-bit field.

The MMTP packet may include packet counter flag information indicating presence of packet counting information. In a specific embodiment, the packet counter flag information may be referred to as C. In a specific embodiment, the packet counter flag information may be a 1-bit field.

The MMTP packet may include FEC type information indicating a scheme of an FEC algorithm for preventing errors in the MMTP packet. In a specific embodiment, the FEC type information may be referred to as FEC. In a specific embodiment, the FEC type information may be a 2-bit field.

The MMTP packet may include extension flag information indicating presence of header extension information. In a specific embodiment, the extension flag information may be referred to as X. In a specific embodiment, the extension flag information may be a 1-bit field.

The MMTP packet may include RAP (Random Access Point) flag information indicating whether an RAP for data random access of a payload is included. In a specific embodiment, the RAP flag information may be referred to as R. In a specific embodiment, the RAP flag information may be a 1-bit field.

The MMTP packet may include type information indicating a data type of the payload. In a specific embodiment, the type information may be referred to as type. In a specific embodiment, the type information may be a 6-bit field.

The MMTP packet may include packet ID information indicating an ID identifying the packet. The broadcast reception device 100 can determine an asset including the corresponding packet on the basis of the packet ID information. Further, the broadcast reception device 100 can acquire a relationship between the asset and the packet ID from the signaling message. The packet Id information may have a unique value for the lifetime of the corresponding transport session. In a specific embodiment, the packet ID information may be referred to as packet_id. In a specific embodiment, the packet ID information may be a 16-bit field.

The MMTP packet may include packet sequence number information indicating a packet sequence number. In a specific embodiment, the packet sequence number information may be referred to as packet_sequence_number. In a specific embodiment, the packet sequence number information may be a 32-bit field.

The MMTP packet may include timestamp information that specifies a time instance value of MMTP packet transmission. The timestamp information may be based on a UTC value. Further, the timestamp information may represent a time when the first byte of the MMTP packet is transmitted. In a specific embodiment, the timestamp information may be referred to as timestamp. In a specific embodiment, the timestamp information may be a 32-bit field.

The MMTP packet may include packet counting information indicating a count of transmitted packets. In a specific embodiment, the packet counting information may be referred to as packet counter. In a specific embodiment, the packet counting information may be a 32-bit field.

The MMTP packet may include FEC information which is necessary according to an FEC protection algorithm. In a specific embodiment, the FEC information may be referred to as Source FEC_payload_ID. In a specific embodiment, the packet counting information may be a 32-bit field.

The MMTP packet may include reserved header extension information for later header extension. In a specific embodiment, the header extension information may be referred to as header extension.

The broadcast transmission device 10 can insert application signaling information into a generic type packet. Specifically, the broadcast transmission device 10 can insert the application signaling information into a payload of the generic type packet in the form of a file and transmit the application signaling information. Here, the broadcast transmission device 10 can allocate different packet IDs to files. The broadcast reception device 100 can extract the application signaling information from the generic packet. Specifically, the broadcast reception device 100 can extract a file including the application signaling information from the generic packet. Specifically, the broadcast reception device 100 can extract the file including the application signaling information on the basis of the packet ID of the generic packet. For example, the broadcast reception device 100 can determine whether the packet includes necessary application signaling information on the basis of the packet ID of the generic packet.

The broadcast transmission device 10 may transmit the application signaling information using the header extension information of the MMTP packet. This will be described with reference to the following figure.

FIG. 155 shows a structure of an MMTP packet and a syntax of a header extension field for application signaling information transmission according to another embodiment of the present invention.

The broadcast transmission device 10 may insert the application signaling information into the header of the MMTP packet and transmit the same. Specifically, the broadcast transmission device 10 may insert the application signaling information into the header extension information and transmit the same.

In a specific embodiment, the header extension information may include header extension type information indicating the type of header extension information included therein. Here, the header extension type may indicate that the header extension information includes an application signaling message. In another specific embodiment, the header extension type information may indicate the type of application signaling information included in the header extension information. Here, the type of application signaling information may include a trigger type depending on the aforementioned trigger property. In a specific embodiment, the header extension type information may be referred to as type.

In a specific embodiment, the header extension information may be a 16-bit field. In a specific embodiment, the header extension information may include header extension length information indicating the length of the header extension information. Here, the header extension length information may indicate the length of the application signaling information included in the header extension information. In a specific embodiment, the header extension length information may be referred to as length. In a specific embodiment, the header extension information may be a 16-bit field.

In a specific embodiment, the header extension information may include a header extension value indicating extension information included therein. Here, the header extension value may represent application signaling information included in the header extension information. Here, the application signaling information may be a trigger. Further, the type of the application signaling information may be a URI in a string form. The URI in a string form may be the aforementioned string type trigger. In a specific embodiment, the header extension value may be referred to as header_extension_value.

Accordingly, the broadcast reception device 100 can extract the application signaling information from the header extension information. Specifically, the broadcast reception device 100 can extract the application signaling information on the basis of the header extension type information included in the header extension information. Specifically, the broadcast reception device 100 can determine whether the header extension information includes the application signaling information on the basis of the header extension type information. The broadcast reception device 100 can extract the application signaling information when the header extension information includes the application signaling information. Further, the broadcast reception device 100 can determine the type of the application signaling information included in the header extension information on the basis of the header extension type information. Accordingly, the broadcast reception device 10 can selectively acquire the application signaling information.

Description will be given of operations of the broadcast transmission device 10 and the broadcast reception device 100 according to transmission and reception of application signaling information in accordance with the above-described embodiments of the present invention with reference to the following figures.

FIG. 156 shows part of a broadcast system according to an embodiment of the present invention.

In a future hybrid broadcast system, an interactive application related to broadcast programs may be delivered through a broadcast network or the Internet and provided to users. To deliver the interactive application to a receiver, a service worker, one type of web workers of HTML5 which can be generally used in a browser environment, may be used.

The service worker may automatically store content items related to the interactive application in a storage of the receiver depending on characteristics of type of the interactive application. Otherwise, the content items related to the application may be stored in the receiver by a user.

The receiver can provide a mechanism that can operate similarly to a package application or a widget through the service worker and can drive applications even in an offline state such as an Internet-disconnected state.

An embodiment of the present invention relates to a method of installing the interactive application in the receiver through the service worker and/or interworking with addLink( ) API to provide application management functions such as execution, termination, update and/or deletion of the interactive application when a user wants.

The broadcast system according to an embodiment of the present invention includes a receiver J104100, a content provider/broadcaster J104200 and/or an application service server J104300.

The receiver J104100 may include a signaling parser J104110, an application manager J104120, an application browser (or an application processor) J104130, a service worker J104132, a (non-real-time) NRT content manager J104140 and/or a storage J104150.

The signaling parser J104110 is a device or a module for parsing a signal sent from the content provider/broadcaster. The signal may include signaling information (or signaling data) and/or content. The signaling information including application related information is acquired. The signaling information may include command information for identifying a command related to application execution.

The application manager J104120 is a device or a module for managing an application when the application is present after the signal is parsed. The application manager J104120 generates a control signal with respect to an application action using information included in the signaling information.

The application browser (or application processor) J104130 is a device or a module for performing a process for executing an application. The application browser J104130 processes the application according to a control signal. The application browser J104130 can perform interactive communication between the receiver and a server (or broadcaster), which is necessary for a procedure through which the application is provided to a user.

The service worker J104132 may be included in the application browser or included as a separate device in the receiver. The service worker J104132 is a module or a device for managing downloading of NRT content or application related information from a server provided by the content provider/broadcaster.

The NRT content manager J104140 is a module or a device for managing non-real-time (NRT) content. The NRT content manger J104140 processes NRT content transmitted in non real time.

The storage J104150 is a device storing data. The storage used in the present invention may include an internal storage of the receiver, a cache in a browser for driving the interactive application and/or an external storage (e.g., external USB storage) connected to the receiver. The storage J104150 provides applications and/or signaling information stored therein to the service worker J104132 or the application browser J104130. The storage J104150 can receive and store an application through interactive communication with the application service server.

The application used in the present invention may correspond to an application provided by the content provider/broadcaster. The application may provide an independent service or may be combined with broadcast content to provide a service with higher quality to users. The application can operate by activating (or launching), suspending, resuming or terminating (or exiting) actions.

The content provider/broadcaster J104200 provides content in the broadcast system. The content provider/broadcaster J104200 can deliver signaling information related to the application to the receiver. The content provider/broadcaster J104200 can transmit signaling information and/or NRT content to the receiver through an NRT transmission network. The NRT content may include broadcast content and/or the application.

The application service server J104300 is a server providing data related to the application.

FIG. 157 shows an example in which a storage is included in the broadcast system according to an embodiment of the present invention.

The storage may be included in the broadcast system as an internal storage J105100, a cache memory J105200 and/or an external storage J105300.

The internal storage J105100 may correspond to a storage device included in the receiver.

The cache memory J105200 may correspond to a storage device included in the application browser.

The external storage J105300 may be a storage device outside the receiver and may correspond to a general external storage device, a server or a cloud storage. When the external storage J105300 corresponds to the server or cloud storage, the receiver and the external storage are connected through networking and the receiver can rapidly receive data about an application at the request of a receiver user.

FIG. 158 shows operation of the service worker according to an embodiment of the present invention.

The service worker, a web worker of HTML5, can be driven by the application browser that can execute an application in the receiver. The service worker may be created to be activated when an initial application is executed or when a user wants. The service worker may be positioned between the application server and a web application executed in the receiver to serve as a proxy for a network request transmitted to the application server. When the service worker is activated, the service worker processes a request for application content items when the application executed in the receiver sends the request to the application server. The service worker can receive and/or process a response from the application server.

The application content items may refer to the application or subsidiary content necessary to present the application.

FIG. 159 shows operation of the service worker in an offline state according to an embodiment of the present invention.

The advantage of the service worker as a proxy role is that the service worker can store all or some application content items on the application server in a cache.

The cache can be used differently from a cache generally used in a browser, and the cache defined in the service worker can be completely manually controlled.

As shown, the receiver can execute an application even when the receiver is not connected to the Internet using application content items downloaded from the application server and stored in the cache by the service worker. In this case, the application browser can deliver a request for the application content items to the service worker and the service worker can check whether application content items suitable for the request are present in the cache and deliver corresponding data to the application browser.

FIG. 160 shows an application program interface (API) and metadata used for a receiver to execute an application according to an embodiment of the present invention.

As described above, the interactive application can be installed in the receiver and provided to a user. When application content items for the interactive application in a web application form are stored in a database (DB) (or a storage) or a cache by the service worker, the receiver can execute the interactive application like a widget even in an offline state (i.e., the Internet is not connected). The interactive application can call addLink( ) API of the application manager of the receiver. Here, the application manger provides metadata related to the application to the application browser or the service worker such that the receiver can configure a page or a menu for a link.

When the user is viewing a program through the receiver, application notification indicating presence of the interactive application related to the program may be displayed on the screen. The user inputs a command for executing the application to the receiver. The service worker in the receiver may be registered or may register the application or the user command. An install button may be displayed during execution of the application and the user may install the application by selecting the install button. The service worker may control application content items to be downloaded and stored in a storage (an internal storage, an external storage or a cache). An application registration procedure of the service worker may include application installation and/or application activation. The application may call addLink( ) API of the application manager of the receiver. When the addLink( ) API is called, related metadata may be delivered to the application manager of the receiver such that the application manager can configure an application widget page. The application manager of the receiver may configure an application collection page and/or menu using the delivered metadata. Users may order operations of executing, terminating, updating and/or deleting installed applications using the application collection page or menu. When a user executes an installed application, the user may call the URL of the application. When application content items corresponding to the URL are stored in the storage, the service worker may load the application content items from the storage.

The URL of the interactive application in a web application form may be stored in the receiver. The interactive application calls the addLink( ) API of the application manage of the receiver, and metadata related to the application may be delivered to the application manger such that the receiver can configure a page or a menu for a link.

When a user is viewing a program through the receiver, application notification indicating presence of the interactive application related to the program may be displayed on the screen. The user inputs a command for executing the application to the receiver. The service worker may not be registered. In this case, the service worker may not download application content items which will be used in an offline state. The install button may be displayed during execution of the application and the user may input a command for selecting the install button to the receiver. The application may call the addLink( ) API of the application manager. When the addLink( ) API is called, related metadata may be delivered from the application such that the application manager of the receiver can configure an application link page. The application manager of the receiver may configure an application collection page or menu using the delivered metadata. Users may input a command for executing, terminating, updating and/or deleting installed applications to the receiver. A user may control link to the URL of an installed application to be executed to load application content items.

Table (a) of the figure shows an embodiment of addLink( ) API of the application manager. When the addLink( ) API is successfully called, the receiver adds a link to a list of links. The integer returns a value indicating whether the API has been successfully called and, when calling fails, returns a value indicating the reason of failure. The addLink( ) may be called application link information. The application link information includes a link and/or application property information necessary to execute an application.

The addLink( ) may include URI information and/or linkmetadata information.

The URI information indicates a URI value of a URL stored as a link. The URI information may indicate a URL stored as a link for an application.

The linkmetadata information includes metadata related to a link. The linkmetadata information will be described in detail below.

Table (b) of the figure shows values returned by the addLink( ) APO and definition thereof. When "0" is returned, this value indicates successful calling and addition of a link. When "1" is returned, this value indicates that calling fails because the syntax of URI information is not valid. When "2" is returned, this value indicates that calling fails because the linkmetadata information is not valid. When "3" is returned, this value indicates that calling fails because the number of stored links exceeds a permitted limit.

Table (c) of the figure shows a schema table of the linkmetadata information. The linkmetadata information may include @url information, @title information, @majChanNum information, @minChanNum information, @channelName information, @programName information, @expiration information, @packagedApp information, @description information, a Param element, @title information, @description information, an Icon element, @source information, @width information and/or @height information.

The @url information indicates a URL related to a link. The @url information may represent the URL of an object indicated by a link.

The @title information indicates a link title displayed to a user.

The @maiChanNum information indicates a major channel number of a virtual channel for which a link is provided. When the link is provided through an NRT service, this information can indicate some values (e.g., upper 8 bits) of service id information of the NRT service included in a service map table (SMT).

The @minChanNum information indicates a minor channel number of a virtual channel for which a link is provided. When the link is provided through an NRT service, this information can indicate some values (e.g., lower 8 bits) of service_id information of the NRT service included in the service map table (SMT).

The @channelName information indicates a short_name of a virtual channel for which a link is provided. When the link is provided through an NRT service, this information can indicate the same information as short_service_name information of the NRT service included in the service map table (SMT).

The @programName information indicates title text (a title represented by characters) of a program (e.g., a PSIP event, a broadcast program, a broadcast event or an event in an application) for which a link is provided.

The @expiration information indicates an expiration date at which a link become invalid.

The @packagedApp information indicates whether a linked URL corresponds to a widget or a packaged application. The receiver can recognize whether the linked URL is a link for acquiring an application or a widget using this information. When the receiver is not connected to the Internet and the linked URL corresponds to the link for acquiring an application, application management such that shading may be performed such that the application cannot be executed.

The @description information indicates description about an application.

The Param element may be used to indicate a query string following a URL for a link to an application. For example, in a URL of http(s)://app.example.com/index.html?type=value, "type=value" may correspond to the Param element. For example, applications may be discriminated by Param element values although they use the same URL. The application manager of the receiver may use the Param element to group or search for applications associated with the same broadcaster or the same program. A broadcaster or a content provider can efficiently manage applications by discriminating the applications using Param element values without assigning different URLs to the applications.

The @title information indicates a title for the Param element.

The @description information indicates description about the Param element.

The Icon element identifies an icon file used to indicate a link in a display of links to a user. A plurality of icon files may be present. For example, icon files having different sizes or indicating the same link may be present. One of such icon files may be displayed according to situation.

The @source information indicates a URL of an image file for an icon indicated by the Icon element.

The @width information indicates the width of an icon image in pixel units.

The @height information indicates the height of an icon image in pixel units.

FIG. 161 shows a user interface (UI) with respect to an application or a link for an application according to an embodiment of the present invention.

The receiver may provide a UI through which a user can select a desired application or a link providing the application.

The aforementioned information included in the addLink( ) may be used when the receiver provides the UI. For example, the receiver can display an icon for an application or a link for the application using the Icon element, @source information, @width information and/or @height information. The receiver can display a title of an application or a link for the application using the @title information. The receiver can display information describing an application or a link in the UI using the @description information.

FIG. 162 shows a process through which a receiver installs and executes an application in the form of a widget according to an embodiment of the present invention.

An application in the form of a widget may be installed and executed using the service worker and the addLink( ) API.

When the URL of an interactive application is http(s)://app.example.com/index.html, there may be multiple links (or URLs) for application content items included in the application, as shown.

The receiver may receive signaling information related to the application. The receiver may deliver the signaling information related to the application to the application manager (step 1).

The application manger may acquire the URL of the application included in the signaling information and execute the application (step 2).

After execution of the application URL, application content items may be downloaded through a broadcast network and/or the Internet when the service worker is registered automatically or by a user (step 3).

The service worker may store the application content items in a storage (internal storage/browser cache/external storage) after downloading the application content items (step 4).

The application (or application browser) may call add-Link( ) and deliver metadata related to the link of the application to the application manger (step 5).

The application manager may store the delivered metadata in the storage (internal storage/browser cache/external storage) (step 6).

FIG. 163 shows a process through which a user executes an application upon installation of the application according to an embodiment of the present invention.

The URL of the application may be http(s)://app.example.com/index.html and URLs or links of application content items may be as shown in the figure.

A user may input a command for executing the application to the receiver through an installed app menu in the receiver. The installed app menu may be implemented in the form of a UI using metadata included in addLink( ), as described above (step 1).

The application manger may execute the application URL. The application manager may execute the application indicated by the URL. When the user select a specific application, the application manger may be configured to acquire the URL corresponding to the selected application and to execute the application corresponding to the URL (step 2).

In a process through which the application or browser loads the application URL, the service worker is driven to load application content items stored in the storage. Since all application content items for application execution are stored in the storage, the receiver can normally operate the application even when the receiver is not connected to the Internet.

As described above, according to the embodiments of the present invention, the broadcast receiver can correctly execute a desired application of a viewer at an appropriate time even when the broadcast receiver is not connected to the Internet or does not receive data related to the application through the current broadcast network, in application execution in the broadcast receiver.

FIG. 164 is a flowchart illustrating a method of executing an application by a broadcast receiver according to an embodiment of the present invention.

The broadcast receiver receives application signaling information including information about an application (JS112010). The application signaling information may be included in a broadcast signal and transmitted, and the broadcast receiver may parse the application signaling information from the broadcast signal.

The broadcast receiver parses application URL information including a URL at which a specific application can be acquired from the application signaling information (HS112020).

The broadcast receiver receives one or more application content items related to the application identified by the application URL (JS112030).

The broadcast receiver stores the received application content items (JS112040).

All or some technical features described above may be added to each step of the method of executing an application by the broadcast receiver according to an embodiment of the present invention.

FIG. 165 is a diagram showing an API according to an embodiment of the present invention.

The Widget API according to the embodiment of the present invention may include at least one of an installWidget( ) API, an onWidgetInstallation( ) API, a startWidget( ) API and/or a widgets( ) API.

The installWidget( ) API (or ApplicationManager.installWidget) is an API used to install an application. An application browser may asynchronously call an installWidget( ) API of an application manager. The application browser (or a receiver) may install and/or add a widget in and/or to a list of widgets (e.g., applications) based on the installWidget( ) API. The application (or the widget) installed in the receiver may be referred to as a packaged App.

The onWidgetInstallation( ) API (or ApplicationManager.onWidgetInstallation) is an API used for a callback routine (or a callback function) to report on installation progress of a widget (e.g., an application).

The startWidget( ) API (or ApplicationManager.startWidget) is an API used to launch an installed widget (e.g., a packaged application).

The widgets API (or ApplicationManager.widgets) is an API used to return a list of installed widgets (e.g., a packaged application).

The application browser (or the receiver) may call at least one of the above-described widget APIs.

FIG. 166 is a diagram showing an installWidget( ) API according to an embodiment of the present invention.

A side for providing an application (or a widget) cannot add an application to a list of applications (or a list of widgets) of a TV using only an installation function of the application.

Accordingly, the installWidget( ) API according to the embodiment of the present invention may further include widgetMetadata as an argument to provide a function for installing an application and a function for adding an application to the list of applications.

The integer return value of the installWidget( ) API shall indicate whether or not the call of the installWidget( ) API was successful. If the call of the installWidget( ) API failed, the integer return value of the installWidget( ) API shall provide the reason for failure.

The application browser (or the receiver) according to the embodiment of the present invention may call the installWidget( ) API of the application manager. The installWidget( ) API may include a uri argument and/or a widgetMetadata argument as arguments. That is, the application browser (or the receiver) may deliver the uri argument and/or the widgetMetadata argument to the application manager, upon calling the installWidget( ) API of the application manager.

The uri argument may be a resource locator in the form of a URI, which points to an application (or a widget package) to be installed.

The widgetMetadata argument shall represent metadata to be associated with the application. The widgetMetadata argument takes the form of a UTF-8 representation of an XML document. The widgetMetadata argument may be the same as the above-described linkMetadata argument except the root element. That is, the root element of the widgetMetadata argument may be a widgetMetadata element.

For example, the widgetMetadata argument (or the widgetMetadata element) may include a url attribute, a title attribute, a majChanNum attribute, a minChanNum attribute, a channelName attribute, a programName attribute, an expiration attribute, a packagedApp attribute, a description attribute, a Param element, and an Icon element. Details of the attributes and/or elements included in the widgetMetadata argument may include all details of the above-described information having similar names.

FIG. 167 is a diagram showing an addWidget( ) API according to an embodiment of the present invention.

The Widget API according to the embodiment of the present invention may further include an addWidget( ) API. In this case, the above-described installWidget( ) API may include only a uri argument as an argument.

The installWidget( ) API according to an embodiment of the present invention may provide a function for installing an application. The addWidget( ) API according to an embodiment of the present invention may be separated from the above-described installWidget( ) API to provide a function for adding an application to a list of applications.

The integer return value of the addWidget( ) API shall indicate whether or not the call of the addWidget( ) API was successful. If the call of the addWidget( ) API failed, the integer return value of the addWidget( ) API shall provide the reason for failure.

The application browser (or the receiver) according to the embodiment of the present invention may call the addWidget( ) API of the application manager. The addWidget( ) API may include a uri argument and a widgetMetadata argument as arguments. That is, the application browser (or the receiver) may deliver the uri argument and/or the widgetMetadata argument to the application manager, upon the addWidget( ) API of the application manager.

Details of the uri argument and/or widgetMetadata argument included in the addWidget( ) API may include all details of the uri argument and/or the widgetMetadata argument included in the above-described installWidget( ) API.

FIG. 168 is a diagram showing a getLinks( ) API according to an embodiment of the present invention.

When the receiver is not connected to the Internet (or in the case of a packaged application), the receiver (or the application browser) may acquire a list of applications (that is, the packaged application) installed in the receiver based on the widgets( ) API.

When the receiver is connected to the Internet (or in the case of a link), the Widget API according to the embodiment of the present invention may further include a getLinks( ) API.

The getLinks( ) API according to the embodiment of the present invention shall provide information on a list of links capable of being connected to an application in a server. The getLinks( ) API according to the embodiment of the present invention shall provide information on the list of inkMetadata of links in the receiver.

The list of links returned in the getLinks( ) API may be a string in the form of a list composed of linkMetadata.

The receiver according to the embodiment of the present invention may acquire the list of applications (that is, the packaged application) installed in the receiver based on the widgets( ) API.

In addition, the receiver according to an embodiment of the present invention may acquire the list of links based on the getLinks( ) API.

FIG. 169 is a diagram showing a checkApplication( ) API according to an embodiment of the present invention.

Referring to FIG. 169(a). the Widget API according to an embodiment of the present invention may further include a checkApplication( ) API.

The checkApplication( ) API may provide information on whether the same application (e.g., packaged application or link) exists in the receiver. The integer return value of the checkApplication( ) API shall represent whether the same application (e.g., packaged application or link) exists in the receiver.

The application browser (or the receiver) may call the checkApplication( ) API of the application manager. The checkApplication( ) API may include a metadata argument as an argument. That is, the application browser (or the receiver) may deliver the metadata argument to the application manager, upon calling the checkApplication ( ) API of the application manager.

The metadata argument shall represent the metadata to be associated with either the packaged application or the link. The metadata argument takes the form of a UTF-8 representation of an XML document. The metadata argument may be the same as the above-described linkMetadata argument except the root element. That is, the root element of the metadata argument may be a metadata element.

For example, the metadata argument (or the metadata element) may include a url attribute, a title attribute, a majChanNum attribute, a minChanNum attribute, a channelName attribute, a programName attribute, an expiration attribute, a packagedApp attribute, a description attribute, a Param element, and/or an Icon element. Details of the attributes and/or elements included in the metadata argument may include all details of the above-described information having similar names.

The receiver (or the application browser) may call the checkApplication( ) API before calling the installWidget( ) API and/or the addLink( ) API. The receiver may check whether the same application as an application to be installed exists at an application level based on the checkApplication( ) API. That is, the checkApplication( ) API may check whether the same application is installed in the receiver and/or whether the same link is added and return an integer return value.

Referring to FIG. 169(b), the integer return value of the checkApplication( ) API according to the embodiment of the present invention is shown. The integer return value of the checkApplication( ) API according to the embodiment of the present invention may be referred to as a code value.

For example, if the code value is '0', this shall indicate that the same application (or widget) is not installed in the receiver or the same link does not exist. Accordingly, the application can be installed in and/or added to the receiver.

For example, if the code value is '1', this shall indicate that the same application (or widget) is installed in the receiver or the same link exists. Accordingly, the application cannot be installed in and/or added to the receiver.

FIG. 170 is a diagram showing an installWidget( ) API according to an embodiment of the present invention.

In the case of a packaged application, the installWidget( ) API according to the embodiment of the present invention may change an existing return type to return error codes. For example, one of error codes may indicate that the same application (or widget) is installed in the receiver.

Referring to FIG. 170(a). the installWidget( ) API according to the embodiment of the present invention may provide a function for installing an application and a function for adding an application to a list of applications. Details of the installWidget( ) API may include all details of the above-described installWidget( ) API.

Referring to FIG. 170(b), an integer return value may be referred to as a code value.

If the code value is '0', this indicates that the call succeeded and a widget (or an application) was added.

If the code value is '1', this indicates that the call failed and the reason for failure is that the syntax of the URI argument was invalid.

If the code value is '2', this indicates that the call failed and the reason for failure is that the format of the widgetMetadata argument was invalid.

If the code value is '3', this indicates that the call failed and the reason for failure is that the number of stored widgets (or applications) exceeded an upper limit.

If the code value is '4', this indicates that the call failed and the reason for failure is that the same application (or widget) was already installed in the receiver.

FIG. 171 is a diagram showing an addLink( ) API according to an embodiment of the present invention.

In the case of a link, the addLink( ) API according to the embodiment of the present invention may change an existing return type to return error codes. For example, one of the error codes may indicate that the same link exists in the receiver.

Referring to FIG. 171(a), the addLink( ) API according to the embodiment of the present invention may include a function for adding a link to a list of links. Details of the addLink( ) API may include all details of the above-described addLink( ) API.

Referring to FIG. 171(b), an integer return value may be referred to as a code value.

If the code value is '0', this indicates that the call succeeded and a link was added.

If the code value is '1', this indicates that the call failed and the reason for failure is that the syntax of the URI argument was invalid.

If the code value is '2', this indicates that the call failed and the reason for failure is that the format of the linkMetadata argument was invalid.

If the code value is '3', this indicates that the call failed and the reason for failure is that the number of stored links exceeded an upper limit.

If the code value is '4', this indicates that the call failed and the reason for failure is that the same link already exists in the receiver.

FIG. 172 is a diagram showing a broadcast transmission method according to an embodiment of the present invention.

A broadcast transmission apparatus may generate service data (or signaling information for a service using a controller (not shown) (CS1720100).

Here, the service data may include app-based enhancement components. Here, the signaling data may include application signaling information associated with transmission of the app-based enhancement components. Here, the app-based enhancement components may include a primary device (PD) application. Here, the application signaling information may include application information indicating a uniform resource locator (URL) for providing the location of the PD application.

In addition, the broadcast transmission apparatus may generate low-level signaling data and/or service layer signaling data using the controller (CS1720200).

In addition, the broadcast transmission apparatus may transmit a broadcast signal including the service data, the low-level signaling data and the service layer signaling data through a transmission unit (CS1720300).

The low-level signaling data may support bootstrapping of service acquisition. For example, the low-level signaling data may include the above-described FIC.

The service layer signaling data may include first signaling data, second signaling data and third signaling data.

The first signaling data may include reference signal referring to the second signaling data and the third signaling data. For example, the first signaling data may include the above-described USD and/or SMT.

The second signaling data may include a description for the component of the service. For example, the second signaling data may include the above-described MPD.

The third signaling data may include acquisition information of the component related to the service. For example, the third signaling data may include at least one of an SDP, an SMT, a CMT, a ROUTE session element, an LCT session element, and/or an LSID.

FIG. 173 is a diagram showing a broadcast reception method according to an embodiment of the present invention.

The receiver according to the embodiment of the present invention may include a reception module and/or a controller. The controller may include an application processor, a companion module and/or a web socket server.

The receiver according to the embodiment of the present invention may receive a broadcast signal including signaling data for a service and service data (CS1730100).

Here, the service data may include app-based enhancement components. Here, the signaling data may include application signaling information associated with transmission of the app-based enhancement components. Here, the app-based enhancement components may include a primary-device (PD) application.

The receiver may install the PD application using an application processor (or an application browser) (CS1730200).

The receiver may perform a discovery process with a CD application executed in a companion device (CD) using the companion module (CS1730300).

The receiver may establish a web socket connection among the web socket server of the PD, the PD application and the CD application using the companion module (CS1730400).

The receiver may receive an emergency alert (EA) message including emergency alert information through a broadcast network or broadband using the reception module (CS1730500).

The receiver may deliver the EA message to the CD through the web socket connection using the web socket server (CS1730600)

In addition, the receiver may receive a request for a device description from the CD application and transmit a first response message, using the companion module. Here, the header of the first response message may include a first URL used as a web server end point of the PD.

In addition, the receiver may receive, from the CD application, a request for application information made from the first URL and transmit a second response message, using the companion module. Here, the second response message may include a second URL used as a web socket end point of the PD.

Here, the application signaling information may include application information indicating a uniform resource locator (URL) for providing the location of the PD application.

The receiver may call an install widget application programming interface (API) for installing the PD application in the PD using an application processor. Here, the install widget API may include at least one argument. Here, the at least one argument may include URI information indicating the PD application and metadata information indicating metadata associated with the PD application. Here, the install widget API may provide a response message. Here, the response message may indicate that the same PD application was already installed in the PD.

The above-described steps may be omitted or replaced with other steps of performing the same or similar operations.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording media storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A device for processing a broadcast signal, the device comprising:
   a tuner configured to receive the broadcast signal including a signal frame including content for a service, application signaling information for one or more applications that are related to the service and signaling information for discovering the application signaling information for the service, wherein:
   the signaling information including service category information representing a category of the service, the application signaling information including URL information of Hypertext Markup Language (HTML) files associated with the one or more applications;
   a frame parser configured to parse the signal frame;
   a time de-interleaver configured to time de-interleave data in the signal frame based on a Time Interleaving (TI) block;
   a decoder configured to decode the time de-interleaved data;

a display screen configured to display application information about the one or more applications, the application information including at least one of descriptions of the one or more applications, icons representing the one or more applications, or titles of the one or more applications; and in response to a selection signal of an application of the one or more applications, a controller configured to execute the application based on the application information.

2. The device of claim 1, wherein the content is delivered via one or more ROUTE sessions.

3. The device of claim 1, wherein the one or more applications are displayed in form of a widget on the display screen.

4. The device of claim 1, wherein a size of an icon is changeable.

5. The device of claim 4, wherein the display screen is further configured to display install information of the one or more applications.

6. The device of claim 5, wherein: in response to an installation signal of the one or more applications, the controller is further configured to install the one or more applications.

7. A method of processing a broadcast signal by an apparatus, the method comprising:

receiving the broadcast signal including a signal frame including content for a service, application signaling information for one or more applications that are related to the service, and signaling information for discovering the application signaling information for the service, wherein:

the signaling information including service category information representing a category of the service, the application signaling information including URL information of Hypertext Markup Language HTML files associated with the one or more applications;

parsing the signal frame;

time de-interleaving data in the signal frame based on a Time Interleaving (TI) block;

decoding the time de-interleaved data;

displaying application information about one or more applications, the application information including at least one of descriptions of the one or more applications, icons representing the one or more applications, or titles of the one or more applications; and in response to a selection signal of an application of the one or more applications, a controller configured to execute the application based on the application information.

8. The method of claim 7, wherein the content is delivered via one or more ROUTE sessions.

9. The method of claim 7, wherein the one or more applications are displayed in form of a widget on the display screen.

10. The method of claim 7, wherein a size of an icon is changeable.

11. The method of claim 7, wherein the method includes: displaying install information of the one or more applications.

12. The method of claim 11, wherein: in response to an installation signal of the one or more applications, installing the one or more applications.

* * * * *